United States Patent
Narkier et al.

(10) Patent No.: US 10,049,335 B1
(45) Date of Patent: Aug. 14, 2018

(54) INFRASTRUCTURE CORRELATION ENGINE AND RELATED METHODS

(75) Inventors: Sheppard David Narkier, Charlotte, NC (US); Anthony Bennett Bishop, Charlotte, NC (US); Paul Edward Renaud, Ottawa (CA); Alexis Salvatore Pecoraro, Huntersville, NC (US); Paul John Wanish, Concord, NC (US)

(73) Assignee: EMC Ip Holding Company LLC, Hopkinton, MA (US)

( * ) Notice: Subject to any disclaimer, the term of this patent is extended or adjusted under 35 U.S.C. 154(b) by 528 days.

(21) Appl. No.: 12/973,599

(22) Filed: Dec. 20, 2010

Related U.S. Application Data

(63) Continuation of application No. 12/899,456, filed on Oct. 6, 2010.

(60) Provisional application No. 61/278,361, filed on Oct. 6, 2009.

(51) Int. Cl.
  *G06Q 10/00* (2012.01)
  *G06Q 10/06* (2012.01)

(52) U.S. Cl.
  CPC ..... *G06Q 10/0637* (2013.01); *G06Q 10/0631* (2013.01)

(58) Field of Classification Search
  None
  See application file for complete search history.

(56) References Cited

U.S. PATENT DOCUMENTS

| | | |
|---|---|---|
| 7,117,161 B2 | 10/2006 | Bruce |
| 7,162,427 B1 * | 1/2007 | Myrick et al. ............ 705/348 |
| 7,308,414 B2 | 12/2007 | Parker et al. |
| 7,346,529 B2 | 3/2008 | Flores et al. |
| 7,574,343 B2 | 8/2009 | Levi et al. |
| 7,574,694 B2 | 8/2009 | Mangat et al. |
| 7,584,117 B2 | 9/2009 | Bubner |
| 7,970,729 B2 | 6/2011 | Cozzi |
| 8,150,726 B2 | 4/2012 | Merrifield, Jr. et al. |
| 2002/0087497 A1 * | 7/2002 | Troianova et al. ............ 706/45 |

(Continued)

OTHER PUBLICATIONS

Hurwitz et al. "E-Business Software (toward virtual companies) (industry trend or event)" DBMS, Jul. 1998, vol. 11, No. 8, P. 8. (Year: 1998).*

(Continued)

*Primary Examiner* — Stephanie Z Delich
(74) *Attorney, Agent, or Firm* — Krishnendu Gupta; Robert Kevin Perkins

(57) ABSTRACT

A method includes displaying to a user, via a display element, a user interface that allows a user to characterize business demand of an organization; receiving, from a user, via one or more input devices, input characterizing business demand; automatically comparing, utilizing one or more processors and one or more memory elements of a computer system, qualities of business demand to attributes of ensembles comprising implementations of reusable patterns, the qualities of business demand being based at least in part on the received input characterizing business demand; determining, based on the comparing step, a recommended ensemble; and displaying to a user, via a display element, the recommended ensemble and other possible ensembles as well as a visualization comparing the recommended ensemble and the other possible ensembles to business demand.

18 Claims, 126 Drawing Sheets

(56) References Cited

U.S. PATENT DOCUMENTS

| | | |
|---|---|---|
| 2004/0025162 A1* | 2/2004 | Fisk .................. G06F 3/0613 |
| | | 718/105 |
| 2004/0059611 A1 | 3/2004 | Kananghinis et al. |
| 2004/0143470 A1 | 7/2004 | Myrick et al. |
| 2005/0138160 A1* | 6/2005 | Klein et al. .................. 709/223 |
| 2005/0246215 A1 | 11/2005 | Rackham |
| 2006/0178920 A1 | 8/2006 | Muell |
| 2006/0195373 A1 | 8/2006 | Flaxer et al. |
| 2006/0242261 A1* | 10/2006 | Piot et al. .................. 709/217 |
| 2007/0005618 A1* | 1/2007 | Ivanov et al. .................. 707/100 |
| 2007/0033221 A1* | 2/2007 | Copperman et al. ..... 707/103 R |
| 2007/0038465 A1 | 2/2007 | Jang et al. |
| 2007/0038490 A1* | 2/2007 | Joodi .................. 705/7 |
| 2007/0038501 A1 | 2/2007 | Lee et al. |
| 2007/0118551 A1 | 5/2007 | Akkiraju et al. |
| 2007/0157165 A1* | 7/2007 | Kim .................. 717/113 |
| 2008/0028409 A1* | 1/2008 | Cherkasova .......... G06F 9/5061 |
| | | 718/104 |
| 2008/0040364 A1* | 2/2008 | Li .................. 707/100 |
| 2009/0228204 A1* | 9/2009 | Zavoli et al. .................. 701/208 |
| 2010/0082386 A1 | 4/2010 | Cao et al. |

OTHER PUBLICATIONS

"Matrix One Creates Intelligent Collaborative Commerice; Adaptive, Proactive, Secure Solutions Define Competitive Success for E-Commerce", Business Wire, Sep. 11, 2000, p. 2799. (Year: 2000).*

Information Disclosure Statement (IDS) Letter Regarding Common Patent Application(s), dated Jul. 18, 2012.

* cited by examiner

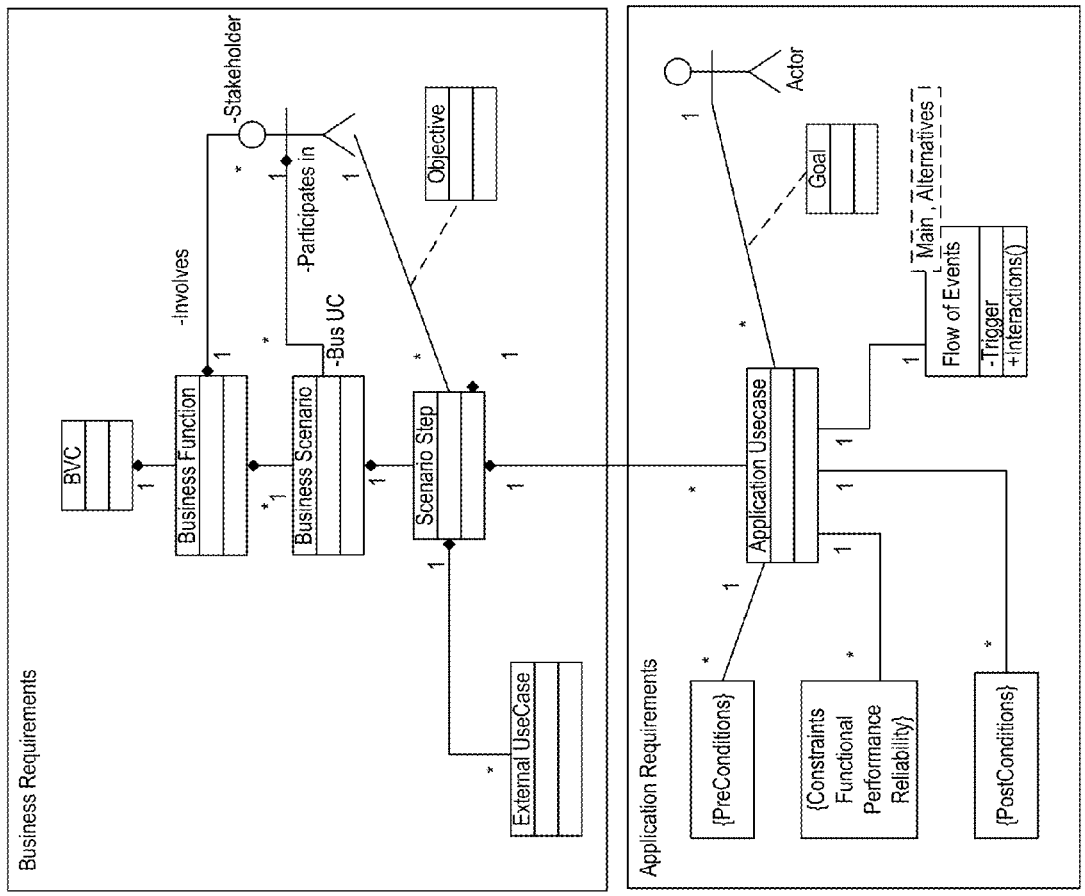
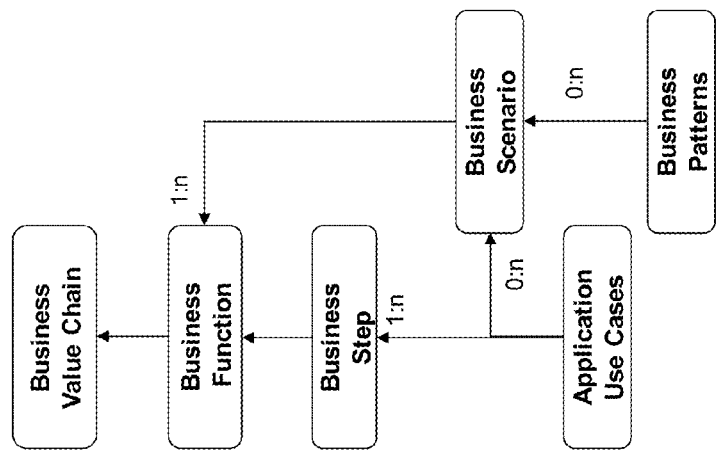
FIG. 6

FIG. 10

|  | | Answer 1<br>High | Answer 2<br>Medium | Answer 3<br>Low |
|---|---|---|---|---|
| RLA | Peak # of Concurrent Users | 200k to 50k | 50k to 10k | Less than 10k |
|  | Peak Transaction Size (bytes/transaction) | 25kB to 5kB | 5kB to 1kB | Less than 1kB |
|  | Peak Response Size (bytes/transaction) | 2MB to 1MB | 1MB to 100kB | Less than 100kB |
|  | Peak Interval Between Transactions per User (s) | Less than 1 s | 3s to 1s | 3s to 6s |
| ETL | Total # of Records (#) | 600M to 300M | 100M to 500M | Less than 100M |
|  | Runtime SLA (hours) | Less than 3 hrs | 3 hrs to 6 hrs | 6 hrs to 8 hrs |
|  | Total Data Load (TB) | 1TB to 500GB | 500GB to 250GB | Less than 250GB |
|  | Total Records Processed per Second (MB/s) | 8MB/s to 4MB/s | 4MB/s to 2MB/s | Less than 2MB/s |
| BI | Total # of Records (#) | 900M to 450M | 150M to 450M | Less than 150M |
|  | Runtime SLA (hours) | Less than 4 hrs | 4 hrs to 8 hrs | 6 hrs to 10 hrs |
|  | Total Data Load (TB) | 1.5TB to 750GB | 750GB to 400GB | Less than 400GB |
|  | Total Records Processed per Second (MB/s) | 12MB/s to 6MB/s | 6MB/sec to 3MB/sec | Less than 3MB/sec |

|  | | Dominant Affect | Units | H | M | L |
|---|---|---|---|---|---|---|
| RLA | Peak # of Concurrent Users | Network | Gbps | 1,000 | 250 | 50 |
|  | Peak Transaction Size (bytes/transaction) | Memory | GB | 512 | 128 | 32 |
|  | Peak Response Size (bytes/transaction) | Disk | GB | 6,000 | 3,000 | 1,000 |
|  | Peak Interval Between Transactions per User (s) | Compute | GHz | 200 | 67 | 33 |
| ETL | Total # of Records (#) | Network | Gbps | 36 | 18 | 6 |
|  | Runtime SLA (hours) | Compute | GHz | 42 | 21 | 7 |
|  | Total Data Load (TB) | Disk | GB | 1,000 | 500 | 250 |
|  | Total Records Processed per Second (MB/s) | Memory | GB | 128 | 64 | 32 |
| BI | Total # of Records (#) | Network | Gbps | 53 | 27 | 9 |
|  | Runtime SLA (hours) | Compute | GHz | 63 | 32 | 11 |
|  | Total Data Load (TB) | Disk | GB | 1,500 | 750 | 375 |
|  | Total Records Processed per Second (MB/s) | Memory | GB | 192 | 96 | 48 |

*FIG. 14*

| Functional Pattern | Pattern Component | Compute | Memory | Disk | Network |
|---|---|---|---|---|---|
| Rich Internet Application | Business Logic | 17.0 | 34.4 | 384.6 | 69.8 |
| Rich Internet Application | Data Distribution Manager | 13.2 | 34.4 | 230.8 | 69.8 |
| Rich Internet Application | Data Source Communicator | 5.7 | 19.1 | 384.6 | 69.8 |
| Rich Internet Application | Edge Cache Repository | 9.4 | 26.7 | 384.6 | 69.8 |
| Rich Internet Application | Garbage Collector | 5.7 | 34.4 | 0.0 | 0.0 |
| Rich Internet Application | Media Repository | 17.0 | 34.4 | 692.3 | 69.8 |
| Rich Internet Application | Namespace Manager | 13.2 | 26.7 | 384.6 | 69.8 |
| Rich Internet Application | Non-Rich Media Transformation Engine | 17.0 | 34.4 | 384.6 | 69.8 |
| Rich Internet Application | Page Builder | 13.2 | 34.4 | 153.8 | 69.8 |
| Rich Internet Application | Personalization Repository | 9.4 | 34.4 | 538.5 | 69.8 |
| Rich Internet Application | Publish/Subscribe Manager | 13.2 | 34.4 | 538.5 | 69.8 |
| Rich Internet Application | Request Representation Mapper | 13.2 | 26.7 | 384.6 | 69.8 |
| Rich Internet Application | Rich Media Transformation Engine | 17.0 | 34.4 | 692.3 | 69.8 |
| Rich Internet Application | Service Request Manager | 13.2 | 34.4 | 230.8 | 69.8 |
| Rich Internet Application | Session Page Based Repository | 9.4 | 34.4 | 230.8 | 23.3 |
| Rich Internet Application | Targeted Source & Request Update Builder | 13.2 | 34.4 | 384.6 | 69.8 |
|  |  | 200.0 | 512.0 | 6000.0 | 1000.0 |

FIG. 15

| Functional Pattern | Pattern Component | High | | | |
|---|---|---|---|---|---|
| | | Compute | Memory | Disk | Network |
| Business Intelligence | Ad Hoc Report Output Renderer | 5.5 | 9.6 | 28.0 | 3.4 |
| Business Intelligence | Ad-Hoc Connection Pool Manager | 2.4 | 17.3 | 98.1 | 3.4 |
| Business Intelligence | Ad-Hoc Query Engine | 2.4 | 9.6 | 42.1 | 3.4 |
| Business Intelligence | Cube Data Aggregator/Dimensioner | 7.1 | 13.4 | 98.1 | 1.5 |
| Business Intelligence | Data Cube Publisher | 2.4 | 9.6 | 126.2 | 4.4 |
| Business Intelligence | Information Warehouse | 2.4 | 9.6 | 126.2 | 4.4 |
| Business Intelligence | Production Report Connection Pool Manager | 5.5 | 17.3 | 126.2 | 1.5 |
| Business Intelligence | Production Report Output Renderer | 5.5 | 17.3 | 126.2 | 4.4 |
| Business Intelligence | Production Report Query Engine | 7.1 | 17.3 | 126.2 | 4.4 |
| Business Intelligence | Report Authoring & Administration | 1.6 | 3.8 | 28.0 | 1.0 |
| Business Intelligence | Report Distribution Manager | 2.4 | 9.6 | 126.2 | 4.4 |
| Business Intelligence | Report Request Manager | 2.4 | 9.6 | 126.2 | 4.4 |
| Business Intelligence | Report Scheduler | 1.6 | 3.8 | 28.0 | 1.0 |
| Business Intelligence | Report Selector, Viewer, Filter | 2.4 | 9.6 | 42.1 | 3.4 |
| Business Intelligence | Standard Report Connection Pool Manager | 5.5 | 17.3 | 126.2 | 4.4 |
| Business Intelligence | Standard Report Query Engine | 7.1 | 17.3 | 126.2 | 4.4 |
| | | 63.0 | 192.0 | 1500.0 | 54.0 |

FIG. 16

| | | | | | | | | | | |
|---|---|---|---|---|---|---|---|---|---|---|
| Transaction Monitoring | Application Monitoring | Application Data Service Monitoring | Security Service Monitoring | Middleware Monitoring | Operating System Monitoring | Hardware and Storage Monitoring | IP Connectivity Monitoring | Network Monitoring | Powering Monitoring | Heat Dissipation Monitoring |
| Execution Monitoring | | Service Monitoring | | | Resource Monitoring | | | | Environmental Monitoring | |

Document Storage Ensemble

| Transactional | Master Data | Documents | Audio and Video | Business Work Products |
|---|---|---|---|---|

Transactional
- I/O
- Throughput,
- Time-
- Compliance,
- Data group= (High) Fine Grained, Structured, Block Access
- Data Retention..........High
- Data Replication..........Med
- Data Virtualization..........Low
- Data Cache..........High
- Data Throughput..........Med
- Data Capacity..........Med
- Data Access..........High
- Data Audit..........Low
- Data Containment....Med
- Data Surveillance....High

Master Data
- I/O
- Throughput,
- Time-
- Compliance,
- Data group= (High) Fine Grained, Structured, Block Access
- Data Retention..........High
- Data Replication..........Med
- Data Virtualization..........Low
- Data Cache..........High
- Data Throughput..........Med
- Data Capacity..........Med
- Data Access..........High
- Data Audit..........Low
- Data Containment....Med
- Data Surveillance....High

Documents
- I/O
- Throughput,
- Time-
- Compliance,
- Data group= (High) Fine Grained, Structured, Block Access
- Data Retention..........High
- Data Replication..........Med
- Data Virtualization..........Low
- Data Cache..........High
- Data Throughput..........Med
- Data Capacity..........Med
- Data Access..........High
- Data Audit..........Low
- Data Containment....Med
- Data Surveillance....High

Audio and Video
- I/O
- Throughput,
- Time-
- Compliance,
- Data group= (High) Fine Grained, Structured, Block Access
- Data Retention..........High
- Data Replication..........Med
- Data Virtualization..........Low
- Data Cache..........High
- Data Throughput..........Med
- Data Capacity..........Med
- Data Access..........High
- Data Audit..........Low
- Data Containment....Med
- Data Surveillance....High

Business Work Products
- I/O
- Throughput,
- Time-
- Compliance,
- Data group= (High) Fine Grained, Structured, Block Access
- Data Retention..........High
- Data Replication..........Med
- Data Virtualization..........Low
- Data Cache..........High
- Data Throughput..........Med
- Data Capacity..........Med
- Data Access..........High
- Data Audit..........Low
- Data Containment....Med
- Data Surveillance....High

---

Transactional Policy Set
Active Copy Ret. on Primary
Active Copy Ret. on Secondary
Active Copy Ret. on Tertiary
Retain Time Extra Copies (RETE)
Retain Time Last Only Copy (RETO)
Number of Existing Ver. (VERE)
Number of Deleted Ver. (VERD)
Archive Time Ret. Ver. (RETV)
Backup Periodicity
Archive Periodicity RAID Configuration
Read I/O Threshold
Write I/O Threshold
Read Throughput Threshold
Write Throughput Threshold

Master Data Policy Set
Active Copy Ret. on Primary
Active Copy Ret. on Secondary
Active Copy Ret. on Tertiary
Retain Time Extra Copies (RETE)
Retain Time Last Only Copy (RETO)
Number of Existing Ver. (VERE)
Number of Deleted Ver. (VERD)
Archive Time Ret. Ver. (RETV)
Backup Periodicity
Archive Periodicity RAID Configuration
Read I/O Threshold
Write I/O Threshold
Read Throughput Threshold
Write Throughput Threshold

Documents Policy Set
Active Copy Ret. on Primary
Active Copy Ret. on Secondary
Active Copy Ret. on Tertiary
Retain Time Extra Copies (RETE)
Retain Time Last Only Copy (RETO)
Number of Existing Ver. (VERE)
Number of Deleted Ver. (VERD)
Archive Time Ret. Ver. (RETV)
Backup Periodicity
Archive Periodicity RAID Configuration
Read I/O Threshold
Write I/O Threshold
Read Throughput Threshold
Write Throughput Threshold

Audio and Video Policy Set
Active Copy Ret. on Primary
Active Copy Ret. on Secondary
Active Copy Ret. on Tertiary
Retain Time Extra Copies (RETE)
Retain Time Last Only Copy (RETO)
Number of Existing Ver. (VERE)
Number of Deleted Ver. (VERD)
Archive Time Ret. Ver. (RETV)
Backup Periodicity
Archive Periodicity RAID Configuration
Read I/O Threshold
Write I/O Threshold
Read Throughput Threshold
Write Throughput Threshold

Business Work Prod. Policy Set
Active Copy Ret. on Primary
Active Copy Ret. on Secondary
Active Copy Ret. on Tertiary
Retain Time Extra Copies (RETE)
Retain Time Last Only Copy (RETO)
Number of Existing Ver. (VERE)
Number of Deleted Ver. (VERD)
Archive Time Ret. Ver. (RETV)
Backup Periodicity
Archive Periodicity RAID Configuration
Read I/O Threshold
Write I/O Threshold
Read Throughput Threshold
Write Throughput Threshold NetApp 3451

| Transaction Monitoring (e.g. Optier, CoreFirst) | Application Monitoring (e.g. Precise) | Application Data Service Monitoring (e.g. Hawk) | Security Service Monitoring (e.g. Cisco XML Gateway) | Middleware Monitoring (for App Server, DB, Grid, etc.) (e.g. Precise) | Operating System Monitoring (e.g. MOM) | Hardware and Storage Monitoring (e.g. Director, Insight) | IP Connectivity Monitoring (for LAN/WAN) (e.g. Cisco, OpNet, NetScout) | Powering Monitoring (e.g. APC, Schnieder, Rariton) | Heat Dissipation Monitoring (e.g. Honeywell) |
|---|---|---|---|---|---|---|---|---|---|

FIG. 30

| Bus. Demand Char. | High | Med. | Low |
|---|---|---|---|
| Availability Reqs. | Continuous Avail 24/7 | Extend hours | Normal hours |
| Compliance Reqs. | Reqs determine workflow | Reqs. Signif. affect workflow | Little reqs. |
| Comp. Reqs. | Fast growing usage | Average or moderate | Below average |
| Extent of Visual. & person. | High need for usability | Some requirements | Low need |
| Scalability Reqs. | Growth > 20%/yr | Growth <20% / yr | Little growth |
| Shape of Demand Profile | Unpredictable | Predictable but fluctuating | Predictable, little variation |
| Unit of Work Latency | Extreme low | Online fin tranx | No latency sensitive processing |
| Extent of change | Frequent need for flexibility | Mod change to business rules | Little annual change |
| Intensity of I/O | High I/O rates | Intermittently fluctuating rates | Low or few periods of inc I/O |
| Unit of Work Complexity | Multi-phase commit | Moderate collaboration | Low-collaboration |
| Data Distribution Reqs. | Diverse sources of data | Typical quantity of data sources | Limited use of data sources |
| Data Retention Reqs. | Above average | typical | limited |
| Data Transformation Reqs. | Significant aggregation | Periodic rollup | No summarization req. |
| Data Volume & Throughput Reqs. | Rapidly growing | typical | Small volume |
| Reporting Reqs. | Ad hoc, OLAP, Predef. mgmt | Predef. Mgmt only | Little or none |
| Unit of Work Data Granularity | Fine grain | Mixed granularity | Coarse grain |
| Extent of access to data across aps/svcs | Location transparent access | Broad access req. | Localized access only |
| Mobility reqs. | Increasing need for mobility | Some or limited need | No mobility req. |
| Security Reqs. | Increased security & auth req | Typical security | Not security sensitive |

*FIG. 35A*

| Application | Business Activities | Availability Requirements | Workload | | | | | | | |
|---|---|---|---|---|---|---|---|---|---|---|
| | | | Compliance Requirements | Computational Requirements | Extent of Visualization and Personalization | Scalability Requirements | Shape of Demand Profile | Unit of Work Latency Sensitive | Extent of Change in Business Rules | Unit of Work Complexity | Intensity of I/O |
| GenSUB | Primary Business Activity | N/A | N/A | Medium | High | Medium | Medium | N/A | High | N/A | Medium |
| | Secondary Business Activity | N/A | N/A | Medium | High | N/A | N/A | N/A | High | High | Medium |
| | Tertiary Business Activity | N/A | High | N/A | Low | N/A | Low | N/A | Low | Medium | N/A |

| Application | Business Activities | Unit of Work Data Granularity | Data Management | | | | Access | | |
|---|---|---|---|---|---|---|---|---|---|
| | | | Data Transformation Requirements | Data Distribution Requirements | Data Retention Requirements | Data Volume & Throughput Requirements | Reporting Requirements | Extent of access across applications / services | Mobility requirements | Security Requirements |
| GenSUB | Primary Business Activity | Medium | High | Medium | N/A | Medium | N/A | High | High | Medium |
| | Secondary Business Activity | Medium | High | High | High | Medium | N/A | High | High | Medium |
| | Tertiary Business Activity | N/A | Medium | N/A | N/A | N/A | Medium | N/A | N/A | N/A |

*FIG. 35B*

| QUALITY PROFILE | Transaction Monitoring | Application Monitoring | Appl data service monitoring | Security service monitoring | Middleware monitoring | O/S monitoring | Hardware storage monitoring | IP Conn. Monitoring | Network layer monitoring | Power monitoring | Heat monitoring |
|---|---|---|---|---|---|---|---|---|---|---|---|
| Qualities | | | | | | | | | | | |
| Avail. Target % Uptime | high | high | high | high | high | high | high | high | high | high | high |
| Avail. Req.-Days of Op. | high | high | high | high | high | high | low | medium | medium | Low | Not defined |
| Avail. Req-Hours of Op | high | high | high | high | high | high | low | medium | medium | low | Not defined |
| Avail Req-MTTR | Not defined | Not defined | Not defined | Not defined | Not defined | Not defined | high | Not defined | Not defined | high | Not defined |
| Avail Req-Max failover | Low | high | high | low | high | low | Not defined | high | high | Not defined | Not defined |
| Deg Excep-based proc. | medium | high | medium | low | medium | low | Not defined | low | medium | Not defined | Not defined |
| Batch proc time | Not defined | high | high | Not defined | medium | medium | Not defined | low | low | Not defined | Not defined |
| Session Oriented | high | high | high | low | high | high | Not defined | low | medium | Not defined | Not defined |
| Event Driven | low | high | low | low | medium | medium | Not defined | medium | Medium | Not defined | Not defined |
| Reusability | Not defined | Not defined | Not defined | Not defined | Not defined | Not defined | Not defined | Not defined | Not defined | Not defined | Not defined |
| Volatility of bus rules | Not defined | Not defined | Not defined | Not defined | Not defined | Not defined | Not defined | Not defined | Not defined | Not defined | Not defined |
| Workflow (cond. Seq) | Not defined | Not defined | Not defined | Not defined | Not defined | Not defined | Not defined | Not defined | Not defined | Not defined | Not defined |
| Wkflw-deg concurrency | high | high | medium | high | medium | medium | high | high | high | Not defined | Not defined |
| Wkflw concur units | high | high | medium | Not defined | medium | Not defined | Not defined | Not defined | high | Not defined | Not defined |
| Wkflw units processing | Not defined | high | Not defined | Not defined | Not defined | Not defined | Not defined | Not defined | Not defined | Not defined | Not defined |
| Wkflw QoS | high | high | medium | Not defined | medium | medium | high | Not defined | high | Not defined | Not defined |
| Modifiability of wrkflw | Not defined | Not defined | Not defined | Not defined | Not defined | Not defined | Not defined | Not defined | Not defined | Not defined | Not defined |
| Data source integration | Not defined | Not defined | high | low | high | high | high | high | high | Not defined | Not defined |
| Inc req't guaranteed del | medium | medium | low | Not defined | low | Not defined | Not defined | Not defined | Not defined | Not defined | Not defined |
| Asynchronus mes del | Not defined | high | low | Not defined | high | Not defined | Not defined | Not defined | high | Not defined | Not defined |
| Sychronus mes del | low | high | low | Not defined | high | Not defined | Not defined | Not defined | high | Not defined | Not defined |
| Number of protocols | Not defined | Not defined | Not defined | Not defined | Not defined | Not defined | Not defined | Not defined | high | Not defined | Not defined |
| Dist load (compute) | Not defined | high | medium | medium | medium | high | high | medium | medium | Not defined | Not defined |

FIG. 37

| Data Usage Patterns | Data Group | Active Copy Retention on Primary | Active Copy Retention on Secondary | Active Copy Retention on Tertiary | Retain Time Extra Copies (RETE) | Retain Time Last Only Copy (RETO) | Number of Existing Versions (VERE) | Number of Deleted Versions (VERD) | Archive Time Retained Versions (RETV) | Backup Periodicity | Archive Periodicity | Continuous Replication |
|---|---|---|---|---|---|---|---|---|---|---|---|---|
| Operating System | Low | High | Low | Not Defined | Low | Low | Low | Low | Not Defined | Low | Low | Not Defined |
| Software Application | Low | High | Low | Not Defined | Low | Low | Low | Low | Not Defined | Low | Low | Not Defined |
| Business Work Products | Low | Med | Low | Not Defined | High | High | High | High | Low | High | High | Not Defined |
| Development Work Products | Low | High | High | Not Defined | High | High | High | High | Med | High | High | Not Defined |
| Generic Backup (inactive) | Low | Low | Low | Not Defined | Low | Low | Low | Low | Not Defined | Low | Not Defined | Not Defined |
| Generic Archive (inactive) | Low | Low | Low | Not Defined | Not Defined | Not Defined | Not Defined | Not Defined | Low | Not Defined | Low | Not Defined |
| Audio (full spectrum) | Low | Med | Med | Low | Med | Med | Med | Med | High | High | Med | Med |
| Audio (voice) | Low | Med | Med | Low | Low | Med | Low | Low | High | High | Med | Med |
| Static Image Files | Low | Med | Med | Low | Low | Med | Low | Low | High | High | Med | Low |
| Telemetry | Med | High | High | High | High | Low | Low | Low | Not Defined | High | Not Defined | High |
| Logs | Med | Low | Low | Not Defined | Low | High | High | High | Not Defined | High | Not Defined | Not Defined |
| Application Dynamic Files | Med | High | High | Not Defined | High | High | High | High | Med | Med | Low | Med |
| Generic Files (active) | Med | Low | Low | Not Defined | Low | Low | Low | Low | Low | Med | Med | Low |
| Documents | Med | High | High | Med | Med | High | High | High | High | High | Med | Med |
| Audio and Video | Med | High | High | Med | High | Med | High | Low | High | Med | Low | Med |
| Video | Med | Med | Med | Low | Med | Med | Low | Low | Low | High | Low | Med |
| Other Multimedia (Flash, etc.) | Med | Med | High | Low | Low | Med | High | High | Low | Med | Med | Med |
| Transactional | High | High | High | High | Not Defined | High | Not Defined | Not Defined | Not Defined | Not Defined | Not Defined | High |
| Master Data | High | High | Low | Low | High | High | Med | Med | Med | Med | Not Defined | Med |
| Data Warehouse | High | High | Med | Med | High | High | Low | Low | High | Med | High | Med |
| Historical Data | High | Low | Low | Low | High | High | Low | Low | Low | High | High | Low |
| Data Mart | High | High | Low | Low | Med | Med | Med | Med | High | High | High | Med |
| Email | High | High | High | Med | High | Low | Med | Low | Med | Med | Med | Low |

FIG. 38

| | | | I/O Qualities | | | | | | Throughput Qualities | | | |
|---|---|---|---|---|---|---|---|---|---|---|---|---|
| | | | What are the general I/O characteristics req'd by the business for an application? | | | | | | What are the general throughput characteristics req'd by the business for an application? | | | |
| Data Group Description | Data Group | Score | Read Frequency | Write Frequency | Peak I/O | Peak I/O Frequency | Peak I/O Duration | Peak Throughput | Peak Throughput Frequency | Peak Throughput Duration | Size (Unit of Work) |
| | | | Average # of reads/sec | Avg # of writes / sec | When peaks in I/O activity occur, what is the threshold reached? | How often do I/O peaks occur in a given period? | When an I/O peak occurs, how long does it last? | When a peak in throughput of I/Os occur, what is the magnitude of the peak? | How often do throughput peaks occur in a given period? | When a throughput peak occurs, how long does it last? | What is the avg size of a typical transaction for this application? |
| | | Low | <100 | <100 | <100 IOPS | <1/day | <10s | <10 Mbps | <1/day | <10s | <1 kB |
| Fine Grained Structured Block Access | | Med | <1,000 | <1,000 | <1,000 IOPS | <12/day | <60s | <100 Mbps | <12/day | <60s | 1 kB - 1 MB |
| | High | High | >1,000 | >1,000 | >1,000 IOPS | >12/day | >60s | >100 Mbps | >12/day | >60s | >1MB |
| | | Low | <10 | <10 | <10 IOPS | <1/wk | <60s | <100 Mbps | <1/wk | <60s | <1MB |
| Mixed or changing granularity | | Med | <100 | <100 | <100 IOPS | <7/wk | <10m | <1 Gbps | <7/wk | <10m | 1 MB - 100 MB |
| | Med | High | >100 | >100 | >100 IOPS | >7/wk | >10m | >1 Gbps | >7/wk | >10m | >100 MB |
| | | Low | <1 | <1 | <1 IOPS | <1/mo | <10m | <1 Gbps | <1/mo | <10m | <10 MB |
| Coarse Grained Unstructured File Access | | Med | <10 | <10 | <10 IOPS | <4/mo | <1hr | <10 Gbps | <4/mo | <1hr | 10 MB - 1 GB |
| | Low | High | >10 | >10 | >10 IOPS | >4/mo | >1hr | >10 Gbps | >4/mo | >1hr | >1 GB |

*FIG. 40A*

| Time Qualities | | | | | Throughput Qualities | | |
|---|---|---|---|---|---|---|---|
| What time thresholds are req'd by the business for an application? | | | | | What are the general compliance & security rel'd req'ts by the business for an application? | | |
| Time to 1st read | Time to 1st write | Access Pattern | Last Access Time | Last Mod Time | Retention Level | Sensitivity to Disclosure | Sensitivity to Alteration |
| avg time to read 1st blocks of I/O operation? | Avg time to write 1st blocks of I/O operation? | Typical pattern of data as they flow to and from a storage container? | When was file last accessed? | When was file last mod? | How long generally does a file need to be made available for access? | What is file's sensitivity to being accessed, etc by outside entities? | What is file's sensitivity to mods, etc. |
| >10 ms | >10 ms | sequential | >1hr | >1hr | <1hr | public domain | Unltd alteration |
| <10 ms | <10 ms | predictable periodic | <1hr | <1hr | <1day | ltd distribution | ltd alteration |
| <1 ms | <1 ms | aperiodic | <1min | <1min | >1day | confidential | creator alteration |
| >100 ms | >100 ms | sequential | >1wk | >1wk | <1wk | public domain | Unltd alteration |
| <100 ms | <100 ms | predictable periodic | <1wk | <1wk | <1mo | ltd distribution | ltd alteration |
| <10 ms | <10 ms | random | <1day | <1day | >1mo | confidential | creator alteration |
| >1s | >1s | sequential | >1mo | >1mo | <1yr | public domain | Unltd alteration |
| <1s | <1s | predictable periodic | <1mo | <1mo | <10yr | ltd distribution | ltd alteration |
| <100ms | <100ms | aperiodic | <1wk | <1wk | >10yr | confidential | creator alteration |

FIG. 40B

| Capability Type | Resources Configured (PED) | | | Product Realization | | | | Software Dependencies | | | | Resource Supplied | | | | |
|---|---|---|---|---|---|---|---|---|---|---|---|---|---|---|---|---|
| | Ensemble Requirement | Mgmt Level | Units configured | Technical Capability | Standards Compliance | Product Name | Product Version | Operating system | O/S version | Other software | Software versions | Configuration Restrictions | Notes | CPU (GHz) | Memory (MB) | Disk (GB) | Network (Mbps) | Configuration Restrictions |
| Mgmt | N/A | Resource Unit | 1.00 | Router | Strategic | Cisco | 3400 | IOS | | | | | | | | | | |
| Mgmt | N/A | Resource Unit | 2.00 | Ntwk Switch | Strategic | Cisco | 1200 | IOS | | | | | | | | | | |
| Mgmt | Complex Transaction | Resource Unit | 1.00 | Mem Appliance | Evaluation | Azul | Vega 3 3310B | AVM | | | | RTPM configured | Dual processor 2x 1.66 GHz | | 48 | N/A | 2x 1 GBps |
| Mgmt | Complex Transaction | Resource Unit | 20.00 | Compute Blade Server | Evaluation | HP Integrity | Rx2660 | HP-UX | v11i | HA-OE | v3 | | | 1.66 GHz | 32 | 500 | 1GBps+ |
| Mgmt | Report Processing | Resource Unit | 1.00 | Storage Appliance | Strategic | NetApp | FAS3160 | NFS | v4 | | | MetroCluster configured | Dual controller 2x 1.66 GHz | | 16 | 6000 10x 4GB FC | |
| Mgmt | Report Processing | Resource Unit | 2.00 | Compute Blade Server | Evaluation | HP Integrity | Rx2660 | HP-UX | v11i | HA-OE | v3 | | | | 32 | 500 | 1GBps+ |

Profile Attributes for Quantity of Each Type of Ensemble

Profile Attributes for Make/Model of Equipment

Profile Attributes for Logical Configuration Supplied

Profile Attributes for Physical Configuration Supplied

*FIG. 41*

| Maturity Level | Core | | | Integrated | | Autonomic | |
|---|---|---|---|---|---|---|---|
| CMM Level | Chaotic / Ad Hoc | Rationalized / Repeatable | Stabilized / Defined | Stabilized / Managed | Optimized | | Enabling |
| Management | Inconsistent - every situation is unique | Project-based approach | Process-Based approach using enterprise-wide standard processes | Processes are measured and managed by metrics | Processes are continually improving | | Processes are self-aligning |
| Engineered Quality of Experience | Difficulty correlating Cost, User Experience, & Efficiency | Reactive improvements to Cost, User Experience, or Efficiency | Remediation to improve Cost, User Experience, or Efficiency | Proactive improvements to Cost, User Experience, or Efficiency | Balanced improvements to Cost versus User Experience and Efficiency | | Predictive improvements to Cost, User Experience, or Efficiency |
| Architectural Model | None or Incomplete | Role exists on a project-by-project basis Architecture documentation exists but is inconsistent | Role exists on LoB basis Architecture standards exist | Role exists across all LoB, coordinated by Architecture Council | Architecture is an integral part of IT strategy Architectural benefits are tracked across enterprise | | Architecture teams collaborate to respond to new business opportunities & challenges |
| Operating Model | High cost and slow to react | Reactive but instrumentation provides basis for improvements | Reactive but instrumentation guides pre-failure remediation | Proactive driven by architecture, strategy & governance | Proactive and pre-emptive based on correlation to past experiences / issues | | Proactive and predictive based on predictive trending |

FIG. 42

| | | Criteria Assessment | | | | |
|---|---|---|---|---|---|---|
| | | None | Few | Some | Most | All |
| Process | % Relevant Units | <5% | 5 – 35% | 35 – 65% | 65 – 95% | >95% |
| | % Cases followed | <5% | 5 – 35% | 35 – 65% | 65 – 95% | >95% |
| Technical | Feature Level | None | Basic | Typical | Well Featured | Full Featured |
| | Applicability | No Cases | Few | Some | Most | All Cases |
| Competency | Skill Level | None | Beginner | Average | Advanced | Expert |
| | % People in Role | <5% | 5 – 35% | 35 – 65% | 65 – 95% | >95% |

*FIG. 43*

|  | All | Most | Some | Few | None |
|---|---|---|---|---|---|
| All | 0 | .25 | .50 | .75 | 1 |
| Most | 0 | .15 | .35 | .50 | .75 |
| Some | 0 | .10 | .25 | .35 | .50 |
| Few | 0 | .05 | .10 | .15 | .25 |
| None | 0 | 0 | 0 | 0 | 0 |

FIG. 44

| Degree of Assessment | Level of Presence |
|---|---|
| Capability is almost certainly present | >95% |
| Capability is most likely present | 66 - 95% |
| Capability is equally likely present or absent | 36 - 65% |
| Capability is most likely absent | 5 - 35% |
| Capability is almost certainly absent | <5% |

*FIG. 45*

Conditional Probability Matrix = p(A | B)

| | | B = Dependency | | | | |
|---|---|---|---|---|---|---|
| | | Absent | Few | Some | Most | Present |
| A = Constructed Capability | Present | - | 0.25 | 0.50 | 0.75 | 1.00 |
| | Absent | 1.00 | 0.75 | 0.50 | 0.25 | - |
| | | - | - | - | - | - |
| | | - | - | - | - | - |
| | Subtotal | 1 | 1 | 1 | 1 | 1 |
| P(Bj) = Equally Likely = | | 0.20 | 0.20 | 0.20 | 0.20 | 0.20 |

FIG. 48

| Conditional Probability Matrix = p(B \| A) | | B= Dependency | | | | Subtotal |
|---|---|---|---|---|---|---|
| | | Absent | Few | Some | Most | Present | |
| A = Constructed Capability | p(Present) | - | 0.10 | 0.20 | 0.30 | 0.40 | 1.00 |
| | p(Absent) | 0.40 | 0.30 | 0.20 | 0.10 | - | 1.00 |
| | | - | - | - | - | - | - |
| | | - | - | - | - | - | - |

FIG. 49

Workload Pattern

| Resource | Influence Type | Quality or Quality Calculation |
|---|---|---|
| Processing | Latency | Degree of Exception Based Processing |
| Processing | Latency | Latency |
| Processing | Latency | Latency (increasing) |
| Processing | Latency | Response Time (Increasing) |
| Processing | Latency | Wrkflw QoS (Time, Vol)- specifics in performance |
| Processing | Quality | Batch Processing Time |
| Processing | Variation | Peak Duration |
| Processing | Variation | Peak Frequency |
| Processing | Variation | Peak Size |
| Processing | Variation | Wkflw- Degree of Concurrency |
| Processing | Volume | # Concurrent Users |
| Messaging | Latency | Asynchronus Message Delivery |
| Messaging | Latency | Increasing requirement for Guaranteed Delivery of Messages |
| Messaging | Latency | Wrkflw QoS (Time, Vol)- specifics in performance |
| Messaging | Quality | Latency |
| Messaging | Quality | Incr Rment for Guaranteed Delivery |
| Messaging | Variation | Event Driven |
| Messaging | Volume | Session Oriented (degree of user intervention) |
| Memory | Quality | Inverse of Scalability- Stateful- (Partitioned, Affinity), Stateless, Transparent |
| Memory | Volume | Calculation Size (increasing number of records/transactions per calculation) |
| Memory | Volume | Session Oriented (degree of user intervention) |
| Data | Latency | Calculation Data Requirement (increasing size of calc load - KB to GB) |
| Data | Latency | Calculation Size (increasing number of records/transactions per calculation) |
| Data | Latency | Wrkflw QoS (Time, Vol)- specifics in performance |
| Data | Quality | Data Storage - Time |
| Data | Volume | Data Source Integration |
| Data | Volume | Throughput Volume |
| Availability | MTBF | Availability Requirement- Days of Operation |
| Availability | MTBF | Availability Requirement- Hours of Operation within a day |
| Availability | MTBF | Availability Target % Uptime |
| Availability | MTTR | Availability Requirement- Maximum failover time |
| Availability | MTTR | Availability Requirement- MTTR- max time to repair |

34 of 50 Qualities Rearranged

*FIG. 51*

| Pr( KP \| Workload Pattern, Pattern Sensitivity) | | Workload Pattern Quality Value | | | |
|---|---|---|---|---|---|
| | | High | Medium | Low | Not Defined |
| Pattern Quality Value | High | 0.85 | 0.75 | 0.35 | 0 |
| | Medium | 0.75 | 0.5 | 0.25 | 0 |
| | Low | 0.35 | 0.25 | 0.1 | 0 |
| | Not Defined | 0 | 0 | 0 | 0 |

*FIG. 52*

| X | Operation | Y | Result |
|---|---|---|---|
| H | × | H | H |
| H | × | M | H |
| H | × | L | M |
| M | × | H | H |
| M | × | M | M |
| M | × | L | L |
| L | × | H | M |
| L | × | M | L |
| L | × | L | L |

| X | Operation | Y | Result |
|---|---|---|---|
| H | - | H | L |
| H | - | M | M |
| H | - | L | H |
| M | - | H | L |
| M | - | M | L |
| M | - | L | M |
| L | - | H | L |
| L | - | M | L |
| L | - | L | L |

*FIG. 53*

| WORKLOAD PATTERN ||||
|---|---|---|---|
| Quality Type | Resource | Influence Type | Quality or Quality Calculation |
| Base | Processing | Volume | # Concurrent Users |
| Calculated | Processing | Volume | Throughput Volume/Degree of Concurrency |
| Base | Processing | Variation | Peak Duration |
| Base | Processing | Variation | Peak Frequency |
| Calculated | Processing | Variation | Peak Frequency x size / Duration |
| Base | Processing | Variation | Peak Size |
| Base | Processing | Variation | Wkflow- Degree of Concurrency |
| Base | Processing | Quality | Batch Processing Time |
| Base | Processing | Latency | Degree of Exception Based Processing |
| Base | Processing | Latency | Latency |
| Base | Processing | Latency | Latency (increasing) |
| Base | Processing | Latency | Response Time (increasing) |
| Base | Processing | Latency | Wrkflw QoS (Time,Vol)- specifics in performance |
| Base | Messaging | Volume | Session Oriented (degree of user intervention) |
| Calculated | Messaging | Volume | Throughput Volume x Calculation Data Req't |
| Base | Messaging | Variation | Event Driven |
| Calculated | Messaging | Variation | Variation |
| Base | Messaging | Quality | Incr Rment for Guaranteed Delivery |
| Base | Messaging | Quality | Latency |
| Base | Messaging | Latency | Asynchronus Message Delivery |
| Base | Messaging | Latency | Increasing req't for Guaranteed Delivery of Messages |
| Calculated | Messaging | Latency | Latency / Calculation Size |
| Base | Messaging | Latency | Wrkflw QoS (Time,Vol)- specifics in performance |
| Base | Memory | Volume | Calculation Size (increasing number of records/transactions per calculation) |
| Base | Memory | Volume | Session Oriented (degree of user intervention) |
| Calculated | Memory | Volume | Throughput Volume x Calculation size |
| Base | Memory | Quality | Inverse of Scalability-Stateful- (Partitioned, Affinity), Stateless, Transparent |
| New | Facility | Volume | Space Footprint |
| New | Facility | Quality | Heat Generated |
| New | Facility | Quality | Power consumed |
| Base | Data | Volume | Data Source Integration |
| Calculated | Data | Volume | Data Storage- Retention Size x time |
| Base | Data | Volume | Throughput Volume |
| Calculated | Data | Variation | Peak Frequency x Peak Size x Calc Size / Duration |
| Base | Data | Quality | Data Storage - Time |
| Base | Data | Latency | Calculation Data Req't (increasing size of calc load - KB to GB) |
| Base | Data | Latency | Calculation Size (increasing number of records/transactions per calculation) |
| Calculated | Data | Latency | Latency / Calculation Size |
| Base | Data | Latency | Wrkflw QoS (Time,Vol)- specifics in performance |
| Base | Availability | MTTR | Availability Req't - Maximum failover time |
| Base | Availability | MTTR | Availability Req't - MTTR - max time to repair |
| Base | Availability | MTBF | Availability Req't - Days of Operation |
| Base | Availability | MTBF | Availability Req't - Hours of operations within a day |
| Base | Availability | MTBF | Availability Target % Uptime |

Calculating Optimal Quality Profile (Business Activity)

Overview
This is the process whereby the Quality Profile of a Business Activity is edited to match its underlying KPI Model. This can be visually represented by a Spider/Radar chart diagram.

Database Objects
- KPI
- KPI_QoE_Attributes_Mappings
- Profile_Business_Activities
- Profile_Business_Activity_Quality_Profile

Pseudo Code
Executed for each row in
Profile_Business_Activities

*Create Target KPI Model Data Points*
FIND THE BUSINESS_FUNCTION_ID FROM PROFILE_BUSINESS_ACTIVITIES TABLE
FILTER PROFILE_BUSINESS_FUNCTION_KPI_MAPPING BY BUSINESS_FUNCTION_ID FROM ABOVE
FOR EACH ROW IN PROFILE_BUSINESS_FUNCTION_KPI_MAPPING
    FIND MATCH WITH KPI_TARGETS USING KPI_TARGET_ID
    IF FOUND
        PUSH INTO ARRAY PROFILE_BUSINESS_FUNCTION_KPI_MAPPING.KPI_ID    PUSH INTO ARRAY KPI_TARGETS.TARGET_RELATIVE_RATING
    END IF
END FOR
USE ARRAY AS INPUT FOR PLOTTING TARGET SERIES OF DATA

*Create Current KPI Model Data Points (derived from Business Activity Quality Profile)*
FILTER PROFILE_BUSINESS_ACTIVITY_QUALITY_PROFILE BY BUSINESS_ACTIVITY_ID FORM THE ROW ABOVE
DECLARE QoEMIN, QoEMAX, QoEVALUE
FOR EACH ROW IN KPI TABLE
    FOR EACH ROW IN KPI_QOE_ATTRIBUTES_MAPPING TABLE
        FIND MATCH WITH PROFILE_BUSINESS_ACTIVITY_QUALITY_PROFILE ROW USING QOE_ATTRIBUTE_ID
        IF FOUND
            QoEMIN = QoEMIN + MINIMUM (KPI_QOE_ATTRIBUTES_MAPPING.HIGH, KPI_QOE_ATTRIBUTES_MAPPING.MEDIUM, KPI_QOE_ATTRIBUTES_MAPPING.LOW)
            QoEMAX = QoEMAX + MAXIMUM (KPI_QOE_ATTRIBUTES_MAPPING.HIGH, KPI_QOE_ATTRIBUTES_MAPPING.MEDIUM, KPI_QOE_ATTRIBUTES_MAPPING.LOW)
            SELECT CASE PROFILE_BUSINESS_ACTIVITY_QUALITY_PROFILE.VALUE_ID
                CASE "HIGH"
                      QoEVALUE = QoEVALUE + KPI_QOE_ATTRIBUTES_MAPPING.HIGH
                CASE "MEDIUM"
                      QoEVALUE = QoEVALUE + KPI_QOE_ATTRIBUTES_MAPPING.MEDIUM
                CASE "LOW"
                      QoEVALUE = QoEVALUE + KPI_QOE_ATTRIBUTES_MAPPING.LOW
                CASE ELSE
                      QoEVALUE = QoEVALUE + 0
                END SELECT
        END IF
    END FOR
    KPI_CURRENT_VALUE = System.Math.Round(((( QoEVALUE - QoEMIN) / (2 * (QoEMAX - QoEMIN))) + 0.25) * 100, 2)
    PUSH INTO ARRAY KPI.KPI_ID, KPI_CURRENT_VALUE
END FOR
USE ARRAY AS INPUT FOR PLOTTING TARGET SERIES OF DATA

FIG. 59

Calculating Optimization Suggestions

*Overview*
This is the process used to optimize a Profile Business Activity Quality Profile or a Project Quality Profile

*Database Objects:*
- Profile Business Activity Quality Profile or Project Quality Profile depending on the context
- KPI QoE Attributes Mapping

*Pseudo Code:*
Step 1:
For Each Optimization Target KPI
　For Each QoE Attribute
　　• Calculate and Store the Best Fit Score When QoE Attribute Value = 'High' (only change the value of QoE Attribute from outer loop and all other QoE Attribute values remain the same)
　　• Calculate and Store the Best Fit Score When QoE Attribute Value = 'Medium' (only change the value of QoE Attribute from outer loop and all other QoE Attribute values remain the same)
　　• Calculate and Store the Best Fit Score When QoE Attribute Value = 'Low' (only change the value of QoE Attribute from outer loop and all other QoE Attribute values remain the same)
　Next
Next This step creates the map of best fit scores corresponding to every possible combination of changes to a QoE Attribute Value for any Optimization Target KPI.

Step 2:
For Each Optimization Target KPI
　Update Best Fit Score = Absolute Value of (Target KPI Value – Best Fit Score)
Next This step sets up the best fit scores that are the closest to the Target KPI values for any Optimization Target KPI Step 3:
Calculate and store the Geometric Mean for each combination of QoE Attribute and Value
For Each QoE Attribute
　Select and Output the Value which corresponds to the minimum Best Fit Score
Next This step eliminates the KPIs out of the equation and then selects QoE Attribute and Value combination that has the lowest Best Fit Score. Given the update done in step 2 this means that these particular Values for QoE Attributes will optimize the QoE Profile closest Optimization Target KPI

FIG. 60

| Business Activities | Demand Characteristics | Sales Functions | | | Trade Execution (desk, Alog, Black Box) | Order Mgmt (routing, matching) | Market Data | ECN Connectivity |
|---|---|---|---|---|---|---|---|---|
| | | Research | Client Screening | Client Relationship Mgmt | | | | |
| | Business Service Requirements | Visual Experience, Accessibility to Content, Quality of Search, Availability / Convenience, Geographical Regs | | | 5x8 / 5x24 Market Calendar, Event Sensitive, High Volumes, Cost Sensitive, Speed of Execution, Geographical Regs, Internal Security, Zero-Minimal Tolerance Delays | | | |
| Quality Profiles | Latency | Standard | Standard | Standard | Microsecond | Microsecond | Microsecond | Millisecond |
| | Availability | Standard | Standard | High | Very High | Very High | Very High | High |
| | Throughput QoS | Conflated | Conflated | Conflated | Full Rate | Full Rate | Full Rate | Full Rate |
| | Throughput Load | Low | Low | Low | High | High | Very High | High |
| | Data Aggregation | Low | Low | Low | Moderate | Moderate | High | Low |
| | Interim Data Persistence | Low | Low | Low | High | High | High | High |
| | Data Distribution | Low | Low | Low | Moderate | High | High | High |
| | Swap Utilization | Moderate | Low | Moderate | NA | NA | NA | NA |
| | Disk Consumption | High | Moderate | High | High | High | Moderate | Moderate |
| | Memory Consumption | Low | Low | Low | High | High | High | High |
| | Memory Volatility | Low | Low | Low | High | High | High | High |
| | Distrib. Memory coherence | Low | Low | Low | High | High | High | High |
| | Compute Data Set Size | Small | Small | Small | Moderate | Small | Small | Small |
| | Data Transformation | Low | Low | Low | Low | Low | Low | Moderate |
| | Rendering | Moderate | Low | Low | Low | Low | NA | NA |
| | Workload Size | Small | Small | Small | Small | Small | Small | Small |
| | Event Intensive | Low | Low | Low | High | High | High | High |
| | Input Intensive | Low | Low | Low | High | High | High | High |
| | Output Intensive | Low | Low | Low | High | High | High | High |
| | Machine to Machine Internal | Yes | Yes | Yes | Yes | Yes | Yes | Yes |
| | Machine to Machine External | No | No | No | No | No | No | No |
| | Geographic Data Restrictions | No | Yes | Yes | No | No | No | No |
| | Role Based Cross Machine Access | Yes | Yes | Yes | Yes | No | Yes | Yes |
| | Role Based Access | Yes | Yes | Yes | Yes | Yes | Yes | Yes |
| | Policy Mgmt | Yes | Yes | Yes | Yes | Yes | Yes | Yes |
| | Policy Enforcement | Yes | Yes | Yes | Yes | Yes | Yes | Yes |
| Best Ensemble | Fit-for-Purpose Network Ensemble | Information Integration | Information Integration | Information Integration | Latency Sensitive | Latency Sensitive | Latency Sensitive | Latency Sensitive |

FIG. 61

Calculating Optimal Quality Profile (Project)

Overview
This is the process whereby the Quality Profile of an Application is edited to match its underlying KPI Model. This can be visually represented by a Spider/Radar chart diagram.

Database Objects
- KPI
- KPI_QoE_Attributes_Mappings
- Project_Quality_Profile

Pseudo Code

*Create Target KPI Model Data Points*
```
FOR EACH ROW IN PROJECT_KPI_MAPPINGS
    FIND MATCH WITH KPI_TARGETS USING
KPI_TARGET_ID
    IF FOUND
        PUSH INTO ARRAY PROJECT_KPI_MAPPINGS.KPI_ID
        PUSH INTO ARRAY
KPI_TARGETS.TARGET_RELATIVE_RATING
    END IF
END FOR
USE ARRAY AS INPUT FOR PLOTTING TARGET SERIES OF DATA
```

*Create Current KPI Model Data Points (derived from Project Quality Profile)*
```
DECLARE QoEMIN, QoEMAX, QoEVALUE
FOR EACH ROW IN KPI TABLE
    FOR EACH ROW IN KPI_QOE_ATTRIBUTES_MAPPING TABLE
        FIND MATCH WITH PROJECT_QUALITY_PROFILE ROW USING QOE_ATTRIBUTE_ID
        IF FOUND
            QoEMIN = QoEMIN + MINIMUM (KPI_QOE_ATTRIBUTES_MAPPING.HIGH,
KPI_QOE_ATTRIBUTES_MAPPING.MEDIUM, KPI_QOE_ATTRIBUTES_MAPPING.LOW)
            QoEMAX = QoEMAX + MAXIMUM (KPI_QOE_ATTRIBUTES_MAPPING.HIGH,
KPI_QOE_ATTRIBUTES_MAPPING.MEDIUM, KPI_QOE_ATTRIBUTES_MAPPING.LOW)
            SELECT CASE
PROFILE_BUSINESS_ACTIVITY_QUALITY_PROFILE.VALUE_ID
                CASE "HIGH"
                    QoEVALUE = QoEVALUE +
KPI_QOE_ATTRIBUTES_MAPPING.HIGH
                CASE "MEDIUM"
                    QoEVALUE = QoEVALUE +
KPI_QOE_ATTRIBUTES_MAPPING.MEDIUM
                CASE "LOW"
                    QoEVALUE = QoEVALUE +
KPI_QOE_ATTRIBUTES_MAPPING.LOW
                CASE ELSE
                    QoEVALUE = QoEVALUE + 0
            END SELECT
        END IF
    END FOR
    KPI_CURRENT_VALUE = System.Math.Round(((( QoEVALUE - QoEMIN) / (2 *
(QoEMAX - QoEMIN))) + 0.25) * 100, 2)
    PUSH INTO ARRAY KPI.KPI_ID, KPI_CURRENT_VALUE
END FOR
USE ARRAY AS INPUT FOR PLOTTING TARGET SERIES OF DATA
```

*FIG. 65*

Calculating Ensemble Best Fit (Project)

Overview

This is the process whereby the Quality Profile of an Application is matched to all Ensembles available in the system. This can be visually represented by a Spider/Radar chart diagram

Database Objects
- Ensembles
- Ensemble_QoE_Attributes_Mappings
- Project_Quality_Profile

Pseudo Code

```
FOR EACH ROW IN ENSEMBLE TABLE
    FILTER ENSEMBLE_QOE_ATTRIBUTES_MAPPING BY ENSEMBLE_ID FROM ABOVE ROW
    FOR EACH ROW IN ENSEMBLE_QOE_ATTRIBUTES_MAPPING TABLE
        FIND MATCH WITH PROJECT_QUALITY_PROFILE ROW USING QOE_ATTRIBUTE_ID
        IF FOUND
            SELECT CASE PROJECT_QUALITY_PROFILE.VALUE_ID
                CASE "HIGH"
                    PUSH INTO ARRAY1 ENSEMBLE_QOE_ATTRIBUTES_MAPPING.HIGH
                CASE "MEDIUM"
                    PUSH INTO ARRAY1 ENSEMBLE_QOE_ATTRIBUTES_MAPPING.MEDIUM
                CASE "LOW"
                    PUSH INTO ARRAY1 ENSEMBLE_QOE_ATTRIBUTES_MAPPING.LOW
                CASE ELSE
                    PUSH INTO ARRAY1 0
            END SELECT
        END IF
    END FOR
    PUSH INTO ARRAY2 ENSEMBLE.ENSEMBLE, GEOMETRIC MEAN (Array1)
END FOR
```

*FIG. 66*

Calculating Ensemble Best Fit (Business Activity)

Overview

This is the process whereby the Quality Profile a Business Activity is matched to all Ensembles available in the system. This can be visually represented by a Spider/Radar chart diagram.

Database Objects

- Ensembles
- Ensemble_QoE_Attributes_Mappings
- Profile_Business_Activity_Quality_Profile

Pseudo Code

```
FOR EACH ROW IN ENSEMBLE TABLE
    FILTER ENSEMBLE_QOE_ATTRIBUTES_MAPPING BY ENSEMBLE_ID FROM ABOVE ROW
    FOR EACH ROW IN ENSEMBLE_QOE_ATTRIBUTES_MAPPING TABLE
        FIND MATCH WITH PROFILE_BUSINESS_ACTIVITY_QUALITY_PROFILE ROW USING QOE_ATTRIBUTE_ID
        IF FOUND
            SELECT CASE PROFILE_BUSINESS_ACTIVITY_QUALITY_PROFILE.VALUE_ID
                CASE "HIGH"
                    PUSH INTO ARRAY1 ENSEMBLE_QOE_ATTRIBUTES_MAPPING.HIGH
                CASE "MEDIUM"
                    PUSH INTO ARRAY1 ENSEMBLE_QOE_ATTRIBUTES_MAPPING.MEDIUM
                CASE "LOW"
                    PUSH INTO ARRAY1 ENSEMBLE_QOE_ATTRIBUTES_MAPPING.LOW
                CASE ELSE
                    PUSH INTO ARRAY1 0
            END SELECT
        END IF
    END FOR
    PUSH INTO ARRAY2 ENSEMBLE.ENSEMBLE, GEOMETRIC MEAN (Array1)
END FOR
```

FIG. 68

- By IT Function

| | Score | Maturity Level |
  |---|---|---|
  | Management | 25% | Core |
  | Engineering | 57% | Integrated |
  | Operations | 76% | Autonomic |

- By IT Process Area

| | Score | Maturity Level |
  |---|---|---|
  | Business Capability Mgmt | 15% | Core |
  | Application & Service Development | 23% | Core |
  | Resource Planning | 85% | Autonomic |
  | Customer Mgmt | 56% | Integrated |
  | Service Delivery Operations | 36% | Core |
  | Resource Mgmt | 68% | Autonomic |
  | Supply Chain Mgmt | 43% | Integrated |

- By Utility Focus Area

| | Score | Maturity Level |
  |---|---|---|
  | Service Governance | 88% | Autonomic |
  | Service Automation | 64% | Integrated |
  | Service Virtualization | 58% | Integrated |
  | Service Infrastructure | 24% | Core |
  | Service Monitoring | 12% | Core |

*FIG. 74*

| Function | Business | Logical | Architecture | Engineering | Operations |
|---|---|---|---|---|---|
| Define Scope | •BVC<br>•KPI | Workload QP | Workload Ensemble | Ensemble Manifest | •Capability Remediation<br>•IT Driver |
| Select Pattern | BVC Pattern | •QoE Pattern<br>•Functional Pattern | •Architecture Patterns<br>•Information Patterns | •Deployment Pattern<br>•Functional Pattern (inherited)<br>•Information Pattern (inherited) | •Capability Patterns |
| Design | •BVC Leg-BF<br>•BF-KPI<br>•BF-BA<br>•App Portfolio | •Workload-BA<br>•Workload-QP<br>•Workload Functional Pattern | •Best Fit Ensembles<br>•Infrastructure Mgmt Policies | •KP-KR<br>•PED Manifest<br>•Physical Layout<br>•Engineering Rules | •Assess Capability<br>•Assess Maturity |
| Time | •Business Drivers<br>•Current to Future State Transition | •KPI-QP Lens<br>•Top BA-QP Lens | •Predicted Heat Map Lens | •Forensic Heat Map<br>•Missing TC | •IT Driver Lens<br>•Capability Area Lens<br>•Maturity Improvement |
| Generate Blueprint Sheet | Business Context | Workload Requirements | Enterprise Architecture Stack | Physical Deployment | Operations Model |

*FIG. 82*

Business Context Blueprint Sheet

| | Business Value Chain (BVC) — Weighted Quality Goals for each segment of the BVC | | | | | | | | | |
|---|---|---|---|---|---|---|---|---|---|---|
| BVC Functions | Sales | | | Trading | | | | | | |
| Business Activities/ Qualities | Client Screening | Research | Client Relationship w/ Mgmt | Trade Execution | Trade Validation | Trade Simulation | Electronics Comm Networks | Bail Bids Trading | Order Mgmt | Work at Data | Portfolio Mgmt |
| App 1: Call Center Application | | ■ | ■ | | | | | | | | |
| App 2: CRM | | | ■ | | | | | | | | ■ |
| App 3: Trading Platform | | | | ■ | ■ | | ■ | ■ | ■ | ■ | |
| App 4: Trader Research | | | | | | ■ | | | | | ■ |
| App 6: External Correspondence Application | | ■ | ■ | | | | | | | | |

FIG. 85B

Workload Requirements Blueprint Sheet pt. 1

| Workload Sources | | QoE Requirements Sales Functions | | | | | |
|---|---|---|---|---|---|---|---|
| | | | BA-1 | Client Screening | Client BA-2 | Trade Execution (desk, Alog, Black Box) | Order Mgmt (routing, matching) | BA-3 | ECN Connectivity |
| Business Demand Characteristics | Business Service Requirements | Visual Experience, Accessibility to Content, Quality of Search, Availability / Convenience, Geographical Regs | | | 5x8 / 5x24 Market Calendar, Event Sensitive, High Volumes, Cost Sensitive, Speed of Execution, Geographical Regs, Internal Security, Zero-Minimal Tolerance Delays | | | |
| | Latency | Standard | Standard | Standard | Microsecond | Microsecond | Microsecond | Millisecond |
| | Availability | Standard | Standard | High | Very High | Very High | Very High | High |
| | Throughput QoS | Conflated | Conflated | Conflated | Full Rate | Full Rate | Full Rate | Full Rate |
| | Throughput Load | Low | Low | Low | High | High | Very High | High |
| | Data Aggregation | Low | Low | Low | Moderate | Moderate | High | Low |
| Business Demand Characteristics | Interim Data Persistence | Low | Low | Low | High | High | High | High |
| | Data Distribution | Low | Low | Low | Moderate | High | High | High |
| | Swap Utilization | Moderate | Low | Moderate | NA | NA | NA | NA |
| | Disk Consumption | High | Moderate | High | High | High | Moderate | Moderate |
| | Memory Consumption | Low | Low | Low | High | High | High | High |
| | Memory Volatility | Low | Low | Low | High | High | High | High |
| | Distrib. Memory coherence | Low | Low | Low | High | High | High | High |
| | Compute Data Set Size | Small | Small | Small | Moderate | Small | Small | Small |
| | Data Transformation | Low | Low | Low | Low | Low | Low | Moderate |
| | Rendering | Moderate | Low | Low | Low | Low | NA | NA |
| | Workload Size | Small | Small | Small | Small | Small | Small | Small |
| | Event Intensive | Low | Low | Low | High | High | High | High |
| | Input Intensive | Low | Low | Low | High | High | High | High |
| | Output Intensive | Low | Low | Low | High | High | High | High |
| | Machine to Machine Internal | Yes | Yes | Yes | Yes | Yes | Yes | Yes |

Top 3 QoE Problems
- Scale to meet business demand
- Production Reliability
- Data Integrity (Matching Promotions to Inventory)

Workload Quality Profile

*FIG. 88A*

Consumption Model

| Business Action | Execution Style | Capabilities | Enables / Value Provided |
|---|---|---|---|
| Trade Execution | Low Latency Ensemble | - Application Execution Microkernel<br>- Common Class Libraries<br>- Distributed Data Caching<br>- Grid Execution Engine<br>- HTTP Container<br>- Lightweight Application Container<br>- Object Relational Mapping<br>- Publish / Subscribe Service<br>- Relational Query Engine<br>- Transactional Grid<br>- Web Server Page Container | - Enables Enterprise-Wide Application Integration<br>- Enables Rapid Development of Object-Relational Data Access<br>- Facilitates Sharing of Transactional Information<br>- Provides Application Integration (Web Services Based)<br>- Provides Internal/External Web Based Access<br>- Provides Relational Database Access |
| Trade Validation | Complex Transaction Ensemble | - Application Execution Microkernel<br>- Common Class Libraries<br>- Distributed Data Caching<br>- Grid Execution Engine<br>- HTTP Container<br>- Lightweight Application Container<br>- Object Relational Mapping<br>- Object State Container<br>- Publish / Subscribe Service<br>- Relational Query Engine<br>- Transactional Grid<br>- Two Phase Transaction Manager<br>- Web Server Page Container | - Enables Business Process Activity Across Multiple Applications<br>- Enables Business Process Activity Across Multiple Databases<br>- Enables Enterprise-Wide Application Integration<br>- Enables Rapid Development of Object-Relational Data Access<br>- Facilitates Sharing of Transactional Information<br>- Provides Application Integration (Web Services Based)<br>- Provides High Availability for User Sessions<br>- Provides Internal/External Web Based Access<br>- Provides Relational Database Access |

*FIG. 89*

SOA Architecture Blueprint Sheet

- Service Request Mgr: Accepts requests; provides rich interaction facility through high speed delivery of large multi-media content; interprets partial page updates.
- Business Logic: Interacts with user; responds to partial page updates; invokes necessary logic for refresh;
- Page Builder: Waits for page elements; deliver partial page updates; delivery pages based on configuration; invokes business logic;
- Garbage Collector: Cleans expired entities;
- Edge Cache Repository: Holds more stable content that changes less and has a high reuse profile (e.g. icons, banners, stock videos, form shells);
- Rich Media Transformation Engine: Translation to req'd formal; deserialization / Serialization:
- Non-Rich Media Transformation Engine. Transform to req'd formal; Deserialization/ Serialization:
- Targeted Source & Request Update Builder: Build requests for each source; build updates for each source;
- Pub/Sub Mgr: Process subscription requests; process publish requests; alert subscriber of change, bundles requests;
- Data Distribution Mgr: Uses messaging semantics to guarantee delivery of changed data, has ACID transaction semantics;
- Namespace Mgr: Ensures data entities are properly named; preserving uniqueness;
- Request Rep. Mapper: Holds source meta-data; resolves complex requests to source;
- Data Source Communicator: Makes requests and updates; awaits responses; awaits unsolicited updates from remote data changes; has API's to refine tyeps of requests;
- Session Page Based Repository. Holds page element based data for streamlined session throughput; higher volatility; holds intermediate values during sessions;
- Media Repository. Holds media that can be streamed to multiple clients;
- Personalization Repository. Holds views; holds format preferences.

*FIG. 92C*

Component Resource Analysis Table

| Element resource analysis table | | | Pain [0,1]- and Remediation Need [0,1] bubbles up from functions in patterns collaboration table | | |
|---|---|---|---|---|---|
| Element Collaborators list {...} // Element function list {...} | | | | | |
| Element Function | Element Workload Consumption type | Value scale | Scale meaning | Workload Intensity Type | Value scale | Scale meaning |
| | CPU | [0,1] | Degree of CPU intensive processing, 1= Highest | Element Interrupt focus | [0,1] | Degree of interrupts that the Element is designed to process, 1= Highest Note that a Element such as a message processor would expect to process many interrupts, but an individual Unit of Work would be intolerant of those interrupts, because it is supposed to get the work done quickly. |
| | Network | [0,1] | Degree of Network intensive processing- 1= Highest | UoW interrupt tolerance | [0,1] | Degree of interrupts an individual 1= Highest Note that a Element such as a message processor would expect to process many interrupts, but an individual Unit of Work would be intolerant of those interrupts, because it is supposed to get the work done quickly. |
| | Persistent Storage | [0,1] | Degree of Persistent storage required- 1= Highest | CPU duration/ UoW | [0,1] | Degree of expected CPU utilization required to complete work according to quality. A low latency function such as a message processor would expect to have little CPU utilization per work load, but may actually use the CPU more than a calculation engine, depending on numerous factors. 1 = Highest |
| | Interim Storage | [0,1] | Degree of CPU Interim storage required- 1= Highest | Information Size/ UoW | [0,1] | Relative size of - 1= Highest |
| | Workload Surrogate | [0,1] | Degree of reliance on Processing outside of Element (opsys, service brokers) | | | |

*FIG. 106*

Element – Quality conflict meta table arguments

| Business Function | Element Function | Priority | Pain [0,1] | Quality type | Quality value requirement | stringency | Quality Gap | Remediation on Need [0,1] | Remediation Tactic A | Remediation tactic A gap coverage |
|---|---|---|---|---|---|---|---|---|---|---|
| Read stock Trade Message | Message format transaltion | .85 | .95 | latency | 5ms | .99 | Cannot process below 20ms | 1 | Cisco ACE | Converts at line speed, exceeds need |
| Read stock Trade Message | Record Update | .9 | .95 | latency | 20ms | .99 | Cannot process below 20ms | 1 | Oracle Coherence | In memory cache, <10 ms |
| Read stock Trade Message | Format outgoing message | .95 | .95 | latency | 5ms | .99 | Cannot process below 20ms | 1 | Cisco ACE | Converts at line speed, exceeds need |
| Update Portfolio | Process messages at line speed | .95 | .95 | Throughput | 5000 messages/ second | .99 | Cannot process below 20ms | 1 | Cisco ACE with routing by Stock symbol & multiple message processors | Segment line load to handle incoming traffic |

*FIG. 107*

Pattern Collaboration table and Conflict analysis prep table

| Pattern collaboration table AND Conflict analysis prep table – might need logic to remediate Tactics per quality ||||||||
|---|---|---|---|---|---|---|---|
| Function-this can trace back to BVC | Containing Element | Collaborating Element in pattern | Degree of collaboration | Degree of message passing Important – given quality columns? | Event passing Important – given quality columns? | Priority of interaction Important – given quality columns? | Qualities of interaction {...} Will have a few EACH based performance, availability, security For each quality, need PAIN, STRINGENCY, PRIORITY, REMEDIATION NEED and TACTIC | Potential concurrency between function | Proximity requirement |
| A | A | B | [0,1] | [0,1] | [0,1] | [0,1] | {Many columns}. Value discrete or continuous? | [0,1] | [0,1] |
| B | B | A | [0,1] | [0,1] | [0,1] | [0,1] | {Many columns} | [0,1] | [0,1] |
|   |   |   |   |   |   |   | {Many columns} |   |   |

*FIG. 108*

INFRASTRUCTURE CORRELATION ENGINE AND RELATED METHODS

CROSS-REFERENCE TO RELATED APPLICATION

The present application is a U.S. continuation patent application of, and claims priority under 35 U.S.C. § 120 to, U.S. nonprovisional patent application Ser. No. 12/899,456, filed Oct. 6, 2010, which patent application and any patent application publications thereof are incorporated by reference herein, and which patent application is a U.S. nonprovisional patent application of, and claims priority under 35 U.S.C. § 119(e) to, U.S. provisional patent application Ser. No. 61/278,361, filed Oct. 6, 2009. A copy of this provisional patent application is attached as an exhibit hereto and incorporated herein by reference, with the proviso that no definitions, or other disclosure, contained therein shall be interpreted, considered, or construed as being limiting on disclosure herein in any way shape or form, and to the extent that an interpretation or understanding of a term or phrase in view of disclosure contained therein is inconsistent with an interpretation or understanding of a term or phrase in view of disclosure herein, such inconsistent interpretation shall be considered an alternative interpretation, and shall not be interpreted, considered, or construed as limiting in any way, shape, or form.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to information technology (IT).

For some organizations, the one size fits all solution to IT performance issues, such as, for example, high execution times, is the time honored American tradition of "buying more stuff". More specifically, when faced with performance issues, an organization frequently adds additional infrastructure to try to improve performance. However, this additional infrastructure can increase cooling and power requirements, increase maintenance costs, and introduce additional operational complexity. Further, changes can create a need for higher network bandwidth requirements to ensure that highly collaborative elements can communicate effectively. Moreover, an organization has to put all its "stuff" somewhere, and, the more hardware it adds, the further apart some of it ends up, thus potentially causing the organization to fall victim to the horrors of IT sprawl. More specifically, as distances between physical tiers of infrastructure grow larger, performance can be affected via the increase of overall execution time required to perform work, which can in turn cause an organization to . . . buy (even) more stuff. Continuing efforts to compensate for performance impacts can create a downward spiral of cost, efficiency, and performance, often leading to decisions that include expanding or building new data centers, which are prohibitively expensive and time consuming.

Unfortunately, aside from limited individualized guidance for particular elements, it has traditionally been difficult to find cohesive, methodical, or customized assistance in implementing the various tasks associated with IT design, operations, and management.

Some assistance in conceptualizing the relationship between IT and business needs was provided by work done by Michael Porter in 1985. He introduced the concept of a business value chain (BVC), which is a generic value chain model that comprises a sequence of activities found to be common to a wide range of firms. Porter identified key activities, including policies and decisions, interrelationships, integration and scale that strongly apply to the general function(s) required of IT. However, a need remained for a systematic approach, dedicated tools, and the like to assist in the actual design and management of IT. Without these things, typical problems encountered include a lack of alignment between the BVC and IT, overlapping and missing functionality in the business platform, a continuous battle with missed customer expectations, rigid and brittle infrastructure, IT delivery and resources being unable to keep up with demand, a lack of definitive examples on how to document, a heavier reliance on tribal knowledge for how to get things done, and many others.

A need exists for improvement in IT design, operations, and management. This, and other needs, are addressed by one or more aspects of the present invention.

SUMMARY OF THE INVENTION

Broadly defined, the present invention according to a first aspect of the present invention relates to a method that includes displaying to a user, via a display element, a user interface that allows a user to characterize business demand of an organization; receiving, from a user, via one or more input devices, input characterizing business demand; automatically comparing, utilizing one or more processors and one or more memory elements of a computer system, qualities of business demand to attributes of ensembles comprising implementations of reusable patterns, the qualities of business demand being based at least in part on the received input characterizing business demand; determining, based on said comparing step, a recommended ensemble; and displaying to a user, via a display element, the recommended ensemble and other possible ensembles as well as a visualization comparing the recommended ensemble and the other possible ensembles to business demand.

In a feature of this aspect, the step of determining, based on said comparing step, a recommend ensemble comprises determining based at least in part on Bayesian logic, a recommended ensemble.

In a feature of this aspect, the method further includes allowing a user to select, via a user interface displayed via a display element, the recommended ensemble or one of the other possible ensembles; receiving, from a user, via one or more input devices, input selecting an ensemble; and generating, based at least in part on said received input for selecting an ensemble, an IT blueprint, the IT blueprint comprising information for use by one or more users in implementing the selected ensemble.

In a feature of this aspect, the step of displaying to a user, via a display element, a user interface that allows a user to characterize business demand of an organization comprises displaying to a user, via a display element, a user interface that allows a user to characterize key performance indicators of the organization.

In a feature of this aspect, the method further includes a step of deriving a quality profile based on the received input characterizing business demand.

In a feature of this aspect, the reusable patterns comprise architecture patterns. In accordance with this feature, the architecture patterns can include one or more design architecture patterns, technology architecture patterns, functional architecture patterns, deployment architecture patterns, or information architecture patterns.

In a feature of this aspect, the qualities of business demand include qualities associated with resources, such as qualities associated with processing resources, qualities associated with memory resources, qualities associated with network resources, or qualities associated with storage resources.

Another aspect of the present invention relates to a method for generating a strategy for an organization for remediating known problems. The method includes identifying a known problem; automatically determining, utilizing one or more processors and one or more memory elements of a computer system, based at least in part on information contained in a knowledge base, a capability for remediating the known problem; automatically determining utilizing one or more processors and one or more memory elements of a computer system, based at least in part on information contained in a knowledge base, one or more intermediate capabilities required to obtain the determined capability for remediating the known problem; generating a remediation strategy incorporating the determined capability for remediating the known problem; and displaying to a user, via a display element, the remediation strategy.

In a feature of this aspect, at least one of said determining steps takes into consideration probabilities that particular capabilities are available to the organization.

Another aspect of the present invention relates to a method for generating a strategy for an organization for remediating known problems. The method includes identifying one or more known problems; automatically determining, utilizing one or more processors and one or more memory elements of a computer system, based at least in part on information contained in a knowledge base, capabilities for remediating the one or more known problems; displaying to a user, via a display element, one or more determined capabilities for remediating the one or more known problems; receiving, from a user, via one or more input devices, input accepting or rejecting at least one of the one or more determined capabilities; generating, based at least in part on the input accepting or rejecting at least one of the one or more determined capabilities, a remediation strategy incorporating at least one of the determined one or more capabilities; and displaying to a user, via a display element, the remediation strategy; wherein said determining step takes into consideration probabilities that particular capabilities are available to the organization.

Another aspect of the present invention relates to a method for facilitating the expansion of the capabilities of an organization. The method includes displaying to a user, via a display element, a list of capabilities; receiving, from a user, via one or more input devices, a selection of a capability for acquisition; and determining, based at least in part on information contained in a knowledge base, one or more intermediate capabilities required to obtain the selected capability for acquisition.

In a feature of this aspect, the method further includes estimating, based on probabilities that intermediate capabilities are available to the organization, effort to acquire the selected capability for acquisition.

Another aspect of the present invention relates to a method for facilitating the design or description of IT for an organization. The method includes displaying to a user, via a display element, a user interface that allows a user to characterize key performance indicators for the organization; receiving, from a user, via one or more input devices, input characterizing key performance indicators for the organization; automatically deriving, based at least in part on the input characterizing key performance indicators for the organization, a quality profile; displaying to a user, via a display element, a user interface depicting the quality profile that is configured to allow a user to effect changes to the quality profile; automatically comparing, utilizing one or more processors and one or more memory elements of a computer system, the quality profile to attributes of ensembles comprising implementations of reusable patterns; determining, based on said comparing step, a recommended ensemble; and displaying to a user, via a display element, the recommended ensemble and other possible ensembles as well as a visualization comparing the recommended ensemble and the other possible ensembles to the quality profile.

Another aspect of the present invention relates to a method for facilitating the design or description of an IT supply chain corresponding to a business value chain for an organization. The method includes displaying to a user, via a display element, a user interface that allows a user to identify one or more business functions within the business value chain; receiving, from a user, via one or more input devices, input identifying one or more business functions within the business value chain; displaying to a user, via a display element, a user interface that allows a user to identify business activities within each identified business function; receiving, from a user, via one or more input devices, input identifying business activities within each defined business function; displaying to a user, via a display element, a user interface that allows a user to map business activities to legs of the business value chain or the IT supply chain; receiving, from a user, via one or more input devices, input mapping business activities to legs of the business value chain or the IT supply chain; displaying to a user, via a display element, a user interface that allows a user to characterize key performance indicators for the organization; receiving, from a user, via one or more input devices, input characterizing key performance indicators for the organization; automatically deriving, based at least in part on the input characterizing key performance indicators for the organization, an optimal quality profile; displaying to a user, via a display element, a user interface depicting the optimal quality profile that is configured to allow a user to effect changes to the optimal quality profile; automatically deriving, based at least in part on the optimal quality profile, a business activity quality profile for each identified business activity; automatically comparing, utilizing one or more processors and one or more memory elements of a computer system, a certain one of the business activity quality profiles to attributes of ensembles comprising implementations of reusable patterns; determining, based on said comparing step, a recommended ensemble; and displaying to a user, via a display element, the recommended ensemble and other possible ensembles as well as a visualization comparing the recommended ensemble and the other possible ensembles to the certain one of the business activity quality profiles.

Another aspect of the present invention relates to a method for determining optimized infrastructure for an application. The method includes displaying to a user, via a display element, a user interface that allows a user to select a pattern they believe an application is associated with, the patterns from which the user may choose being patterns stored in a knowledgebase together with qualities thereof; receiving, from a user, via one or more input devices, input selecting a pattern they believe an application is associated with; automatically looking up, in the knowledgebase, a recommended ensemble for the selected pattern; displaying to a user, via a display element, the recommended ensemble as well as a visualization comparing the recommended ensemble to the selected pattern.

In a feature of this aspect, the method further includes identifying, based on the recommended ensemble, technical capabilities for the recommended ensemble; and generating an IT blueprint, the IT blueprint comprising information for use by one or more users in implementing the selected package, and the IT blueprint detailing one or more identified technical capabilities.

Another aspect of the present invention relates to a method for determining optimized infrastructure for an application. The method includes displaying to a user, via a display element, a user interface that allows a user to select a pattern they believe an application is associated with, the patterns from which the user may choose being patterns stored in a knowledgebase together with qualities thereof; receiving, from a user, via one or more input devices, input selecting a pattern they believe an application is associated with; looking up, in the knowledgebase, qualities for the selected pattern; automatically comparing, utilizing one or more processors and one or more memory elements of a computer system, qualities of the selected pattern to attributes of ensembles comprising implementations of reusable patterns; determining, based on said comparing step, a recommended ensemble; displaying to a user, via a display element, the recommended ensemble and other possible ensembles as well as a visualization comparing the recommended ensemble and the other possible ensembles to the selected pattern.

In a feature of this aspect, the method further includes allowing a user to select, via a user interface displayed via a display element, the recommended ensemble or one of the other possible ensembles; receiving, from a user, via one or more input devices, input for selecting an ensemble; and generating, based at least in part on said received input for selecting an ensemble, an IT blueprint, the IT blueprint comprising information for use by one or more users in implementing the selected ensemble.

Another aspect of the present invention relates to a computer readable medium containing computer executable instructions for a software program including an analysis engine module. The analysis engine module includes a shared decision workspace that can be refined simultaneously by each of a plurality of agents of the analysis engine, and a decision iteration module configured to provide recommendations of ensembles comprising implementations of reusable patterns based on iterative analysis performed by the plurality of agents of the analysis engine. The software program further includes a resolution navigator module configured to provide side-by-side comparisons of ensembles; and a knowledgebase containing information for running the analysis engine module.

In a feature of this aspect, the plurality of agents include a work agent configured to match workload to reusable patterns through iterative decomposition, an IT proximity optimization agent configured to weigh degree of collaboration and intensity of collaboration traffic as factors in decomposition, a management agent configured to evaluate workload and concurrency to determine how best to minimize conflict and remediate resource utilization, and a leverage agent configured to match technologies to functional and operational needs to determine technology remediation tactics.

In a feature of this aspect, the program further includes a wizard module configured to guide a user on a directed path to optimizing information technology.

Another aspect of the present invention relates to a computer readable medium containing computer executable instructions for a software program configured to display a visualization to a user representing various user interface viewpoints of information technology architecture; allow a user to select one or more of the user interface viewpoints from the visualization; prompt a user for input associated with one of the user interface viewpoints; and generate an information technology blueprint based at least in part on user input that describes the configuration of information technology architecture.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 6 illustrates how a business scenario is in essence a higher level expression of a use case that contains one or more business steps;

FIG. 10 illustrates exemplary information patterns for storage and access;

FIG. 14 illustrates an exemplary service profile detailing peak period related qualities for rich internet application, business intelligence, and extract, translate, load functional patterns;

FIG. 15 illustrates an exemplary service profile showing resource consumption qualities of each element of a rich internet application functional pattern;

FIG. 16 illustrates an exemplary service profile showing workload allocation qualities of each element of a business intelligence functional pattern;

FIG. 22 facilitates understanding that an integrated monitoring pattern can be used to define technology used within a common monitoring deployment pattern;

FIG. 26 illustrates how a technology pattern can be used to describe the end to end characteristics of an entire enterprise architecture;

FIG. 28 illustrates an exemplary document storage ensemble;

FIG. 30 illustrates an exemplary technology stack;

FIG. 35A illustrates generic business demand characteristics that can be utilized in a workload profile;

FIG. 35B illustrates an exemplary workload profile utilizing the generic business demand characteristics of FIG. 35A;

FIG. 37 illustrates an exemplary QoE profile;

FIG. 38 illustrates data usage patterns charted utilizing a detailed policy set of their service profiles;

FIGS. 40A-B illustrate second tier qualities for use in dimensioning storage for a processing execution destination;

FIG. 41 illustrates an example of provisioning a processing execution destination;

FIG. 42 illustrates exemplary maturity levels that can be utilized;

FIG. 43 illustrates an exemplary capability assessment table for process, technical, and competency capabilities;

FIG. 44 illustrates an exemplary scoring matrix which might be utilized in one or more implementations;

FIG. 45 illustrates an exemplary range table which might be utilized in one or more implementations;

FIGS. 48-49 illustrate conditional probability matrices;

FIG. 51 illustrates an exemplary workload pattern that represents a subset quality profile having thirty four of fifty qualities rearranged;

FIG. 52 illustrates how a pattern quality value can be correlated to a workload pattern quality value;

FIG. 53 illustrates exemplary fuzzy logic tables;

FIG. 54 illustrates a workload pattern having both base qualities and calculated qualities derived therefrom;

FIG. 55A-B collectively illustrate an exemplary performance heat map predicting how well an ensemble meets workload requirements;

FIGS. 59-60 illustrate pseudo control instructions;

FIG. 61 illustrates the similarity of quality profiles for business activities of a sales business function and the identification of a fit for purpose network ensemble for these business activities;

FIGS. 65-66 illustrate pseudo control instructions;

FIG. 68 illustrates pseudo control instructions;

FIG. 74 illustrates exemplary capability summary scorecards;

FIG. 82 illustrates a generalized process for each view of FIG. 80;

FIGS. 88A-B collectively illustrate an exemplary workload requirements blueprint sheet;

FIG. 89 is a consumption model showing ensemble best fit matches for trade execution and trade validation business activities;

FIGS. 92A-C illustrate an exemplary service oriented architecture blueprint sheet;

FIG. 106 illustrates an exemplary element resource analysis table;

FIG. 107 illustrates an exemplary table containing a small sample of remediation tactics that could be kept in a database and presented for review;

FIG. 108 illustrates an exemplary pattern collaboration table and conflicts analysis preparation table;

DETAILED DESCRIPTION

Figure 1:
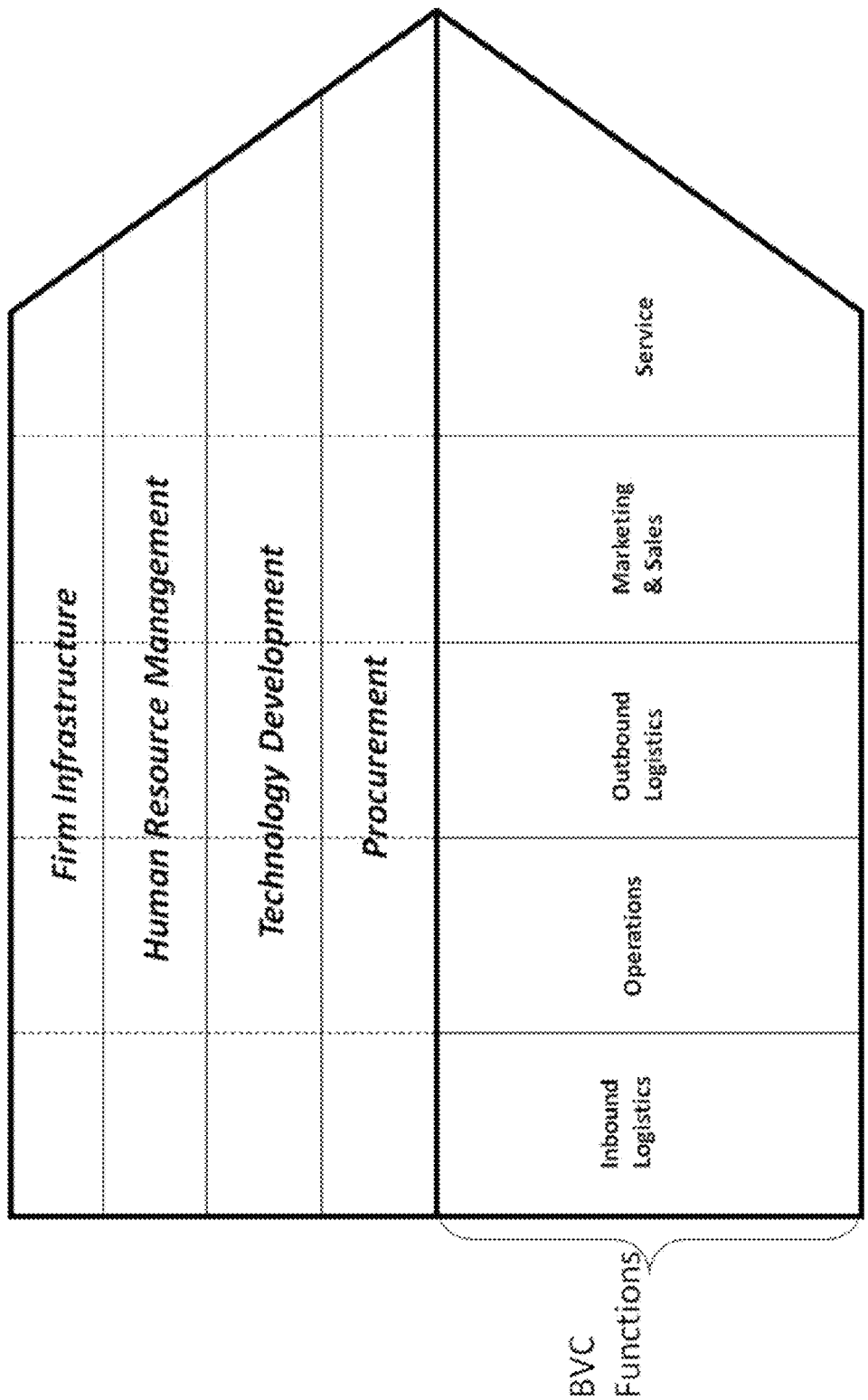
FIG. 1 illustrates a generic business value chain model that includes inbound logistics, operations, outbound logistics, marketing and sales, and service business functions.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

As used herein, the terms infrastructure and architecture shall generally each be construed as potentially enveloping both hardware and software, excepting only those situations where a particular characterization would be impossible.

Referring now to the drawings, one or more preferred embodiments of the present invention are next described. The following description of one or more preferred embodiments is merely exemplary in nature and is in no way intended to limit the invention, its implementations, or uses.

Inter alia, systems and methods for leveraging expert knowledge in advanced IT architecture, engineering and real-time operational management are described herein. One or more aspects of the present invention relate to such systems or methods, or software implementing, embodying, or facilitating such systems or methods.

At least some such software can be characterized as an infrastructure correlation engine (ICE). In at least some preferred implementations, an infrastructure correlation engine represents a tool that combines expert knowledge in advanced IT architecture, engineering, and real-time operational management to enable users to create optimized real time infrastructure designs that respect workload and physics in a repeatable manner across industries. Such users might include, for example, architects, system engineers, and systems management personnel. One or more aspects of the present invention can be characterized as leveraging an insight that optimal IT architecture can be best understood via a balancing of business demand with a supply of IT Resources to meet that demand.

Business Demand

Figure 2:
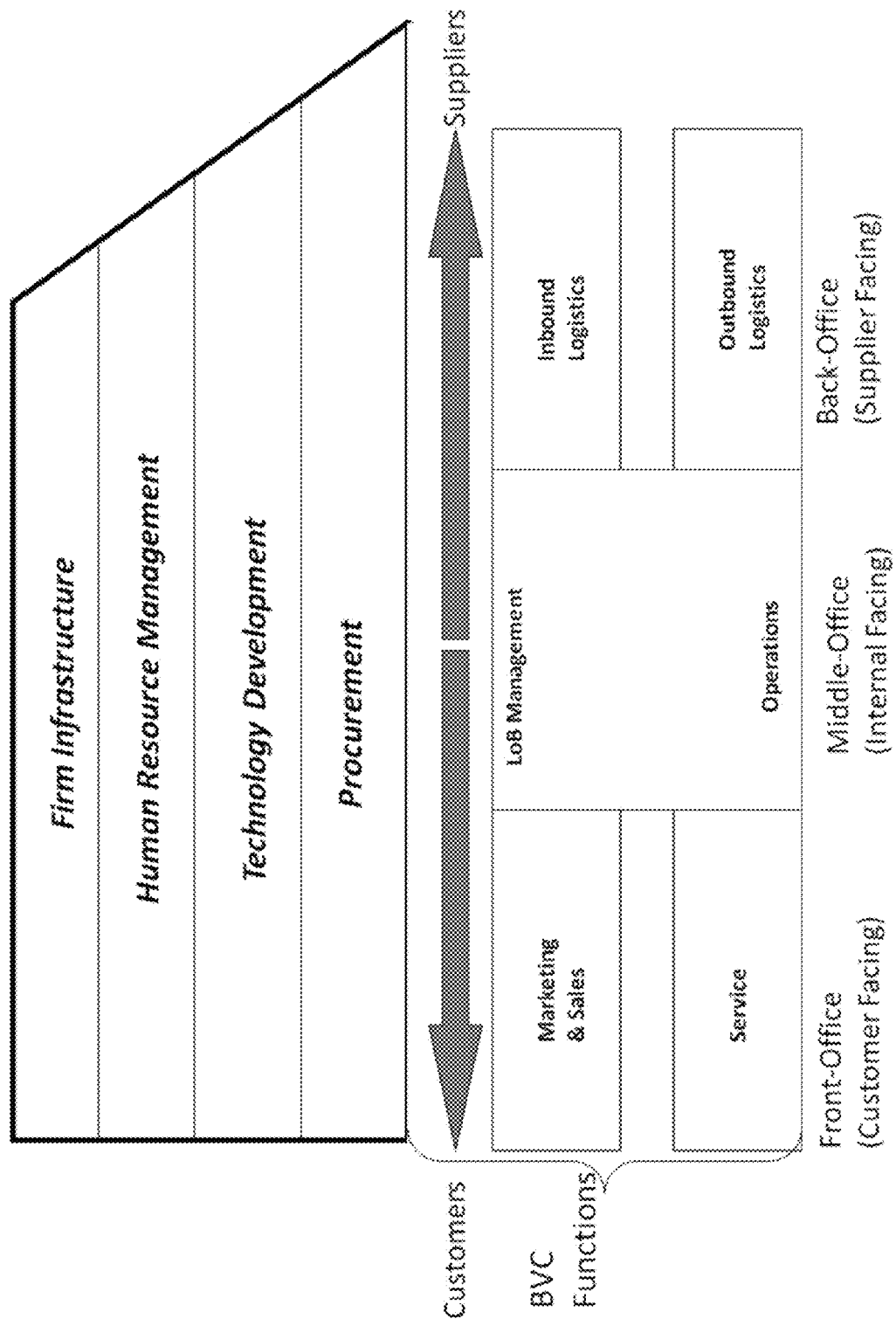
FIG. 2 illustrates a rearrangement of the business value chain model of FIG. 1.

A common methodology for describing the creation of economic value for an organization involves the utilization of business value chains. A business value chain can be characterized as being comprised of a plurality of links, each of which represents a major business function of the organization. FIG. 1 illustrates a generic business value chain model that includes inbound logistics, operations, outbound logistics, marketing and sales, and service business functions. The generic business value chain model can be rearranged to organize links by whether they are customer facing (front office), internal facing (middle office), or supplier facing (back office). FIG. 2 illustrates such a rearrangement.

Figure 3:
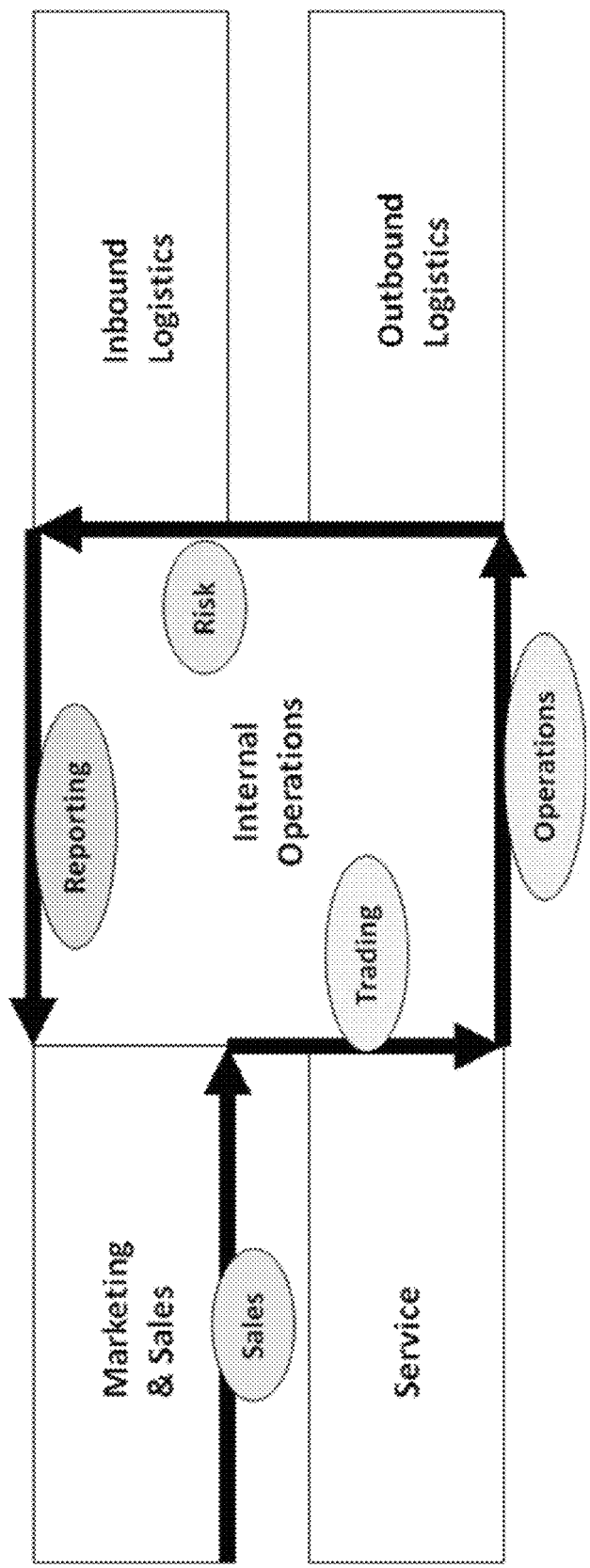
FIG. 3 illustrates business functions as links in a business value chain.

A more concrete example would be a capital markets business value chain which includes sales, trading, operations, risk, and reporting business functions. FIG. 3 illustrates these business functions as links in a business value chain.

Notably, a business value chain and the business functions within a business value chain usually span multiple stakeholders. Each business function has a primary set of stakeholders with specific business objectives. The fulfillment of a stakeholder objective represents a business scenario. Business scenarios can be identified by first identifying each stakeholder in a business function, and, thereafter, for each stakeholder, identifying each objective that that stakeholder has in that business function. Any specific requirements for meeting a stakeholder's objective should be identified so as to be included in a service level agreement (described hereinbelow).

Each stakeholder-objective combination for a business function is the point of departure for a business scenario. For each business scenario, a trigger event can be identified that initiates the scenario. A main sequence of interactions can then be described that represents the main scenario. Business exceptions can be captured as alternative flows through the scenario, i.e. as alternative scenarios. Each alternative scenario can be identified by describing each variation in the flow of events for the main scenario. Each alternative scenario can be described as a sequence of interactions.

An example of a business scenario is a business scenario for a car accident claim. The stakeholder in such a business scenario would be the claimant. The stakeholder's objective would be to get paid for his or her claim. A service level agreement (described in more detail hereinbelow) might specify that a stakeholder is to be paid within two weeks. The trigger for this scenario would be the submission of a claim by the claimant.

The main scenario would involve steps of the claimant submitting a claim with substantiating data, an insurance company verifying that claimant owns a valid policy, the insurance company assigning an agent to examine the case, the insurance company verifying all details are within policy guidelines, and the insurance company paying claimant and closing the file.

A first alternative scenario would encompass the situation where the submitted data from the first step was incomplete. This alternative scenario would include steps of the insurance company requesting missing information, and the claimant supplying the missing information.

A second alternative scenario would encompass the situation where the claimant does not own a valid policy. This alternative scenario would include the step of the insurance company denying the claim, notifying the claimant, and terminating the claim process.

A third alternative scenario would encompass the situation where no agent was available to examine the case. This alternative scenario would include the step of queuing the case for examination. Those familiar with the U.S. Patent and Trademark Office should be very familiar with this "alternative" scenario.

A fourth alternative scenario would encompass the situation where an accident associated with the claim violates basic policy guidelines. This alternative scenario would involve the insurance company declining the claim, notifying the claimant, and terminating the claim process.

A fifth alternative scenario would encompass the situation where an accident associated with the claim violates minor policy guidelines. This alternative scenario would involve the insurance company beginning negotiations with the claimant as to the degree of payment to be made.

Figure 4:
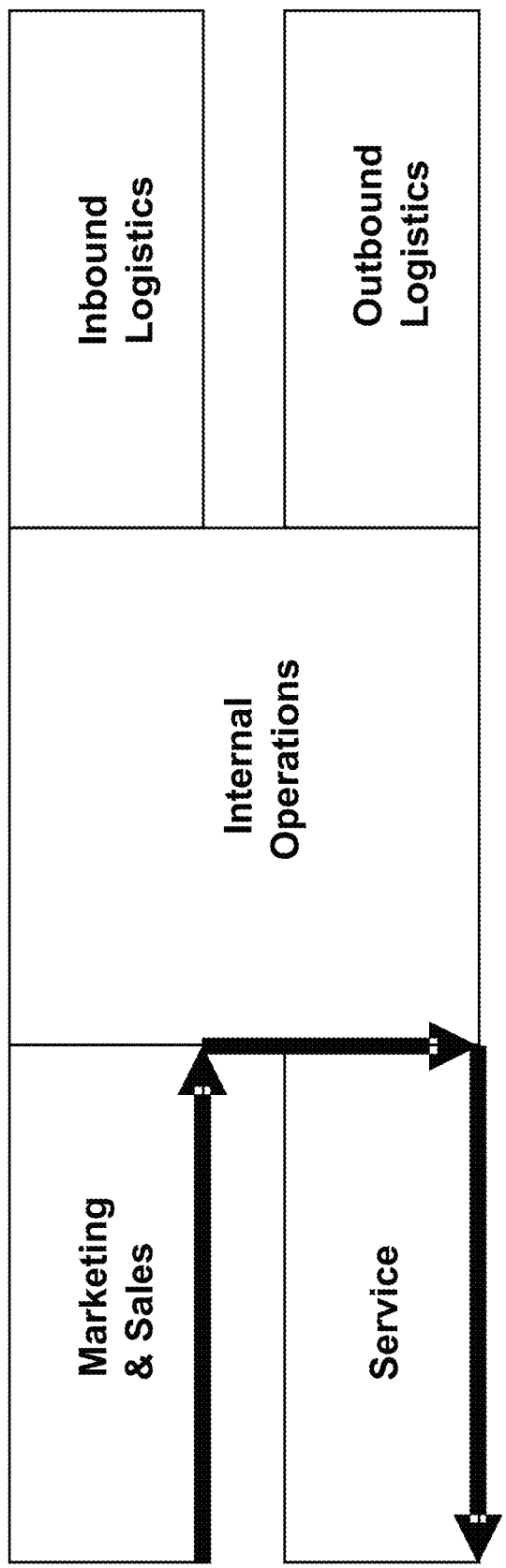
FIGS. 4-5 illustrate exemplary business scenarios.
Figure 5:
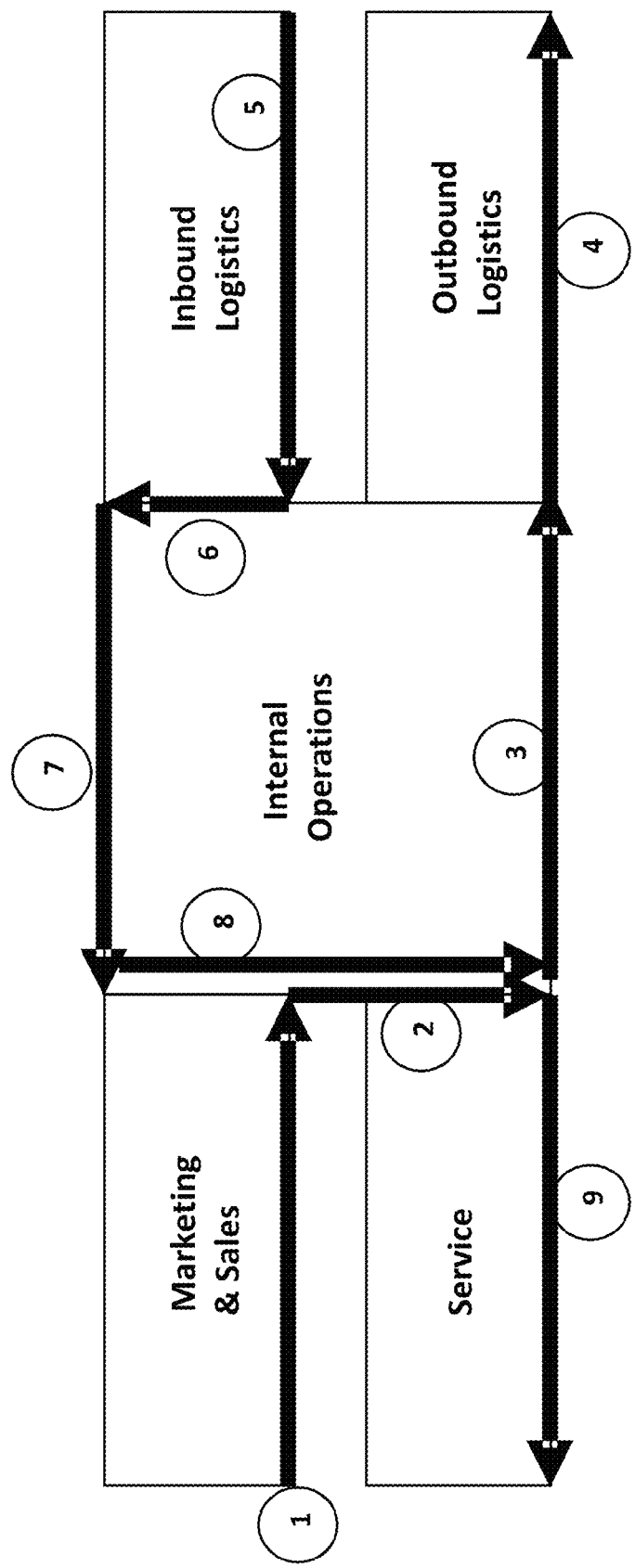

FIG. 4 and FIG. 5 illustrate additional exemplary business scenarios. Specifically, FIG. 4 illustrates a basic customer sale and installation scenario, and FIG. 5 illustrates an exemplary order fulfillment scenario utilizing just in time manufacturing and a field install.

Each business function in a business value chain comprises a series of business steps. Each business step involves a subset of stakeholders of the business function it is part of. Business steps represent a process view of a business value chain. For example, a risk business function could be broken down into steps of calculating counterparty risk, generating counterparty reports, establishing a value of portfolios, calculating a value at risk for each portfolio, comparing the calculated value at risk to risk thresholds and compliance requirements, determining portfolio adjustments to reduce risk, generating portfolio adjustment reports, and generating overnight trades to rebalance portfolio risk.

A use case describes functionality of a business step by expounding on part of a business scenario.

Specifically, a business scenario is in essence a higher level expression of a use case that contains one or more business steps, and each of these business steps can be elaborated by one or more use cases, as illustrated in FIG. 6.

For example, a "process trade" business step within a trade execution business scenario might include a "cancel a trade" use case. A use case is written to describe "what" a system or application must do to fulfill a user request. Use cases might have multiple steps (not to be confused with business steps), and each step can be characterized as having an actor, e.g. a user or a user's surrogate. A use case further has pre-conditions which must be fulfilled before the use case can start, as well as at least one post-condition, which can guarantee a certain outcome. An "e" flag can be utilized to determine whether an error occurs during execution of a use case. A use case can be composite, where each step in a higher level use case can be decomposed into separate multi-step use cases.

With respect to the exemplary "cancel a trade" use case, he actor for this use case would be a trader. The goal of this use case would be to reverse a prior trade prior to execution. The triggering event for this use case would be that the trader decides that the trade is no longer favorable. The frequency/repetition/concurrency of this trade would be once per day. A main flow of events for this use case would include steps of a trader checking that the trade has no prior fills, the system confirming no prior fill, the trader issuing a trade cancellation, the system removing the trade from an order book, and the trader receiving confirmation of the trade cancellation. The pre-conditions for this use case would require an initial state of the trade being unfulfilled and authentication by the trader. The post-conditions for this use case would specify that the trade is canceled and that the trade is subsequently historical for data integrity purposes. This use case would include constraints on performance (a check for prior fills must execute within half a second and removal from order book must complete within one second), reliability (a cancel trade transaction must be recovered if the system fails after confirming no prior fill), security (it is only possible for a trader to cancel trades belonging to the trader), and business rules (trade cancellation of a trade cannot be completed if the trade is filled prior to completion, and concurrent trade execution fails after a trade issues a trade cancellation). In an alternative flow of events, the trader discovers that a trade has already been filled and abandons the cancel trade attempt, or the trader discovers that a trade has been partially filled and issues cancellation of an unfulfilled balance of the trade.

Figure 7A:
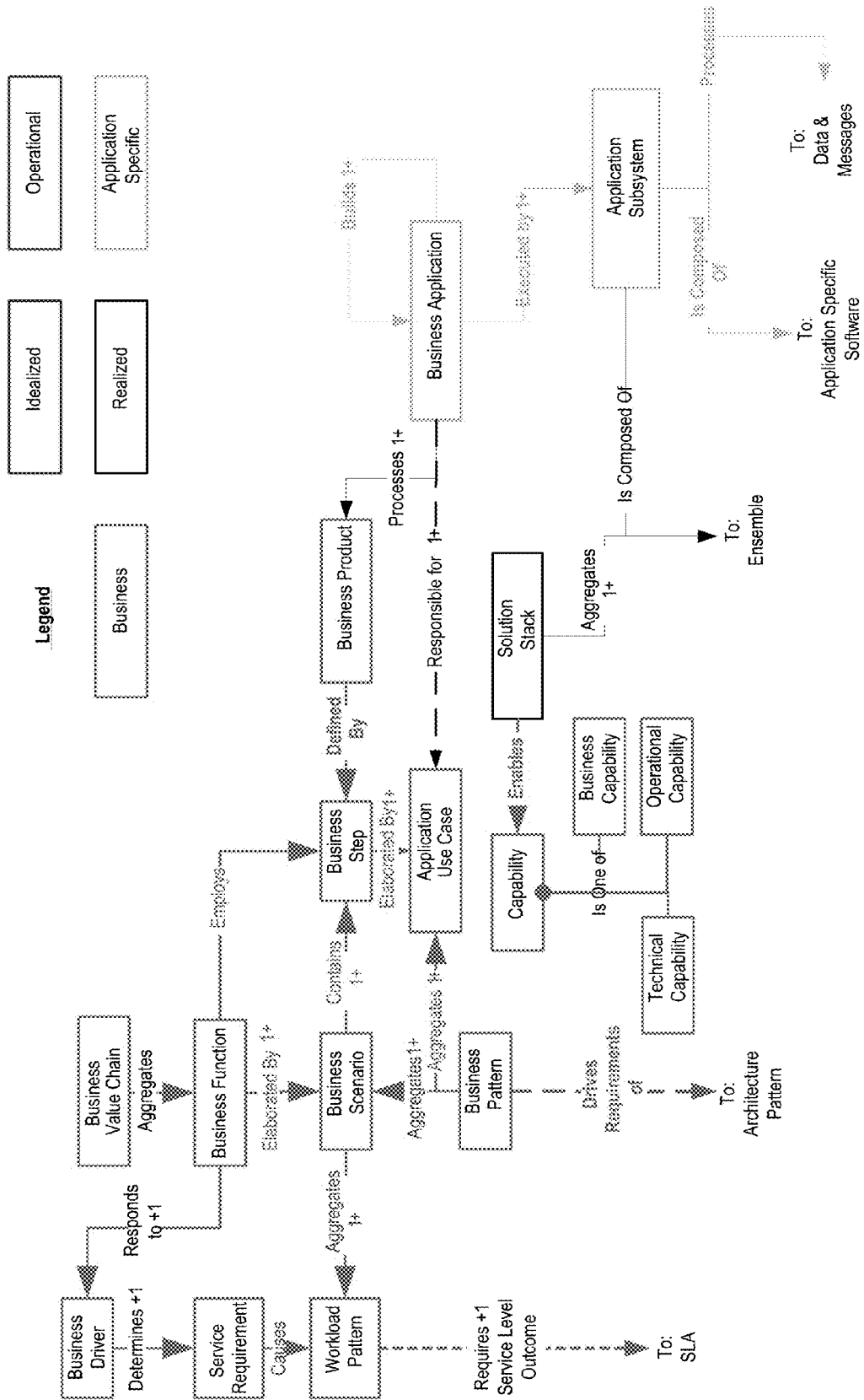
FIG. 7 illustrates exemplary relationships of various concepts and elements described herein.
Figure 7B:
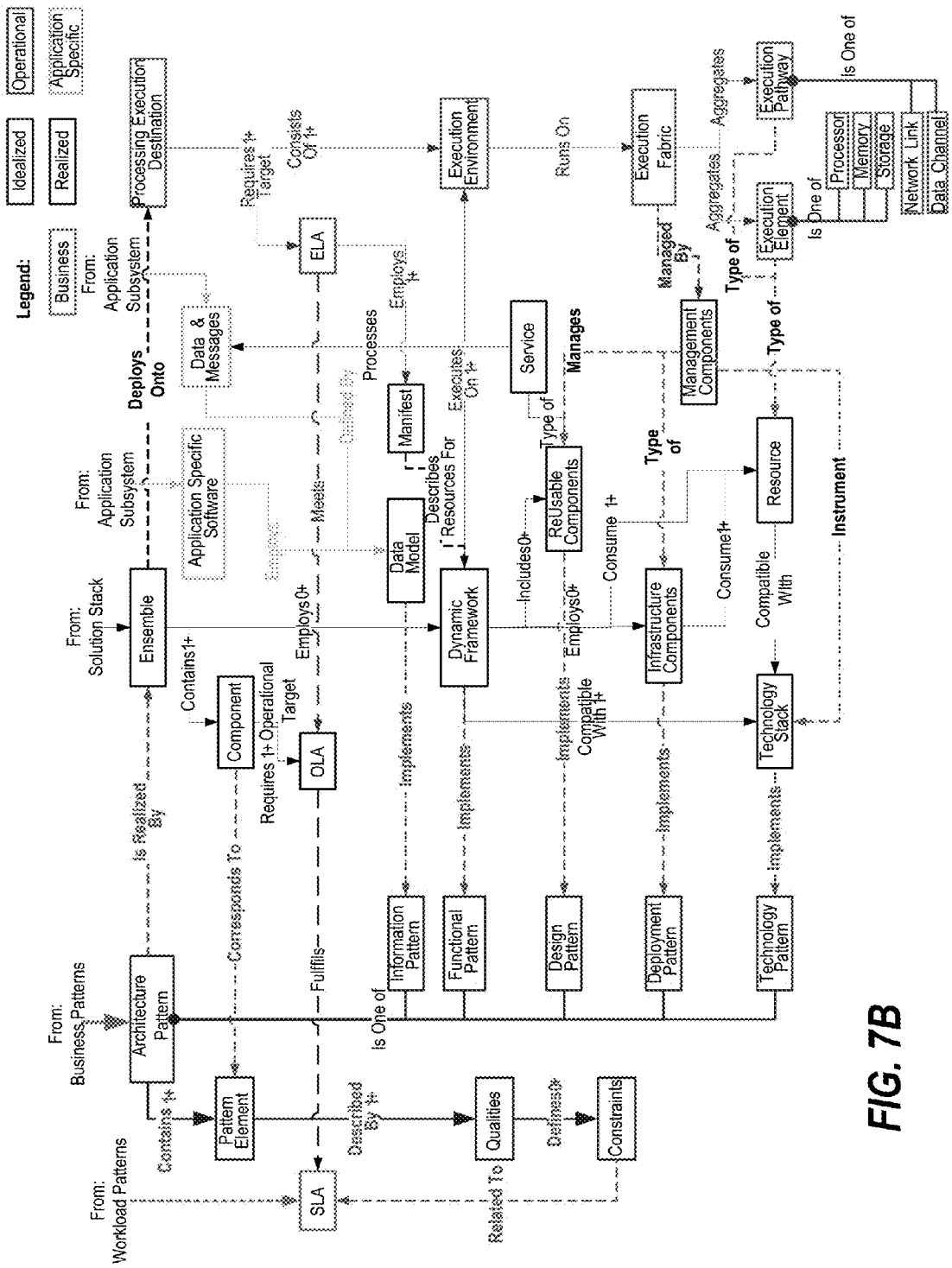

A business application processes one or more business products defined by business steps and is responsible for one or more application use cases. Such a business application is executed by an application subsystem composed of one or more assemblies of infrastructure capabilities configured to optimize a certain workload profile. These assembles can be characterized as ensembles. These relationships are illustrated in FIG. 7, together with relationships of other conceptualizations described herein in accordance with some preferred systems and methodologies.

Notably, a business value chain and the business functions within a business value chain usually span multiple business applications. Similarly, business scenarios may transcend applications. A business step, in contrast, typically involves a primary application in combination with secondary applications from adjacent business steps. A use case is specified in a manner similar to a scenario, but corresponds to only a single business application.

Figure 8:
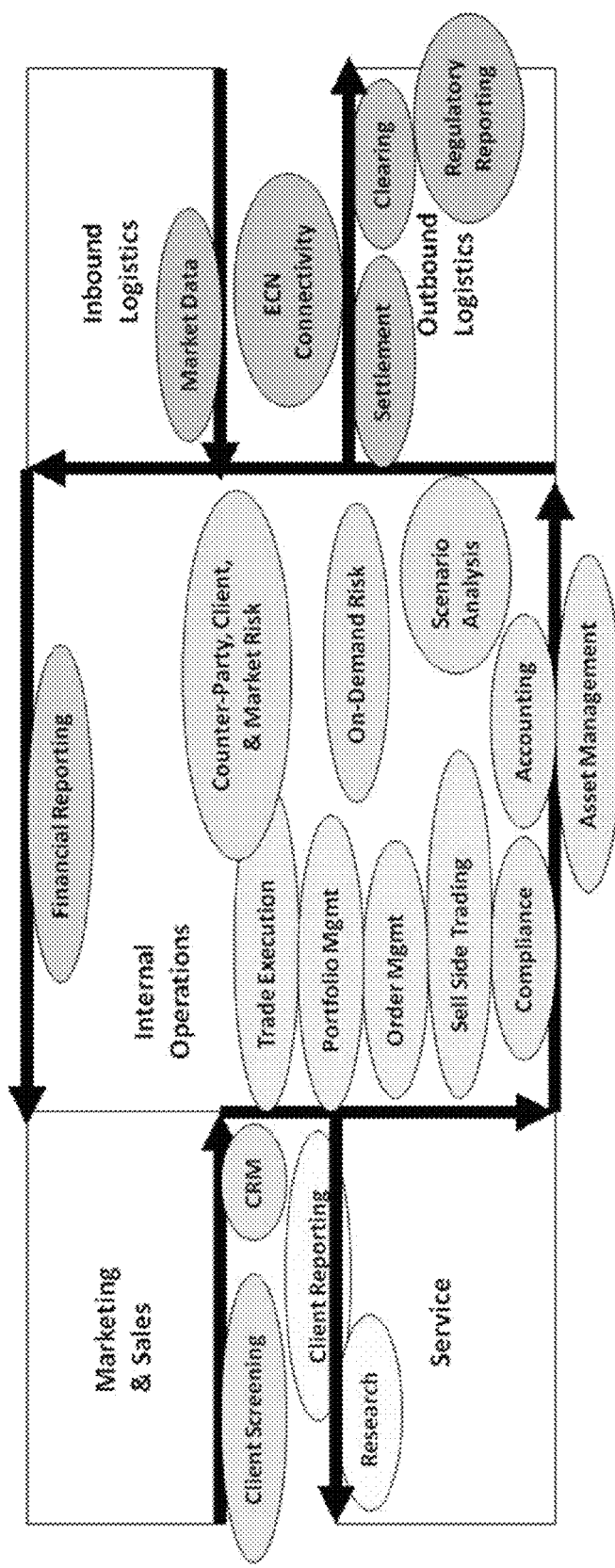
FIG. 8 illustrates exemplary business activities that underpin a straight through processing capital markets business value chain.

Business steps can be organized around common business activities that combine related business steps. Thus, business activities represent an organizational sub-grouping within a business function. For example, the illustrated ovals in FIG. 8 represent exemplary business activities that underpin a straight through processing capital markets business value chain.

Business Patterns

In walking through various business scenarios across varying business functions, recurring functionality can be found. Such recurring functionality within business activities can be characterized as business patterns.

Specifically, a business pattern represents recurring functionality from one or more business scenarios or application use cases. A business application is responsible for providing the IT functionality required for such application use cases.

For example, a business pattern might represent the common situation where a request is put in for service. This business pattern would include the steps of receiving a request from a customer, recording the customer request, collecting information necessary to satisfy the customer request, processing the request, recording information required to respond to the request, providing a response to the customer, and following up to ensure the response to the request was satisfactory. Such a business pattern might apply, for example, to a request for account information, a request to update a customer profile, a request to open a new account, or a request for a new loan for an existing account. Furthermore, since business patterns are shaped by the forces of business operating on the organization, business drivers and business demand characteristics can be identified which shape the nature of business demand into distinct workloads. Recurring types of business forces result in recurring workload patterns.

Architecture Patterns

Because these business patterns are themselves recurring, enterprise IT architecture can be utilized to address these recurring business patterns because recurring business patterns frequently result in a recurring set of architectural requirements. It is believed that such systems and methods for interrelating business patterns and architecture patterns provide advantages previously unrealized by other systems and methodologies.

Because enterprise IT architecture can quickly become very complex, just as it is advantageous when endeavoring to fully describe a building or structure to utilize multiple viewpoints (e.g. an electrical plan, mechanical plan, etc.), so too is it advantageous in describing enterprise IT architecture to utilize multiple viewpoints. For example, enterprise IT architecture can be described from an information viewpoint (e.g via a data model), a functional viewpoint (e.g. processing structure), a design viewpoint (e.g. engineering implementations), a deployment viewpoint (e.g. operations and management of architecture), and a technology viewpoint (e.g. platform standards/conventions). Preferably, these viewpoints are systematically synthesized into a single engineering ensemble of systems, storage, and networks. It is believed that such systems and methods for such systematic analysis provide advantages previously unrealized by other systems and methodologies.

A collection of requirements in accordance with one of these viewpoints driven by a business pattern represents an architecture pattern. Each viewpoint thus gives rise to a corresponding architecture pattern family (e.g. information, functional, deployment, technology, and design families). For example, a set of requirements regarding the information viewpoint can be described by an information pattern, while a set of requirements regarding the design viewpoint can be described by a design pattern. These architecture patterns describe enduring abstract patterns that are independent of any particular set of products or technology, and can be implemented differently as technology changes without altering the architecture pattern itself.

One or more aspects of the present invention relate to guiding a user in selecting better or more optimal operational platforms to run applications on. Preferably, this allows for performance improvement, waste reduction, throughput increase, and monetary savings. However, many IT practitioners feel that their applications are too unique to characterize using broad demand driven analysis, so there can be resistance to optimization techniques.

Most practitioners can now agree, though, that their applications, as unique as they are, can be characterized by decomposing them into sub-assemblies called patterns. Patterns have distinct operational behavior that manifests in specific resource consumption finger prints. These finger prints can be characterized by a set of detailed qualities that characterize consumption behavior and operational requirements. Preferably, these qualities are utilized to identify optimal infrastructure to run classes of applications on, removing the need to treat each application as a special case.

Thus, patterns can be described utilizing qualities, which represent categorical metrics, attributes, or constraints relating to the pattern. In general, patterns can be described in terms of a set of qualities called a quality profile. Specifically, the qualities of a business pattern, which are expressed in terms of business demand characteristics, can be described by a type of quality profile called a workload demand profile. The qualities of a workload pattern can be described by a different type of quality profile called a quality of experience (QoE) profile. The qualities of an architecture pattern can be described in a service profile. Since architecture patterns describe different viewpoints of enterprise architecture, different types of architecture patterns will have different content in their service profiles. Thus, information pattern service profiles will be different than design pattern service profiles. Similarly, different pattern families of the same architecture pattern may also have different content in their service profiles.

In one or more preferred implementations, architecture patterns are associated with known problems (described in more detail hereinbelow) related to implementations of those patterns. For example, such information might be stored in a knowledgebase.

Architecture Patterns—Information Patterns

Analyzing enterprise architecture from an information viewpoint allows for the use of several organizing principles. First, it is preferred that an information model be defined for all applications, as using the right information is key to business competitiveness. Further, it is preferred that a common vocabulary be utilized for all database and message elements, as this ensures that all applications speak the same language from a data perspective. Similarly, it is preferred that standard message formats are used in communications, as this is key to unlocking the sharing of application services and events. Still further, the sharing of transactional events between applications is preferred, as this unlocks cross business unit synergies. Lastly, it is preferable that defined information patterns for data representation, storage and access, and manipulation be utilized, as this unlocks reuse and minimizes design and maintenance efforts.

A first of these, information patterns for data representation relate, as their name implies, to how data is represented. Information patterns allow for the separation of user needs in viewing data from the complexity of source and format variation. This supports abstraction and promotes decoupling of divergent application needs.

Exemplary information patterns for data representation include a static representation pattern associated with common information that can be shared, such as, for example, a customer or product; a varying attributes pattern associated with common information that varies by business function, such as, for example, load data, which has attributes in common across business functions as well as attributes which vary by business function; a dynamic representation pattern associated with information that can be rendered only at a point in time, such as, for example, market data, trade transactions, and positions; a time series pattern associated with information that can be analyzed across time, that might, for example, be based on sample timing, an interval, and duration; and an unstructured data pattern associated with information that can be tagged and/or searched, that might, for example, be based on XML namespaces and/or tags.

Figure 9:
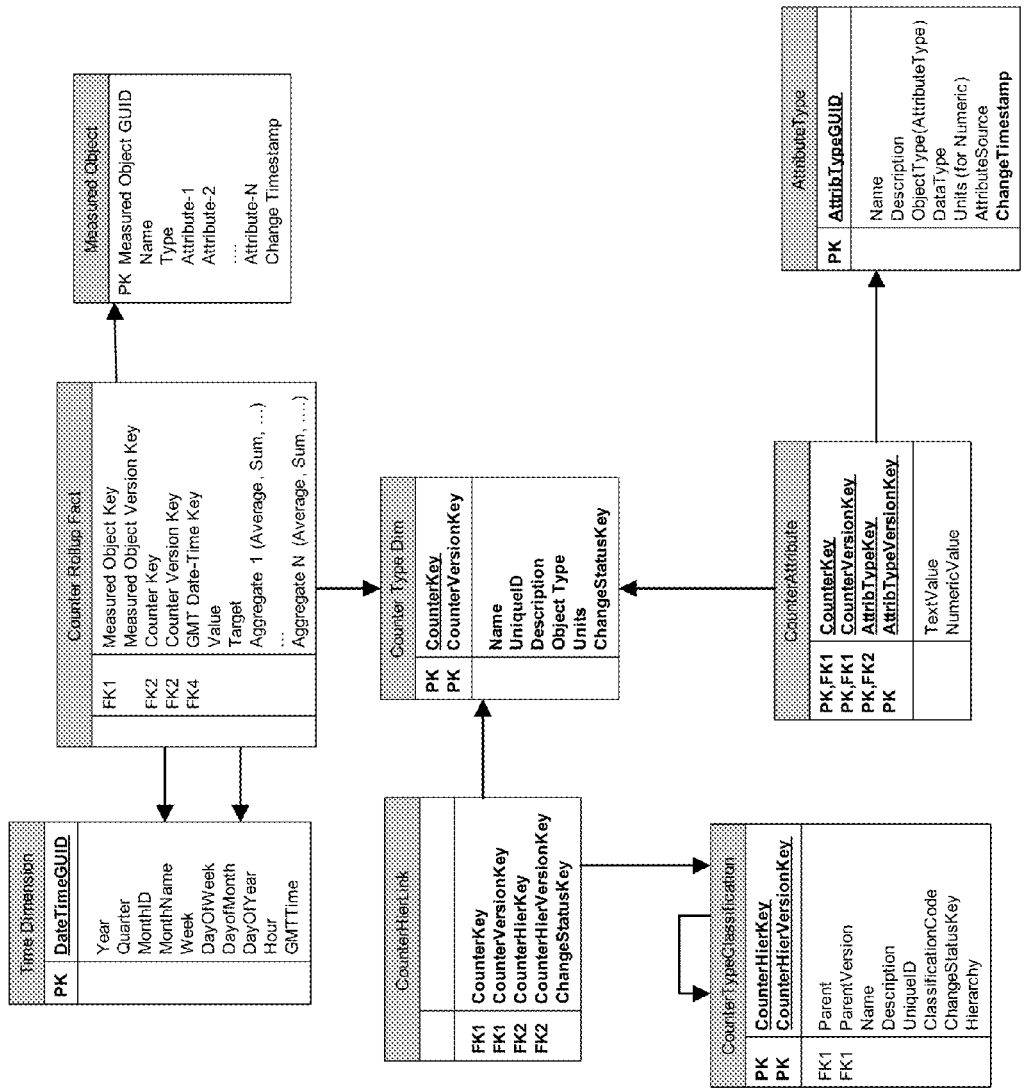
FIG. 9 illustrates a counter aggregation pattern.

A second group of information patterns, information patterns for data manipulation, can be further classified into various sub-families. A first of these is grouping patterns, such as, for example: summary aggregation type information patterns which calculate a sum, average, max or min, or similar aggregation value; or structural association type information patterns, which relate to an industry or sector the data is associated with. A second of these sub-families is utility patterns that encode rules needed for understanding data, which might be necessary for understanding information at a fundamental information level. Thus, information patterns for data manipulation might be used to define special calendar periods for data or functions operable on the data, such as defined aggregations or functions associated with the start and/or end of a period. For example, a counter aggregation pattern is an information pattern that is a member of the summary aggregation grouping pattern family. This pattern models measured values that are summarized across a time period, and might be applicable to any sales or operational metrics. FIG. 9 illustrates such a counter aggregation pattern.

Figure 10:
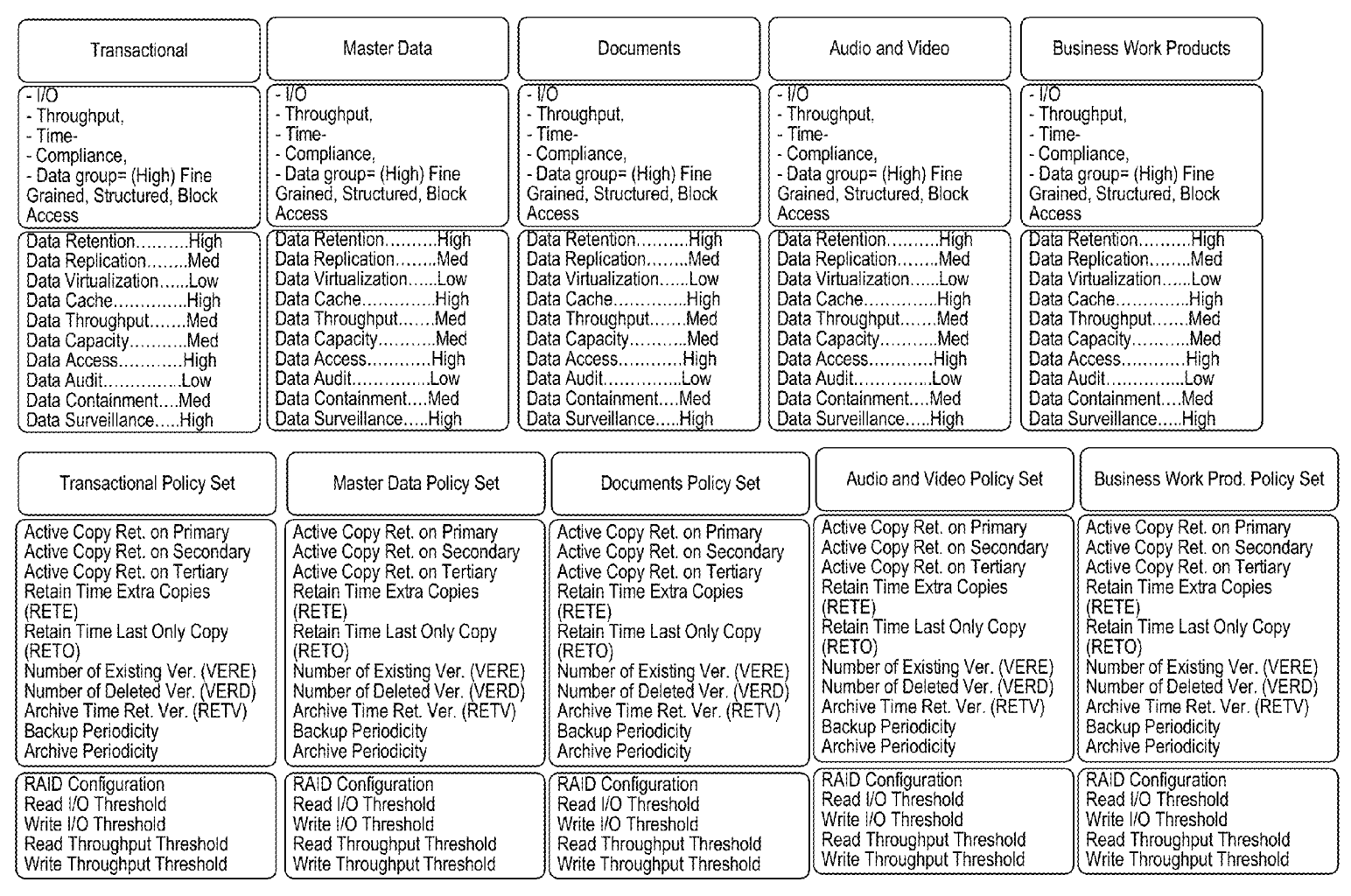

A third group of information patterns, information patterns for data storage and access (or data usage), can likewise be further classified into various sub-families. A first of these sub-families pertains to storage type patterns, such as, for example, storage type patterns for transactional data, master data, documents, audio and/or video, or business work products. A second of these sub-families pertains to policy set patterns, which define policies for accessing data securely and reliably. FIG. 10 illustrates exemplary information patterns for storage and access. For example, the first column of FIG. 10 provides properties for transactional data and a corresponding transactional policy set. Preferably, this policy set is manifested in operational rules that run against the data. These rules might be derived directly from predictable demand patterns as understood by typical patterns of usage. This preferably shapes how the infrastructure is configured.

Preferably, with respect to an information viewpoint, enterprise architecture design utilizes entity-relationship diagrams, data dictionaries, transaction matrices, data manipulation patterns, data storage patterns, and storage policy set patterns. It is believed that systems and methods incorporating data manipulation, data storage, and storage policy set patterns provide advantages previously unrealized by other systems and methodologies.

Turning to description of information patterns via qualities, a service profile for an information pattern in the data representation sub-family describes qualities relating to the semantic nature of information represented in the pattern. A service profile for an information pattern in the data manipulation sub-family describes qualities relating to the algorithmic nature of manipulating information within the pattern. A service profile for an information pattern in the data usage sub-family of information patterns describes policy sets for data access performance and security, which have profound implications for characterizing infrastructure consumption when synthesizing patterns into an engineered ensemble for configuration of IT infrastructure comprised of systems, networks, and storage.

In a preferred implementation, service profiles are implemented utilizing a two tier approach. A first tier of policy set qualities are used to organize high level policy attributes. With respect to a service profile for an information pattern in the data usage family, first tier policy qualities might include a data group quality (answering the question "What type of data is this?"), an I/O quality (answering the question "What does I/O rate look like?"), a throughput quality (answering the question "What does I/O throughput look like?"), a time quality (answering the question "How much delay in getting to the data is tolerable?"), a compliance quality (answering the question "How tightly controlled does access to data have to be?"), and a data retention quality (answering the question "How long does data need to be retained?" with either short term, which corresponds to a "low" retention value, near-term, which corresponds to a "med" retention value, or long-term, which correspond to a "high" retention value.

A second tier of a service profile corresponds to detailed policy attributes. Returning to the above example, the first tier data retention quality can be elaborated with more detailed policy attributes for active copy retention on primary, active copy retention on secondary, active copy retention on tertiary, retain time extra copies (RETE), retain time last only copy (RETO), number of existing versions (VERE), number of deleted versions (VERD), archive time retained versions (RETV), backup periodicity, and archive periodicity. Preferably, this concept of tiered qualities guides a systematic method of configuration choices for ensembles.

Architecture Patterns—Functional Patterns

A second point of view to utilize to analyze enterprise architecture is a functional viewpoint that describes the nature of computation to be performed. As with the information viewpoint, analyzing enterprise architecture from a functional viewpoint allows for the use of several organizing principles.

First, it is preferable to maximize the macro-level re-use of common business services, for example because this accelerates the delivery of new services to business users. Similarly, it is preferable to maximize the micro-level re-use of infrastructure services and components, as this eliminates unnecessary cost while avoiding constant re-invention of the wheel. Separation of data, data manipulation, data representation, and data presentation is desirable as this minimizes sustaining costs while enabling the ability to provide a common look and feel between applications. Likewise, use of a common messaging API is preferable to unlock sharing of application services and events. Finally, functional decomposition down to smallest units of work is desirable. This is preferably accomplished via use of functional patterns organized by scale and scope that describe the structure of processing required to implement a business pattern. Use of these functional patterns enables sufficient understanding of scalability, concurrency, and performance so as to allow for the automation of systematic methods of ensemble configuration. It is believed that such use of functional patterns provides advantages previously unrealized by other systems and methodologies.

Functional patterns always have a static rendition and acquire a dynamic rendition only when mapped onto an adaptive infrastructure ensemble (described hereinbelow).

IT for meeting the needs of a business value chain can be characterized as an IT supply chain (ITSC), or digital supply chain (DSC). Functional patterns are organized by a scale of the pattern based on how much of an IT supply chain it affects. An enterprise functional pattern crosses links in the IT supply chain, while a business function functional pattern applies to an entire link in the IT supply chain. Similarly, a cross business activity functional pattern crosses business activities within a business function, while a sub-activity functional pattern is used to implement a single business activity. Lastly, a solution functional pattern is a stock solution pattern for common applications or infrastructure.

Figure 11:
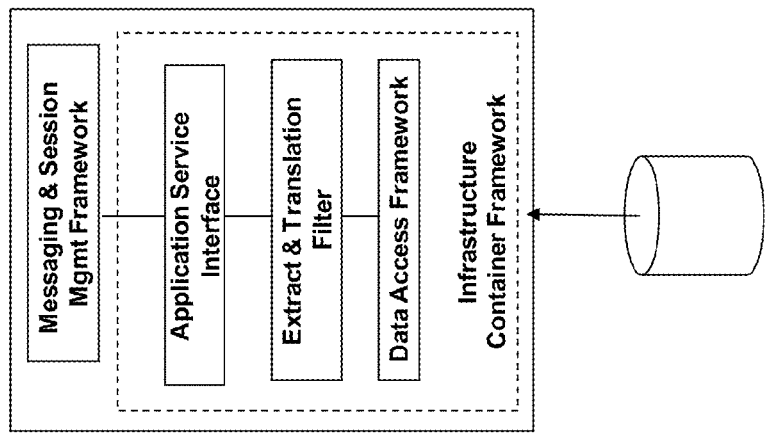
FIGS. 11-12 illustrate exemplary functional patterns.
Figure 12:
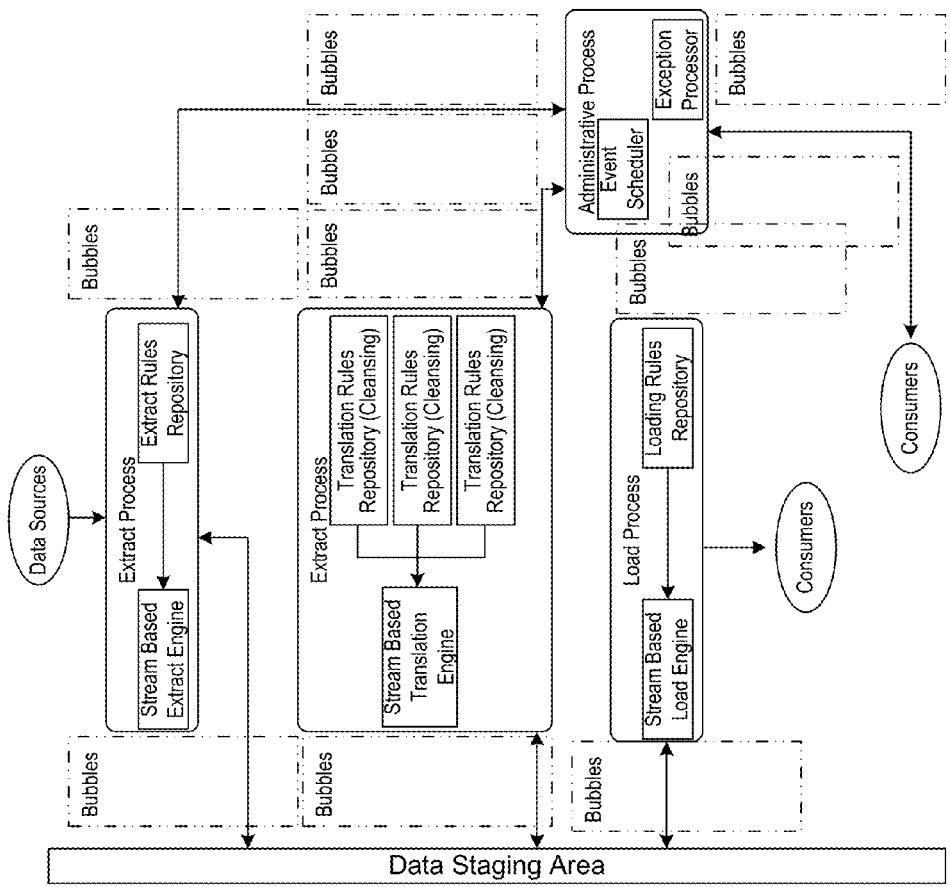

FIG. 11 illustrates an exemplary functional pattern which is a sub-activity scale pattern that utilizes a filter design pattern (as described hereinbelow) in combination with messaging and data access frameworks. FIG. 12 illustrates a second exemplary functional pattern which is an extract, translate and load pattern that is business function wide in scale.

Figure 13:
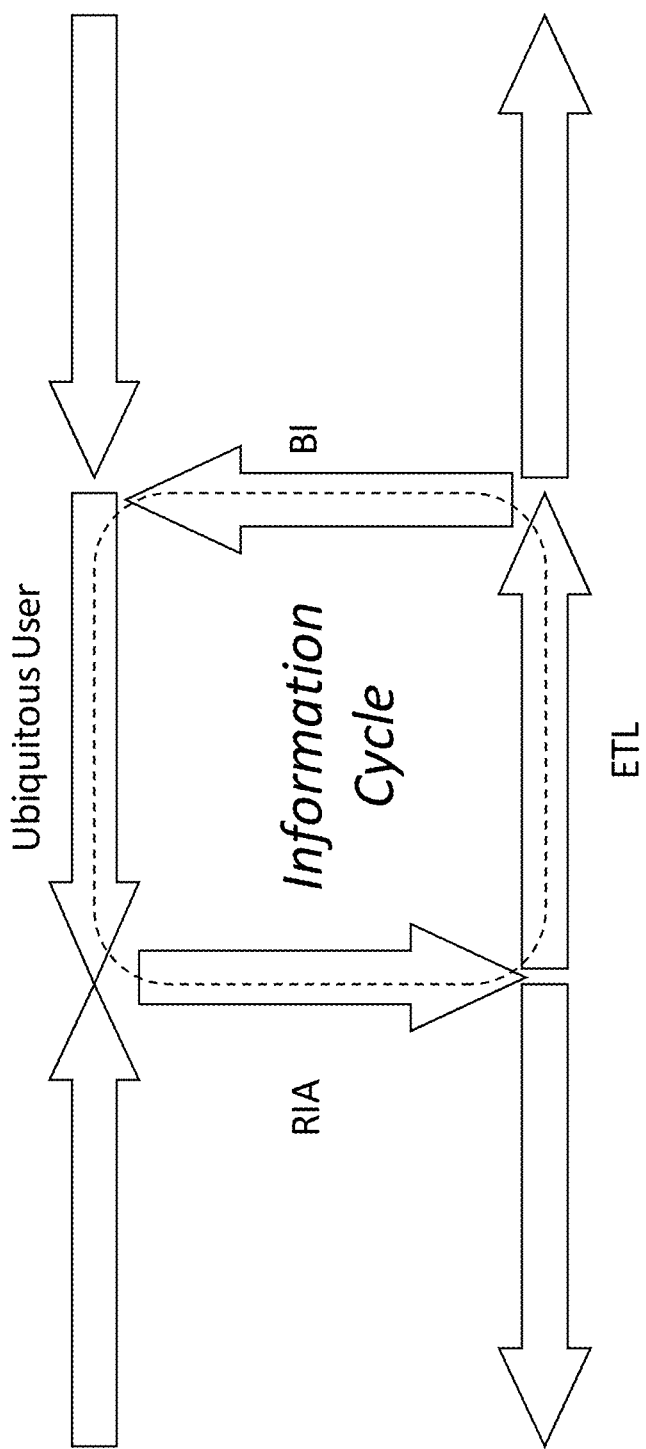
FIG. 13 illustrates the mapping of several application patterns onto links in an IT supply chain.

One special type of functional patterns is application patterns. Although, typically, multiple functional patterns are needed to define an application, application patterns are large scale functional patterns that can be utilized to define a complete application within a single pattern. Application patterns often dominate an entire leg in an IT supply chain. Exemplary application patterns might include a ubiquitous user pattern, a rich internet application pattern, an extract, translate, and load pattern, a business intelligence pattern, and an electronic mail pattern. FIG. 13 illustrates the mapping of several of these application patterns onto links in an IT supply chain.

Preferably, with respect to a functional viewpoint, enterprise architecture design utilizes UML class diagrams, sequence diagrams, a logical service BUS, client frameworks, application services, and scale-appropriate functional patterns.

Turning to description of functional patterns via qualities, a service profile for a functional pattern describes the allocation and resource demand of each of the elements that comprises the pattern. For example, the service profile preferably takes into consideration how a unit of work is dispersed among each element.

The qualities in a service profile applied to each element in a functional pattern are workload resource consumption (e.g. CPU, I/O, memory, storage occupancy and variability), workload allocation related (e.g. parallel or serial dispersion of workload), or peak period related (e.g. number of concurrent users, throughput load, and transaction load).

FIG. 14 illustrates an exemplary service profile detailing peak period related qualities for rich internet application, business intelligence, and extract, translate, load functional patterns.

FIG. 15 illustrates an exemplary service profile showing resource consumption qualities of each element of a rich internet application functional pattern. FIG. 16 similarly illustrates an exemplary service profile showing workload allocation qualities of each element of a business intelligence functional pattern. Specifically, the allocation of resource impact per unit of work onto each functional component is described by workload allocation qualities. Notably, workload allocation qualities are often closely related to the graphical layout of the pattern. A quality can be characterized as serial if workload is the same for all elements of a functional pattern, or as parallel if workload is divided among the elements.

Architecture Patterns—Design Patterns

A third point of view to utilize to analyze enterprise architecture is a design viewpoint. As with the information and functional viewpoints, analyzing enterprise architecture from a design viewpoint allows for the use of re-usable patterns, which, in this case, are design patterns. Design patterns represent re-usable techniques that find common use in an industry.

It is preferable to maximize the re-use of common techniques via the use of design patterns. Similarly, it is preferable to separate implementation from higher level function. It is also preferred to expose major components and interrelationships, but not overly constrain implementation. Likewise, it is preferable that modularity, information hiding, and information coupling be utilized, and design scale be kept in mind.

Preferably, design patterns are utilized to facilitate the engineering of applications, software frameworks, and functional patterns. Similarly to functional patterns, design patterns are subject to scale and scope along the same scales as functional patterns. That is, an enterprise design pattern crosses links in the IT supply chain, while a business function design pattern applies to an entire link in the IT supply chain. Similarly, a cross business activity design pattern crosses business activities within a business function, while a sub-activity design pattern is used to implement a single business activity. Lastly, a solution design pattern is a stock solution pattern for common applications or infrastructure.

Some design patterns might be on the scale of a single element or module. For example, various factory design patterns, structural design patterns, and behavioral design patterns might be on such a scale. Exemplary factory design patterns that could be on the scale of an element or module include a builder design pattern, a prototype design pattern, and a singleton design pattern. Exemplary structural design patterns that could be on the scale of an element or module include an adaptor design pattern, a bridge design pattern, a composite design pattern, a decorator design pattern, a façade design pattern, a flyweight design pattern, and a proxy design pattern. Exemplary behavioral design patterns that could be on the scale of an element or module include a command design pattern, an interpreter design pattern, an iterator design pattern, a mediator design pattern, an observer design pattern, a state design pattern, a visitor design pattern, and a model view controller design pattern.

While design patterns may represent reusable code, the act of running such reusable code causes infrastructure consumption. Thus, design patterns can provide insight into how applications are organized and thus how quality profiles can be defined.

Figure 17:
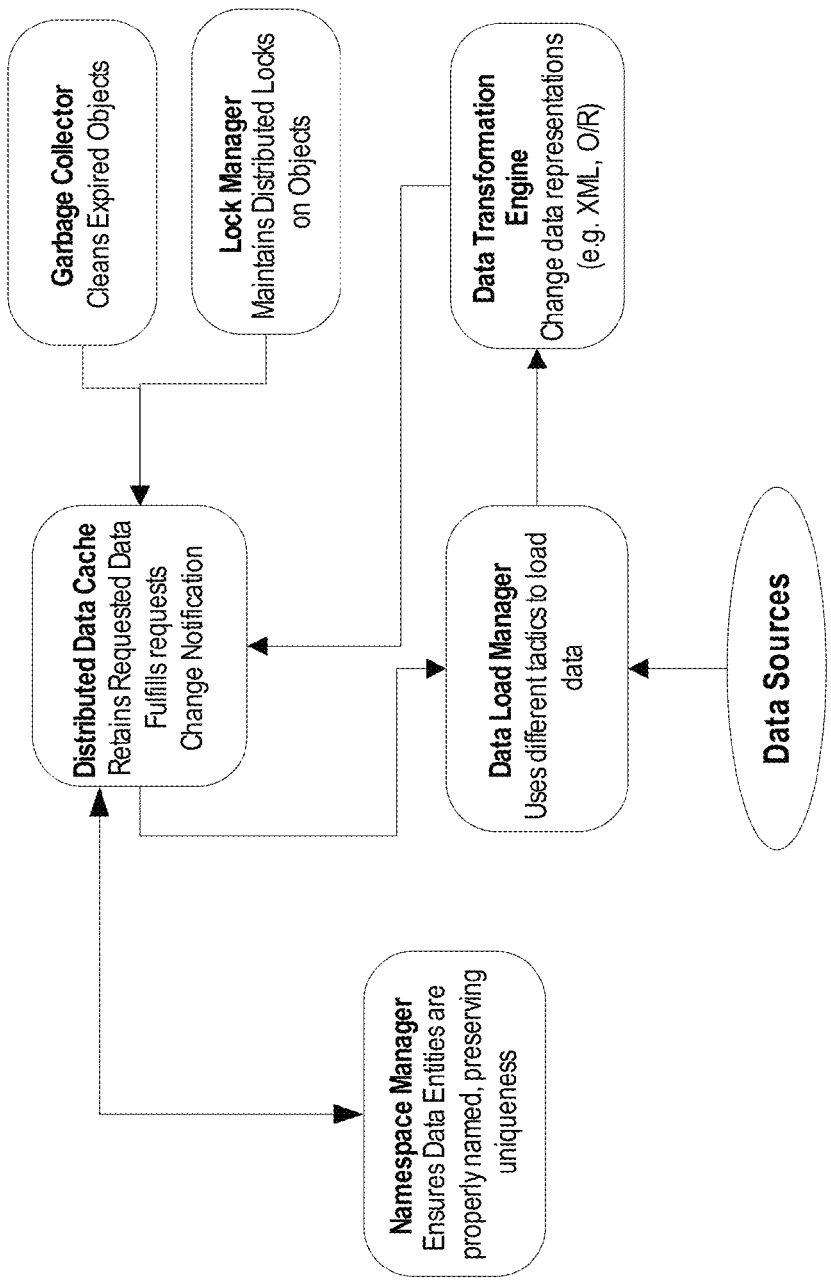
FIG. 17 illustrates an exemplary distributed data cache design pattern.

FIG. 17 illustrates an exemplary distributed data cache design pattern that can be used to maintain a shared state between multiple instances of a processing entity. This design pattern is an application scale design pattern in that it is intended to be utilized on an application-scale across subsystems.

Turning to description of design patterns via qualities, a service profile for a design pattern describes characteristics and tradeoffs of the pattern. Qualities for design pattern service profiles can be grouped into general categories of performance, design, and adaptation. The use of qualities for organization for the purpose of predicting the performance of engineered ensembles which embody them enables the realization of systematic and automated methods of configuring such ensembles. It is believed that such use provides advantages previously unrealized by other systems and methodologies.

Performance might include the qualities of efficiency (e.g. the effectiveness of communications/processing/storage), integrity (e.g. accessibility), reliability (which might include sub-properties for accuracy, anomaly management, and simplicity), survivability (which might include sub-properties for autonomy, distributiveness, modularity, reconfigurability, and anomaly management), and usability (e.g. operability training).

Design might include the qualities of correctness (which might include sub-properties for completeness, consistency, and traceability), maintainability (which might include sub-properties for modularity, consistency, simplicity, self-descriptiveness, and visibility), verifiability (which might include sub-properties for modularity, self-descriptiveness, simplicity, and visibility).

Adaptation might include expandability (which might include sub-properties for modularity, self-descriptiveness, simplicity, augmentability, generality, and virtuality), flexibility (which might include sub-properties for modularity, self-descriptiveness, simplicity, augmentability, and generality), interoperability (which might include sub-properties for modularity, commonality, functional overlap, system compatibility, and independence), portability (which might include sub-properties for independence, modularity, and self-descriptiveness), and reusability (which might include sub-properties for modularity, self-descriptiveness, simplicity, generality, generality, independence, application independence, document accessibility, functional scope, and system clarity).

Many of these have direct implications for how infrastructure is chosen and configured, including a variety of service capabilities and management capabilities that need to be added and run in conjunction with essential functions of an application.

Architecture Patterns—Deployment Patterns

Another point of view to utilize to analyze enterprise architecture is a deployment viewpoint. As with other viewpoints, analyzing enterprise architecture from a deployment viewpoint allows for the use of several organizing principles.

First, it is preferable that client services be deployed separately from application services, as this allows for multiple client types across applications while still promoting the re-usability of application services. Preferably, all services are deployed on a virtualized platform, as this lowers provisioning costs by maximizing application transportability. Notably, this does not imply that virtual machines are the only potential solution, as the use of virtual service pools to provide alternative virtualization at the application layer is also preferred.

Preferably, common instrumentation and a common management framework are utilized, as this simplifies troubleshooting and promotes consistency of operations. Further, data is preferably placed close to where it is used so as to minimize latency in accessing information. Best practices preferably include the use of application manifests and system maps.

As with the other viewpoints, analyzing enterprise architecture from a deployment viewpoint allows for the use of re-usable patterns, which, in this case, are deployment patterns, which are used to characterize different types of distribution and deployment architectures.

Deployment patterns can be grouped into several families, including patterns for high availability tactics, patterns for offload tactics, client/server patterns, and patterns for enterprise application integration tactics.

Patterns for high availability might include, for example, a single instance pattern (notably, use of a single instance pattern by itself likely implies that there is little concern for high availability; however, single instance patterns can be composed in a variety of arrangements to create high availability patterns that can achieve very high availability targets), a proxy server pattern, an appliance pattern, a high availability cluster pattern, a tight-processor array pattern, a computational grid pattern, and an application service virtualization/service pool pattern. Patterns for offloading might include, for example, a pattern for desktop virtualization, a pattern for server operating system virtualization, a pattern for data virtualization, a pattern for network virtualization, a pattern for front-end processor virtualization, and a pattern for back-end processor virtualization. Patterns for enterprise application integration might include, for example, a pattern for a service bus, a hub and spoke pattern, a pull pattern, and a push pattern. Client/server patterns might include, for example, a 2-tier client/server pattern, a 3-tier client/server pattern, a proxy server pattern, a remote proxy pattern, and a reverse proxy pattern.

Figure 18:
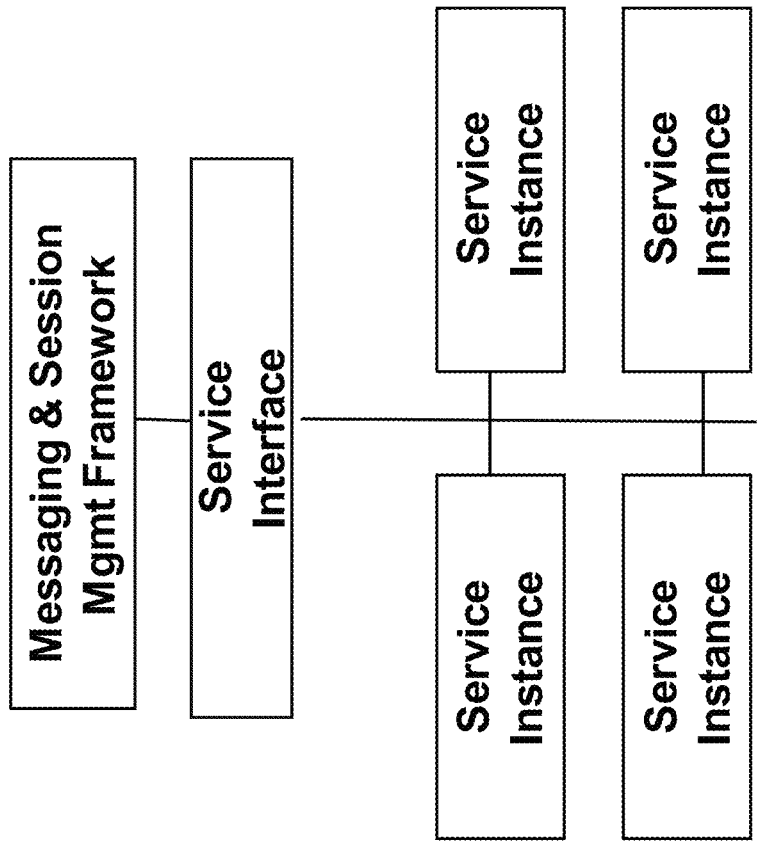
FIG. 18 illustrates an exemplary deployment pattern.

FIG. 18 illustrates an exemplary deployment pattern. Specifically, FIG. 18 illustrates an application service virtualization deployment pattern. In accordance with this pattern, a service is replicated onto multiple servers within a pool as multiple instances, with each instance being active. A service interface provides service registration so that the service can be located once it is started. A load balancer is utilized to select the most appropriate instance for service when the service is needed, thus the service location can be characterized as dynamic. This strategy is appropriate for stateless services that require high scalability and high reliability, such as, for example, reference data servers or a computational grid.

Figure 19:
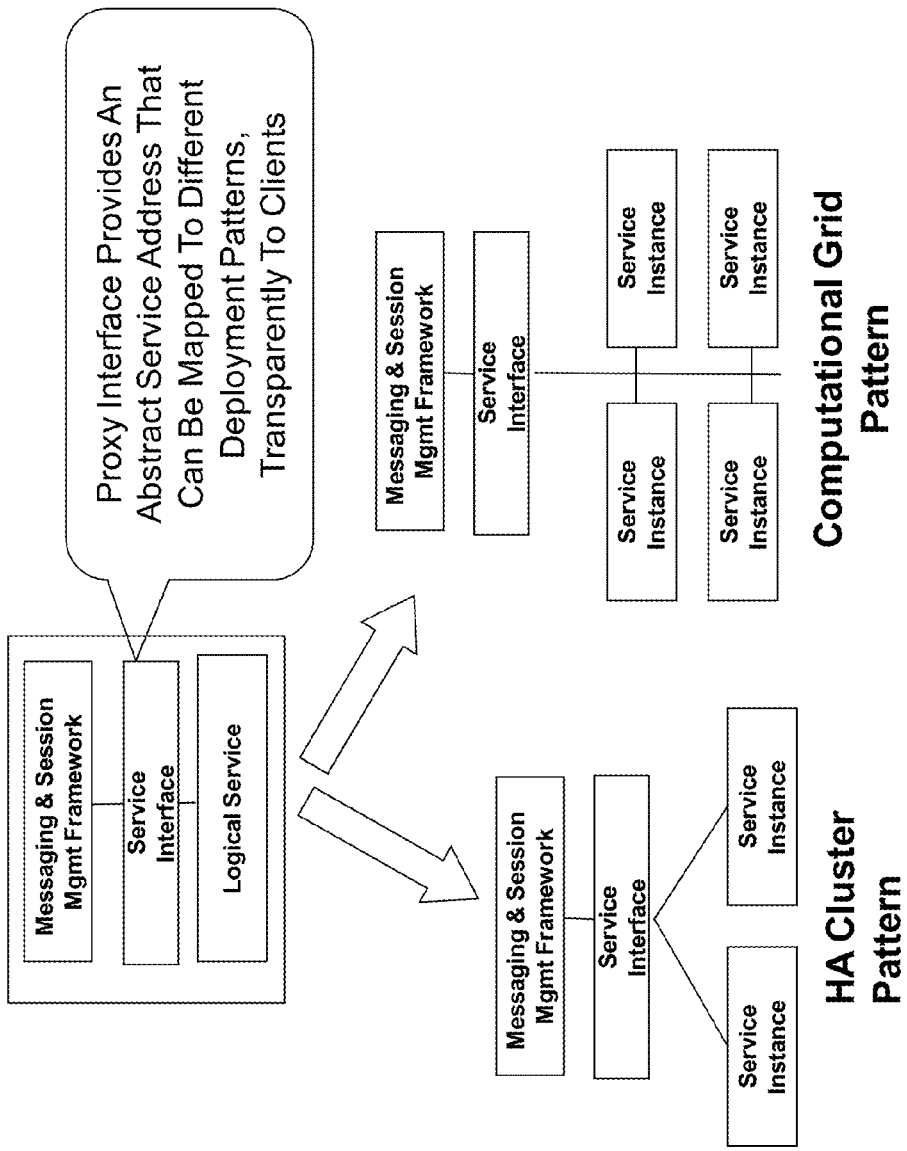
FIG. 19 illustrates an exemplary proxy server pattern.

FIG. 19 illustrates another exemplary pattern, a proxy server pattern. The proxy server pattern includes a proxy interface that provides an abstract service address that can be mapped to different deployment patterns transparently to clients. FIG. 19 illustrates how this service address could be mapped to utilize a high availability cluster pattern or a computational grid pattern.

Figure 20:
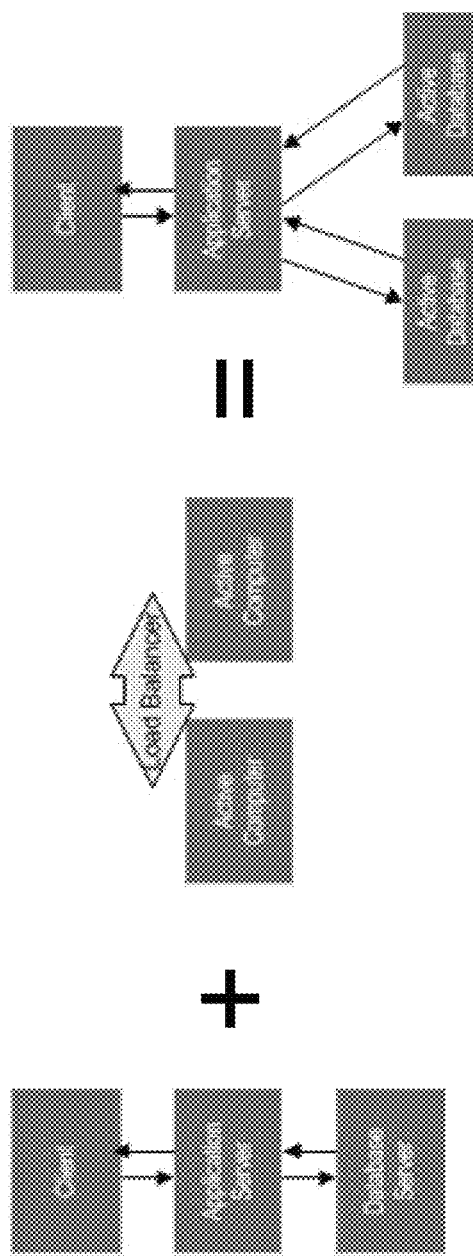
FIG. 20 illustrates how replacing a database server element in a three tier client/server pattern with a Hot high availability pattern results in a three tier client/server pattern that includes a Hot high availability database server.

The proceeding deployment patterns are atomic but do not have to be utilized in isolation, instead they can be combined together to compose new and more complex deployment patterns in a manner similar to atoms being combined to form complex molecules in chemistry. Notably, a new deployment pattern composed of two constituent patterns would inherit the characteristics of the constituent patterns. A new pattern can be composed by replacing an element in a first pattern with a second pattern. For example, with reference to FIG. 20, replacing the database server element in the illustrated three tier client/server pattern with the illustrated Hot high availability pattern results in a three tier client/server pattern that includes a Hot high availability database server, as illustrated. Notably, where deployment patterns are aggregated, the potential known problems associated with the constituent patterns are aggregated as well, i.e. the known problems for the newly formed deployment pattern represents a union of known problems for the constituent patterns.

Deployment patterns can be used to support the deployment of one or more functional patterns. Sometimes, one or more functional patterns will be deployed onto one or more deployment patterns. For example, elements of a rich internet application functional pattern (which may include, for example, ten elements) can be deployed onto the three elements of a three tier client/server deployment pattern. This is the basis for an application manifest that will determine how functionality is to be deployed when systematically configuring one or more ensembles to ultimately execute the deployment.

Elements in a deployment can be replicated in order to accommodate a greater workload volume. For example, a three tier client/server pattern might require several application server instances in order to accommodate greater workload volume. Notably, larger functional patterns might require multiple instances of a single deployment pattern, and/or a combination of different deployment patterns.

The functional pattern that is to be executed on a deployment pattern determines a "shape" of a service profile and is closely related to a corresponding workload profile because it characterizes how resources will be consumed by the elements in the deployment pattern. For example, a numerical processor pattern is compute intensive, and if this were deployed onto a computational grid deployment pattern would be reflected in the service profile of the servers in that pattern as being compute resource intensive.

Turning to description of deployment patterns via qualities, a service profile for a deployment pattern expresses key requirements for a deployment pattern to work optimally and for how the pattern should degrade in the presence of overload or failure. Preferably, each element is characterized in a similar way as with functional patterns described hereinabove. The service profile of a deployment pattern captures these service qualities, and combined with the volume of workload from a workload pattern (described in more detail hereinbelow) enables the appropriate systematic sizing of configured ensembles.

Service profile qualities for a deployment pattern might be workload operating related (e.g. interrupt tolerance, low latency, and unit of work size), element interrelationship related (e.g. concurrency, collaboration, and proximity), or tradeoff related (e.g. quality priority, stringency, conflict resolution). Preferably, full characterization of the service profile for a deployment pattern is performed after associating elements of a functional pattern to elements of a deployment pattern.

Architecture Patterns—Technology Patterns

Another point of view to utilize to analyze enterprise architecture is a technology viewpoint. As with other viewpoints, analyzing enterprise architecture from a technology viewpoint allows for the use of several organizing principles.

First, it is preferable to define standardized technology usage, as this reduces the cost of support and operation. Further, open standards are preferable as compared to proprietary technologies, as this reduces the risk of being locked into a single vendor. Similarly, it is preferable to dual-source technology vendors, so as to reduce the risk of vendor failure or lock-in.

As with the other viewpoints, analyzing enterprise architecture from a technology viewpoint allows for the use of re-usable patterns, which, in this case, are technology patterns. Technology patterns can be used to define standard technology stacks that can be deployed within the design of an ensemble (described in more detail hereinbelow) for service deployment, or to define the infrastructure components of an ensemble. Technology patterns can also be used to define management elements of a processing execution destination (PED; described in more detail hereinbelow). Technology patterns can be further used to define technology employed within a deployment pattern. Additionally, technology patterns can be used to define virtualization and provisioning strategies.

Still further, technology patterns can be utilized for policy management in various contexts. For example, technology patterns could be utilized for security policy management (e.g. Policy Execution Point, Policy Decision Point, Policy Administration Point), or network policy management (e.g. manager/agent management or agentless management).

As noted above, a technology pattern can be used to define technology used within a deployment pattern. Notably, technology patterns are not deployment patterns as they do not govern how services are deployed or distributed. Instead, they simply define technology for managing and supporting deployed services. These definitions of technology are preferably expressed as generic technical capabilities which are independent of the actual products that realize the capability (for example, a technology pattern might require the generic capability of a web server, which in a preferred embodiment, could later be associated to a specific product such as Apache or Microsoft IIS only at the time that it becomes necessary to configure the ensemble).

For example, an integrated monitoring pattern can be used to define technology used within a common monitoring deployment pattern, in accordance with FIG. 22. Note that the common monitoring pattern is a deployment pattern because it defines how monitoring is distributed independently of the monitoring depth defined by the integrated monitoring technology pattern.

Figure 23:
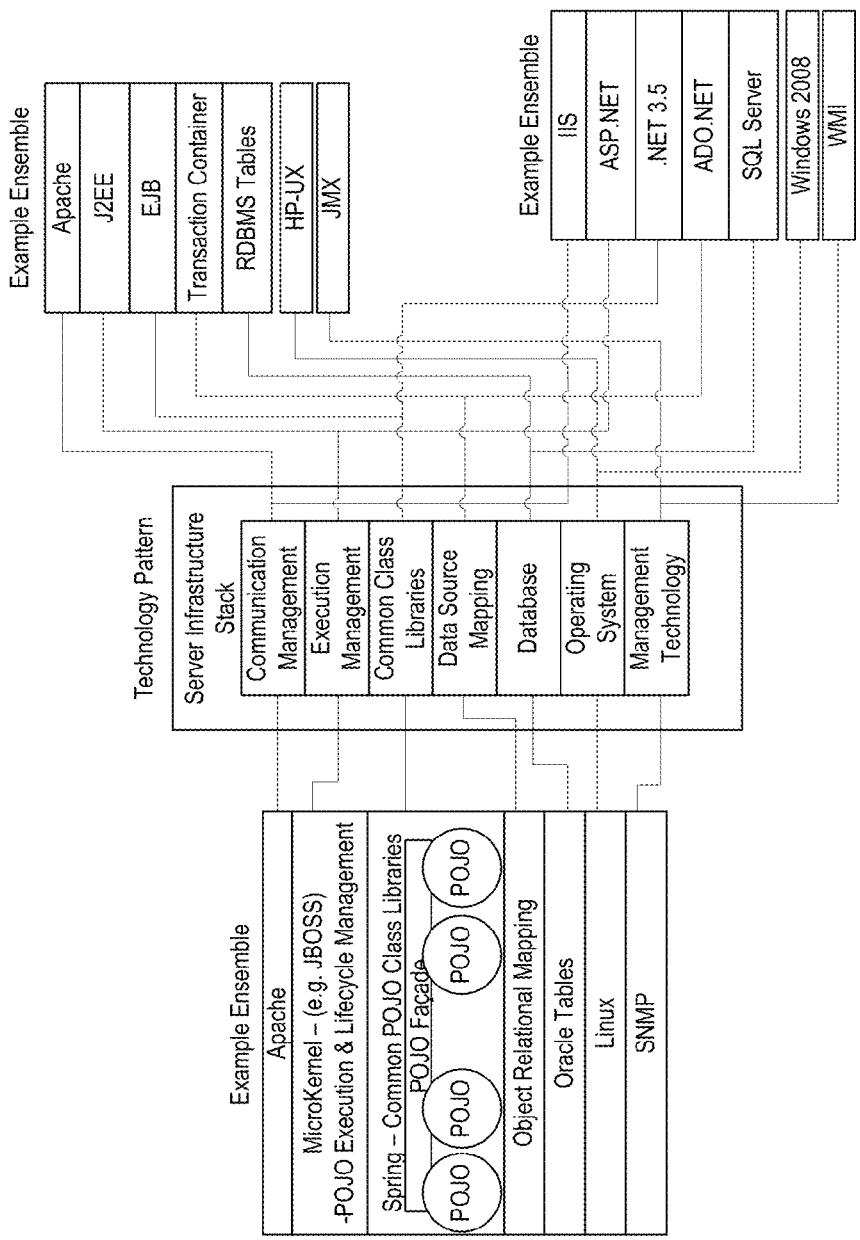
FIG. 23 illustrates an exemplary server infrastructure stack technology pattern and exemplary ensembles that can be realized therefrom by assignment of specific technologies.

A generic, or abstract, manifest for an ensemble (described in more detail hereinbelow) is a type of technology pattern, because only when specific technologies are assigned is the ensemble fully realized. Prior to that, the abstract manifest is a technology pattern. FIG. 23 illustrates an exemplary server infrastructure stack technology pattern and exemplary ensembles that can be realized therefrom by assignment of specific technologies.

Figure 24:
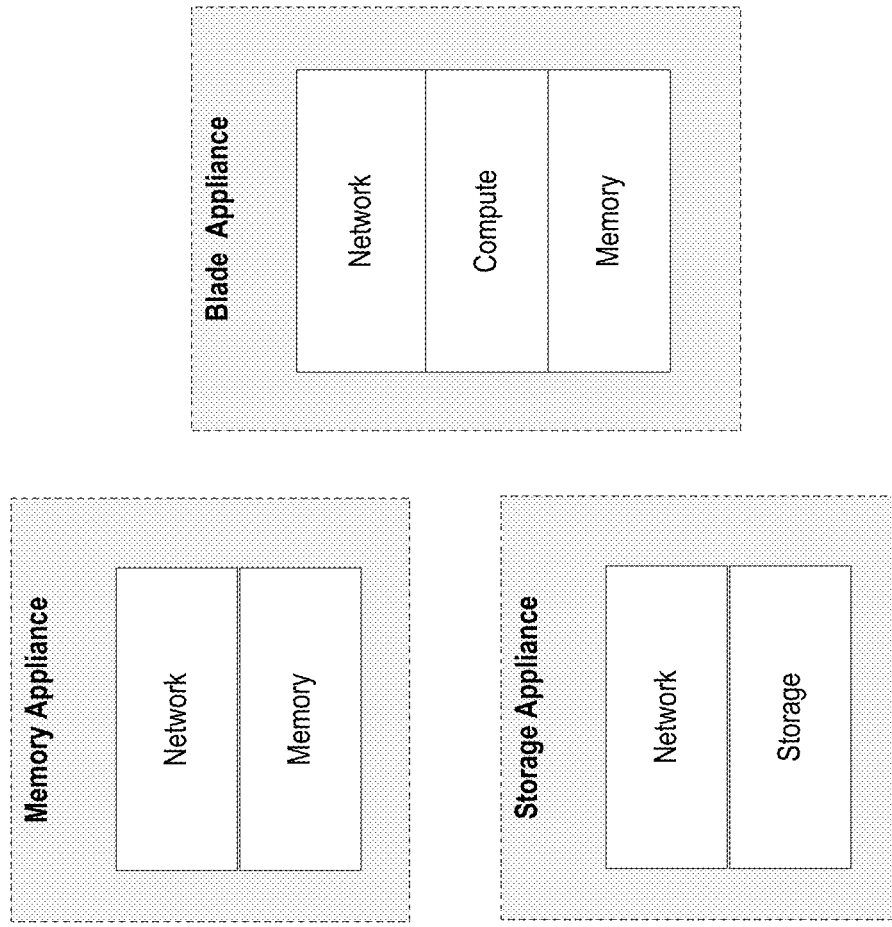
FIG. 24 illustrates an exemplary technology pattern for describing a generic manifest for a processing execution destination.

Similarly, a generic manifest for a processing execution destination (PED) can be described by a technology pattern. FIG. 24 illustrates such an exemplary technology pattern showing types of appliances to be utilized.

Figure 25:
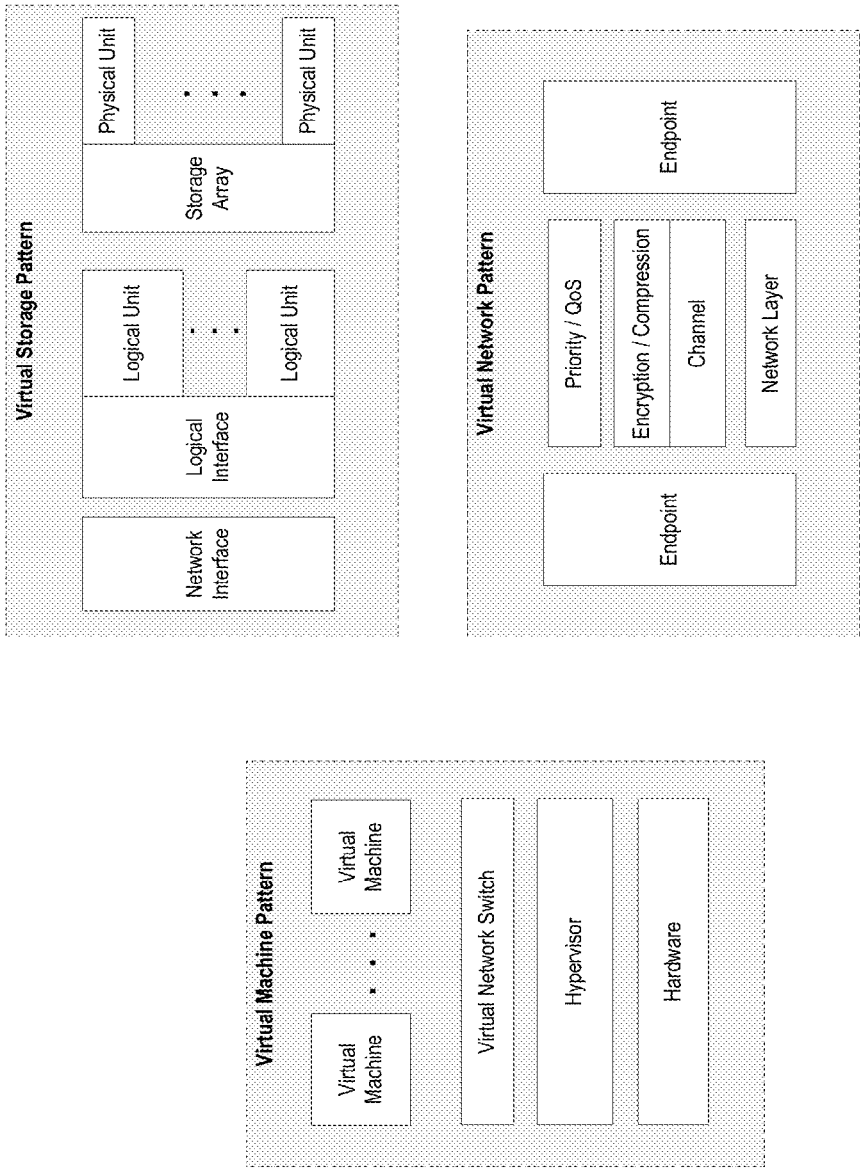
FIG. 25 illustrates exemplary virtualization technology patterns.

As noted above, technology patterns can also be utilized for virtualization. Specifically, although service virtualization is preferably addressed by deployment patterns, technology patterns can be utilized for resource virtualization. A virtualization family of technology patterns can be utilized to define elements of a processing execution destination. FIG. 25 illustrates exemplary virtualization technology patterns.

Figure 26:
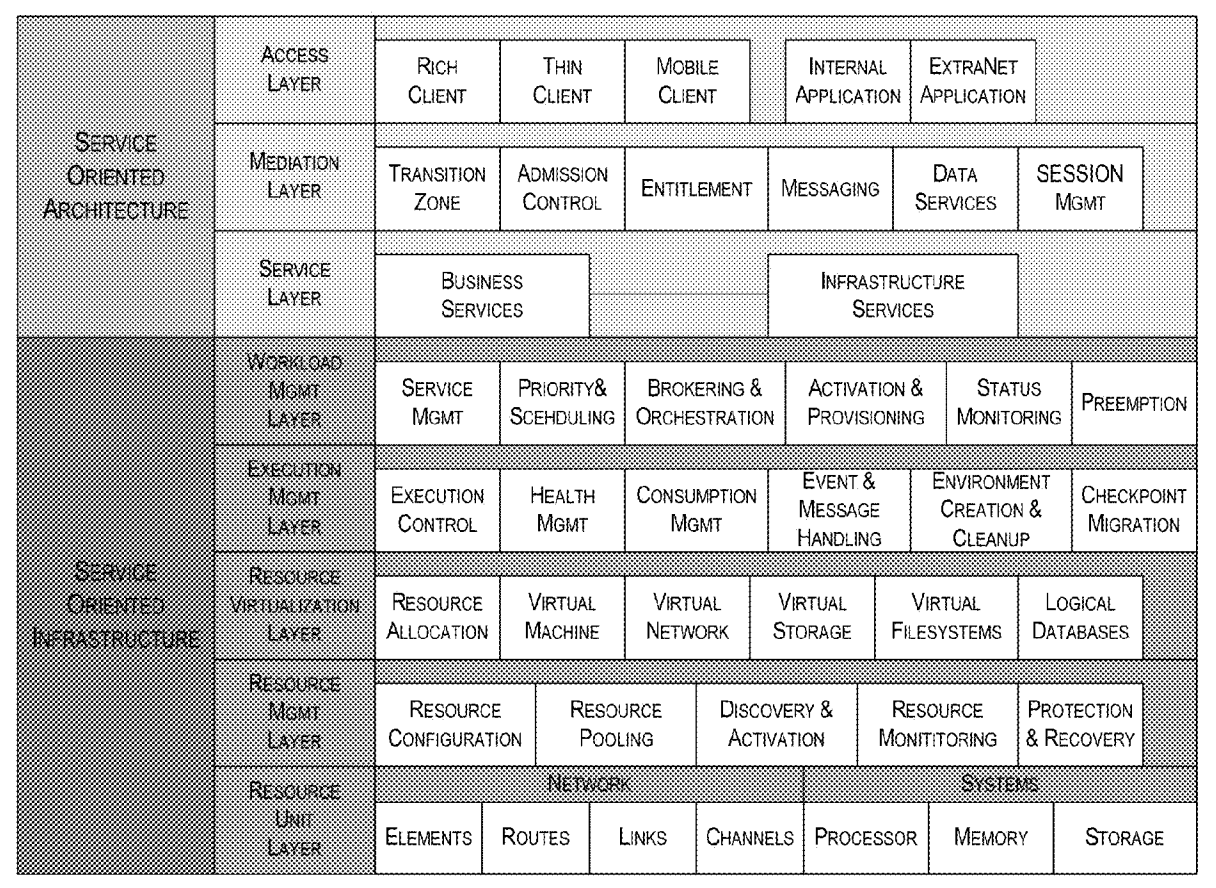
Figure 27:
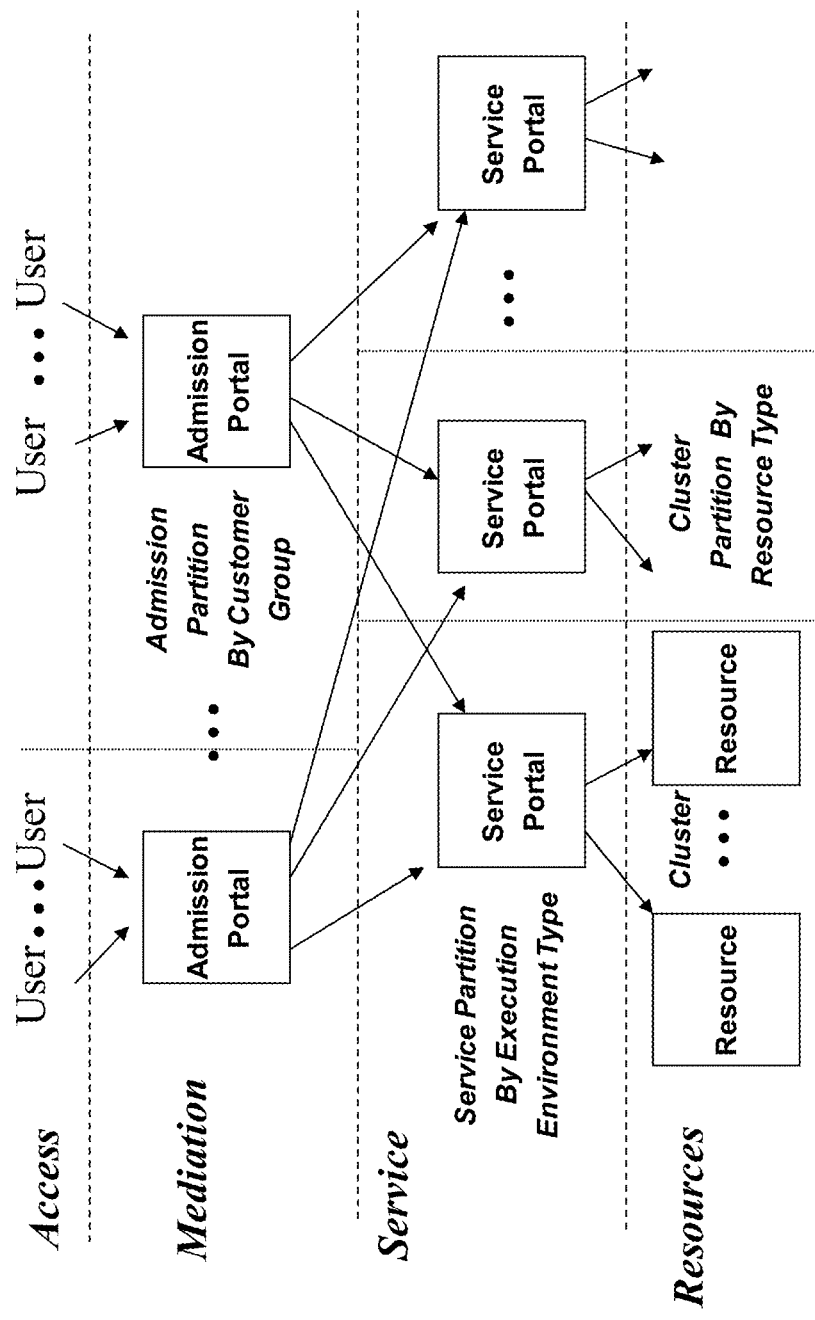
FIG. 27 illustrates the use of an enterprise stack to guide service oriented infrastructure architecture.

A technology pattern can even be used to describe the end to end characteristics of an entire enterprise architecture, as illustrated in FIG. 26. FIG. 27 illustrates the use of an enterprise stack to guide service oriented infrastructure architecture.

Turning to description of technology patterns via qualities, a service profile for a technology pattern for processing execution management, i.e. a technology pattern that describes a generic manifest for a processing execution destination, might define security policies used to control policy decision points, monitoring policies used to control network and system monitoring, and provisioning policies used to control thin provisioning and bare metal provisioning. On the other hand, a service profile for a technology pattern that defines a generic manifest for an ensemble might define generic technical capabilities for that generic ensemble.

Ensembles

Various architectural patterns have been described hereinabove. These architectural patterns can be characterized as being idealized, e.g. they have not been implemented and do not include any specific technology. Indeed, it is because these architectural patterns are idealized, and thus technology independent, that they have enduring value in the face of rapidly changing technology.

A realized implementation of an architectural pattern is an ensemble. In use, an ensemble is part of an application subsystem that, either alone or in combination, executes a business application.

Ensembles can be characterized as realized because, in contrast to architecture patterns, ensembles utilize real products and technologies to implement patterns. In other words, if a "pattern" is described utilizing one or more specific product names, then it is not a pattern that is being described, but rather an ensemble.

Because architectural patterns are technology independent, the same architectural pattern can be realized via different ensembles depending on constraints to be met. The qualities of the pattern and specifically the set of qualities that comprise the service profile is used in a preferred embodiment to automatically guide the selection of technology and configuration of the ensemble. Unlike architectural patterns, which have enduring value, ensembles depreciate in value over time, if not maintained, as technology improves. New ensembles can be created to remediate problems not solved by older ensembles.

Ensembles provide a way to efficiently package standard "line-ups" to provide known capabilities in a re-usable package, thereby promoting re-use and minimizing sprawl caused by many unnecessary variations serving the same pattern. Different types of ensembles can be utilized for this purpose, such as, for example, server ensembles, storage ensembles, and network ensembles.

Ensembles are comprised of components, such as, for example, management components, technology stacks, and software frameworks. Any re-usable component that provides a distinct technical capability can be employed by an ensemble. Ensembles can contain any combination of reusable components, and may contain a single component or multiple components. Ensembles can be realized utilizing third party software products or internal IT software products.

Some components are inline with workload processing, while others are infrastructure-based and do not directly participate inline with the workload. For example, a distributed cache framework is a re-usable component that is inline, while a policy decision point is a re-usable component that does not directly participate inline but is engaged by a security framework to support a workload.

Examples of types of re-usable components include a service oriented architecture service and a re-usable software framework. Exemplary components include a message processor (e.g. an enterprise service bus such as a Cisco Ace XML gateway), and an entitlement service.

Components can represent an implementation of an architecture pattern (or an element thereof), i.e. architectural patterns can be realized as components depending on the technology involved.

For example, a data model is a realized component that implements an information pattern. Data models are employed by application specific software that makes up part of an application subsystem that executes a business application (as described above, an ensemble is part of an application subsystem that, either alone or in combination, executes a business application). Specifically, data models define data and messages that are processed by application subsystems.

Information patterns for storage and access can be implemented in a storage ensemble. For example, the combination of a realized component for an information storage pattern and a policy set for that storage pattern creates a storage ensemble. FIG. 28 illustrates a document storage ensemble thusly formed.

Figure 29:
FIG. 29 illustrates an exemplary low latency server ensemble.

Similarly, functional patterns can be implemented in a server ensemble. Server ensembles provision the service layer in the enterprise stack. Each server ensemble assembles a set of technical capabilities that are fit for purpose. Exemplary service ensembles include, for example, a data processing server, a web application server, a report processing server, a numerical processing server, a low latency server, a complex transaction server, a workflow integration server, and a content collaboration server. FIG. 29 illustrates an exemplary low latency server ensemble.

Alternatively, an ensemble can employ one or more dynamic frameworks, which are realized components that implement a functional pattern. Dynamic frameworks are executable on one or more execution environments of a processing execution destination (described hereinbelow).

A dynamic framework can include one or more reusable components that represent an implementation of a design pattern. For example, a reusable service component might process data and messages as part of a dynamic framework that is employed by an ensemble that is part of an application subsystem executed by a business application.

Further, a dynamic framework can employ one or more infrastructure components. An infrastructure component represents an implementation of a deployment pattern. For example, a dynamic framework might employ a management infrastructure component which manages reusable components that are part of the dynamic framework.

Deployment patterns can be implemented in a network ensemble. The topology of a deployment pattern has a direct effect on the way in which the underlying network is to be configured. A network ensemble's configuration profile defines the packaging of a network configuration might specify, for example, IP address assignment (e.g. must be within a common subnet), VLAN usage (e.g. must be within the same VLAN), quality of service characteristics (e.g. low latency tag), and gateway requirement/treatment (e.g. multiprotocol label switching tagging).

Each dynamic framework is compatible with one or more technology stacks. A technology stack implements a type of technology pattern. Specifically, selecting management technologies for a technology pattern results in a technology stack. This provides for considerable flexibility in configuring products to implement the technology stack. For example, an authentication technology pattern comprising "directory service+directory access+identification" could be realized using Microsoft products as "AD+LDAP+Windows ID". Similarly, a platform technology pattern comprising "hardware+operating system+virtualization layer" could be realized in one ensemble as "Intel+Linux+VM Ware" and in another ensemble as "AMD+Windows+XEND", and a communications technology pattern comprising "session+presentation+RPC" could be realized in one ensemble as "HTTP+XML+SOAP", and in another ensemble as "IIOP+Java Object Serialization+RMI". FIG. 30 illustrates an exemplary technology stack. Specifically, FIG. 30 illustrates an integrated monitoring technology pattern realized as a technology stack via real products.

Just as qualities of an architecture pattern can be described by a service profile, attributes of an ensemble can be described by a configuration profile. A configuration profile for an ensemble defines the product realization for each generic capability in an ensemble, as well as the product configuration for each product used. A configuration profile for an ensemble further identifies any constraints on the configuration. For example, these constraints might be compatibility related. Additionally, a configuration profile for an ensemble identifies minimum resource requirements for that ensemble absent considerations of workload volume.

The configuration profile for an ensemble effectively defines the manifest for configuring that realized ensemble. Different types of ensembles give rise to different types of configuration profiles, i.e. the configuration profile for a storage ensemble is different from the configuration profile for a server ensemble. There also may be differences in the configuration profiles for different ensembles of the same type, e.g. there may be configuration profile differences between different server ensembles.

As an example of configuration profile establishment, it is helpful to revisit FIG. 28, which illustrates a storage ensemble comprising a realized component for an informational storage pattern and a policy set for that storage pattern. These policy set attributes and storage pattern qualities can be utilized to establish a configuration profile for the ensemble.

Figure 31:
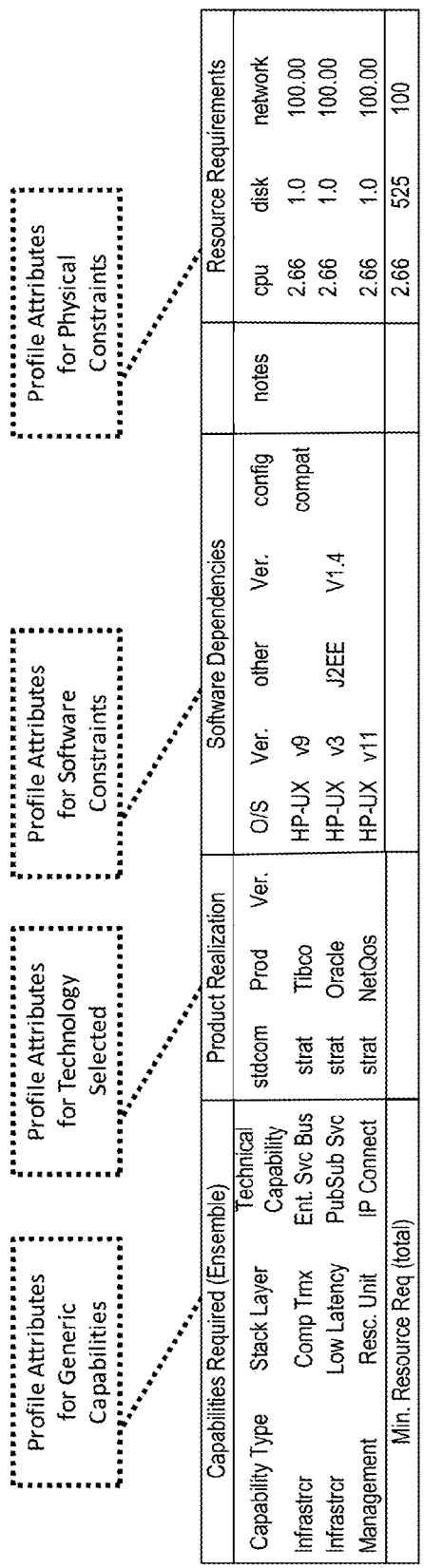
FIG. 31 illustrates an exemplary configuration profile for a server ensemble.

FIG. 31 illustrates an exemplary configuration profile for a server ensemble. The configuration profile details profile attributes for generic capabilities, profile attributes for selected technology, profile attributes for software constraints, and profile attributes for physical constraints.

Figure 32:
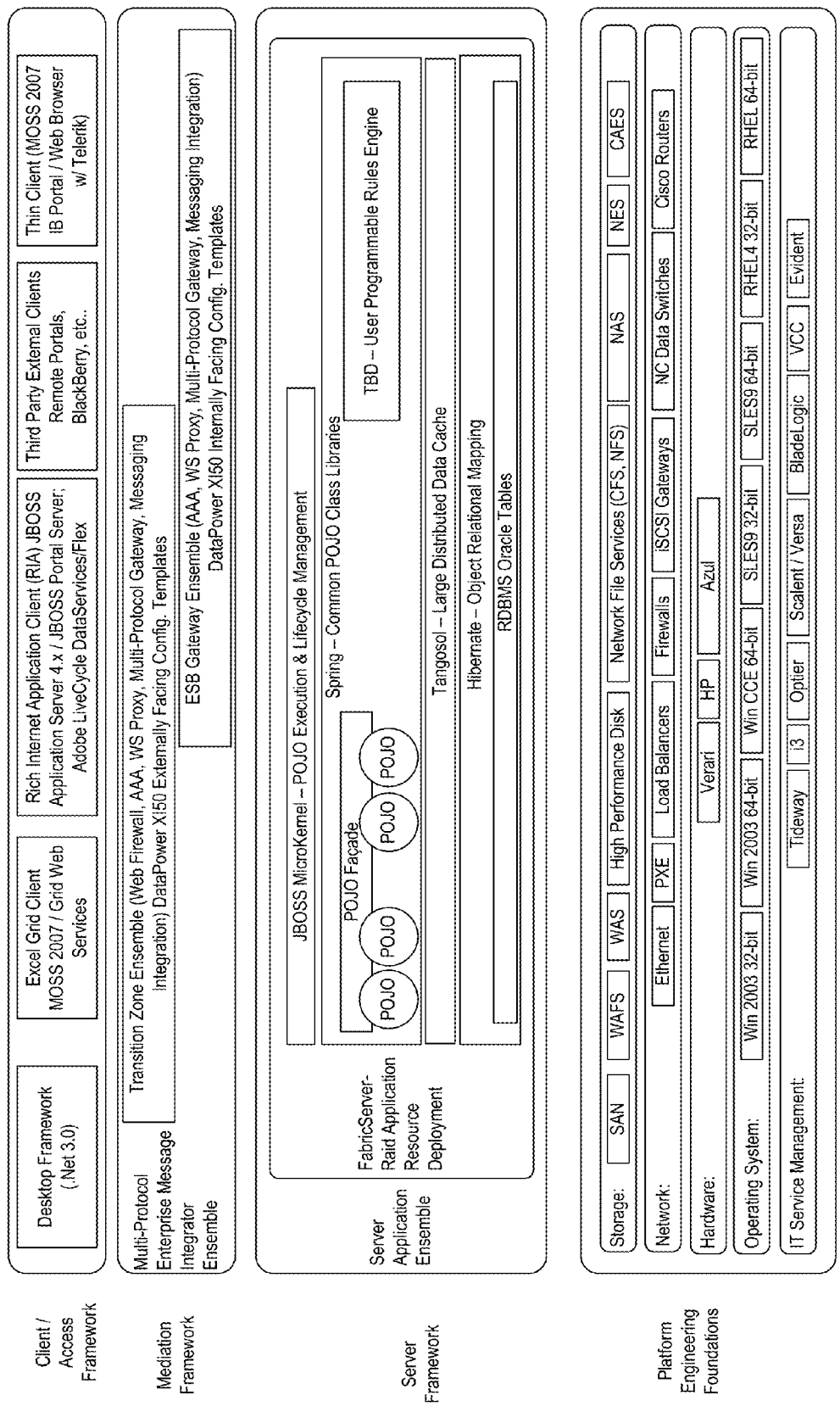
FIG. 32 illustrates a latency sensitive transaction stack that has been realized with real products as an implementation solution for deployment onto a processing execution destination.

Multiple ensembles can be combined together to form an implementation solution. Specifically, an implementation solution is a fit for purpose lineup of multiple ensembles that crosses multiple parts of an Enterprise Stack Pattern but that has not yet been dimensioned for deployment onto a processing execution destination (described hereinbelow). FIG. 32 illustrates a latency sensitive transaction stack that has been realized with real products as an implementation solution for deployment onto a processing execution destination. In a preferred embodiment, the actual deployment into the processing execution destination will further require sizing information to determine the actual quantities of each ensemble required to meet the workload volume. However, the contents of the implementation solution contains all the bill of material line items necessary to configure the processing execution destination and only the quantity of these items remains to be specified to complete the dimensioning.

Processing Execution Destinations

Ensembles are deployed on processing execution destinations (PEDs). In other words, a PED can be characterized as an instance of one or more deployed ensembles, (in a preferred embodiment, multiple ensembles are frequently deployed onto a single PED). While an ensemble is ready to be deployed but has not actually been deployed, and has been configured but has not yet been fully parameterized and dimensioned, a PED is fully parameterized and dimensioned with real processing and networking elements ready to execute workloads.

Specifically, a PED includes processing, memory, storage, networking, and management elements, as well as a platform profile that describes the configuration of all elements. Notably, some of these elements may be integrated. For example, a compute blade integrates memory elements and processing elements, and a solid state disk integrates storage and memory elements. Thus, PEDs comprise deployed computing, networking, and storage resources in a data center (or other place of processing execution). Viewed from a different perspective, a PED can be understood as a physical partitioning of a data center provided that it is understood that certain physical resources may be pivoted physically or temporally among PEDs in response to changing workload volumes in each PED.

A PED is responsible for management of the execution environment. Specifically, a PED is responsible for secure allocation of resources, instrumentation of resource consumption, and detection of, and recovery from, execution errors. Thus a PED contains all the different technical capabilities needed to execute workloads. Accordingly, the use of PEDs facilitate the colocation of processing to improve performance.

Figure 33:
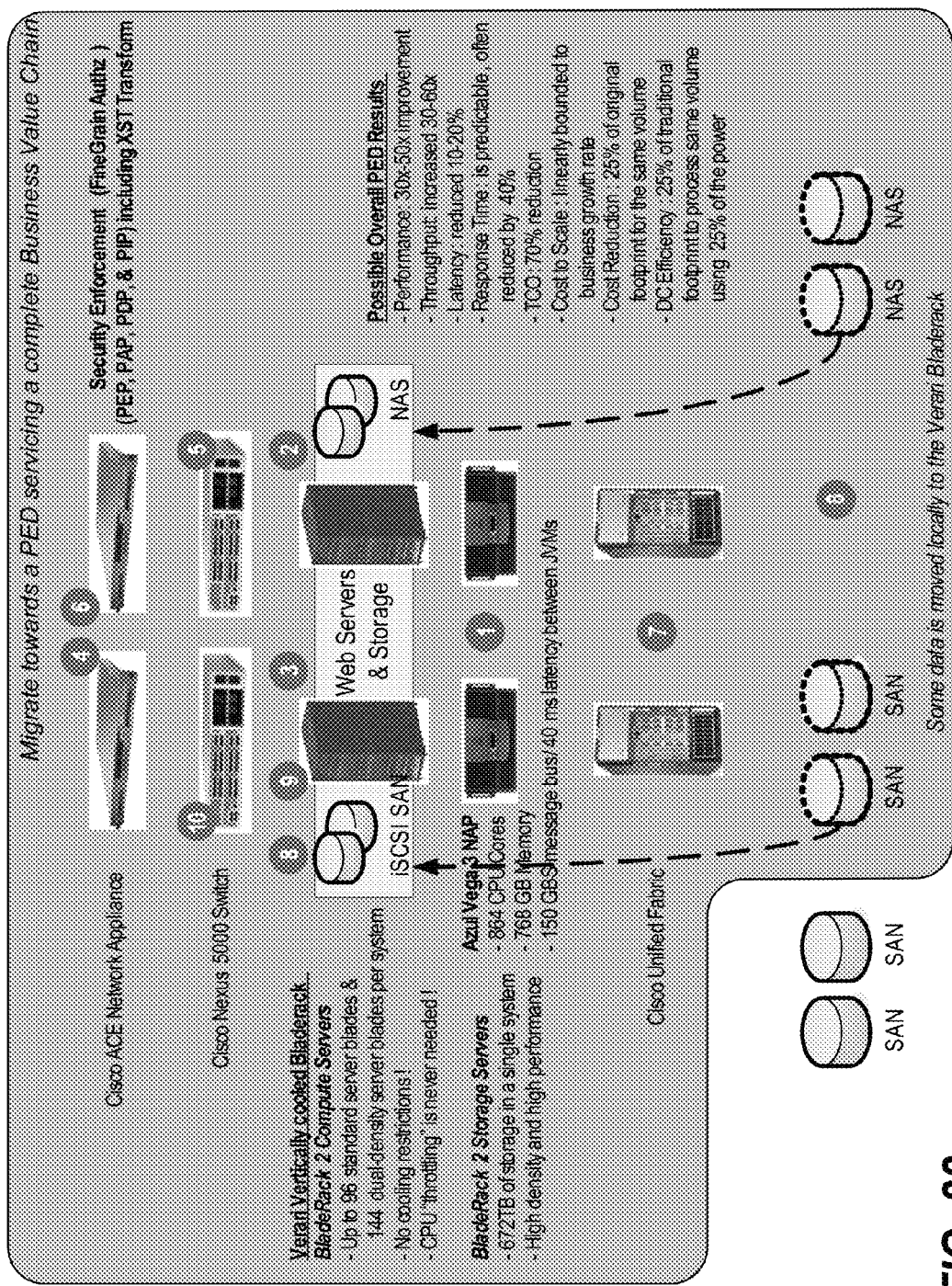
FIG. 33 illustrates an exemplary processing execution destination configured to service an entire business value chain.

In at least some preferred implementations, it is desirable to configure a PED to allow it to service an entire business value chain. FIG. 33 illustrates an exemplary PED configured to service an entire business value chain.

Figure 34:
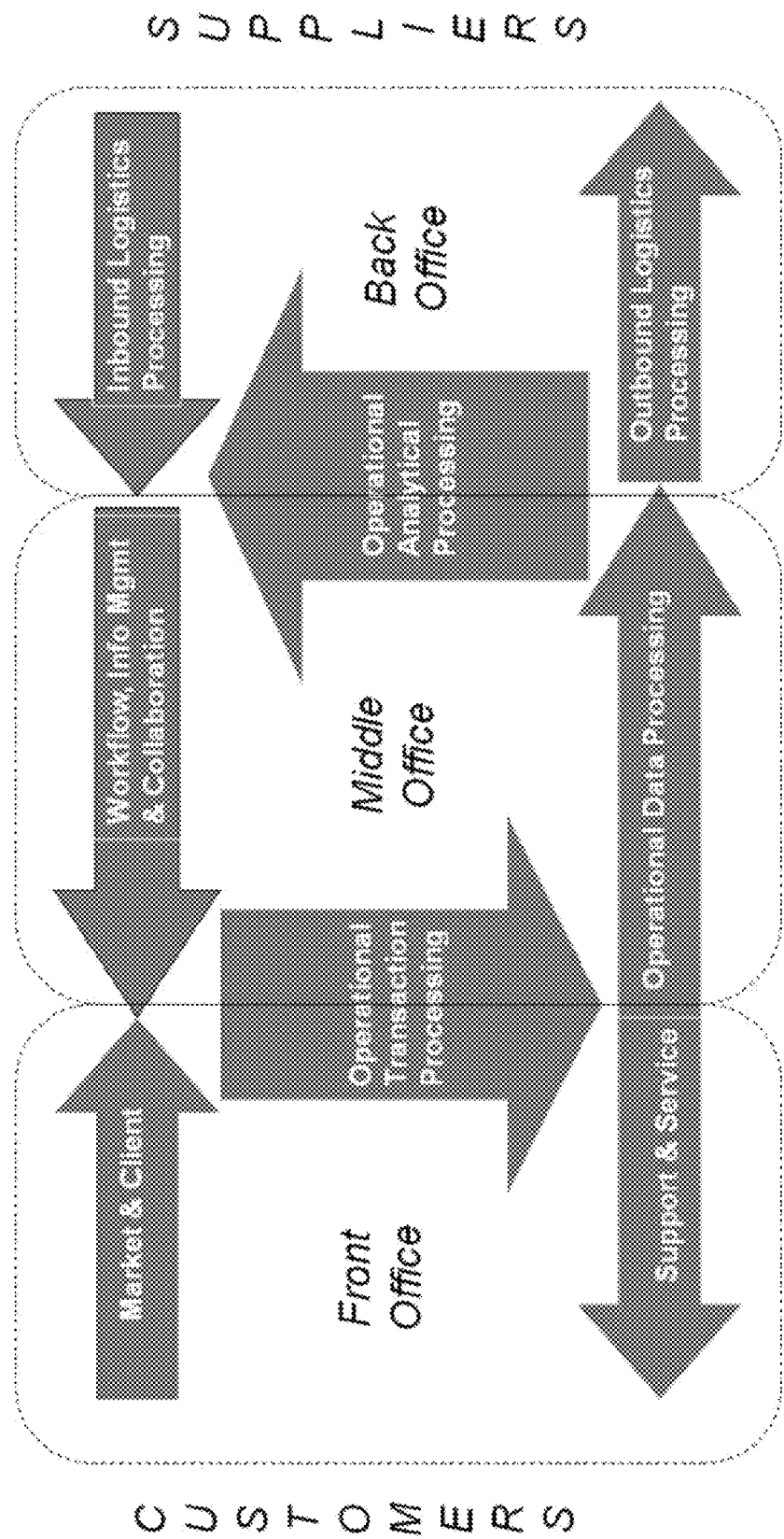
FIG. 34 illustrates an exemplary IT supply chain that maps to a business value chain.

Thus, ensembles running on PEDs can provide IT architecture to support a business value chain. This IT architecture can be characterized as forming all or part of an IT supply chain (ITSC) that supports a business value chain. FIG. 34 illustrates an exemplary IT supply chain that maps to a business value chain.

An IT supply chain is preferably configured to satisfy business demand of an organization. In order to determine whether this is the case, however, business demand must first be determined.

Fortunately, business scenarios and use cases, as described hereinabove, capture a frequency of performance as well as any constraints on performance. Further, business functions can be characterized as responding to various business drivers. Exemplary such business drivers include market advantage business drivers (e.g. time to market and competitive response), customer satisfaction business drivers (e.g. response times such as service time or delivery time, and quality factor), organizational effectiveness business drivers (e.g. continuous improvement, improved business scope/integration, improved business capacity, improved predictability, and improved agility), and vertical reality business drivers (e.g. regulatory response, industry initiates, standardization, and interoperability of products or services). These business drivers, frequencies, and constraints shape workload demand experienced by an organization.

The attributes of business demand can be characterized as business demand characteristics. Business demand characteristics can be organized via use of a workload demand profile (also referred to herein as a workload profile). FIG. 35A illustrates generic business demand characteristics that can be utilized in a workload profile. FIG. 35B illustrates an exemplary workload profile utilizing these generic business demand characteristics.

Workload profiles preferably describe a workload in the business value chain at the most appropriate level of detail. Some business value chains can be described at the business function level if all workloads in that business value chain have the same workload profile. Other business value chains, however, must be described at a business activity level because workloads in that business value chain differ between business activities. Sometimes, workloads must be described at an application level because an application crosses multiple business activities. This case is illustrated in FIG. 35B.

Each link in the IT supply chain, which maps to the business value chain, can include different applications with different processing characteristics. Workload tends to be similar within a link and different between links, i.e. workload demand can be characterized as being patterned because frequency is often the same at the workflow level of the business value chain. In other words, commonly occurring workflows are naturally expressed using workload patterns.

Figure 36:
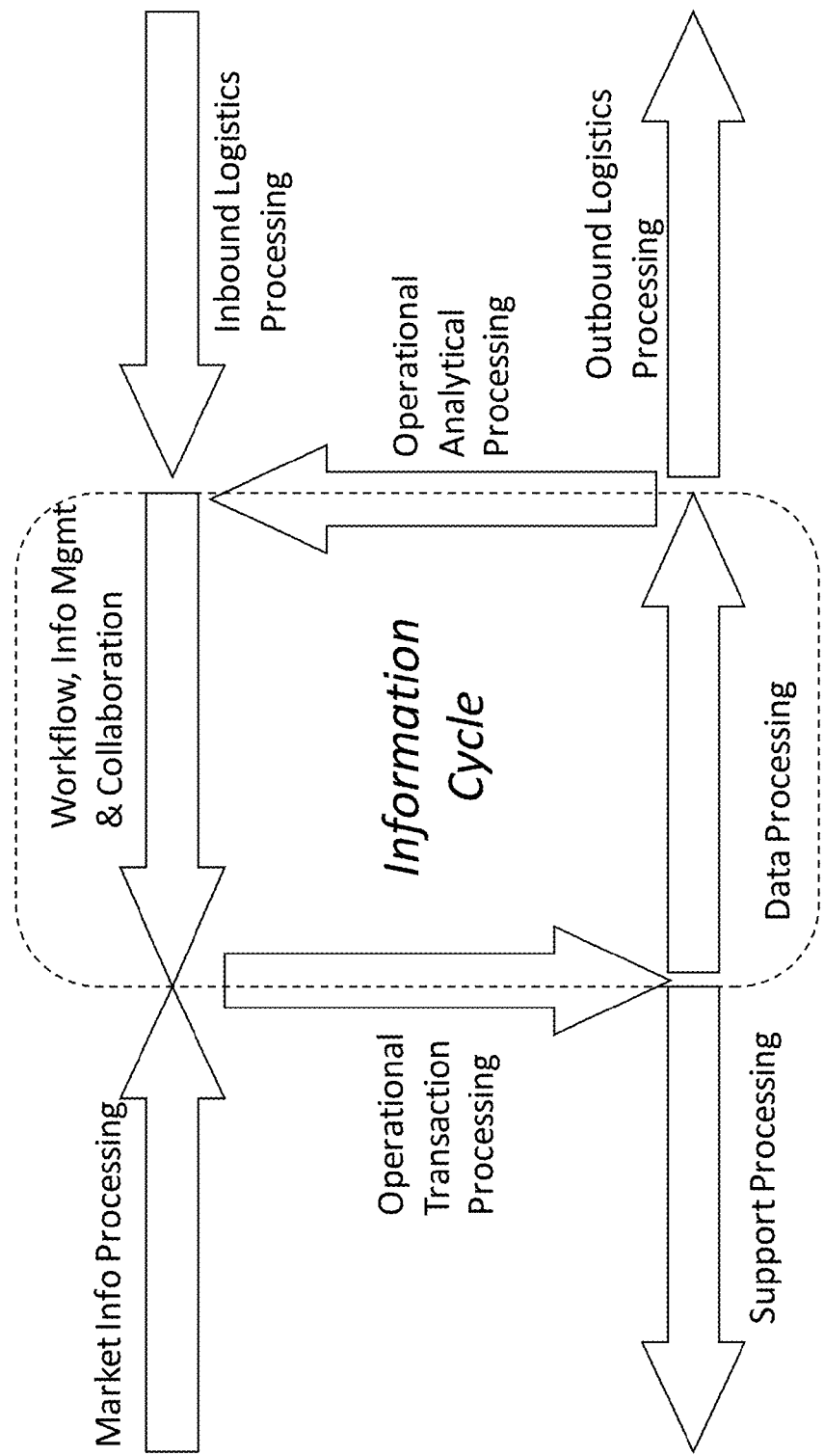
FIG. 36 illustrates an exemplary IT supply chain that includes a plurality of links.

Since recurring workflows typically occur within the same link of an IT supply chain, workload patterns can be utilized, and, for example, mapped onto links in an IT supply chain. FIG. 36 illustrates an exemplary IT supply chain that includes a plurality of links. These links include Market Information Processing (e.g. market data, marketing leads, call centers), Operational Transactional Processing (e.g. order entry, trading), Support Processing (e.g. dispatch, maintenance), Data Processing (e.g. settlement, payroll, extract-transform-load), Operational Analytical Processing (e.g. business intelligence, risk), Collaboration, Communication, and Workflow (e.g. email, SharePoint®, customer relationship management). Each of these links in the IT supply chain can be characterized as often having various commonly recurring workload pattern characteristics. Importantly, these characteristics preferably include recurring qualities as well as recurring known problems that can be remediated (as described in more detail hereinbelow) by the appropriate use of patterns.

For example, processing in the market context of an IT supply chain can frequently be characterized as including, utilizing, or supporting, on a recurring basis, a data flow model, layered peer to peer structures, a cascading flow of input and state, a publication subscription model, many to one relationships, and filtering and routing.

Similarly, transaction processing of an IT supply chain can frequently be characterized as including, utilizing or supporting, on a recurring basis, an n-tier structure with short-lived financial transactions, order entry, point of sale systems and processes, non-repudiation and customer service requests.

Further, support & service processing of an IT supply chain can be characterized as including, utilizing, or supporting a client-server structure that is n-tier with long lived transactions that are rarely financial, dispatching systems, delivery systems, and maintenance systems.

Further still, data processing and integration processing of an IT supply chain can be characterized as including, utilizing, or supporting enterprise application integration (EAI) structures, data aggregation/rationalization/integration, batch processing, clustered models, many to many relationships, large shared databases, extract transform and load operations, and a message bus.

Outbound logistics processing of an IT supply chain can be characterized as including, utilizing, or supporting processes that involve going outside of a company, extranets, protocol gateways, data conversions, store and forward processes, a reconciliation process, complex transactions, security and confidentiality, non-repudiation, and a multi-phase commit process.

Inbound logistics processing of an IT supply chain can be characterized as including, utilizing, or supporting: processes that involve coming inside to a company, security, validation, protocol and data conversions, non-repudiation and logging.

Still yet further, analysis and reporting processing of an IT supply chain can be characterized as including, utilizing, or supporting aggregation and large fan out, normalization and analysis, renders, distribution, data marts, satellite repositories, business intelligence, and operations research. Analysis and reporting can be characterized as tying into workflow and collaboration.

Finally, workflow and collaboration processing of an IT supply chain can be characterized as including, utilizing, or supporting distributed workflow management, data and media distribution, a controller, repositories, and caches.

Just as attributes of demand can be characterized as business demand characteristics, attributes of workload patterns can be also be characterized as qualities. A workload pattern can be characterized by a quality of experience (QoE) profile using qualities. The qualities in a quality of experience profile are more detailed than those utilized in a workload profile. FIG. 37 illustrates an exemplary QoE profile.

Once demand is characterized in a workload pattern via a quality of experience profile, a finer grain service profile can be selected by considering more detailed qualities.

A service profile can be used to create a mapping between architecture patterns and a more detailed policy set that can be used to select an ensemble (as described in more detail hereinbelow). For example, FIG. 38 illustrates data usage patterns charted utilizing a detailed policy set of their service profiles. This mapping can be utilized to select the most appropriate storage ensemble.

While business patterns form a basis for reuse in view of common needs across various business activities, workload patterns form a basis for demand prediction. Specifically, the ability to readily map workload patterns onto IT supply chain models enables such demand prediction.

These business drivers, frequencies, and constraints which shape workload demand can also be used to shape service level agreements (SLAs) that must be met to meet user expectations for a business workflow or business scenario. A service level agreement (SLA) expresses a user's business value chain requirements for service from the IT supply chain (or digital supply chain). Such a service level agreement includes one or more service level outcomes that are required by one or more workload patterns.

Further, qualities of architectural patterns define constraints that are related to this service level agreement. Specifically, ensemble components which correspond to a pattern element of an architecture pattern (e.g. machine to machine dependencies) have one or more operational targets which form part of an operation level agreement (OLA) that expresses the resources and personnel required from an IT supply chain to meet a service level agreement. An execution level agreement (ELA) expresses the dynamic allocation policy of resources to be assigned by the IT supply chain, i.e. it expresses the allowed policy for increasing or decreasing resources required from an IT supply chain to meet a service level agreement.

For example, an SLA might specify that a user expects trade latency to be less than 100 ms with a trading frequency of 1000 trades executed per minute during the business day for peaks of up to 30 minutes. A corresponding sub-system responsible for realizing the SLA might require an OLA that provides for increased monitoring of transaction rates during the business day. A corresponding ELA might specify the ability to add up to three additional processing elements and one networking element (in the form of a VLAN), if monitoring reveals that the assigned resources are unable meet the quoting system's OLA, between 9 AM and 4 PM.

If the supply of resources is in balance with demand, then the IT supply chain will fulfill the SLA required by the business value chain. A PED, or a set of PEDs, is the realization of the IT supply chain. A PED's performance can be measured because it is physical manifestation of one or more ensembles. Ensembles are logically grouped sets of technical capabilities that are optimized to the processing of a specified workload demand. The choice of technology to implement the technical capabilities greatly affects the ultimate cost and success of the IT supply chain (i.e. its ability to meet demand, without over allocation of resources). These measurements can be compared against service level agreements.

PED performance can vary greatly based on configuration and optimization parameters. Each ensemble deployed on a PED can define recommended configuration parameters. These parameters can be adjusted based on operational considerations and workload characteristics as defined by the QoE profile.

Often, a PED will be required to run several types of workloads over a period of time (e.g. a day, a week, a month, etc.). This may require dynamic pivoting of resources and re-provisioning of processing and network elements in order to meet execution level agreements. The policy that governs this dynamic provisioning is the ELA.

Notably, such pivoting does not change a PED, instead, it changes the ensembles that are being executed on the PED and/or the configuration and/or the dimensioning of those ensembles. For example, during the day, an entire PED might be allocated to an ensemble used for dynamic numerical processing, but in the evening the number of processing elements for dynamic numerical processing is scaled back to allow some systems to be re-pivoted to run dynamic business intelligence on that same PED.

Figure 39A:
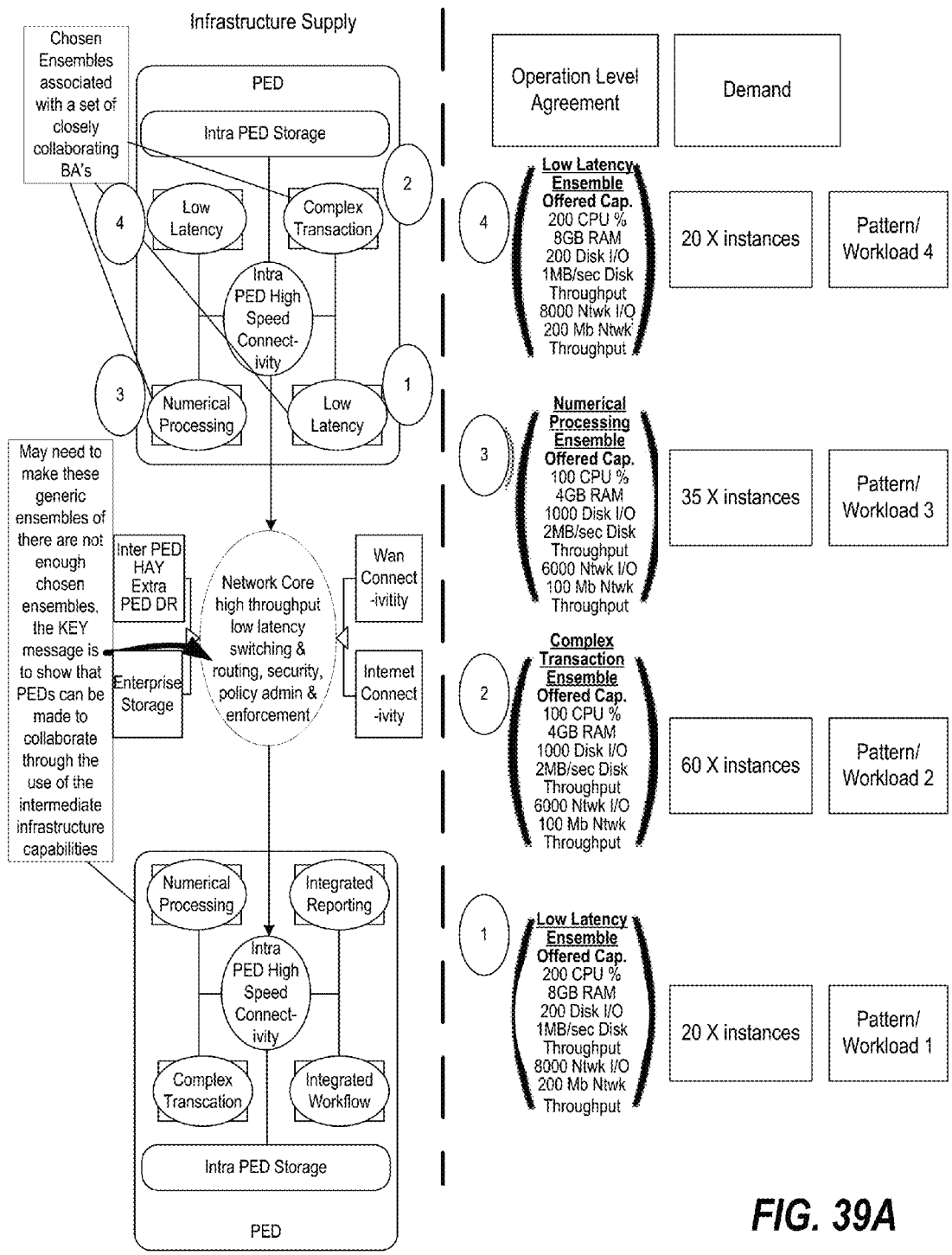
FIGS. 39A-B collectively illustrate an example of dimensioning a processing execution destination to utilize four ensembles at varying times of the day.
Figure 39B:
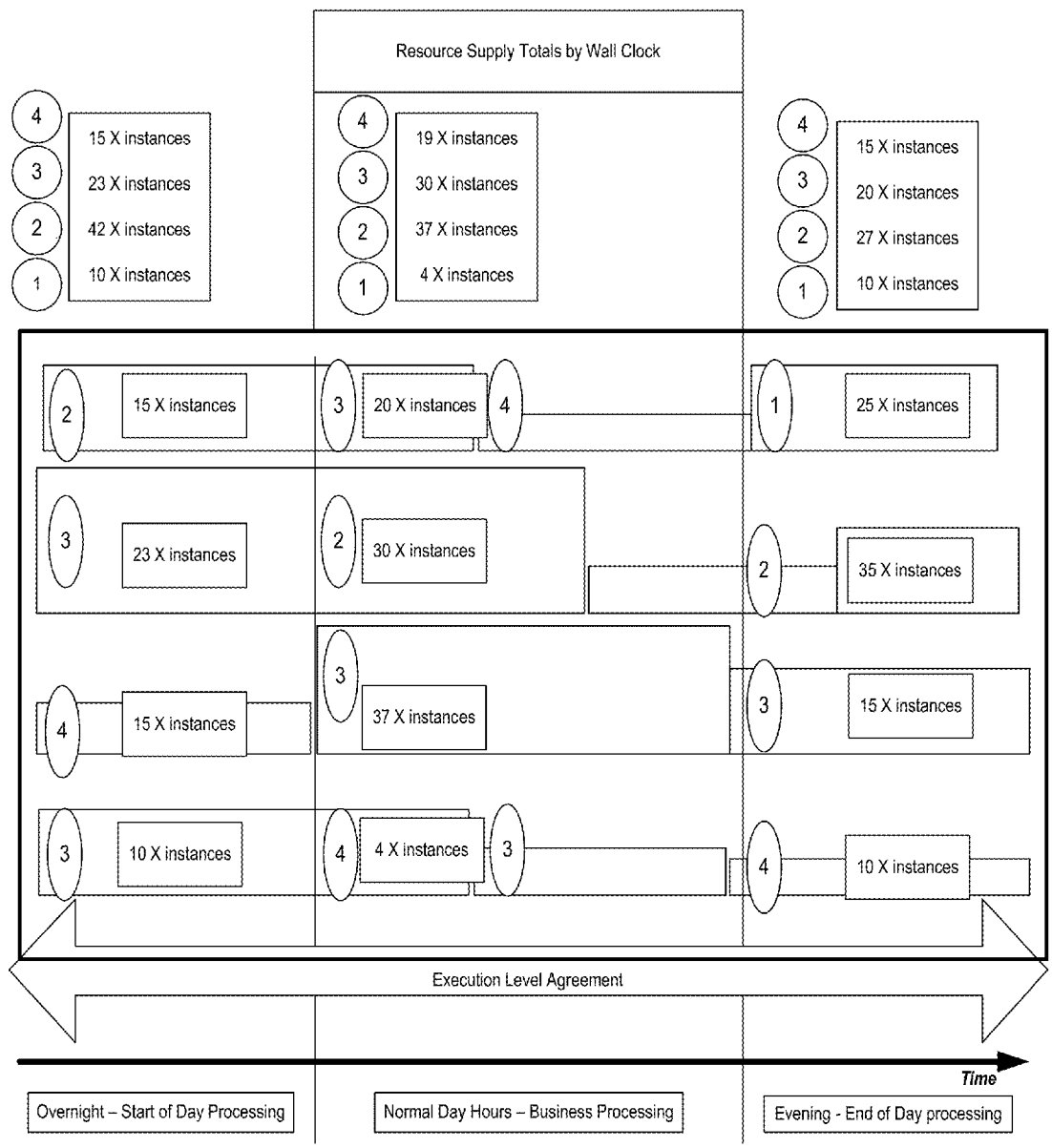

FIGS. 39A-B collectively illustrate an example of dimensioning a PED to utilize four ensembles at varying times of the day: two low latency ensembles, a network processing ensemble, and a complex transaction ensemble. Each ensembles defines operational requirements that form part of an OLA that describes what it requires to fulfill the SLA that it was created to meet.

Just as configuration profiles are utilized to describe the attributes of an ensemble, the provisioned attributes of a PED are described in a platform profile. The platform profile of a PED is based on realizing and dimensioning a manifest provided by each ensemble deployed on the PED. In a dynamic PED, such manifests are utilized to automatically dimension and pivot resources, while for a static PED such dimensioning and pivoting is performed by operations staff.

Preferably, second tier qualities are utilized in dimensioning a PED. For example, FIGS. 40A-B illustrate second tier qualities for use in dimensioning storage for a PED. These second tier qualities might include, as I/O qualities, read frequency, write frequency, peak I/O, peak frequency for I/O, and peak duration for I/O; as throughput qualities, peak throughput, peak frequency for throughput, peak duration for throughput, and size of unit work; as time qualities, time to first read, time to first write, access pattern, last access time, and last modification time; and as compliance qualities, retention level, sensitivity to disclosure, and sensitivity to alteration. Second tier (i.e. deeper and more specific) qualities are utilized for dimensioning because policy sets do not describe the size of a required configuration until second tier qualities are considered.

Notably, however, because multiple ensembles are usually combined in a processing execution destination, a platform profile can contain significantly more information than the sum of the configuration profiles for each ensemble within the processing execution destination. For example, the configuration profile of a processing execution destination preferably contains provisioning information necessary for combining ensembles, configuration information necessary for sizing and dimensioning the processing execution destination, and information for temporal virtualization and prioritization of the processing execution destination.

The platform profile preferably includes detailed information that can be obtained utilizing forensic data gathering of hardware and storage configuration items, network and storage configuration items, configuration parameters for configuration items, and patch and firmware levels for configuration items.

Preferably, a platform profile is based on standards to the extent practicable. For example, the Distributed Management Task Force, Inc.'s Common Information Model can be utilized as a reference basis for hardware and storage configuration items, the Simple Network Management Protocol Management Information Base standard can be used as a reference basis for network configuration items, and configuration management database standards can be used as the reference basis for software configuration items.

FIG. 41 illustrates an example of provisioning a processing execution destination that lists profile attributes detailing configured resources, a make/model of equipment utilized in product realizations, a logical configuration supplied by the resources, and physical resources supplied by the resources. Note that this example does not fully illustrate storage and network provisioning. For example, a profile for networking provisioning might also detail IP address attributes, VLAN attributes, and quality of service attributes. Similarly, a profile for storage provisioning might also detail logical unit (LU) and physical unit (PU) parameters.

Capabilities

Ensembles enable one or more technical capabilities. A single capability might be enabled by multiple components of an ensemble, or, alternatively, multiple capabilities might be enabled by a single component of an ensemble.

In general, capabilities enable the business or IT of an organization. That is, a capability represents an ability to do something, e.g. an ability that an organization, person, or system possesses. There are three types of enablement. Competency capabilities correspond to the aggregate skills and the competency of personnel within an organization, technical capabilities correspond to technology architecture and engineering, and process capabilities correspond to operational organization, sophistication and maturity of process.

Competency capabilities are related to the ability of personnel to fulfill outcomes that IT can enable in a business. For example, the ability to accurately forecast the rate of resource consumption is a competency capability that enables IT to ensure that business functions have the requisite capacity to function.

Technology capabilities are often related to the benefits from introducing a new tool or technology. For example, the ability to monitor transactions end to end and the ability to do bare-metal provisioning are technology capabilities.

Process capabilities pertain to the ability to implement certain processes (such as IT change management) and often also include the processes required in addition to one or more technical capabilities to perform best-practices. For example, the ability to triage alerts by business impact, predict a capacity of resources, pivot resources in response to a surge in business demand, and accurately chargeback for resource consumption are all process capabilities. Net IT processes are also a type of process capability.

Thus, a capability may be a skill or competency possessed by a person or team, a process possessed by an organization, or a technology or product possessed by a system or tool.

Capabilities can be difficult to assess across a large organization that might have degrees of capability spread unevenly across many departments. Further, there is a difference between having a capability, and applying, or utilizing, it. Any assessment of capabilities preferably takes into account both having and applying a capability, and preferably is capable of statistically managing uncertain degrees to which either of these two factors are known.

Clearly, however, you can't apply a capability if you are not even aware of it. Thus, capabilities can be characterized as building blocks for IT maturity. As capabilities are increased, so too is IT maturity. FIG. 42 illustrates exemplary maturity levels that can be utilized.

A capability assessment preferably takes into consideration various factors in assessing differing types of capabilities. One potential assessment methodology that takes into consideration two factors for each of various types of capabilities, and thus can be characterized as being two dimensional, will now be described.

For a process capability, assessment considers how widely the capability is used across an organization, and how often it is used. For example, a change management capability may be practiced in only some units and may not be applied to all changes. For a technical capability, assessment considers how well featured a product is, and how widely it can be used. For example, a product might be capable of managing patches on only Windows systems, and only be capable of detecting Microsoft product patches. For a competency capability, assessment considers whether a competency is fully learned, and if a competency is present in all individuals in a particular role.

A capability assessment table can be utilized to translate the two factors considered for each type of capability into a single score. FIG. 43 illustrates an exemplary capability assessment table for process, technical, and competency capabilities. Note that each of the two factors considered for each type of capability can be converted to a criteria assessment, which is one of: none, few, some, most, or all.

This will produce two criteria assessments for a single capability. In some preferred implementations, a scoring matrix is utilized to express a statistical level of probability that the assessment is accurately known by converting these two assessments to a single score between zero and one. Specifically, the criteria assessment for one factor of a capability is looked up along one axis, and the criteria assessment for the other factor of that capability is looked up along the other axis. The score for that capability is located at the intersection of the factors. FIG. 44 illustrates an exemplary scoring matrix, which in some preferred implementations could be calibrated automatically by sampling frequencies that assessments of this type are accurate across many organizations. For example, if an exemplary technical competency was well featured (thus earning a "most" criteria assessment) but only applicable in a few cases (thus earning a "few" criteria assessment), it would earn a score of 0.15. This represents a fifteen percent level of presence. This level of presence can be viewed as the statistical likelihood that the capability is present, and the statistical likelihood that the capability is absent can be viewed as the inverse of this level (i.e. eighty five percent).

However, because the evaluation is based on a subjective two-dimensional metric, the assessment carries statistical uncertainty. Accordingly, a degree assessment is next looked up from a range table based on the ascertained level of presence to obtain a final assessment. This provides a method for determining base capabilities present in a maturity model even in the presence of uncertainty.

FIG. 45 illustrates an exemplary range table. Returning to the previous example, in which a score of 0.15, corresponding to a fifteen percent level of presence, was assigned, the assessment would result in a determination that the capability is most likely absent.

Preferably, it is assumed that an assessment is unbiased, and that each outcome is equally likely. For example, for the range table illustrated in FIG. 45, it is assumed that each degree of assessment is equally likely (i.e. there is a twenty percent chance of each degree of assessment). Additionally or alternatively, in at least some implementations, biased assessments are accommodated via the use of different weights in the table of assessment certainties.

Capabilities can be combined with other capabilities to create higher level capabilities. Combining capabilities to create new capabilities (or improve existing capabilities) represents a capability increment. When two capabilities are combined together to create a higher level capability, the higher level capability can be characterized as a derived capability, while the capabilities that were combined to form the derived capability can be characterized as base, or constituent, capabilities.

If it is known that a base capability exists (to some level of uncertainty), the likelihood that a derived capability exists can be estimated, although obviously this estimate is uncertain and probabilistic. Conditional probability tables and basic probability theory represent a preferred methodology for such estimates. (Notably, such a methodology preferably does not rely on descriptive statistics or probability distributions, although neither does it prevent or prohibit the alternative application of such techniques as they can be equally accommodated in some preferred implementations.)

Such an estimate preferably incorporates domain knowledge with structure and patterns as well as uncertainty. It is believed that neural nets do not incorporate structure well, and that rule based systems do not adequately incorporate uncertainty, although in at least some implementations these may be utilized anyway.

It is preferred, however, that a Bayesian-based modeling technique for probability calculation be utilized. Bayesian probability is based on basic set theory and the frequency of discrete elements of a set. Its use requires only basic assumptions regarding countable sets of discrete elements (which can be extended for continuous data), and axioms of conditional frequency (although approximate knowledge can be utilized), but does not require independent events (although they can be modeled). By relying only on basic assumptions and axioms, there is less opportunity for inaccuracy being introduced by the modeling technique used within this method.

In contrast, classical descriptive statistics is based on fitting observed data to a continuous probability description. This requires assumptions regarding probability distribution (which are rarely accurate unless there is sufficient data to calibrate a utilized model), continuously valued data sets (e.g. discrete and categorical data is not handled well), and independence between events (which is rarely true). Classical descriptive statistics may be utilized, however, in at least some implementations, as they are not precluded from use in one or more preferred implementations.

Fuzzy logic is similar to Bayesian probability in that it is based on set theory and frequency of discrete elements of a set, however, it is based on the more complex mathematics of infinite sets and uses inequalities as the basis for its reasoning. This is difficult to utilize and modify, thus hampering traceability and the incorporation of client-provided information. Nonetheless, fuzzy logic may be utilized in at least some implementations.

The use of Bayesian techniques is preferred because it provides several benefits. For one, fewer modeling assumptions results in better results in more situations. As noted above, a Bayesian approach works with independent events (probabilities add) as well as conditional events (probabilities multiply). Further, knowledge of conditional probability can come from any source, such as, for example, measured frequencies, subjective knowledge contained in fixed tables, functions of variables used, or hard facts. This is particularly valuable in this application area because of the extensive reliance on subjective knowledge provided by IT architects.

A Bayesian approach allows for reasoning in both directions. For example, if it is known that A causes B, and the baseline frequency of B is also known, inferences can be made in the reverse direction about A given evidence regarding B. A Bayesian approach also enables "explaining cause" reasoning. For example, if it is known that A and B can cause C, but only information about A and C is available, inferences can be made about B that explains the evidence of C.

A Bayesian approach still further enables iteration. It is possible to start out with a mix of hard and soft facts and easily update a model with more hard facts later as they emerge. In other words, knowledge of a prior (i.e. anterior-priori) probability can be updated with new facts or information to yield a more accurate knowledge of a posterior probability (i.e. post-priori). This is particularly well suited for use with an evolving knowledge base utilized by IT architects. For example, the more patterns are used to systematically guide the configuration of ensembles, the greater the accuracy that the correlations between the qualities of those patterns are known. This evolving certainty can be exploited in a preferred embodiment that employs Bayesian techniques for updating probabilities.

Lastly, a Bayesian approach is easily extendable in the creation of advanced models of IT supply chain behavior via the use of Bayesian Belief Networks (BBNs).

Figure 46:
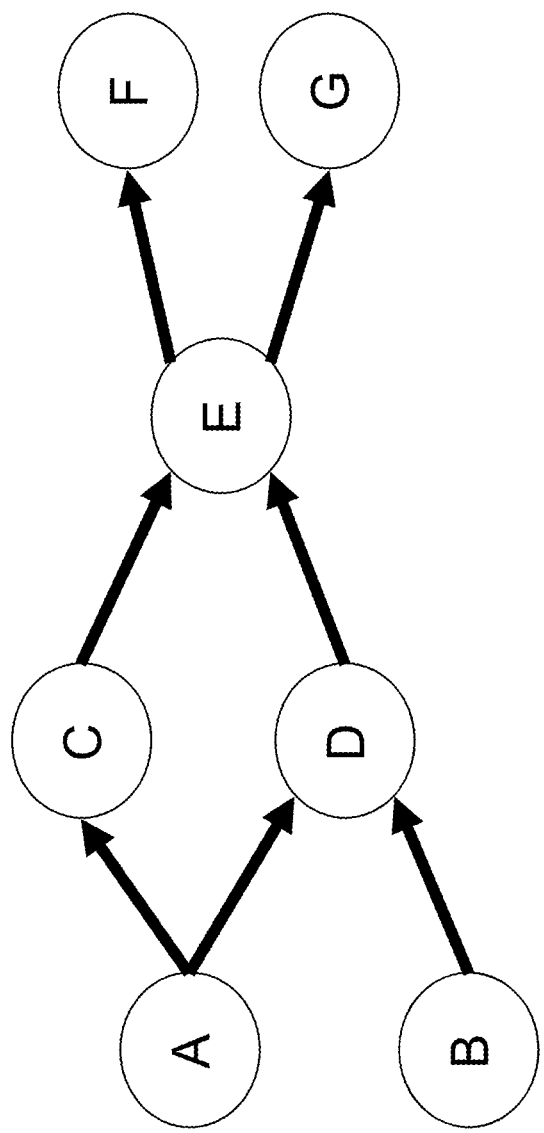
FIG. 46 illustrates an exemplary Bayesian Belief Network.

A Bayesian Belief Network is a causality graph. FIG. 46 illustrates an exemplary such Bayesian Belief Network. Notably, in a Bayesian Belief Network, the nodes do not need to be homogenous, and, in fact, are often very different from one another.

In a Bayesian Belief Network, each starting leaf node is provided with an uncertain estimate, such as, for example a capability assessment. Each subsequent node can be computed utilizing a conditional probability of soft evidence from the leaf nodes. Importantly, how conditional probability is computed can be different at each node.

Figure 47:
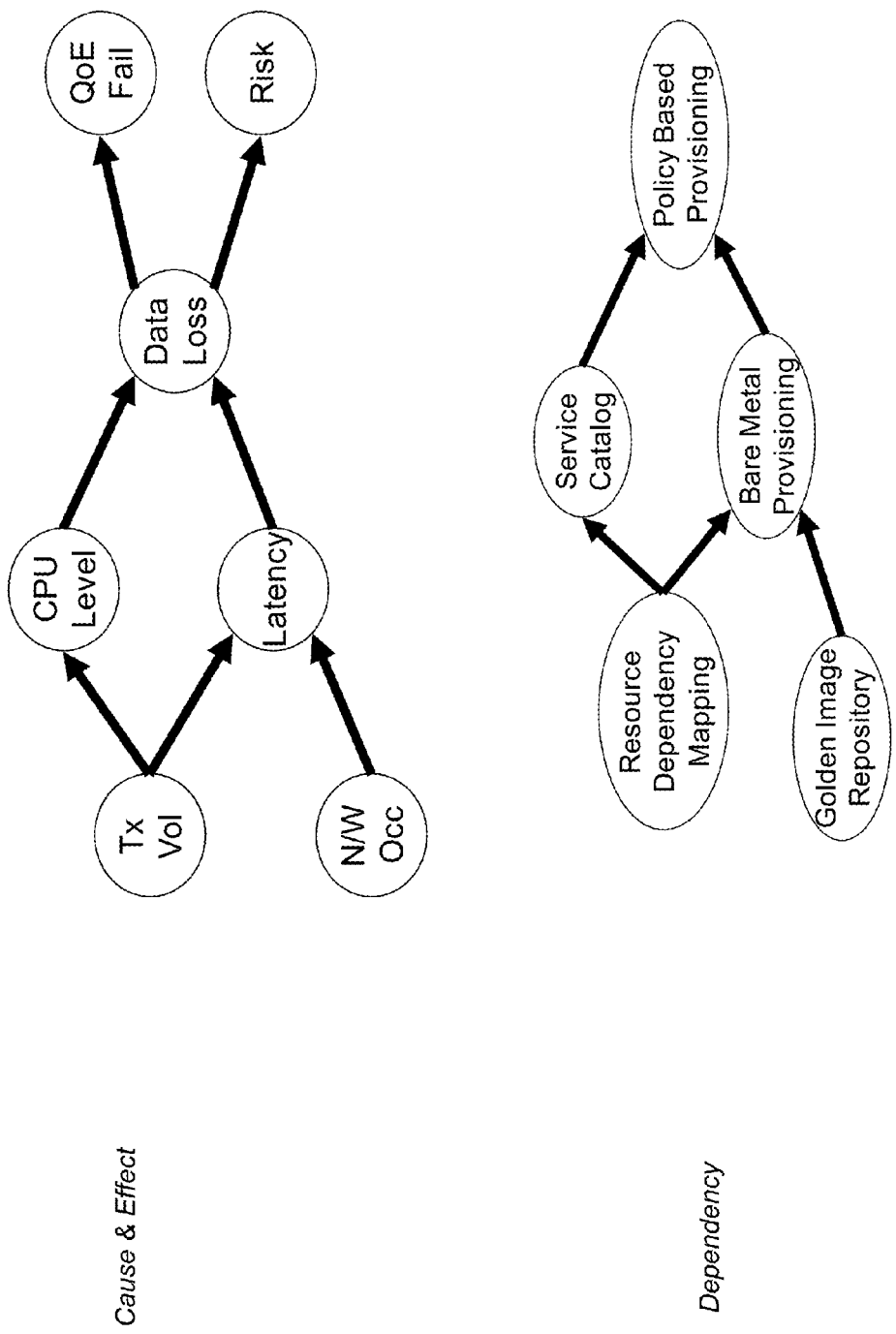
FIG. 47 illustrates the use of causality graphs to represent both cause and effect and dependency.

Bayesian Belief Networks can be utilized to represent different relationships. FIG. 47 illustrates the use of causality graphs to represent both cause and effect (top) and dependency (below).

It will be appreciated that estimations based on Bayesian Belief Networks are uncertain, which makes this technique preferable for estimating the uncertainties in IT supply chains and in IT capabilities. For example, suppose a capability A is based on a capability B, i.e. A depends on B. If information regarding B is known, then the probability of A being present or absent can be inferred using a conditional probability table, such as the one illustrated in FIG. 48.

Then, if it is believed that capability A likely exists (for example because a client said so), but an assessment for B is not available, Bayes' rule can be utilized to infer the level of presence of B.

Bayes' rule can be expressed as $P(B|A)=(P(B)\times P(A|B))/P(A)$, where $P(B)$ is the prior probability or marginal probability of B (i.e. it does not take into account any information about A), $P(B|A)$ is the conditional, or posterior, probability of B, given A, $P(A|B)$ is the conditional probability of A given B, or likelihood, and $P(A)$ is the prior or marginal probability of A, which acts as a normalizing constant.

FIG. 49 illustrates a conditional probability matrix for the probability of B, given A (i.e. $P(B|A)$ that has been calculated using Bayes' rule. For example, for the case where B is known to be "few", in calculating the chance that A is present, $P(B)$ would be 0.2, as all outcomes (absent, few, some, most, present) are equally likely absent more information, $P(A)$ would be 0.5, as present and absent outcomes are equally likely absent more information, and $P(B|A)$ would be 0.25 (based on the conditional probability matrix illustrated in FIG. 48). Accordingly, Bayes' rule says that $P(B|A)$ is equal to $((0.2\times 0.25)/0.5)$, or 0.10, as indicated in the conditional probability matrix of FIG. 49. Thus, Bayes' rule says that B has a ten percent probability of being present if A is present. Note that B's presence is not certain if A is present, because A's presence is uncertain in the first place.

Thus, using Bayesian techniques it is possible to estimate the value of dependent capabilities. This allows for a more accurate assessment of IT maturity than might otherwise be possible. For example, if there are fifty potential capabilities, but a particular organization only has ten of those capabilities, is the organization really only at twenty percent maturity? It is more likely that the organization has partial maturity in some of the remaining forty capabilities. In this case, uncertain estimates of dependent capabilities could be utilized to estimate a score greater than twenty percent.

Additionally, the estimation of dependent capabilities allows for the estimation of a cost/effort required to improve an organization. For example, if the average cost to acquire a capability is ninety days of effort from three people, or three fourths of a person year, then a partial maturity estimate can be multiplied by this value to estimate the effort to perfect the capability. Assuming that it has been estimated that there is a forty percent chance that a certain capability is present, three fourths of a person year could be multiplied by the inverse of the capability estimate, i.e. $(1-0.4)$, which is 0.6 (corresponding to a sixty percent chance that the capability is not present) to generate an estimate that 0.45 of a person year is required to perfect the capability.

Further still, the estimation of dependent capabilities can be utilized to estimate a relative value to an organization of improving the capability. For example, the value of a capability can be multiplied by the probability that the capability is absent to establish a value to the organization in acquiring a capability.

Known Problems and Remediation

In the course of business, an organization might encounter challenges that prevent the organization from pursuing particular approaches to meet its goals. These can be characterized as known problems.

Figure 50:
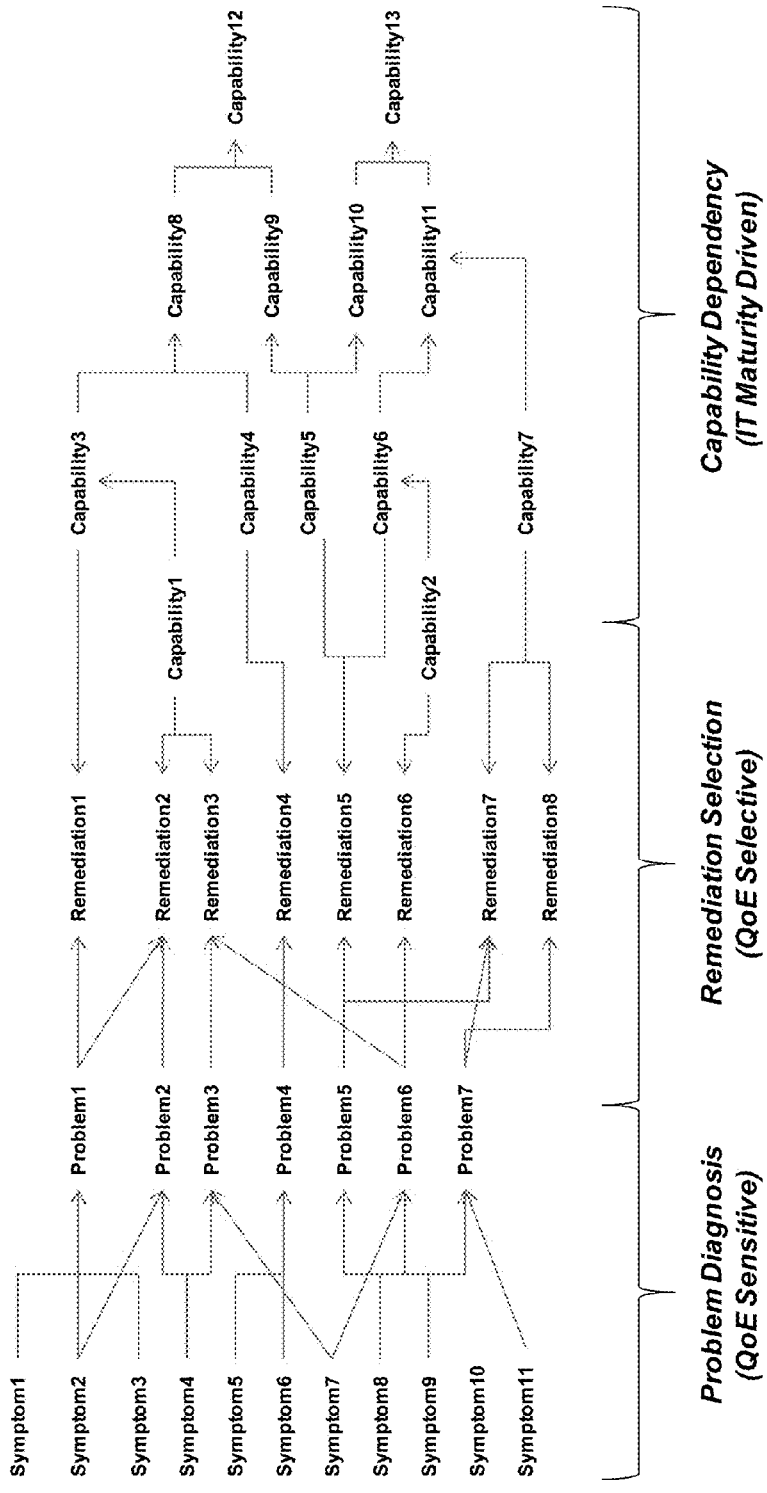
FIG. 50 illustrates how the presence of certain symptoms might indicate the presence of a particular problem.

Known problems can be diagnosed based on the appearance of symptoms. For example, the presence of certain symptoms might indicate the presence of a particular problem, as illustrated in FIG. 50.

Problem diagnosis via symptoms can be characterized as being quality of experience sensitive. For example, symptoms might be identified based on a fit to a quality of experience profile (described herein). In one or more preferred implementations, an automated characterization of symptoms is uncertain and also well suited to the application of Bayesian techniques for recognizing symptoms based on comparing a platform profile of a PED to a configuration profile of ensembles that comprise that PED (for example to detect mismatches in configuration.

Capabilities enable the use of known remediations to resolve known problems. Specifically, a remediation strategy is a set of known remediations used to resolve a known problem. Such a remediation strategy represents a list of capabilities that supply known remediations that are required to resolve the known problem. In one or more preferred implementations, the automated selection of remediations for a known problem is uncertain and also well suited to the application of Bayesian techniques.

Equivalent remediation strategies resolve the same known problem. A minimum equivalent strategy is the smallest set of known remediations that resolve a known problem. Sometimes, a set of remediation strategies in aggregate can resolve a known problem. An equivalent-AND strategy represents such a set. By way of contrast, two remediation strategies that resolve the same known problem can be characterized as equivalent-OR strategies if either can be used in the absence of the other. In this case, which one is most appropriate depends on the context that the known problem appears in.

The insight that capabilities can be combined to create higher-level capabilities can be exploited to simplify reasoning about equivalent remediation strategies. In the cases where the remediation strategy can be defined as an equivalent-AND strategy, it is possible to define a single composite capability that has as its constituents the base capabilities that comprise the members of the equivalent-AND set. Thus the remediation provided by that composite capability can be recognized as automatically matching or predicting the presence of the base capabilities. This provides an algorithmic basis for reducing the number of uncertain capabilities which must be considered to reason about the appropriate remediation. This means that if a preferred embodiment has knowledge of the uncertain maturity level of capabilities, it can infer the probability that an optimal remediation to a known problem can be provided.

If an estimate of the presence of a capability is available, it is possible to compute the probability that a known problem can be solved utilizing a given remediation strategy (as a function of the presence of the capabilities required). Similarly, it is possible to estimate the effort required to resolve a known problem using a remediation strategy.

Qualities Revisited

Qualities can be used to relate quality of experience, workload patterns, patterns, symptoms, known problems, known remediations, and capabilities. As described above, qualities represent categorical metrics. Qualities can be categorized in many ways. These categorizations can be characterized as dimensions in a mathematical sense (not to be confused with the different concept of dimensioning and sizing of a PED, or with different dimensions or viewpoints on IT enterprise architecture). Thus, qualities can be described mathematically as measures within a dimensional metric space. Different dimensions of qualities can be defined to measure different things. Qualities can appear in more than one dimension because there is no restriction that dimensions must be orthogonal to each other (as they are in a Euclidian dimensional space). For example, a workload profile is a useful subset of qualities. Although qualities might be traditionally organized in terms of availability, business process, and usability, qualities can be rearranged into dimensions for processing, messaging, data, and memory. FIG. 51 illustrates an exemplary workload pattern that represents a subset quality profile having thirty four of fifty qualities rearranged.

Qualities can be correlated to other qualities both individually and in aggregate.

Specifically, the fit between any two qualities can be correlated using conditional probability tables. FIG. 52 illustrates how a pattern quality value can be correlated to a workload pattern quality value. Notably, for conditional probability to be utilized to model a quality fit, different conditional probability tables will be needed for different pairs of relationships.

The, average fit between any two quality profiles can be calculated using a multiplicity of techniques. One such technique minimizes the average distance between the qualities. Another technique utilizes a geometric mean. Yet another technique uses density estimation techniques. In one or more preferred implementations, the use of a specific technique may depend on the types of quality profiles being reasoned about, or on the type of reasoning being performed. For example, if it is desirable to exploit the fact that conditional probabilities multiply, the use of a geometric mean based technique can result in a higher performing and more accurate implementation. Alternatively, if a similarity estimate between quality profiles is desired, a density estimation technique might be preferred.

Thus, the fit of, for example, a pattern to a workload or a known problem to a known remediation can be estimated using conditional probability tables to model explicit dependencies (e.g. known problem—known remediation, capability dependency, quality dependency), or using quality profile comparisons in situations where explicit dependency tables are not defined (e.g. an ensemble fit to a business value chain).

Further, it is possible to define rules to derive qualities. This can be accomplished by utilizing a function on one or more qualities. For example, the function $F(X+Y)=Max(X, Y)$ says that, if X="High", and Y="Low", then $F(X+Y)=Max(“High”,“Low”)=“High”$. This simple example illustrates the use of function $F(X+Y)$ to derive a new quality from X and Y qualities. In a more complex methodology, fuzzy logic tables could be utilized to define functions taking X and Y as inputs. Exemplary such fuzzy logic tables are illustrated in FIG. 53. Notably, the use of fuzzy logic tables supplements, rather than replaces, the use of conditional probability tables as both can be accommodated within the same implementation.

Figure 55A:
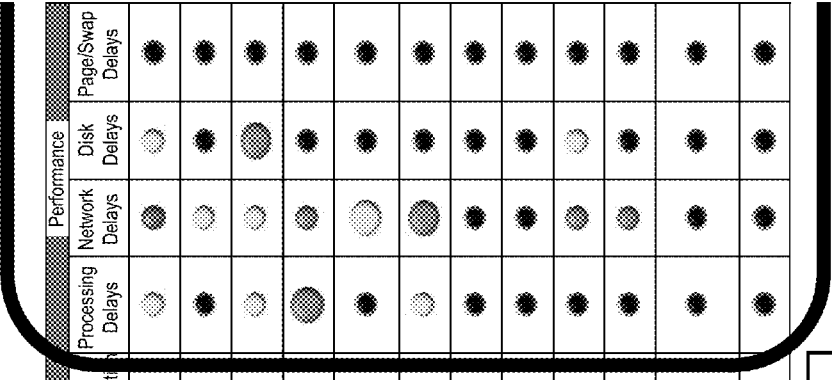
Figure 55B:
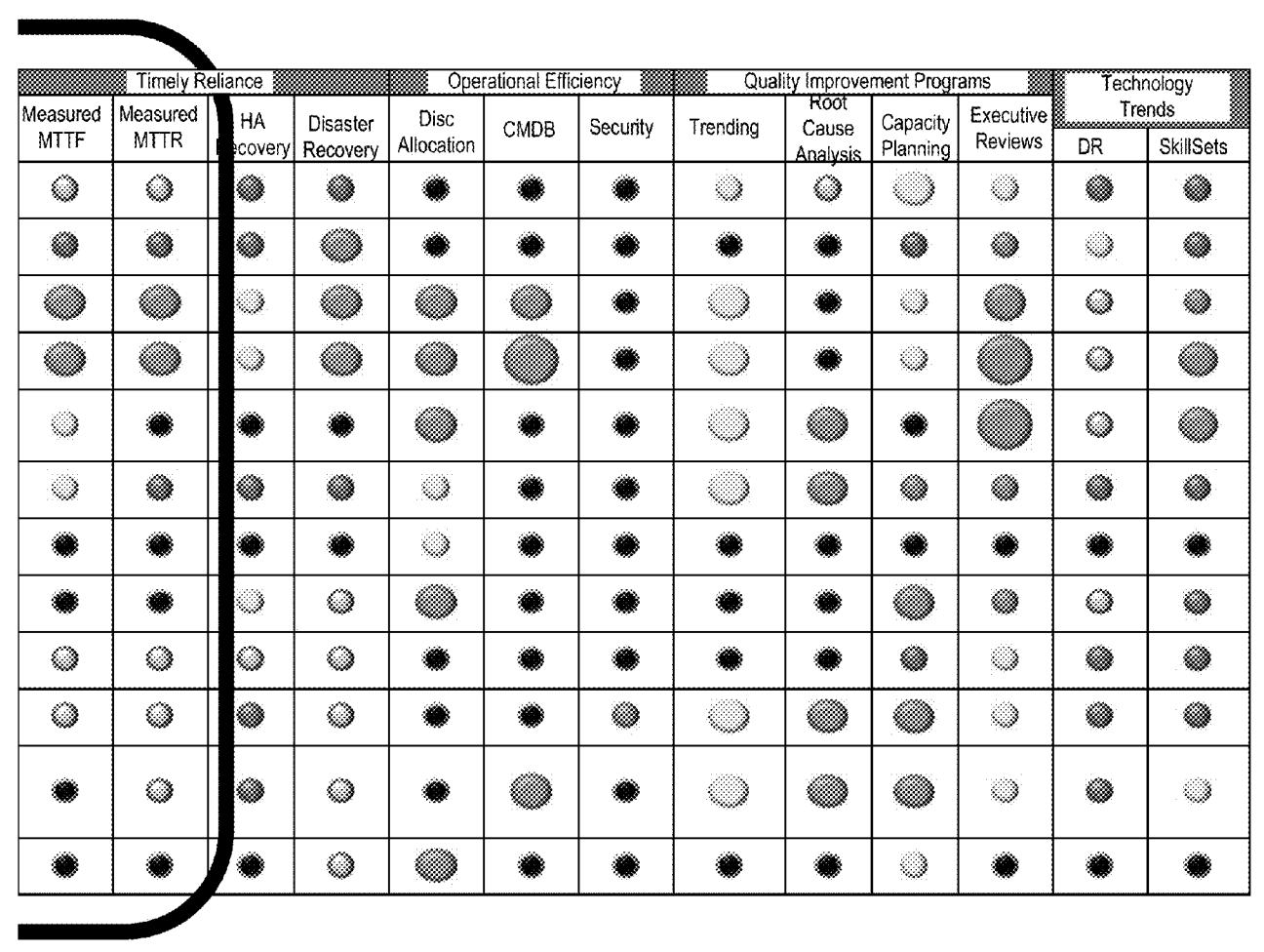

The use of derived qualities enables deeper use of workload patterns. FIG. 54 illustrates a workload pattern having both base qualities and calculated qualities derived therefrom. Functions on qualities can be utilized to extend conditional probability or to help shape conditional probability tables (e.g. ensemble fit to workload). Further, derived qualities can be utilized for heat map comparisons (e.g. a heat map predicting how well an ensemble or remediation meets workload requirements). FIGS. 55A-B collectively illustrate an exemplary performance heat map predicting how well an ensemble meets workload requirements. As illustrated in FIGS. 55A-B, this heat map illustrates the complexity of remediation required to meet workload requirements. This complexity of remediation can be characterized as representing an IT gap. Similarly, a heat map measured on an existing application could be imported to compare to an ensemble.

Exemplary Processes

Figure 56:
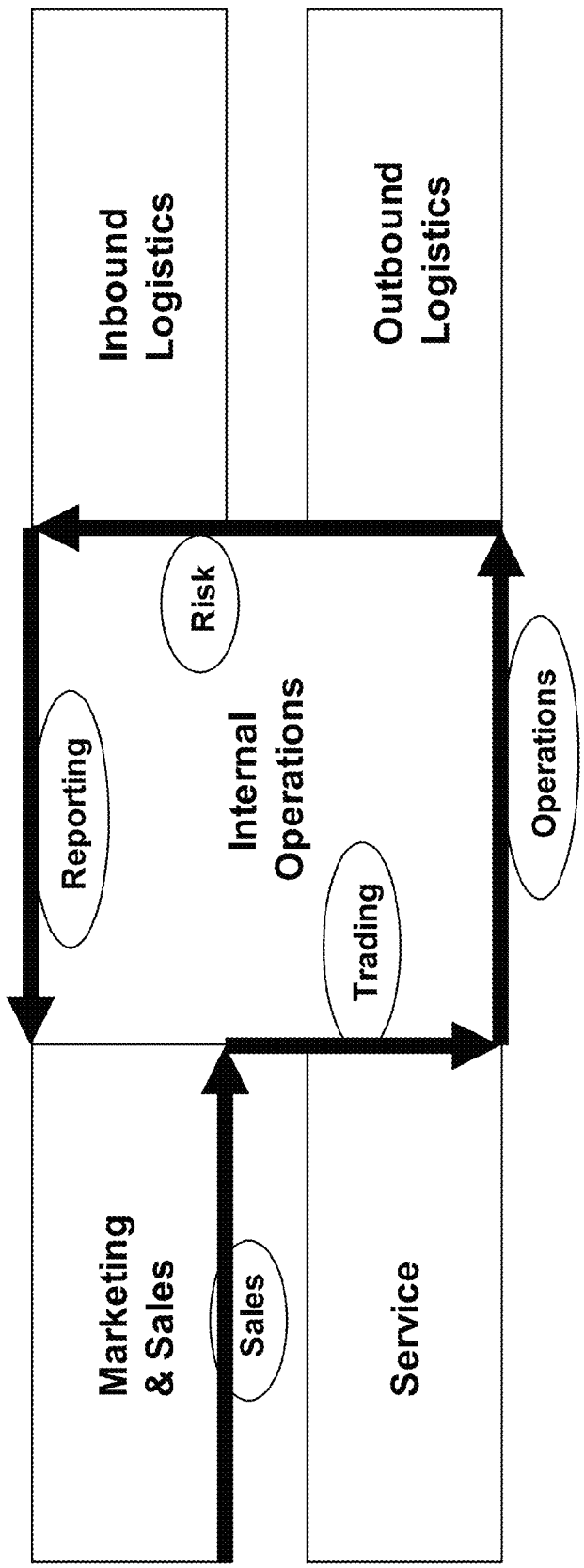
FIG. 56 illustrates business functions that constitute a straight through processing business value chain in capital markets mapped onto an IT supply chain.
Figure 57B:
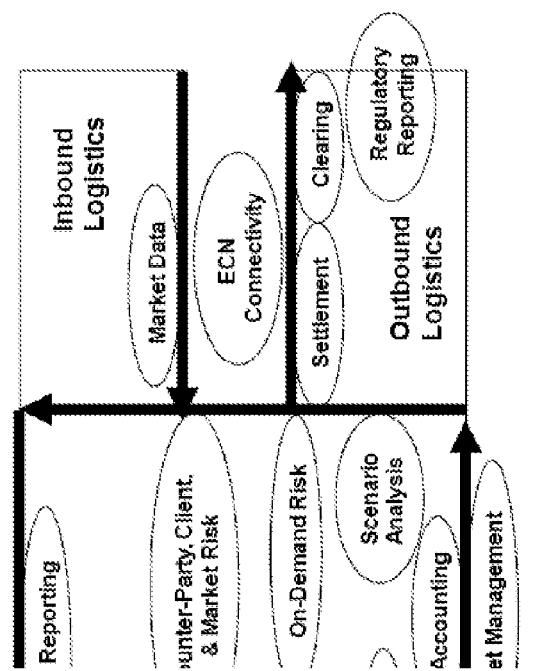
FIG. 57A-B collectively illustrate how business activities can be organized along different legs of an IT supply chain.
Figure 57A:
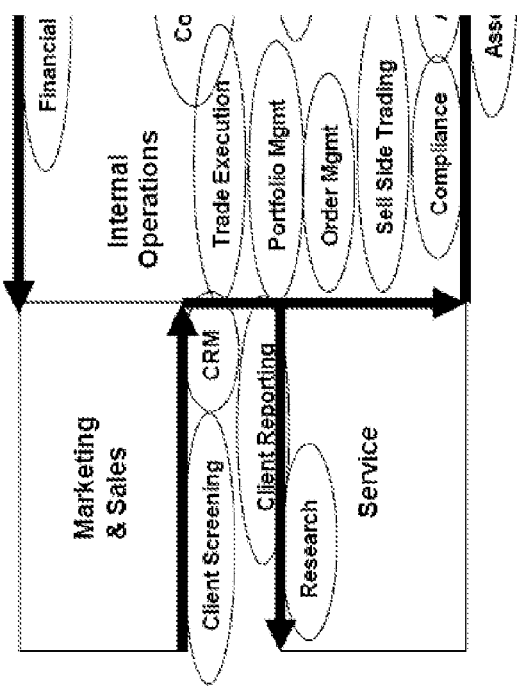

It will be appreciated from the above description that a business value chain can be utilized to characterize IT demand of an organization, and an IT supply chain can be utilized to characterize IT supply to meet that demand. Business functions can be laid out within such a business value chain. Business activities within each business function can then be identified, as illustrated in FIG. 56, which depicts business functions that constitute a straight through processing business value chain in capital markets mapped onto an IT supply chain. Business activities are organized along different legs of the IT supply chain, as illustrated in FIGS. 57A-B.

The requirements for each business activity, which typically are dominated by similar workflows, can be characterized by a recurring workload pattern having a distinct set of qualities, i.e. a quality profile. The requirements, and hence the quality profile, for each business activity in a business value chain are shaped by business drivers for the business functions in that business value chain.

Figure 58:
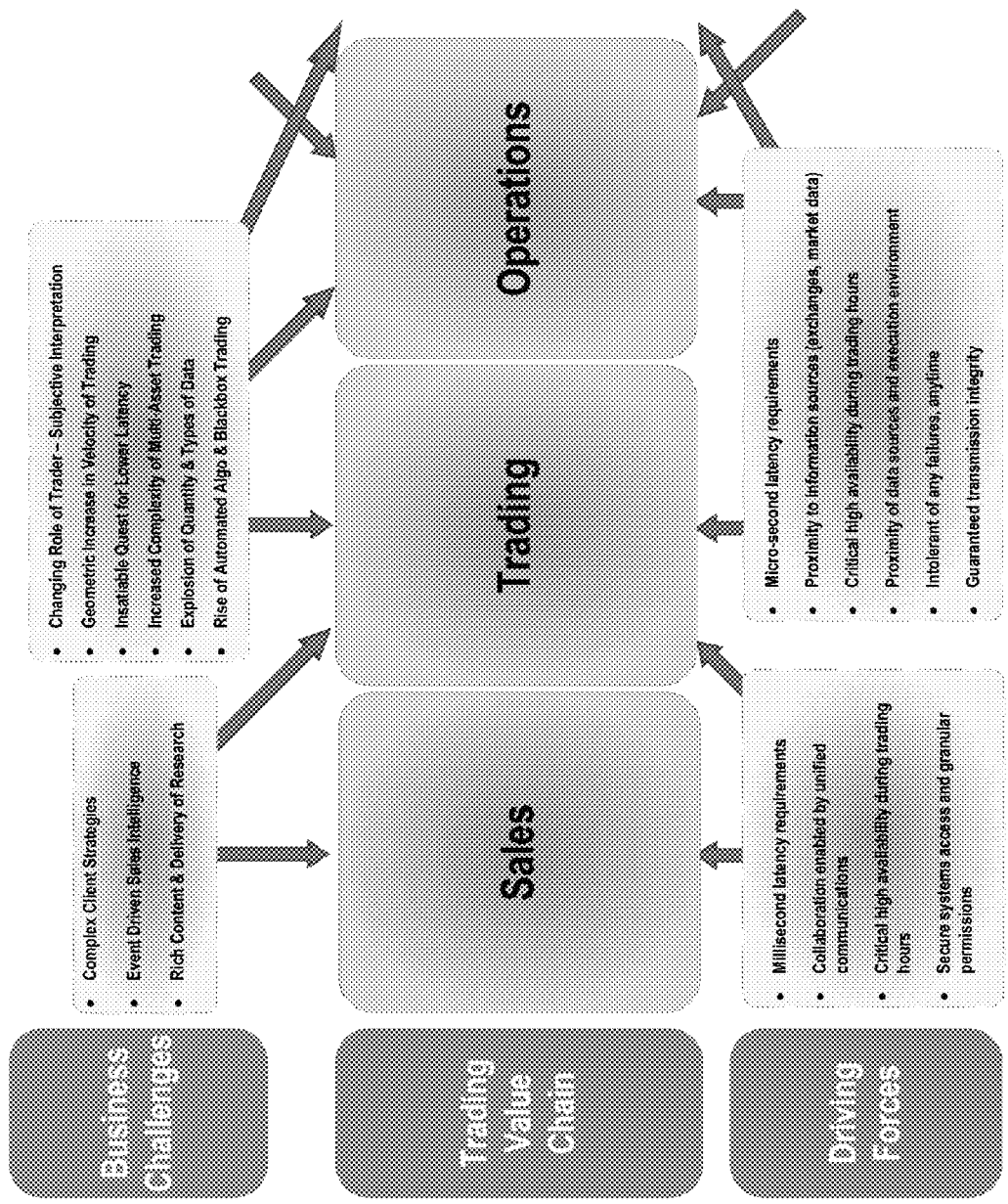
FIG. 58 illustrates how business challenges and driving forces (e.g. service level agreements) can shape key performance indicators for a business function of a business value chain.

In FIG. 56, each arrow identifies a leg in the IT supply chain. Each leg of the IT supply chain has different processing requirements (e.g. this might be influenced by whether a leg is customer facing, internal, or supplier facing). Thus, whereas business drivers are specific to business activities, it is possible to define key performance indicators that exert a common influence on all business activities within the same business function. FIG. 58 illustrates how business challenges and driving forces (e.g. service level agreements) can shape key performance indicators for a business function of a business value chain. For example, key performance indicators might include time to market agility, business performance agility, capital expenditure (CapEx) cost savings, operating expense (OpEx) cost savings, efficiency, operational risk reduction, and reliability. With respect to these key performance indicators (KPIs), for a trading business function, time to market agility, business performance agility, and reliability would likely be characterized as of "high" importance, while CapEx and OpEx cost savings would likely be characterized as of "low" importance.

Once KPI priorities have been characterized for a business function, an optimal quality profile (OQP) can be derived. This optimal quality profile can be utilized as a point of departure to derive a business activity quality profile (BAQP) for each business activity within a business function. Each business activity quality profile can be adjusted based on specific workload requirements for that business activity (e.g. based on business drivers for that business activity). FIG. 59 illustrates pseudo control instructions for carrying out this process.

Figure 21:
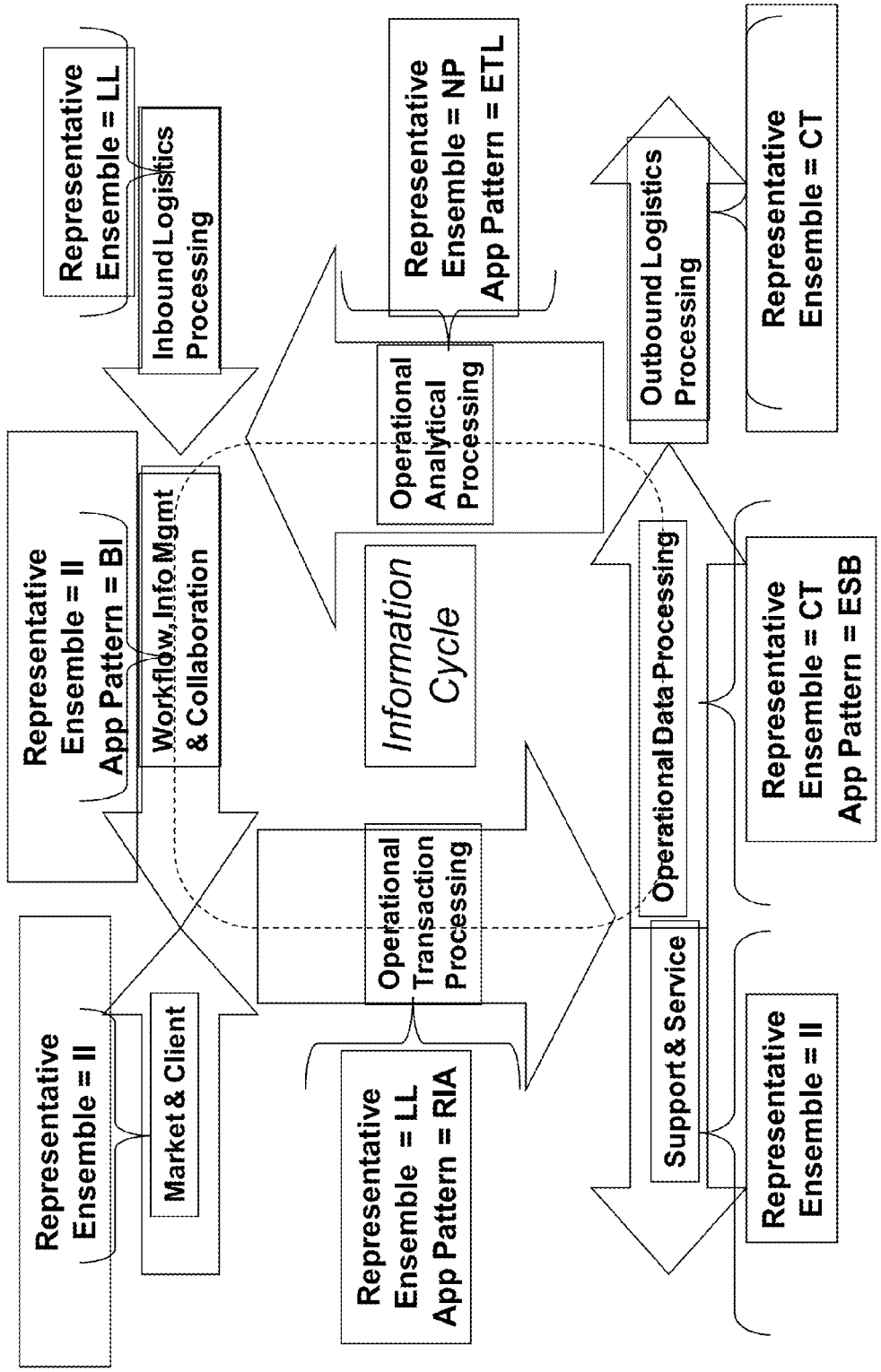
FIG. 21 illustrates how each leg of an IT supply chain can have a representative ensemble.

An ensemble can be matched to this optimal quality profile. This ensemble can be characterized as being representative of the leg of the IT supply chain it is mapped to. Thus, each leg of an IT supply chain has a representative ensemble, as illustrated in FIG. 21.

The fit of this representative ensemble can be compared to an optimal quality profile and business activity quality profiles utilizing a predictive heat map. The fit of this representative ensemble to business activities will vary due to the different business drivers of business activities.

However, business activities within the same leg of an IT supply chain will still have very similar quality profiles. This can be exploited via the use of fit for purpose ensembles (that is, multiple business activities can utilize the same ensemble, and it will generally be a good fit for each business activity). FIG. 61 illustrates the similarity of quality profiles for business activities of a sales business function and the identification of a fit for purpose network ensemble for these business activities.

Figure 62:
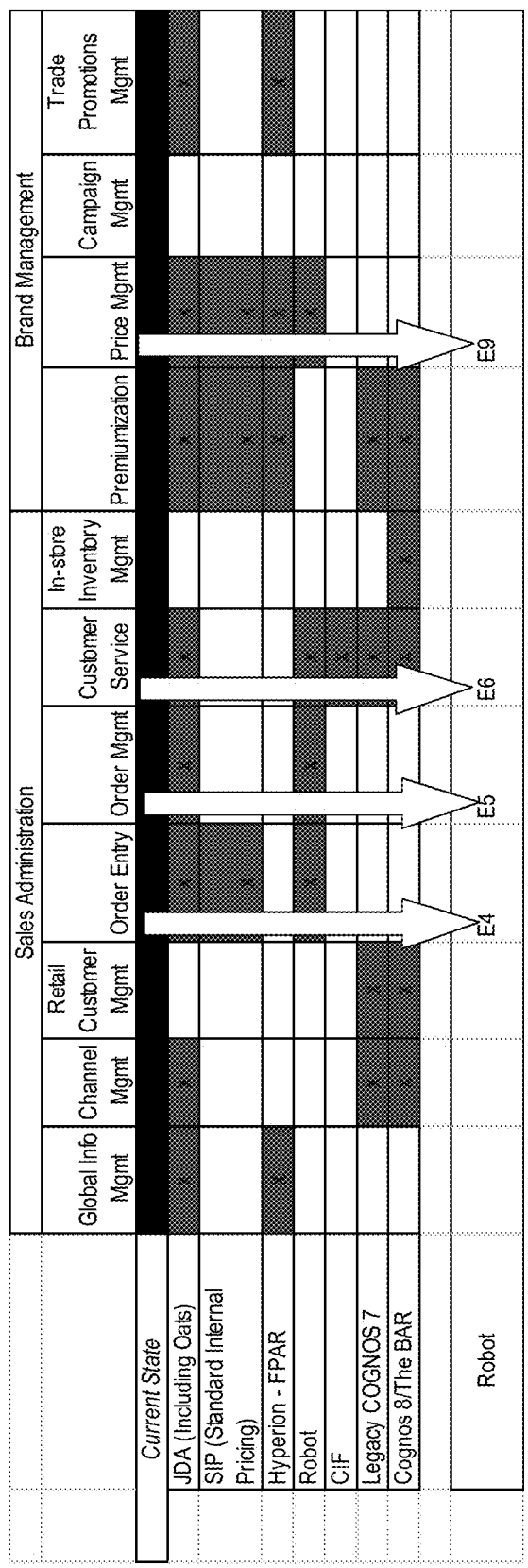
FIG. 62 illustrates how an application can intersect multiple business activities.
Figure 63:
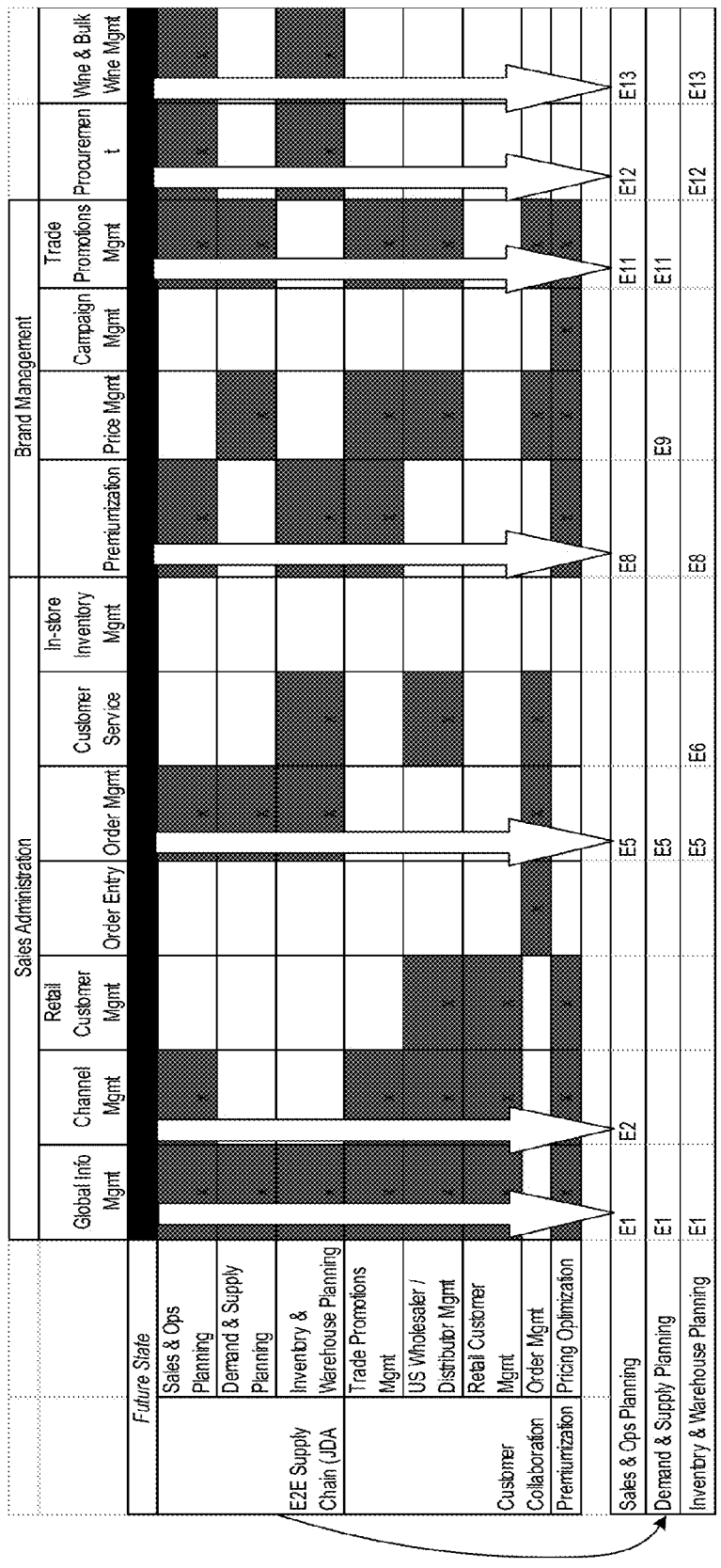
FIG. 63 illustrates how future state application functionality can be planned to intersect multiple business activities.

Notably, though, as an entire business value chain obviously crosses multiple legs of an IT supply chain, the use of multiple ensembles will usually be required to address an organization's business value chain. This is why, as described above, ensembles are combined to form a processing execution destination for the IT supply chain. This also provides the basis for automated reasoning about how the alignment or fit between quality profiles can be used to guide the automated configuration of ensembles and PEDs, Similarly to how a business value chain crosses multiple legs of an IT supply chain, business applications can intersect several business activities. For example, FIG. 62 illustrates how, in a current state, a "robot" application intersects order entry, order management, customer service, and price management business activities, and FIG. 63 illustrates how future state application functionality can be planned to intersect multiple business activities.

Figure 64:
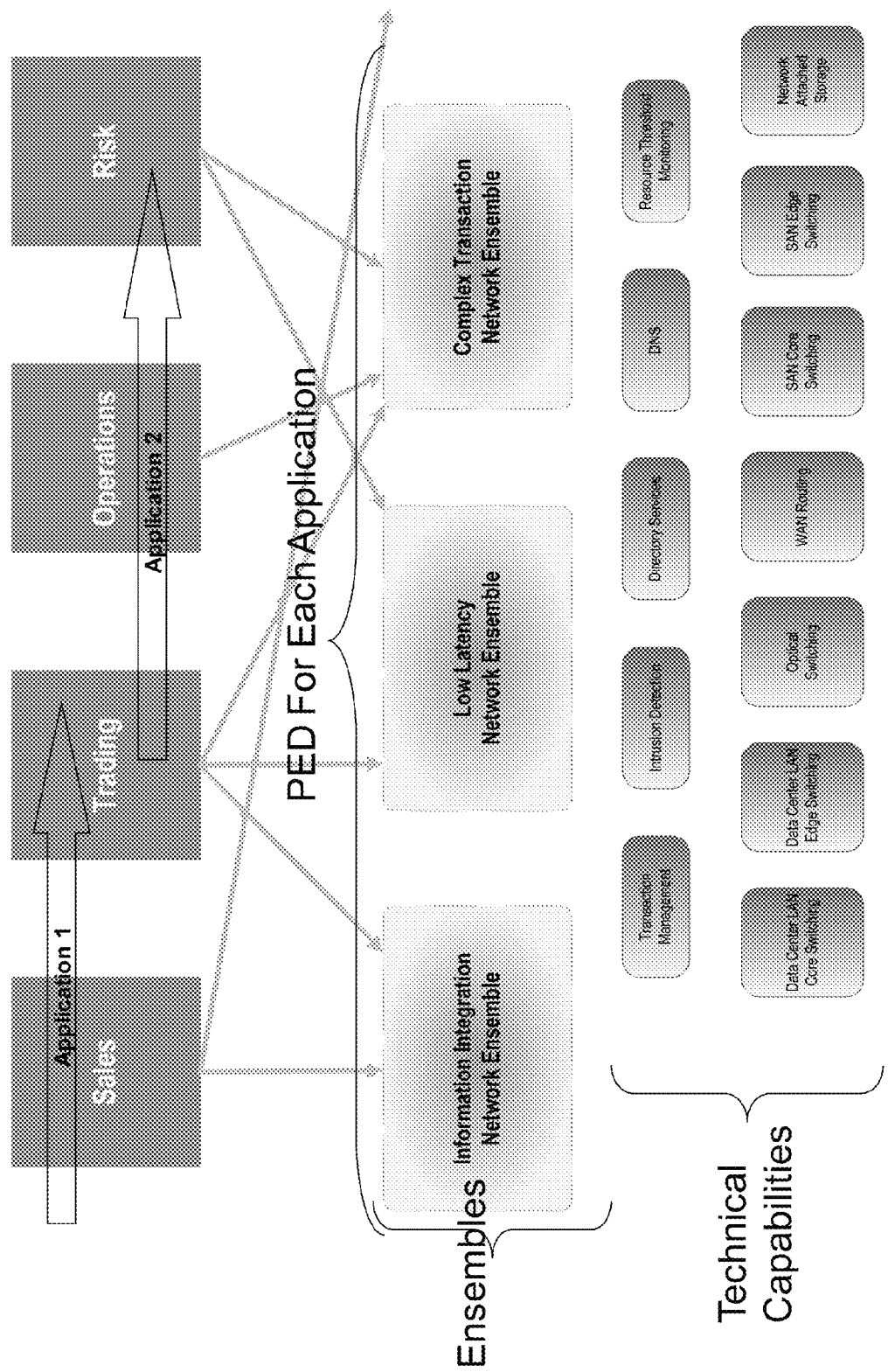
FIG. 64 illustrates two applications that each cross over two business functions.

FIG. 64 illustrates two applications that each cross over two business functions, and the mapping of various of these business functions to ensembles of a processing execution destination.

A method for automatically estimating the appropriate ensembles for use in a PED starts by mapping an application or service to one or more business activities. Next, identified key performance indicators or business demand characteristics can be utilized to predict an optimal quality profile that best fits those KPIs or demand characteristics. There are then several options for proceeding to derive candidate best fit ensembles.

A first option is to derive candidate ensembles based on an application quality profile. This application quality profile can be created from scratch, or can leverage imported business activity quality profiles, which in one or more preferred implementations might use a database of Bayesian prior frequencies that a particular quality in the quality profile occurs across many organizations having the same business activity. Specifically, an application quality profile could be synthesized from the business activity quality profiles for all of the business activities the application has been mapped to. This synthesis could be accomplished by various techniques which may include, for example, comparing and selecting quality by quality, deriving an average quality profile across business activities, selecting qualities based on a majority basis, or ranking business activities by importance to the application and deriving qualities from the highest ranked business activities. This application quality profile can then be customized using the optimal quality profile as a point of departure and adjusting for specific workload requirements. FIG. 65 illustrates pseudo control instructions for carrying out this method.

A candidate best fit ensemble list can then be derived, e.g. by utilizing Bayesian logic based on the application quality profile. FIG. 66 illustrates pseudo control instructions for carrying out this method by utilizing geometric mean calculation to simulate a simplified BBN-type of calculation.

Preferably, multiple ensembles will be selected if the best match has a score lower than a first threshold value such as seventy percent. If the best match is below this first threshold value, then all ensembles with a score greater than a second threshold value, such as thirty percent, can be selected.

A second option is to leverage business activity to IT supply chain mappings. Specifically, functional patterns such as application patterns can be matched based on the IT supply chain legs that business activities are mapped to. Ensembles can then be derived, with less accuracy, based on application patterns. This may be desirable as an alternative in cases where detailed knowledge of business activities is unknown.

A third option is to derive candidate ensembles based on representative ensembles selected based on business activity quality profiles. Candidate ensembles can be derived based on the majority of business activities, a ranking of the importance of business activities, or a best match by average ensembles of business activities.

The first and third of these options are perhaps most applicable for future state applications which are planned on the basis of the business activities that they will service and are not yet implemented, while the second option is perhaps most applicable for current state applications where detailed knowledge of business activities is incomplete or unknown.

This illustrates the flexibility of one or more preferred implementations to be used for the automation of a variety of methods based on the situational context of the user. In at least some implementations, further options are available, which may also be based on the automation of reasoning about patterns, ensembles, and PEDs based on the different kinds of quality profiles described previously. For example, in at least some preferred implementations, alternatively to, or in addition to, the top-down examples cited above, a bottom-up forensic-based analysis is implemented where, instead of using quality of experience profiles, platform and configuration profiles are used as the basis for the automated reasoning.

Figure 67:
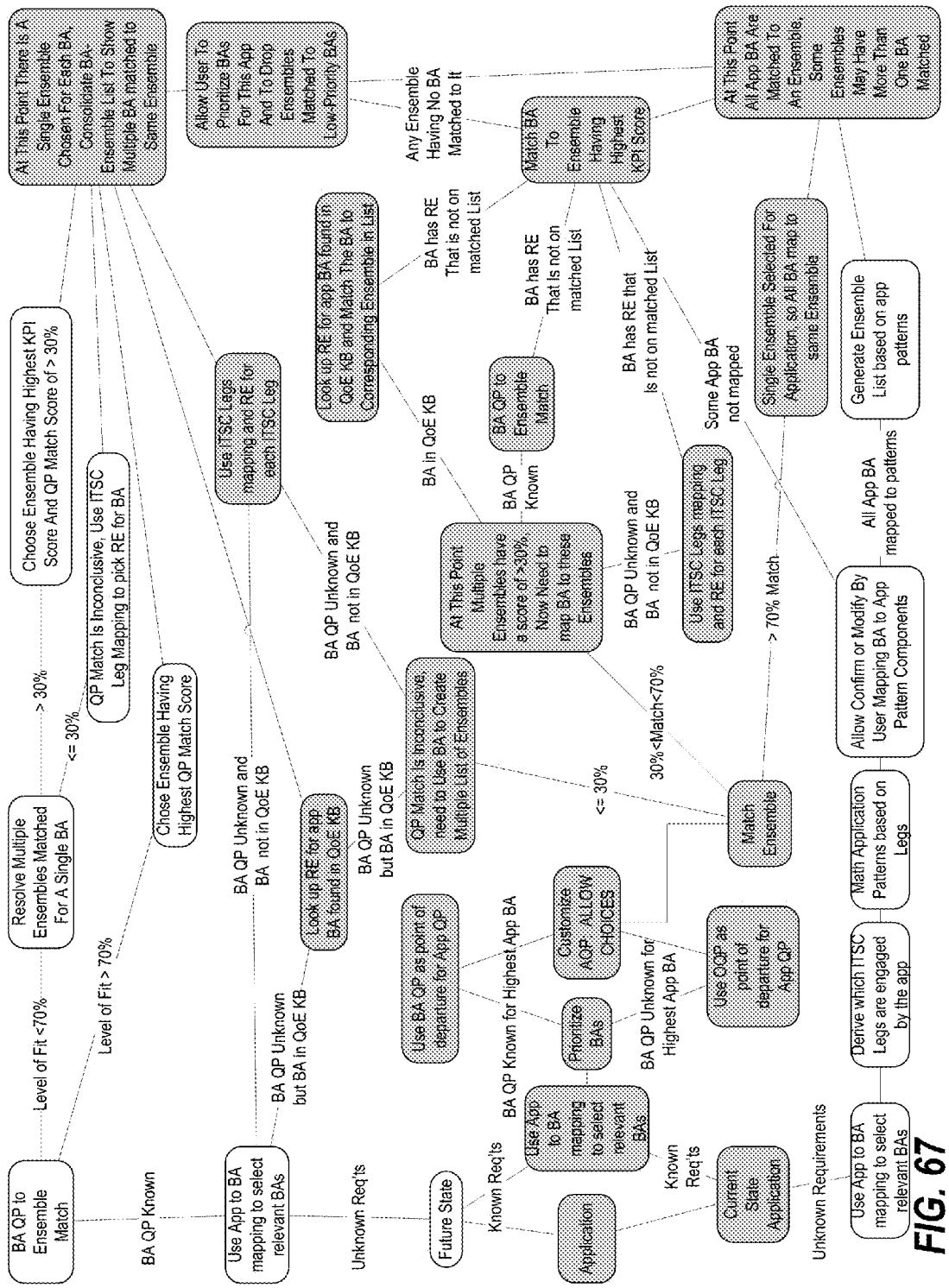
FIG. 67 illustrates a flowchart detailing exemplary decision logic.

FIG. 67 illustrates a flowchart detailing exemplary decision logic that can be utilized synthesizing these options.

First, a determination is made as to whether an application is a current state application or a future state application. If the application is a current state application, then a determination is made as to whether it has known requirements or unknown requirements.

If the application is a current state application, and it has unknown requirements, an application to business activity mapping is utilized to determine relevant business activities. These business activities are then utilized to determine which IT supply chain legs are engaged by the application. This allows for matching to application patterns based on the selection of these legs. At this point, a user can confirm presented application pattern matches, or modify a match by mapping a business activity to application pattern components. If, following this, all application business activities are mapped to patterns, then an ensemble list is generated based on these patterns. If, on the other hand, some business activities are not mapped, those business activities are matched to an ensemble based on key performance indicators. Either way, following this, all application business activities will be matched to an ensemble, although some ensembles may have more than on business activity matched thereto.

If the application is a future state application, and it has unknown requirements, the process once again begins by using an application to business activity mapping to determine relevant business activities.

For each business activity, if a quality profile for that business activity is available, that quality profile is matched to ensembles. FIG. 68 illustrates pseudo control instructions for carrying out this method.

If a level of fit for one of the ensembles is greater than a threshold value, such as seventy percent, the ensemble having the highest score is selected. If no ensemble has a level of fit greater than seventy percent, but one or more ensembles have a level of fit between a different threshold value, such as thirty percent and the seventy percent threshold value, the ensemble having a level of fit greater than thirty percent and the highest key performance indicator score is selected. If no ensemble has a level of fit greater than thirty percent, an IT supply chain leg mapping may be utilized to select a representative ensemble for the business activity. In a preferred embodiment, the threshold values would be set initially on a subjective basis and using Bayesian techniques be updated based on the frequency that the users accept the automated recommendations made. In at least some preferred implementations, other techniques for adjusting the threshold values may be utilized.

Similarly, if no quality profile is available for a business activity, and if the business activity is not in a quality of experience knowledge base, an IT supply chain leg mapping may be utilized to select a representative ensemble for the business activity. If the business activity is in a quality of experience knowledge base, a representative ensemble for the business activity is looked up from the knowledge base.

Either way, a single ensemble will have been selected for each business activity. This list of business activities and matching ensembles can be consolidated to show multiples business activities that are matched to the same ensemble. At this point, a user can prioritize business activities for the application and can even drop ensembles matched to low priority business activities. If a user drops an ensemble, then every business activity having no ensemble matched to it will be matched to one of the remaining ensembles based on key performance indicators.

Following this, all application business activities will be matched to an ensemble.

If the application is a current state or future state application with known requirements, the process once again begins by using an application to business activity mapping to determine relevant business activities. Next, business activities are prioritized. If a business activity quality profile is available for the highest priority business activity, then that business activity quality profile is utilized as the point of departure for an application quality profile. If a business activity quality profile is not available for the highest priority business activity, then an optimal quality profile based on key performance indicators is utilized as the point of departure for an application quality profile.

Either way, a user is allowed to customize the application quality profile. Next, the application quality profile is matched to ensembles. If there is an ensemble with a level of fit greater than a threshold value such as seventy percent, than the ensemble with the highest level of fit is selected for the application, and all business activities are mapped to this ensemble.

If there is no ensemble with a level of fit greater than a threshold value such as seventy percent, but there are one or more ensembles with a level of fit greater than a different threshold value such as thirty percent but less than seventy percent, then each business activity will need to be mapped to an ensemble. For each business activity, if a business activity's quality profile is known, then the business activity's quality profile is matched to an ensemble. If the business activity is in a quality of experience knowledge base, then the representative ensemble for that business activity is looked up from the quality of experience knowledge base. If the business activity's quality profile is not known and the business activity is not in a quality of experience knowledge base, then an IT supply chain leg mapping is utilized to select a representative ensemble for the business activity. Either way, for each business activity, if a representative ensemble is matched that is not on a matched list, that ensemble is added to the matched list, and an ensemble is then selected from the matched list based on key performance indicators.

If there is no ensemble with a level of fit greater than the lower threshold value of say thirty percent, and if no quality profile is available for a business activity, then it is determined whether the business activity is in a quality of experience knowledge base. If the business activity is not in a quality of experience knowledge base, an IT supply chain leg mapping may be utilized to select a representative ensemble for the business activity. If the business activity is in a quality of experience knowledge base, a representative ensemble for the business activity is looked up from the knowledge base. Either way, a single ensemble will be selected for each business activity. This list of business activities and matching ensembles can be consolidated to show multiples business activities that are matched to the same ensemble. At this point, a user can prioritize business activities for the application and can even drop ensembles matched to low priority business activities. If a user drops an ensemble, then every business activity having no ensemble matched to it will be matched to one of the remaining ensembles based on key performance indicators.

Following this, all application business activities will be matched to an ensemble.

Once candidate best fit ensembles are selected, a predictive heat map of quality fit can be derived for these ensembles comparing them to the optimal quality profile, and one or more best fit ensembles can be identified.

Next, processing execution destination engineering considerations can be identified based on consolidation of engineering rules for each selected ensemble. Similarly, required technical capabilities can be identified based on consolidation of pre-defined lists of component technical capabilities for each selected ensemble.

Optionally, physical partitioning can next be specified. This could be accomplished by, first, identifying functional partitioning of an application based on business activities having the same best fit ensembles. Business activities with the same best fit ensemble can be grouped together in the same functional partition, while business activities having different best fit ensembles usually should be in different partitions (although this might be dependent on an amount of collaboration). Notably, application or service specific requirements might cause it to make sense to utilize partitioning of mismatched best fit ensembles (e.g. an application function in one ensemble might need to invoke an application service in another ensemble). Lastly, a processing execution destination design can be generated and application partitions can be allocated to processing execution destinations.

Similarly to how it is possible to calculate an optimal quality profile, it is possible to calculate optimization suggestions. FIG. 60 illustrates pseudo control instructions for the optimization of a project quality profile.

Blueprint Dimensions

The above description describes exemplary methods for characterizing demand of an organization and systems to address this demand, e.g. systems that supply resources to address this demand.

In characterizing demand and supply, however, selecting an approach to facilitate IT decision making requires consideration of a scope of use. For example, a user could be trying to solve a point problem or working on one application. This type of view has a very narrow scope relative to the large problem sets most organizations have. Alternatively, consideration of multiple applications could be undertaken. This would be a much broader scope. These broad and narrow scopes could drive very different approaches.

Similarly, different time horizons could be examined. For example, a user could undertake an analysis based on a current state of IT (current state), design future IT (future state), or consider a transition from a current state to a future state (transition state).

Figure 69A:
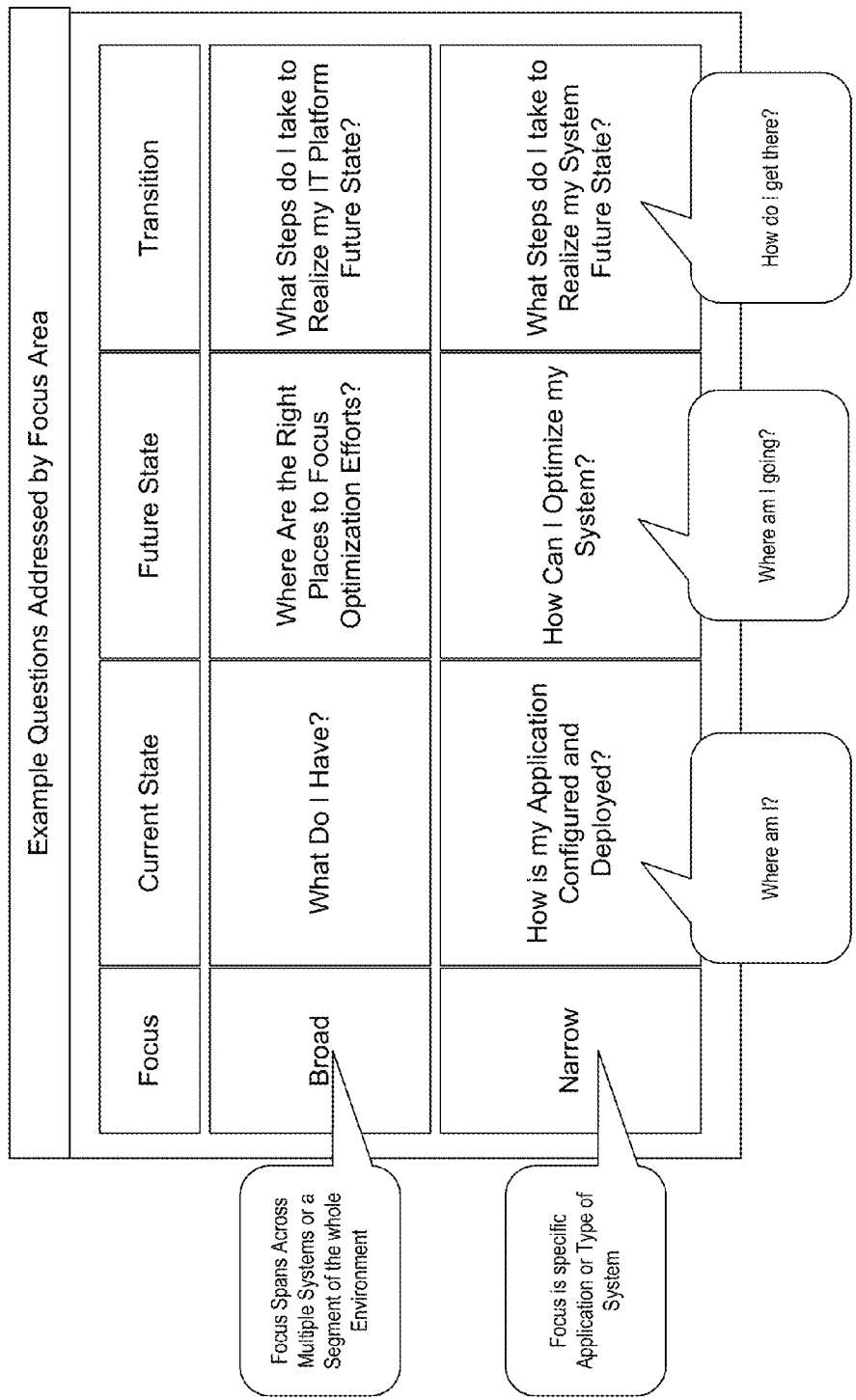
FIGS. 69A-B illustrate how choices of scope and time horizon together provide six major decision content groups with which to work in when making infrastructure changes.

The two choices of scope and the three choices of time horizon together provide six major decision content groups with which to work in when making infrastructure changes, as illustrated in FIG. 69A.

Figure 70A:
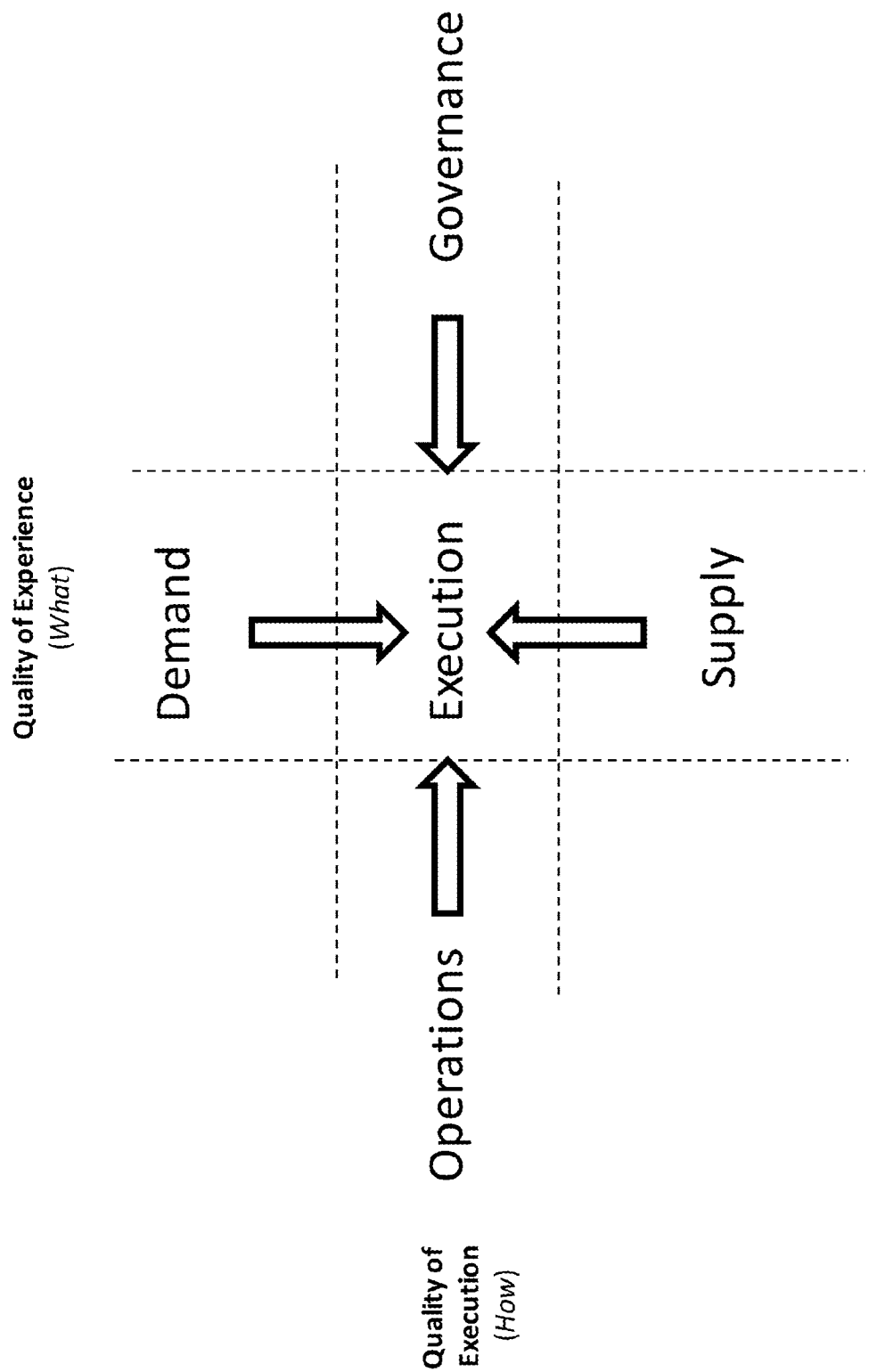
FIGS. 70A-B and FIG. 71 illustrate supply, demand, operations, governance, and execution dimensions.
Figure 70B:
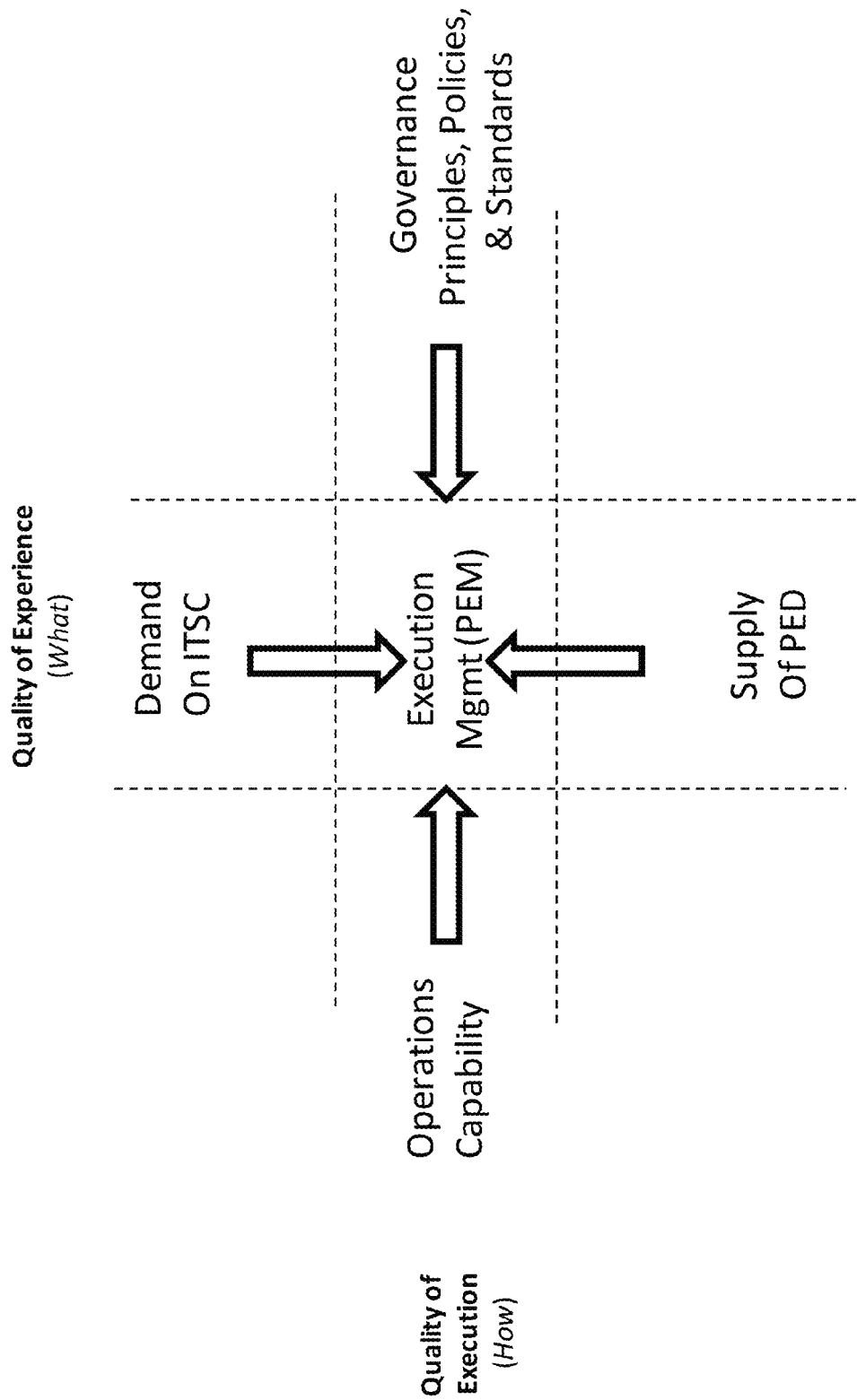

This demand and supply is also useful for organizing architecture blueprints. As illustrated, this supply and demand ideally meet in an execution dimension, where, for example, demand of an organization is met by a processing execution destination, as illustrated in FIG. 70B.

Specifically, the results of the automated reasoning described above can be organized systematically into an orthogonal set of dimensions for automatically generating IT architecture blueprints for building processing execution destinations. FIG. 70A visualizes this relationship.

Figure 69B:
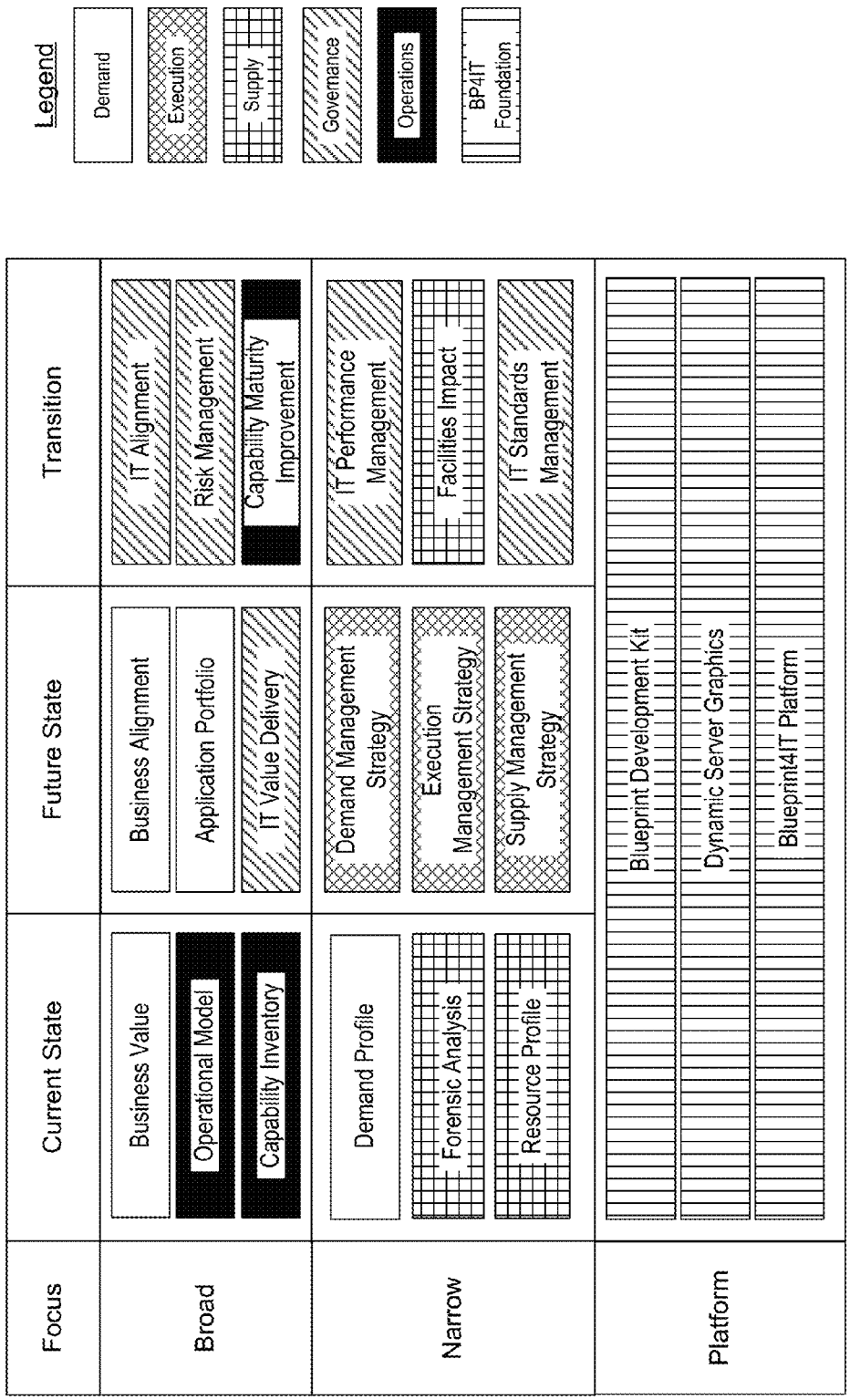
Figure 71:
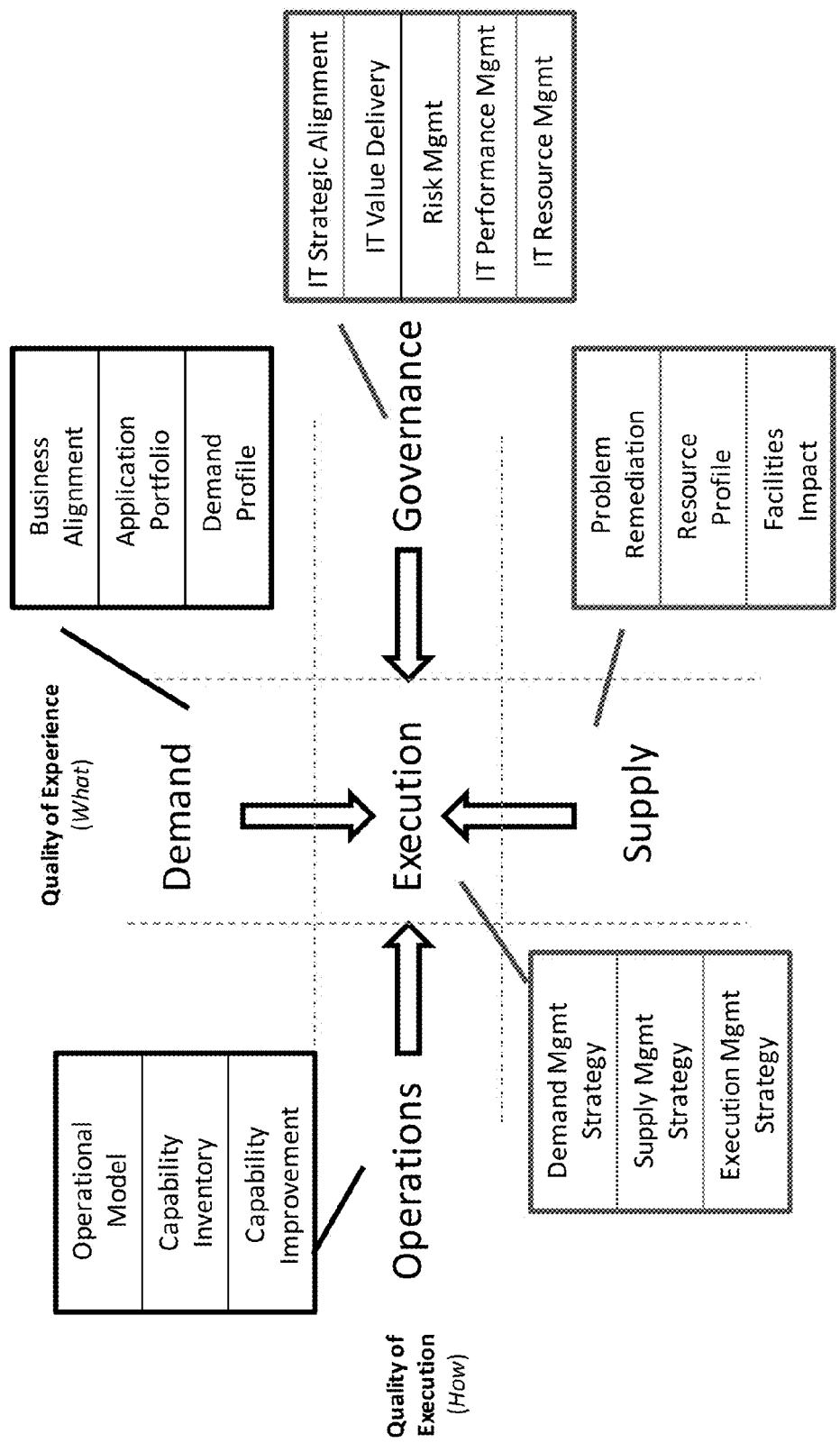

This execution dimension is managed by two additional dimensions pertaining to operations and governance. Together, these five dimensions can be characterized as providing a universe for blueprints for information technology, i.e. an IT blueprint, as illustrated in FIG. 71. Functionality associated with each of these dimensions can be associated with the choices of scope and time horizon noted above, as illustrated in FIG. 69B.

Demand Dimension

The purpose of the demand dimension is to align IT to business needs. With respect to the demand dimension, an IT blueprint preferably summarizes business process requirements and describes workload in the context of business processes. A blueprint can also present information about a portfolio of applications (e.g. the infrastructure of many applications). These goals are preferably accomplished by describing a business (e.g. utilizing a business value chain), understanding alignment of one or more applications to a business value chain, profiling a workload shape via quality of experience (e.g. a quality of experience profile of a workload pattern), profiling workload distribution utilizing functional patterns, and profiling workload volume utilizing peak period characteristics.

The demand dimension can be described utilizing information related to business alignment, application portfolios, and demand profiles.

With respect to business alignment, a line of business (LoB) of an organization can be characterized as determining a business value chain and business drivers for that organization. This business value chain includes business functions and business activities, as described hereinabove. Each of these business activities can be characterized as a business capability of the organization. The business drivers for an organization can be translated to key performance indicators (KPIs) for each business function.

Information relating to business alignment details lines of business of an organization and the business value chains and business drivers for each line of business, a breakdown of each business value chain into business functions by business value chain legs, and business drivers for each business function (which represent external characteristics of the business environment), as well as business demand characteristics for each business function (which represent internal characteristics within the business). This information also preferably details business challenges for each business function, which represent business problems (preferably independent of IT terminology), as well as IT supply chain problems for each business function (e.g. the top three might be shown). This information preferably further includes key performance indicators for each business function, which can be characterized as being related to business challenges. This information preferably still further illustrates how business capabilities can be equivalent, or map to, business activities (notably, for some large business functions, a view of multiple levels may have to be provided).

Business alignment content can be organized and displayed in various ways, e.g. at various levels of granularity from various viewpoints. Preferred methodologies of display include a display of a business value chain showing business functions by business value chain legs, a display of a line of business showing business drivers by business function, a display of a business value chain showing key performance indicators by business function, a display of a business value chain showing business capabilities by business function, a display of a business value chain showing business challenges by business function, and a display of three top IT supply chain problems by business function.

An organization can be characterized as including an application portfolio. A current state of an application portfolio for an organization would include an application inventory for each business function and/or activity. These application inventories would detail application and infrastructure services for each application in a business function and/or activity. Preferably, a future state application portfolio can be designed utilizing applications aligned to business processes, where each business process comprises one or more workloads across a business activity, and a workload represents a use case through an application.

Information relating to an application portfolio details a current state, i.e. an application inventory per business function and/or activity, as well as a future state showing applications aligned to business processes. This information preferably also details common services, which represent shared services between applications. A common service might be an infrastructure service oriented architecture service or a service oriented architecture business service offered by an application. Common services are consumed by applications.

Application portfolio content can be organized and displayed in various ways, e.g. at various levels of granularity from various viewpoints. Preferred methodologies of display include a display of a business value chain showing business processes by business value chain, a business value chain showing business activities by business process, a business value chain showing current applications by business activity, a business value chain showing business processes with application associations, a business value chain showing future state alignment of applications to business activities, a service oriented architecture manifest showing services consumed and offered for each application, and a services inventory showing applications by shared service (i.e. what applications use the same shared service).

Demand profiles can be generated at various levels of granularity and scope. A demand profile for a leg, or link, of a business value chain describes a representative workload for a business function. A quality profile for a business activity describes a representative workload for a business activity, which can be characterized as a canonical shape of demand. A workload quality profile describes the shape of demand for a workload. A functional pattern can be characterized as describing a distribution of demand within a workload. Peak period characteristics describe a dimensioning peak volume of unit of work for a workload, i.e. a volume of demand.

Information relating to demand profiles includes business function demand characteristics for a business value chain leg, business activity quality profiles showing representative workloads per business activity, workload quality profiles showing a shape of demand per workload, functional patterns showing distribution of demand within a workload, known problems per functional pattern linked to functional components, and peak period characteristics.

Demand profile content can be organized and displayed in various ways, e.g. at various levels of granularity from various viewpoints. Preferred methodologies of display include a display of workload quality profiles by business value chain leg, workload quality profiles by business activity, workload quality profiles by business process, functional patterns by business process, functional pattern components by functional pattern, known problems by functional pattern, workload quality profile linkage to key performance indicator dimensions, business activity to functional pattern allocation, data qualities by business process, workloads by business process, workload volume detail by business process, security qualities by business process, and network qualities by business process.

Execution Dimension

The purpose of the execution dimension is effective balancing of supply and demand. With respect to the execution dimension, an IT blueprint preferably describes workload imprint on infrastructure, defines workload management policies, demonstrates optimal utility usage, defines resource allocation policies, and defines processing execution destination management infrastructure (PEM). These goals are preferably accomplished by defining logical architecture utilizing static deployment patterns, using information patterns to derive data, security, and network policies, using ensembles to define high level resources, define a resource allocation strategy, deriving runtime services from ensembles and the resource allocation strategy, profiling expected resource consumption, and defining PEM infrastructure required to control and monitor observed resource consumption.

Figure 72:
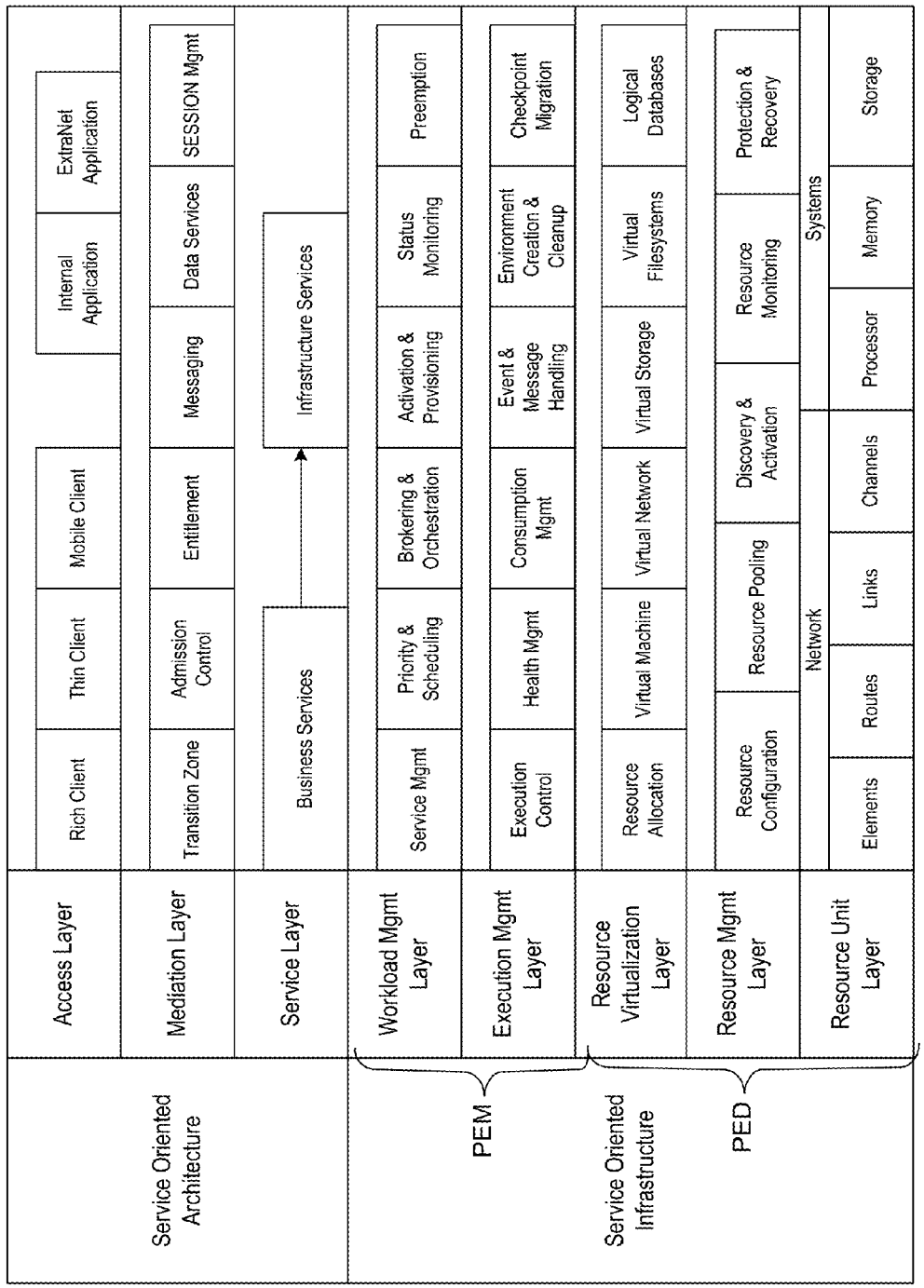
FIG. 72 illustrates how service oriented infrastructure, service oriented architecture, a processing execution destination, and a processing execution destination management infrastructure can be mapped to an enterprise stack.

The execution dimension can be described utilizing information related to demand management strategy (associated with service oriented architecture), supply management strategy (associated with service oriented infrastructure), and execution management strategy. FIG. 72 illustrates how service oriented infrastructure, service oriented architecture (notably, the phrases infrastructure and architecture may each be utilized herein to describe both architecture and infrastructure, although in this description a distinction is made), a processing execution destination, and a processing execution destination management infrastructure can be mapped to an enterprise stack.

With respect to demand management strategy, logical architecture can be characterized by a logical (static) deployment model, e.g. static deployment patterns can be utilized as architecture design templates. A workload allocation policy details the relative priority of workloads over time. Preferably, a predicted resource impact and resource pool dimensioning are available and utilized. Similarly, observed resource consumption is preferably available, e.g. via forensic heat map.

Information relating to demand management strategy includes information pertaining to logical architecture, workload resource consumption ratios (i.e. resource occupancy/unit of work, which, when multiplied by peak volume produces a resource utilization forecast, which is preferably also included), and workload priority information.

Demand management strategy content can be organized and displayed in various ways, e.g. at various levels of granularity from various viewpoints. Preferred methodologies of display include a display of logical architecture showing static deployment patterns, forecasted resource utilization per deployment pattern component, workload priority aligned to business priorities, deployment patterns by deployment pattern family, functional component allocation to deployment patterns, predicted quality of experience heat map based on ensembles, predicted resource heat map based on ensembles, forensic heat maps, forensic heat map synthesis, and forensic event annotations.

With respect to supply management strategy, server ensembles can be characterized as a fit for purpose server (container) for a workload. Information policies describe data, network, and security usage for a workload. A resource allocation policy identifies whether resource allocation is static, virtual, time pivoting, dynamic, or cloud based.

Supply management strategy content can be organized and displayed in various ways, e.g. at various levels of granularity from various viewpoints. Preferred methodologies of display include a display of ensemble mappings by quality profile, ensemble fit analysis results, server ensemble technical capability details, business applications allocated to ensembles, a predicted quality heat map based on ensembles, security ensembles, security policies by information pattern for security, security policy technical capability manifests by information pattern used, storage ensembles, data policies by information pattern for data, data policy technical capability manifests by information pattern used, network ensembles, network policies by information pattern for networks, network policy technical capability manifests by information pattern used, resource allocation policy details, database server technical capability information, and forensic storage usage.

Execution management strategy relates to processing execution destination management infrastructure capabilities and runtime services, e.g. surround services per architecture stack layer. Information relating to execution management strategy includes information pertaining to predicted impact and resource pool dimensioning (sizing), PEM infrastructure technical capabilities (e.g. monitoring, security, network management, and provisioning), observed resource consumption (e.g. via a forensic heat map), and runtime services.

Execution management strategy content can be organized and displayed in various ways, e.g. at various levels of granularity from various viewpoints. Preferred methodologies of display include a display of resource pool sizing analysis, a monitoring technical capabilities manifest, and an execution management services stack.

Supply Dimension

The purpose of the supply dimension is to optimize the use of resources. With respect to the supply dimension, an IT blueprint preferably determines an optimal quantity of resources by type, illustrates an amount of resource reuse, shows remediated problems, a logical architecture, and physical engineering models, and illustrates a next generation data center (i.e. an optimized future IT configuration).

These goals are preferably accomplished by sizing and dimensioning processing execution destinations as pools of resources, mapping resource units onto processing execution destinations, identifying reuse opportunities, remediating known problems, and profiling resource impact on facilities.

The supply dimension can be described utilizing information related to problem remediation, resource profiles, and facilities impacts.

Information relating to problem remediation includes information pertaining to known problems (KPs) having a known cause, known problems by functional pattern, known problems by deployment pattern, known problems by information pattern, known problems by capability. Preferably, a forensic heat map and information related thereto are provided as well.

Problem remediation content can be organized and displayed in various ways, e.g. at various levels of granularity from various viewpoints. Preferred methodologies of display include a display of mappings of workload symptoms to known problems for functional patterns, performance/availability symptoms to known problems for deployment patterns, security symptoms to known problems for information patterns, network types, network symptoms to known problems for information patterns, storage symptoms to known problems for information patterns, usage symptoms to technical capability related known problems for technical capabilities, execution symptoms to PC related known problems for process capabilities, known problems to known remediations for functional patterns, known problems to known remediations for deployment patterns, known problems to known remediations for security, storage, and network information patterns, known remediations to a capability summary, and a forensic heat map to symptoms. Preferably, display of security domains and storage types can also be provided.

Information relating to resource profiles includes information detailing processing execution destinations as pools of fit for purpose resources. Elasticity tactics include a virtualization strategy (thin provisioning), resource orchestration strategy (resource pivoting), and resource sourcing strategy (cloud resources). A resource inventory details how much of each type of resource is available (including appliances optimized to efficiently execute specific workload types). A virtual resource inventory details what resources are virtualized and how they map to physical resources. Preferably, a workload quality of experience to service continuity mapping is provided.

Resource profile content can be organized and displayed in various ways, e.g. at various levels of granularity from various viewpoints. Preferred methodologies of display include display of processing execution destination capability manifests, processing execution destination sizing analysis, processing execution destination virtual to physical allocation, thin provisioning rules, storage tiers, resource inventory usage schedules by resource type, resource inventories by application, a resource reuse summary, and processing execution destination service continuity aspects.

Information relating to facilities impacts includes a footprint consumption profile detailing a processing execution footprint as a function of time, a power consumption profile detailing processing execution destination power required as a function of time, a cooling consumption profile detailing processing execution destination cooling required as a function of time, and processing execution component physical requirements (e.g. rack unit sizes, power, heat).

Facilities impact content can be organized and displayed in various ways, e.g. at various levels of granularity from various viewpoints. Preferred methodologies of display include display of footprint consumption (rack view) profiles per processing execution destination, footprint consumption (floor view) profiles per processing execution destination, footprint cost analysis per processing execution destination, power consumption profiles per processing execution destination, power cost analysis per processing execution destination, cooling consumption profiles across processing execution destinations, cooling cost analysis per processing execution destination, facilities cost analysis per processing execution destination, a next generation data center financial summary, and external cloud cost information.

Operations Dimension

With respect to the operations dimension, an IT blueprint preferably illustrates an operational model, highlights major operational policies, summarizes operational maturity, and provides a capability improvement roadmap.

The operations dimension can be described utilizing information related to an operational model, a capability inventory, and capability improvement.

Figure 73:
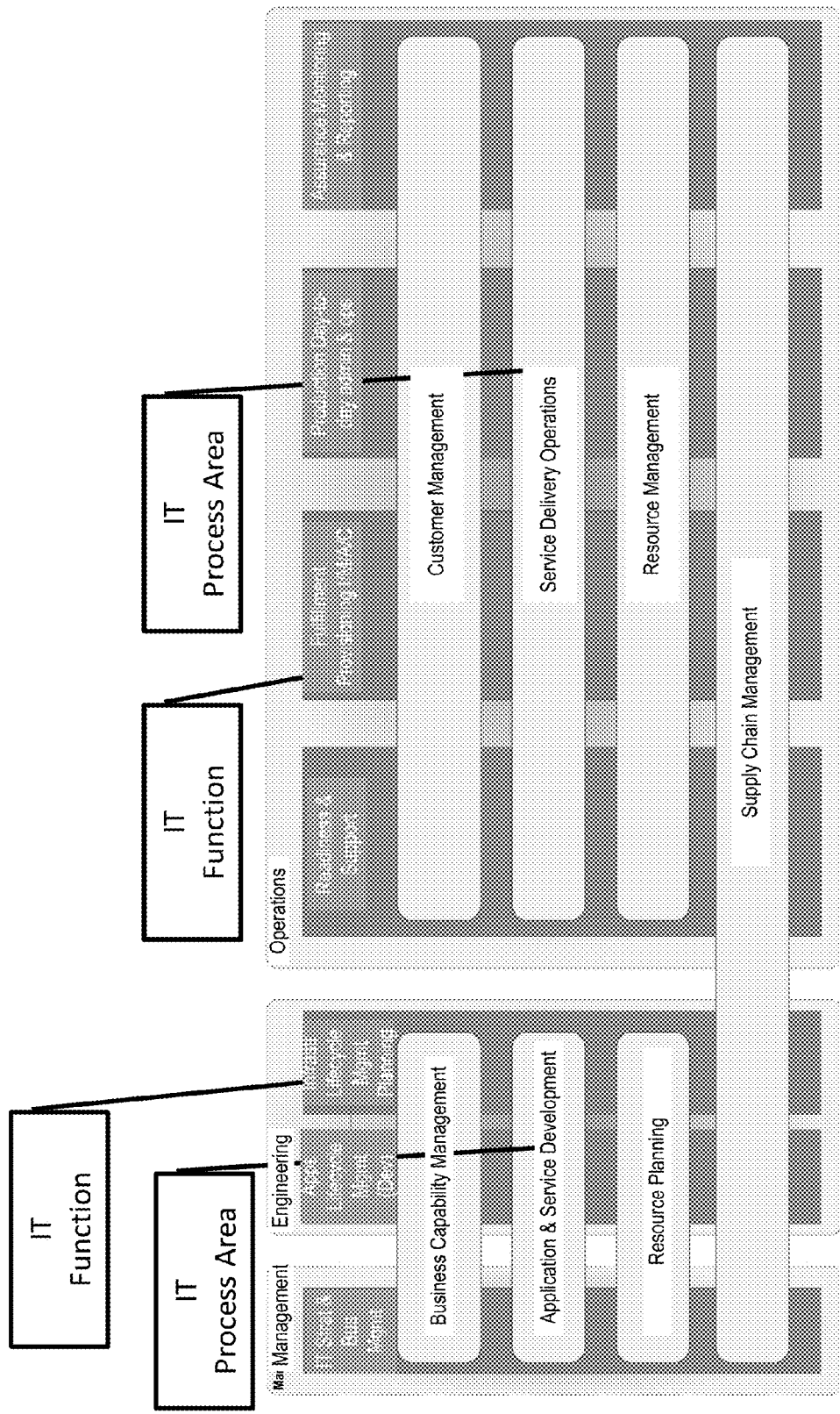
FIG. 73 illustrates an exemplary operational model.

Information relating to an operational model includes information related to IT functions, IT process areas, operations policies and standards, and resource maintenance requirements (e.g. planned unavailability, upgrades, backups, patches, hardware service, change management, etc.). FIG. 73 illustrates an exemplary operational model.

Operational model content can be organized and displayed in various ways, e.g. at various levels of granularity from various viewpoints. Preferred methodologies of display include display of IT organization by IT function, IT organization by IT process area, operational policy technical capability details, operational policy process capability details, and resource maintenance and planned unavailability schedules.

Information relating to a capability inventory includes a technical capability assessment, a view of technical capabilities by enterprise stack by maturity level, a process capability assessment, a view of process capabilities by IT function and IT process area, a competency capability assessment, and a capability inventor, i.e. a summary of capability assessment findings.

Capability inventory content can be organized and displayed in various ways, e.g. at various levels of granularity from various viewpoints. Preferred methodologies of display include display of a process assessment detail report, a technical assessment detail report, a competency assessment detail report, process capabilities by IT process area, process capabilities by IT function, process capabilities by utility focus area for current maturity, technical capabilities by IT process area, technical capabilities by IT function, technical capabilities by utility focus area for current maturity, competency capabilities by IT function, a capability summary scorecard by IT function, a capability summary scorecard by IT process area, and a capability summary scorecard by utility focus area. FIG. 74 illustrates exemplary capability summary scorecards by IT function, IT process area, and utility focus area.

Capability improvement allows for the selection of targets and constraints. A focus area roadmap can be built from capability time and effort relative to an assessment. Capability improvement in operations preferably is near term in focus based on an IT function or IT process area lens. The governance dimension relates to longer term improvement based on a utility delivery lens.

Figure 75:
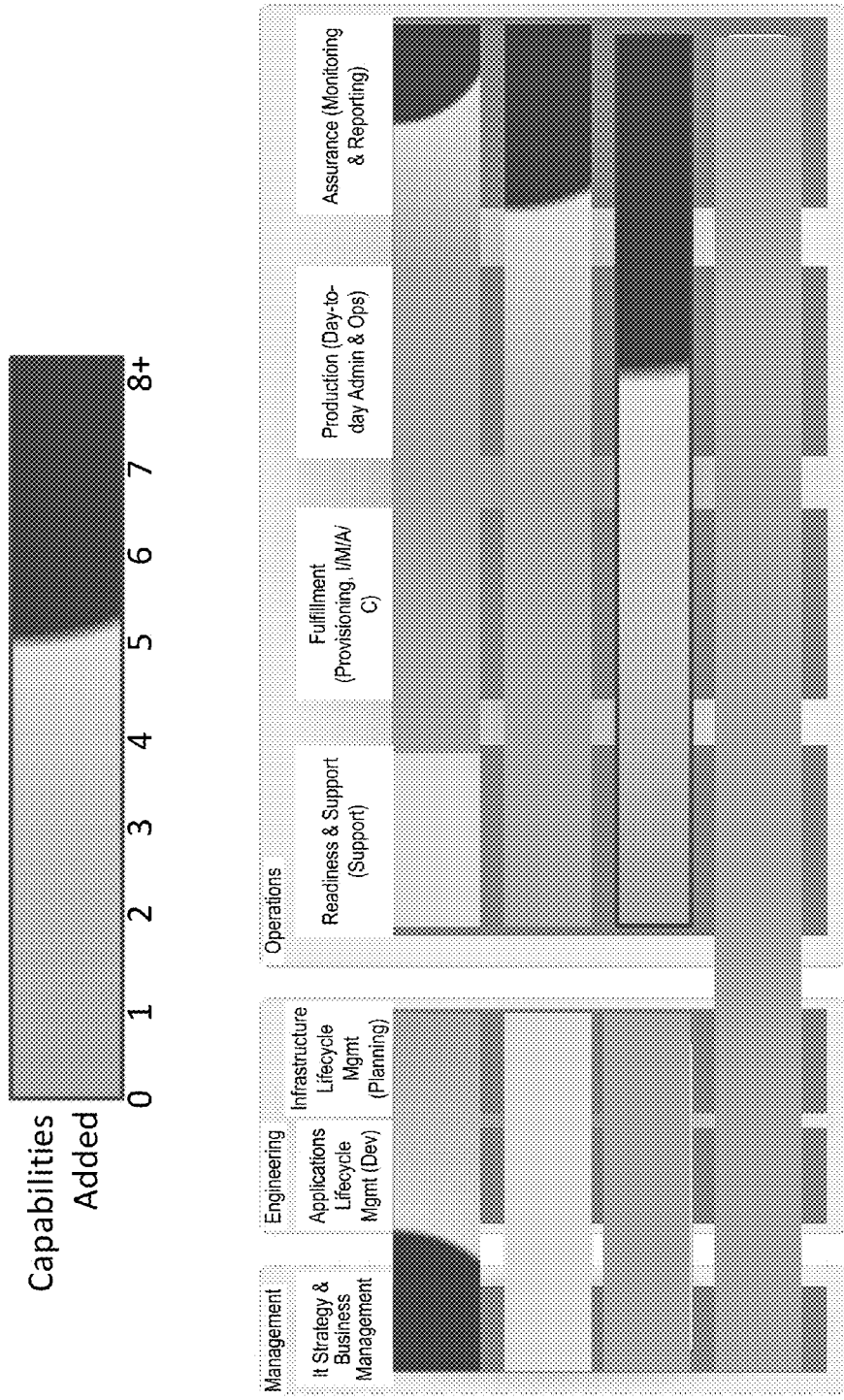
FIG. 75 illustrates an exemplary capability heat map.

Capability improvement content can be organized and displayed in various ways, e.g. at various levels of granularity from various viewpoints. Preferred methodologies of display include display of a capability heat map, focus area selections and constraints, and capability improvement program roadmaps. FIG. 75 illustrates an exemplary capability heat map.

Governance Dimension

The purpose of the governance dimension is to define how IT is accountable to an organization and to establish the policies and standards by which IT is to be managed. With respect to the supply dimension, an IT blueprint preferably establishes governance practices based on a recognized IT governance framework.

An exemplary IT governance framework includes strategic alignment, value delivery, risk management, standards management, and IT performance management governance domains. The strategic alignment governance domain relates to understanding the needs of a business, developing IT strategy and objectives, resource allocation and portfolio management, demand management, and communication. The value delivery governance domain relates to identifying project value drivers, identifying service value drivers, project management, and external benchmarking. The risk management governance domain relates to organizational risk appetite, project and investment risk mitigation, information security risk mitigation, operational risk mitigation, compliance regulatory mandates, and auditing. The standards management governance domain relates to hardware and software asset management, third party service provider management, standardized architecture, and financial management, e.g. service costing. The IT performance management governance domain relates to customer satisfaction, service level management, business value measurement, and process improvement.

In accordance with these governance domains, the governance dimension can be described utilizing information related to strategic alignment, IT value delivery, risk management, IT performance management, and IT standards management.

Strategic alignment encompasses IT planning objectives and priorities, e.g. key performance indicators for IT, such as, for example, to reduce cost or improve scalability. Strategic alignment further encompasses alignment measure and application portfolio management discipline and process.

Strategic alignment content can be organized and displayed in various ways, e.g. at various levels of granularity from various viewpoints. Preferred methodologies of display include display of IT planning objectives and key performance indicators, IT improvement programs by IT key performance indicators, IT improvement programs by IT function, strategic alignment scorecards, application future state portfolios, application future state transitions, and applications by portfolio process stage.

IT value delivery, which can also be characterized as utility value delivery, encompasses IT value models, information regarding utility utilization and value for money, and utility investment plans (e.g. detailing a proportion of investment in reusable infrastructure products and management tools).

IT value delivery content can be organized and displayed in various ways, e.g. at various levels of granularity from various viewpoints. Preferred methodologies of display include the display of value models by project initiative, value delivered summaries, utility utilization information, utility resource reusable capacity plans, and utility resource reuse by project.

Risk management encompasses IT policy standards and guidelines, operational risk mitigation, and architecture control. Risk management can encompass an architecture review process.

Risk management content can be organized and displayed in various ways, e.g. at various levels of granularity from various viewpoints. Preferred methodologies of display include the display of IT policies by IT function, IT policy compliance by application, architecture council strategic priorities, architecture review portfolio status, architecture review scorecards, architecture remediation action plans, operational risk reduction strategic priorities, operational risk reduction by capability, and operational risk reduction by capability by project.

IT performance management encompasses capability maturity, IT service accountability, customer satisfaction, IT competency improvement, chief technology officer related processes (e.g. product release, product research, etc.), and supplier performance assessments.

IT performance management content can be organized and displayed in various ways, e.g. at various levels of granularity from various viewpoints. Preferred methodologies of display include the display of service level agreements by business function, execution level agreements by processing execution destination, operation level agreements by application, capacity assessments by IT function, capability usage by IT project, capability improvement programs by IT function, and capability maturity improvements by utility focus area.

IT standards management encompasses architecture principles and standards, ensemble lifecycle management, architecture tradeoff analysis method (ATAM) standards selection, IT lab processes, IT sourcing evaluation, supply chain sourcing strategy, and application harvesting.

IT standards management content can be organized and displayed in various ways, e.g. at various levels of granularity from various viewpoints. Preferred methodologies of display include the display of architecture principles, policies, and standards, architecture standard usage by project, corporate architecture tradeoff analysis method standards, architecture tradeoff analysis method evaluations by technology capability, ensemble lifecycle plans, cloud sourcing policies, and outsourcing policies by operations function.

Exemplary Software

Software for IT design in accordance with one or more preferred embodiments of the present invention is configured to present IT from a variety of views based on user roles. The variety of views IT is presented from can be characterized as user interface (UI) views. Preferably, each of these views aligns to one of the dimensions of an IT blueprint described hereinabove.

Figure 76:
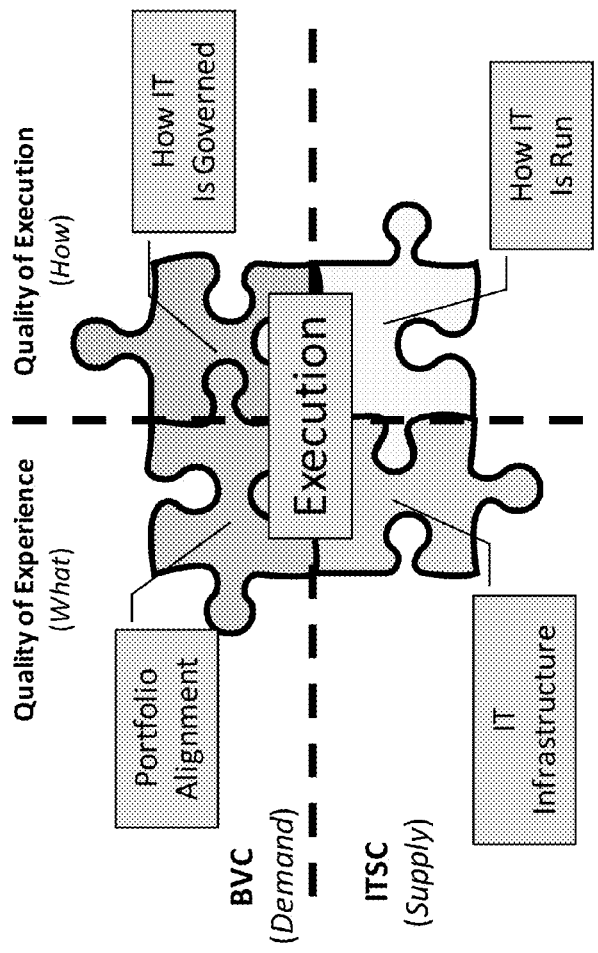
FIG. 76 illustrates an exemplary user interface visualization.
Figure 77:
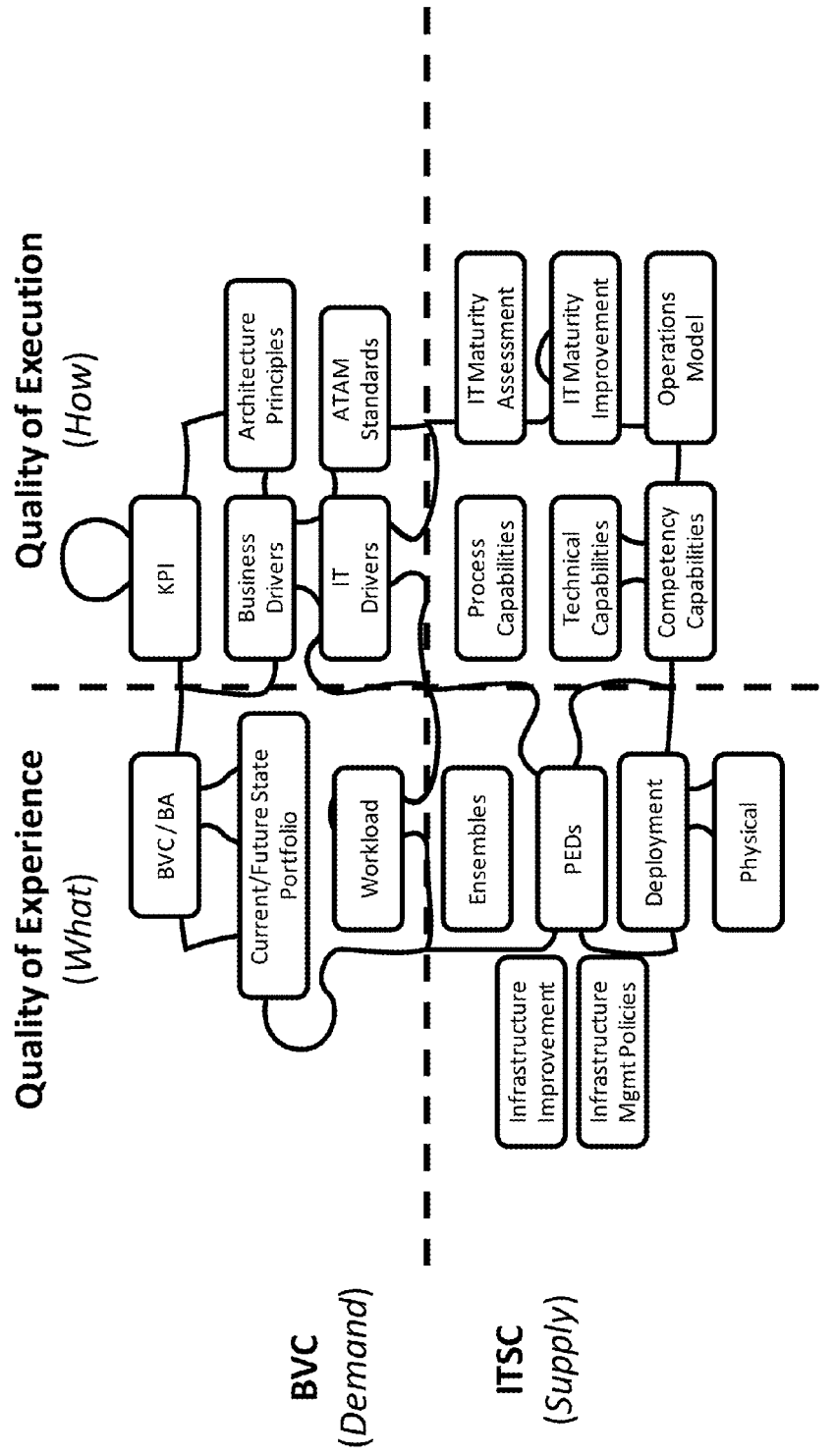
FIG. 77 illustrates exemplary topics that can be explored focus areas accessible via the user interface visualization of FIG. 76.

In at least some implementations, a UI visualization is utilized that allows a user to select an area of focus as well as a workflow to follow. FIG. 76 illustrates an exemplary such visualization. A user can choose to focus on workload (identifying what demand is), execution (where demand meets supply), next generation infrastructure (what supply is ideal), IT capability improvements (how supply is provided), or IT governance (how demand is determined). FIG. 77 illustrates exemplary topics that can be explored within each focus area. It will be appreciated that these focus areas also correspond to the IT blueprint dimensions described hereinabove. In at least some preferred implementations, these focus areas provide access to, or are associated with, one of the UI views.

Figure 78:
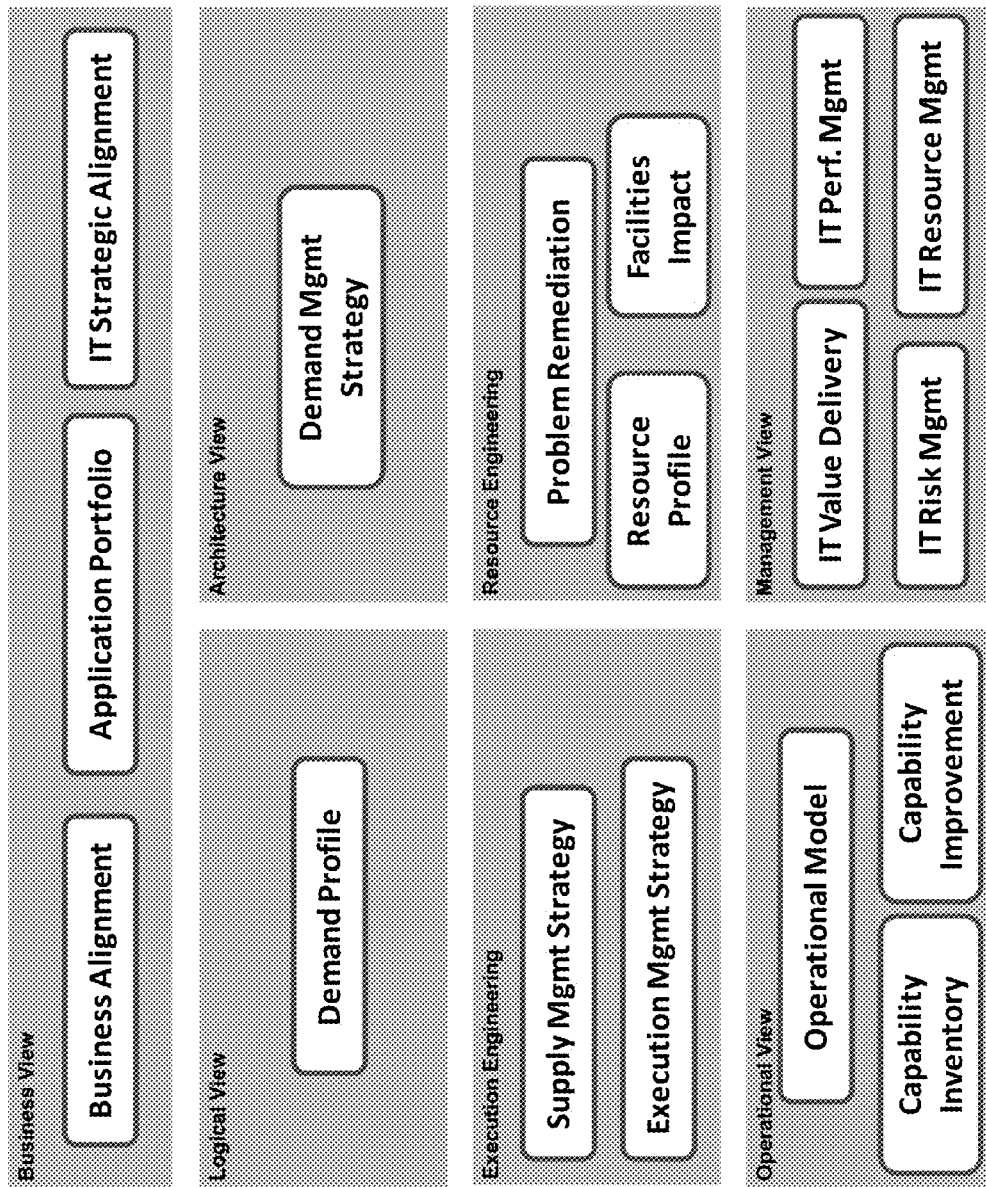
FIG. 78 illustrates user interface views.
Figure 79:
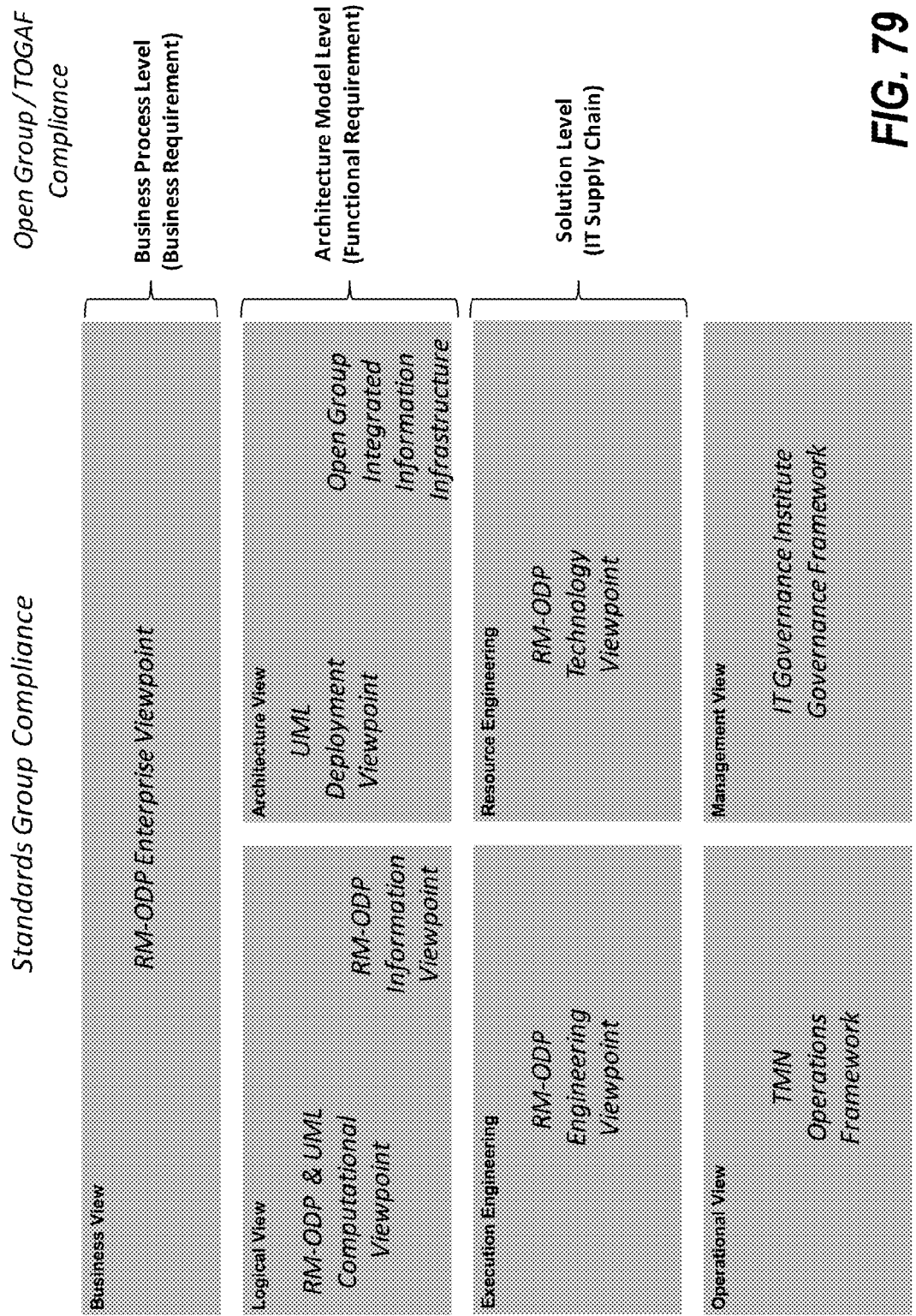
FIG. 79 illustrates compliance standards for the user interface views of FIG. 78.

The UI views include a business view, a logical view, an architecture view, an execution engineering view, a resource engineering view, an operational view, a governance view, and an administrative view. FIG. 78 illustrates each of these views. As illustrated, information associated with dimensions of an IT blueprint described hereinabove can be characterized as being associated with one of these views. FIG. 79 illustrates compliance standards for these views.

Figure 80:
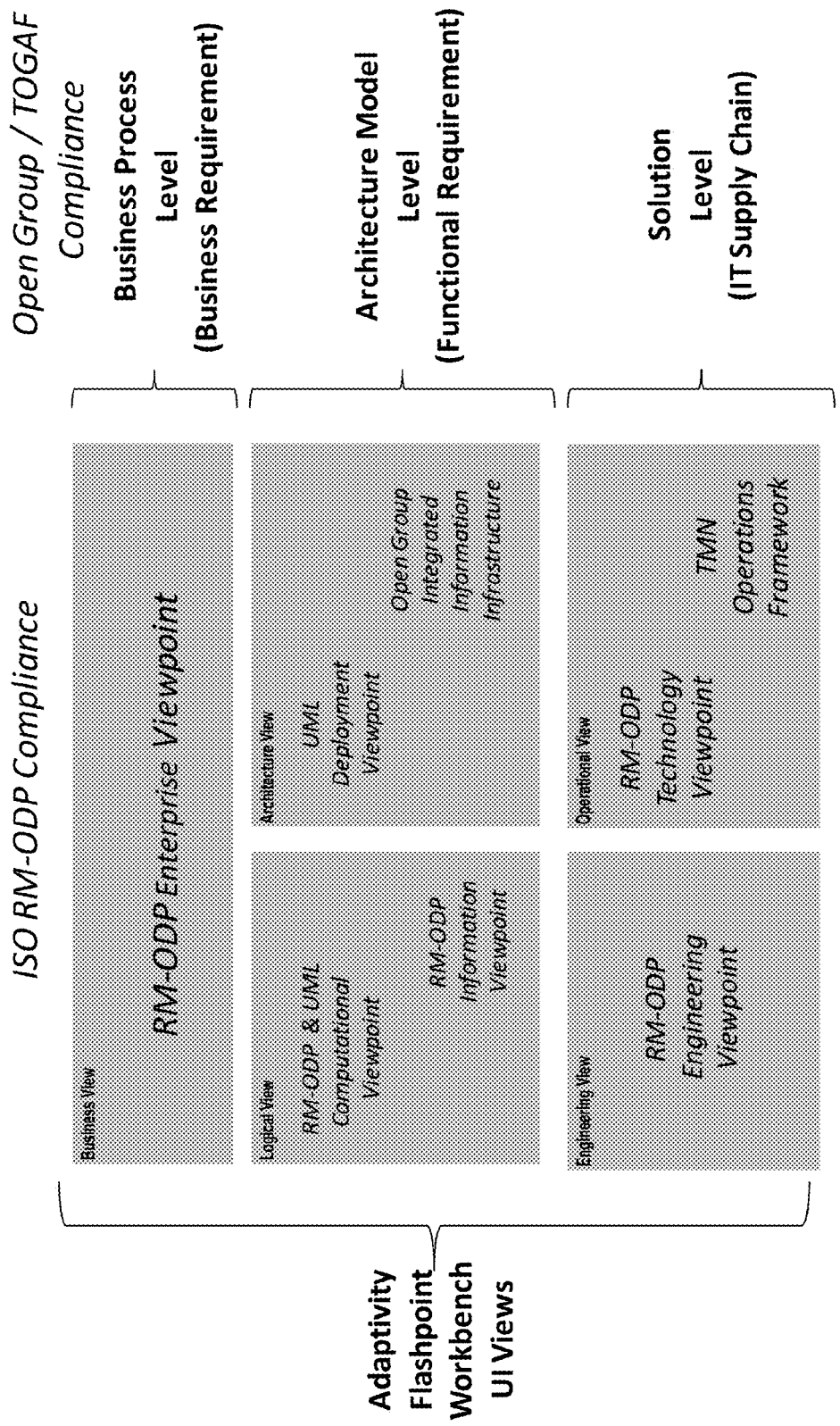
FIG. 80 illustrates how architecture can be described from multiple user interface views.
Figure 81:
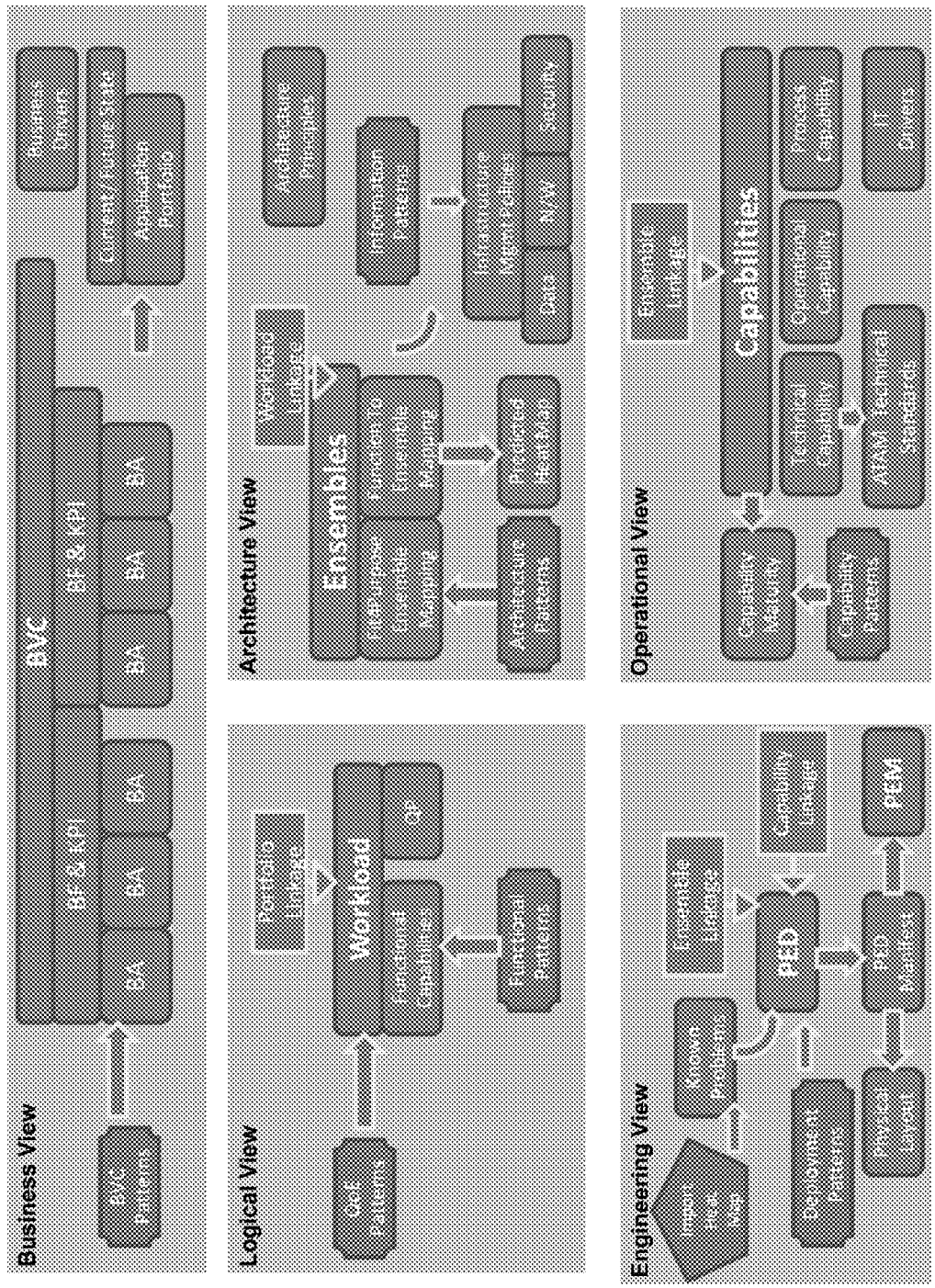
FIG. 81 provides a mapping of concepts to each of the views of FIG. 80.

FIG. 80 illustrates how architecture can be described from multiple UI views, and FIG. 81 provides a mapping of concepts to various views.

Each view allows for the generation of blueprints corresponding to the IT blueprint dimension that view is associated with. The process for generating such a blueprint is generally similar for each view and follows a well-defined workflow that can be configured by an administrative user. Specifically, scope is defined, patterns are selected, design is carried out, tuning is performed, and then a blueprint is generated. FIG. 82 illustrates this generalized process for each view. It will be appreciated that patterns, such as those described hereinabove, are selected and manipulated in such processes. Preferably, an administrative pattern browser tool allows patterns to be added, removed, or updated.

Each of these views, as well as processes therefore, will now be described in more detail.

Turning first to the business view, an objective associated with the business view is to establish business alignment. This includes, for example, the definition of a business value chain and business drivers and key performance indicators. Another objective associated with the business view is the mapping of an application portfolio. This can include both a current and a future state, as well the relative priority of business activities per application. Notably, definition and analysis of workloads within the application portfolio is not an objective of this view, rather it is the primary objective of the logical view as described hereinbelow.

Figure 83:
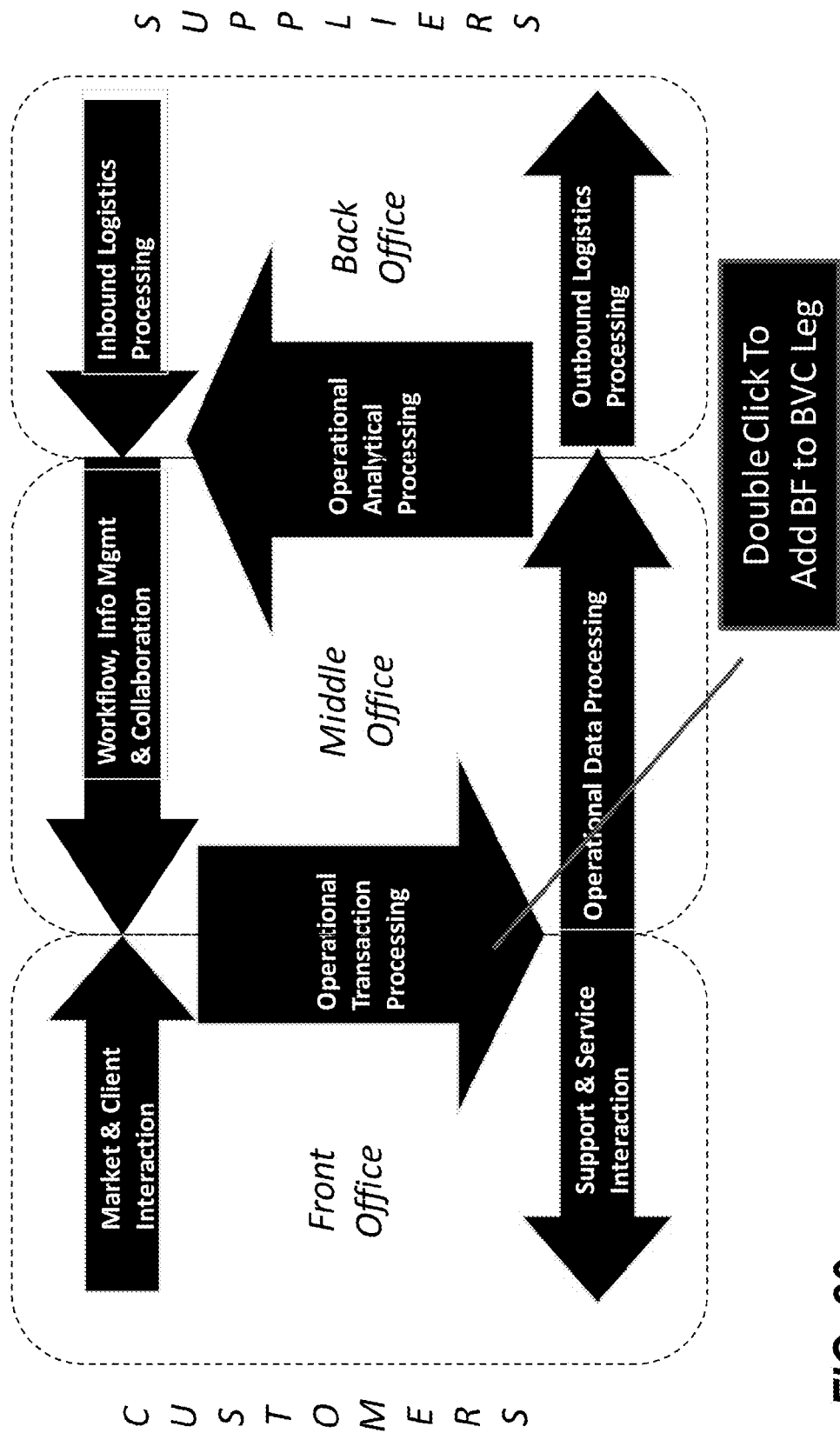
FIG. 83 illustrates a business value chain visualization.
Figure 84:
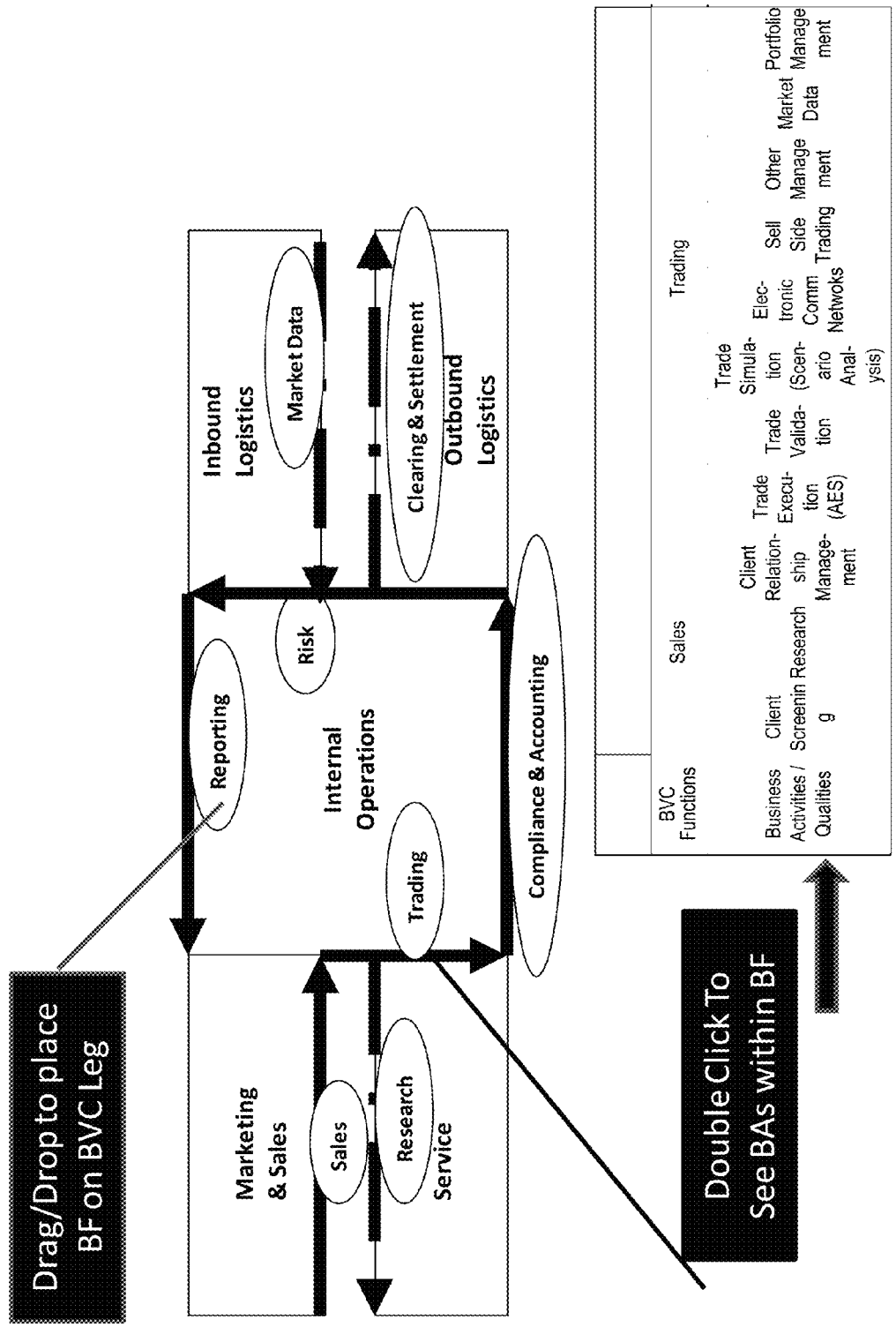
FIG. 84 illustrates how a business function can be double clicked to see business activities within it, as well as how a business function can be dragged and dropped onto a business value chain leg.

Preferably, functionality is provided to accomplish these objectives. Such functionality includes the definition of a business value chain, for example by importing a business value chain for a vertical from a business pattern knowledge base. Alternatively, a business value chain can be created from scratch by defining business functions on business value chain legs, for example by clicking on a leg in of a business value chain visualization such as the one illustrated in FIG. 83. Functionality is further provided to define key performance indicators for each business function. For example, key performance indicators can be detailed as business drivers. Functionality is additionally provided to define business activities within business functions, for example by importing similar business activities from a business value chain pattern knowledge base. Functionality is still further provided to define an application portfolio. This includes the definition of future state applications, current state applications, and transition timelines. Lastly, functionality is provided to link applications to business, for example by showing business activities implemented or prioritizing business activities supported by an application. FIG. 84 illustrates how a business function can be double clicked to see business activities within it, as well as how a business function can be dragged and dropped onto a business value chain leg.

The business view can be characterized as utilizing business value chain patterns, which can be contained in a knowledge base of business value chains, business functions, and business activities, with business functions mapped to business value chain legs.

Figure 85A:
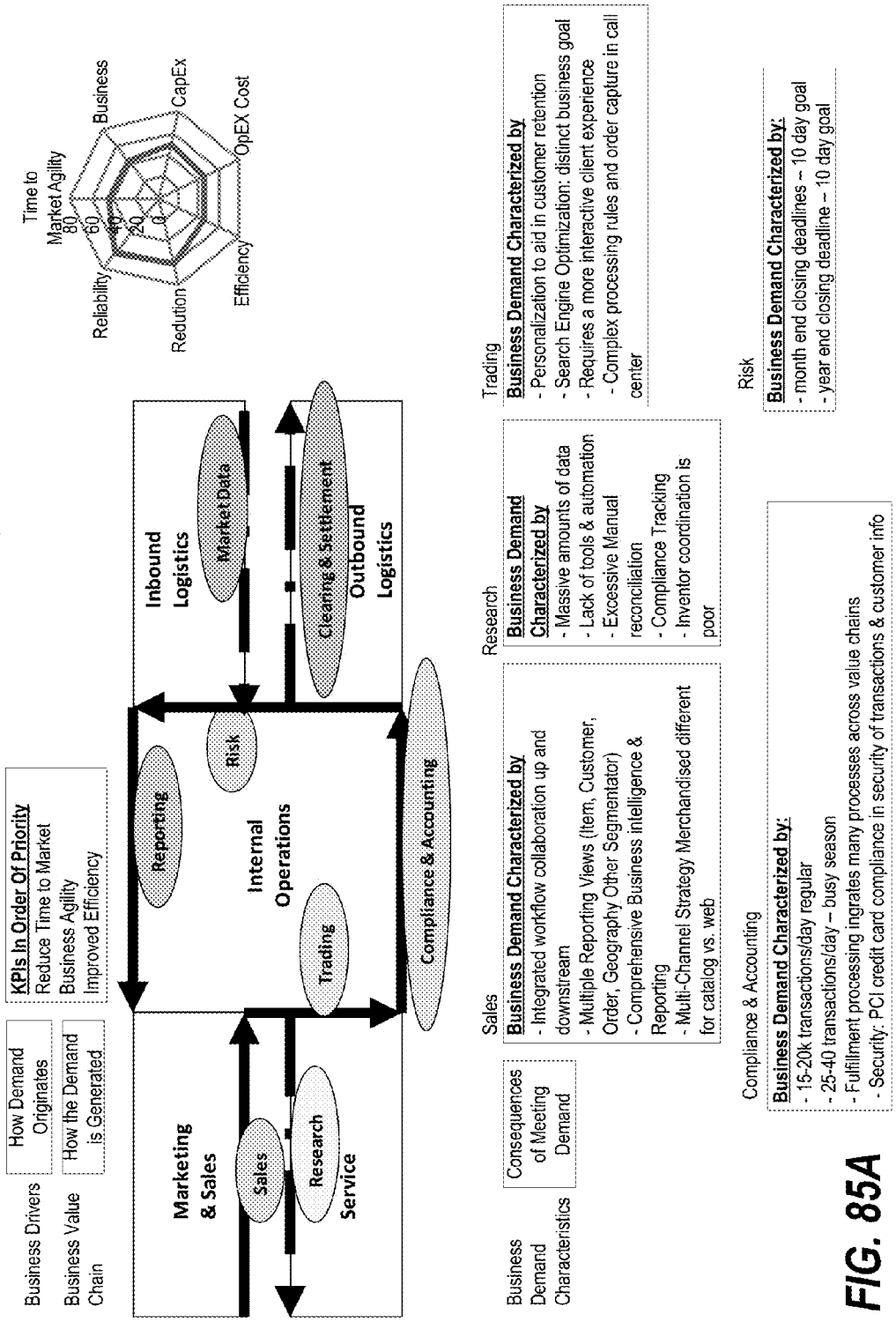
FIG. 85 illustrates an exemplary business context blueprint sheet.

FIG. 85 illustrates an exemplary business context blueprint sheet. The blueprint shows how demand originates via the ranking of key performance indicators, how demand is generated based on a business value chain, the consequences of meeting demand via business demand characteristics, and an application portfolio.

Turning to the logical view, as noted above, the primary objective of the logical view is to describe and analyze a workload. This description and analysis focuses on a single workload at a time. For example, a selected workload can correspond to an entire application, a workload within an application, or the work performed by a single business activity.

A selected workload is described using a quality of experience profile. The processing of the workload is described using functional patterns. Preferably, top supply chain problems being experienced are identified. Further, common services that the selected workload needs to leverage that are not an integral part of the workload are also preferably identified, such as, for example, ecommerce gateways, client databases, or printing. Notably, the logical view is not concerned with generating ensembles or problem analysis.

Figure 86:
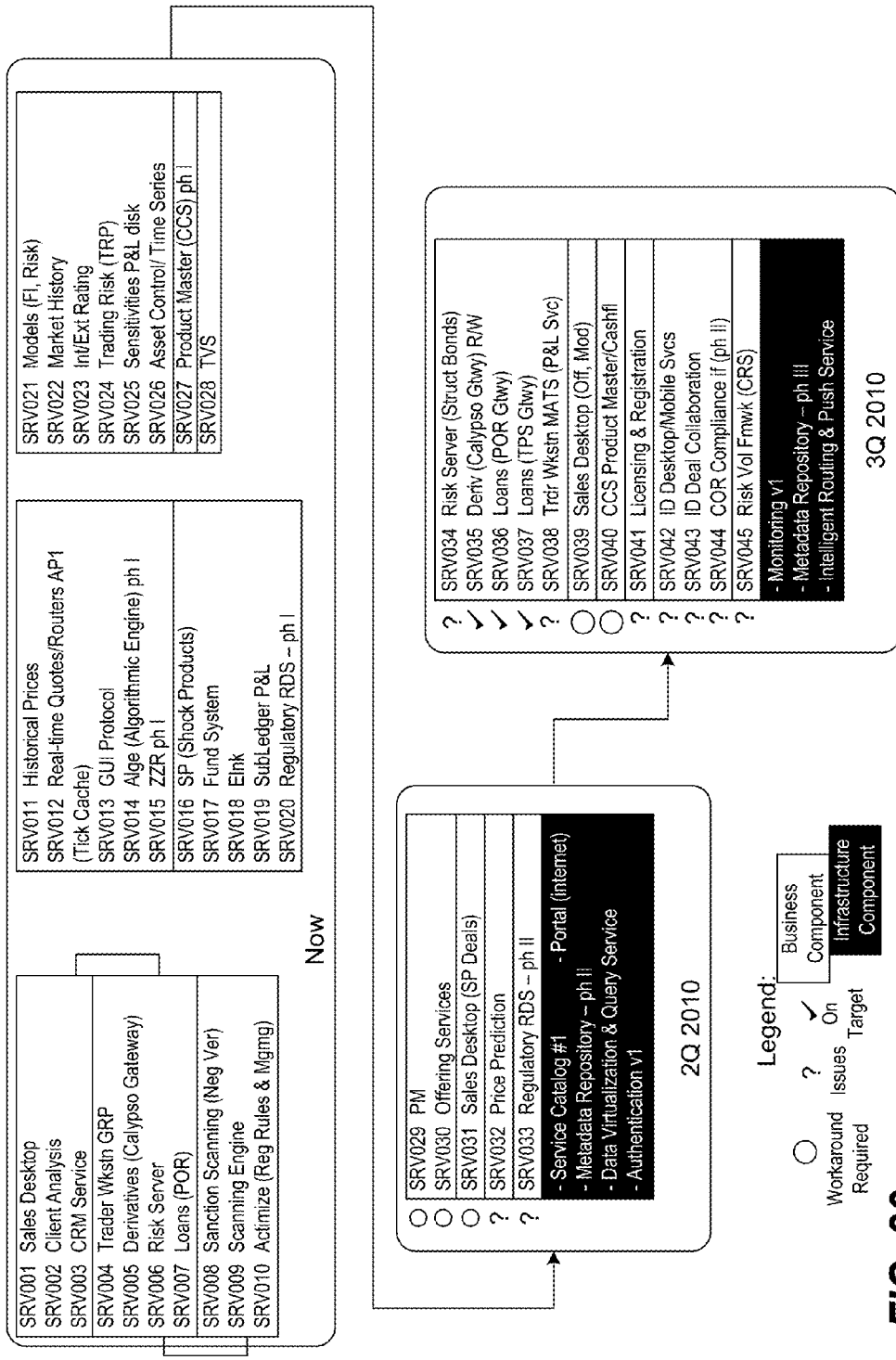
FIG. 86 provides an exemplary visualization of common services.

From the logical view, functionality is provided to describe workloads. More specifically, functionality is provided to define a quality profile for a business activity. Functionality is also provided to define workloads. This can include linking to current state applications or future state business activities, describing workload qualities, and identifying the top problems/priorities (e.g. three) for the supply chain. Functionality is further provided to compare a quality profile against a key performance indicator lens. Additionally, functionality is provided to identify functional patterns and select functional capabilities, and to identify common services, such as business services offered, business services consumed, and infrastructure services consumed. FIG. 86 provides an exemplary visualization of common services.

Figure 87:
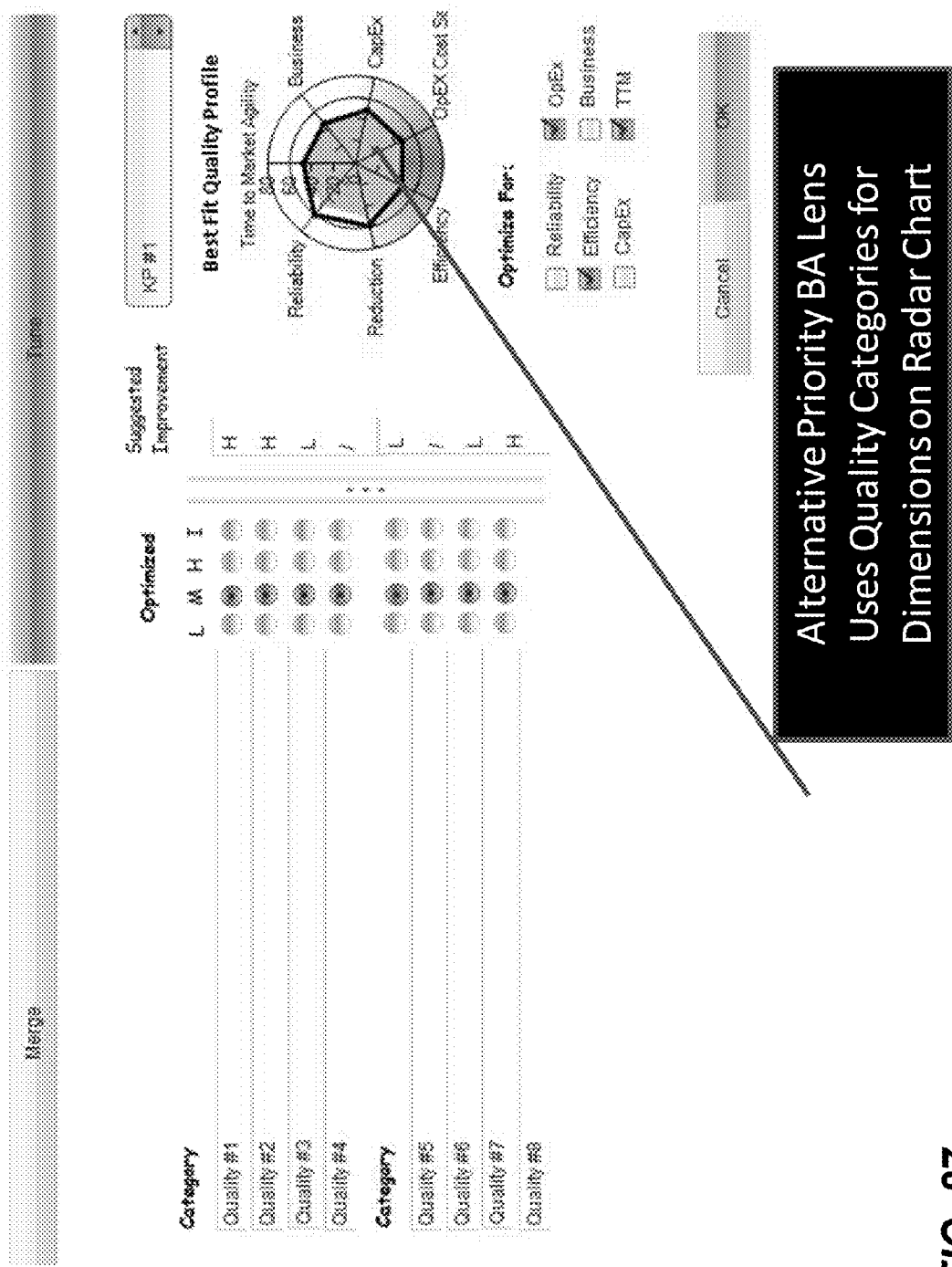
FIG. 87 illustrates quality profile tuning utilizing a key performance indicator lens.

From the logical view, functionality is additionally provided to synthesize quality profiles. For example, there exists the option to quick start utilizing priority business activities. Further, an existing quality profile can be cloned and modified. Lastly, quality profile tuning can be performed utilizing a comparison of a workload quality profile to either key performance indicators or prioritized business activities. FIG. 87 illustrates quality profile tuning utilizing a key performance indicator lens. As illustrated, an alternative priority business activity lens utilizes quality categories for dimensions on a radar chart.

The logical view can be characterized as utilizing business activity quality profiles, and preferably a knowledge base of business activity quality profiles by business value chain is provided. The logical view can further be characterized as utilizing functional patterns, and, similarly, a knowledge base of functional patterns is preferably provided. This preferably includes functional components, functional capabilities for each pattern, and typical linkage points to other functional patterns, which are necessary when more than one functional pattern is utilized. Preferably, known problems for static functional patterns are also included.

Figure 88B:
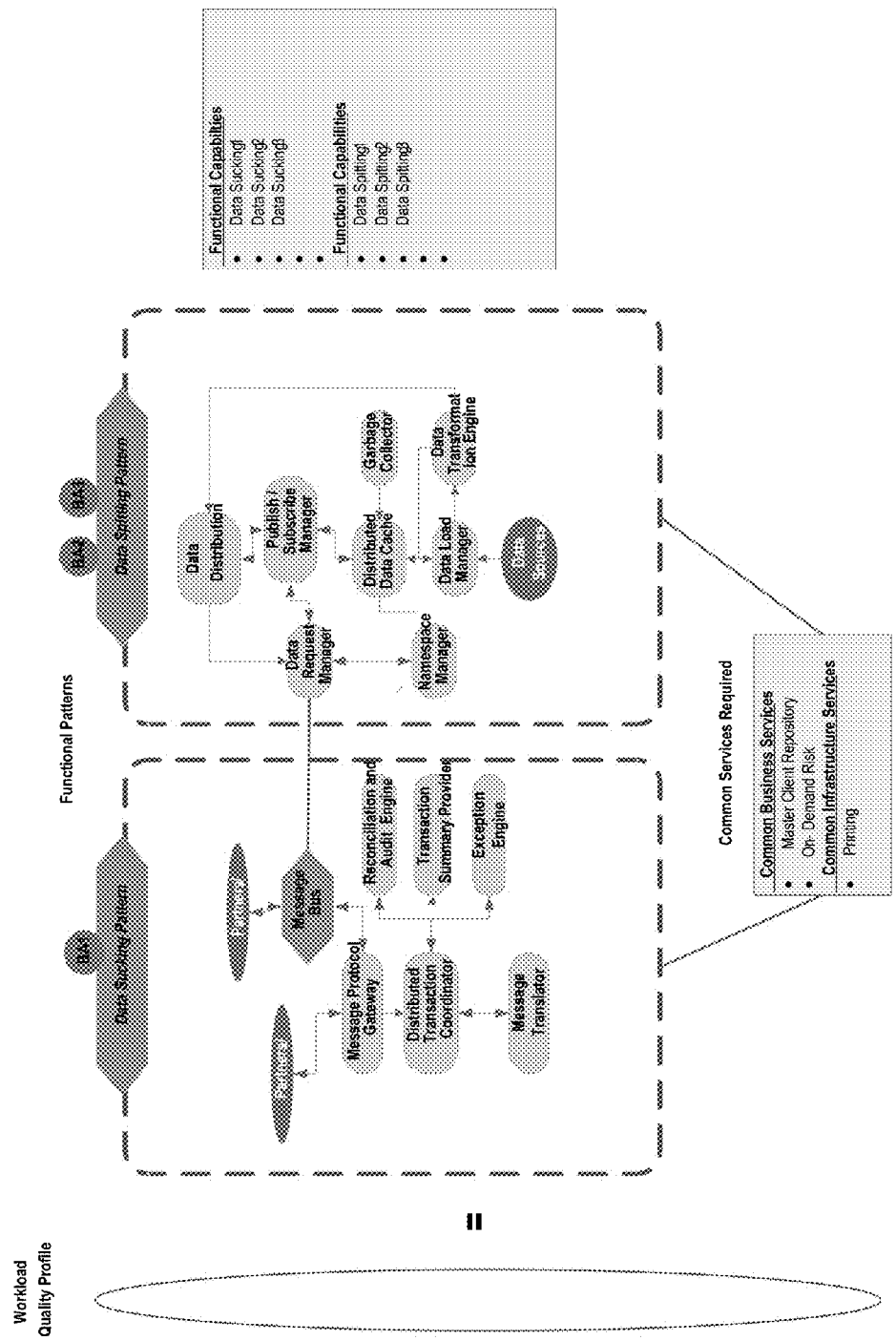

FIGS. 88A-B collectively illustrate an exemplary workload requirements blueprint sheet. The blueprint shows common services for two functional patterns, functional capabilities provided by the functional patterns, and the top quality of experience problems (e.g. the top three) based on quality of experience requirements.

Turning now to the architecture view, it is an objective of the architecture view to describe the logical deployment of a workload. This means describing the types of servers to be utilized (e.g. ensembles), a logical deployment of these within enterprise architecture, and infrastructure management policies (e.g. data, network, security) required for the successful use of the work. Note that the objective is only the description of logical deployment and not a description of physical deployment. For example, logical deployment does not consider physical layout in a data center, virtualization, or dynamic enablement via a grid. Failure to distinguish between logical deployment architecture and a fit for purpose physical deployment can lead to IT sprawl, as resources are not efficiently utilized.

From the architecture view, functionality is provided to accomplish this objective. Such functionality includes the ability to generate ensembles for a workload. Such ensembles are preferably scored against a workload quality profile. If a quality profile is unknown, a business value chain leg is utilized to select representative architecture patterns and ensembles. Such functionality additionally includes the ability to synthesize ensembles. For example, a user can preferably compare ensembles and select multiple ensembles.

Functionality additionally includes the ability to allocate functions to ensembles. For example, business activity linkages for an application can be utilized to find best fit ensembles for business activities. FIG. 89 is a consumption model showing ensemble best fit matches for trade execution and trade validation business activities. Similarly, functionality is provided to match best fit ensembles to selected ensembles.

Figure 90A:
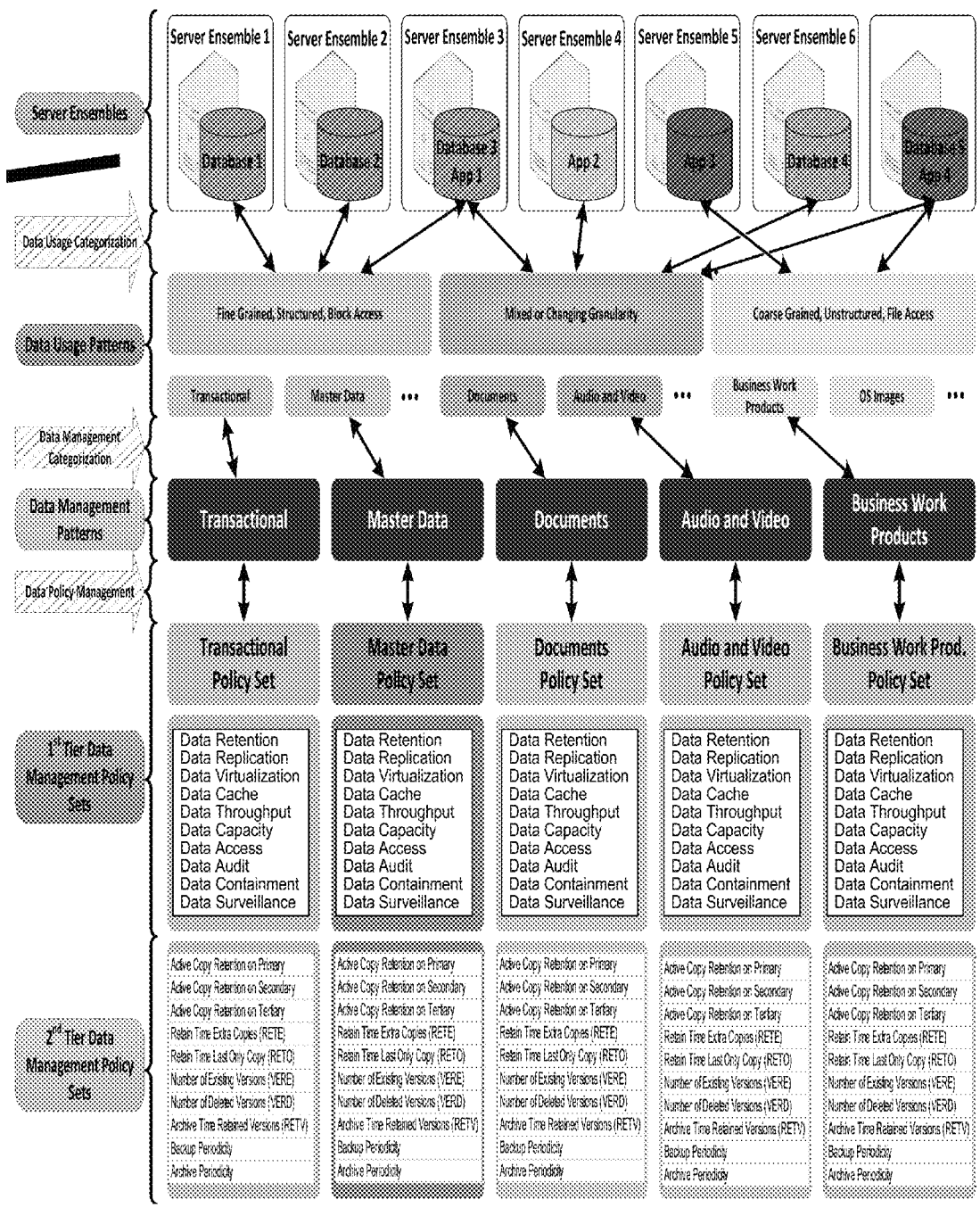
FIGS. 90A-B illustrate the mapping of policy types utilized by server ensembles to appropriate information patterns.
Figure 90B:
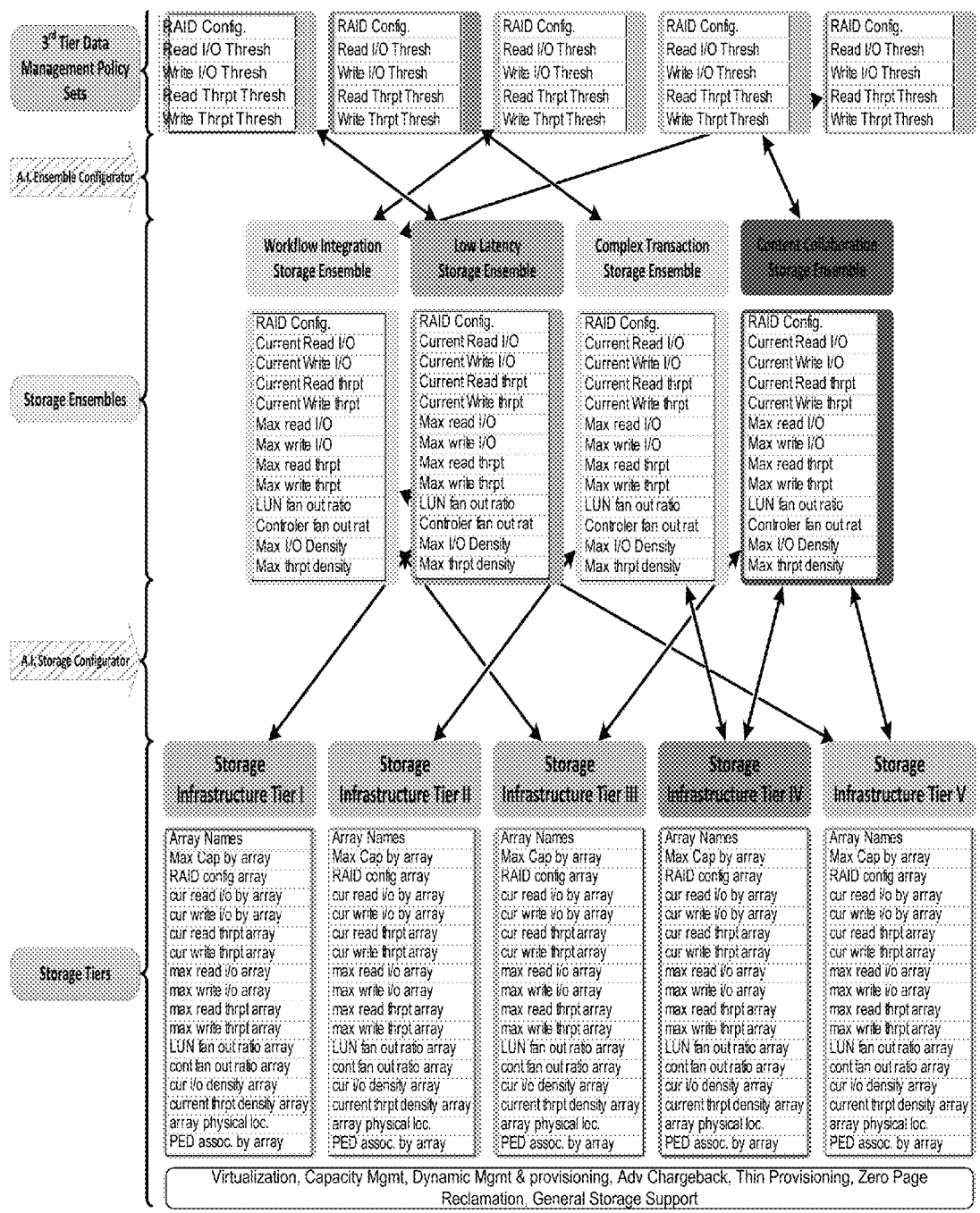

Functionality additionally includes ensemble tuning, for example utilizing a predicted heat map lens or a best fit business activity lens. Lastly, functionality is preferably provided to allocate information patterns to ensembles. For example, deployment policies can be generated for data storage or network security. FIGS. 90A-B illustrate the mapping of policy types utilized by server ensembles to appropriate information patterns. A similar technique is preferably utilized for network and security policies.

Figure 91:
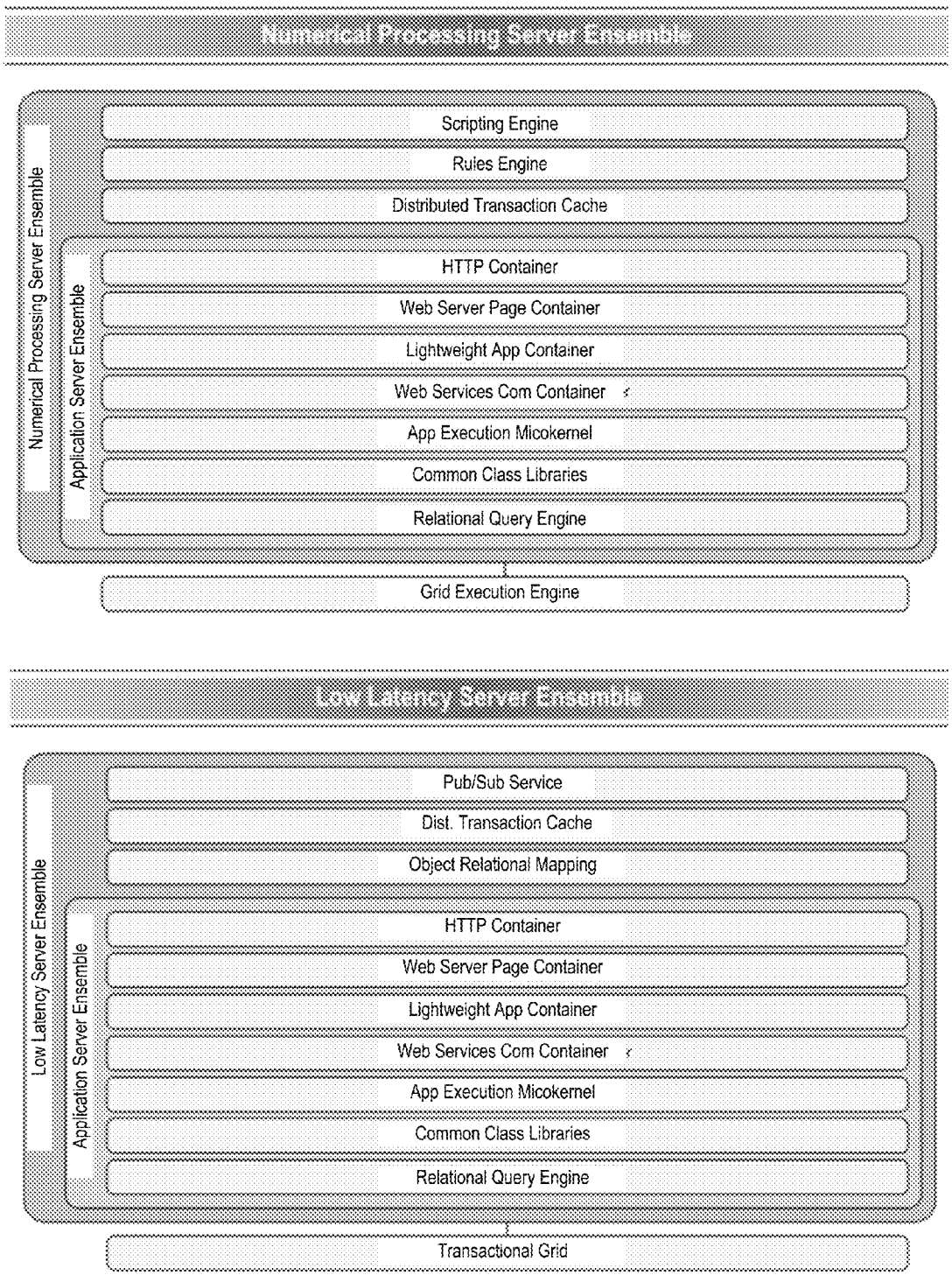
FIG. 91 illustrates visualizations of several server ensembles.

A service ensemble can be characterized by the technical capabilities of a server that hosts a workload, i.e. technical capabilities define a type of server. FIG. 91 illustrates visualizations of several server ensembles.

Figure 92A:
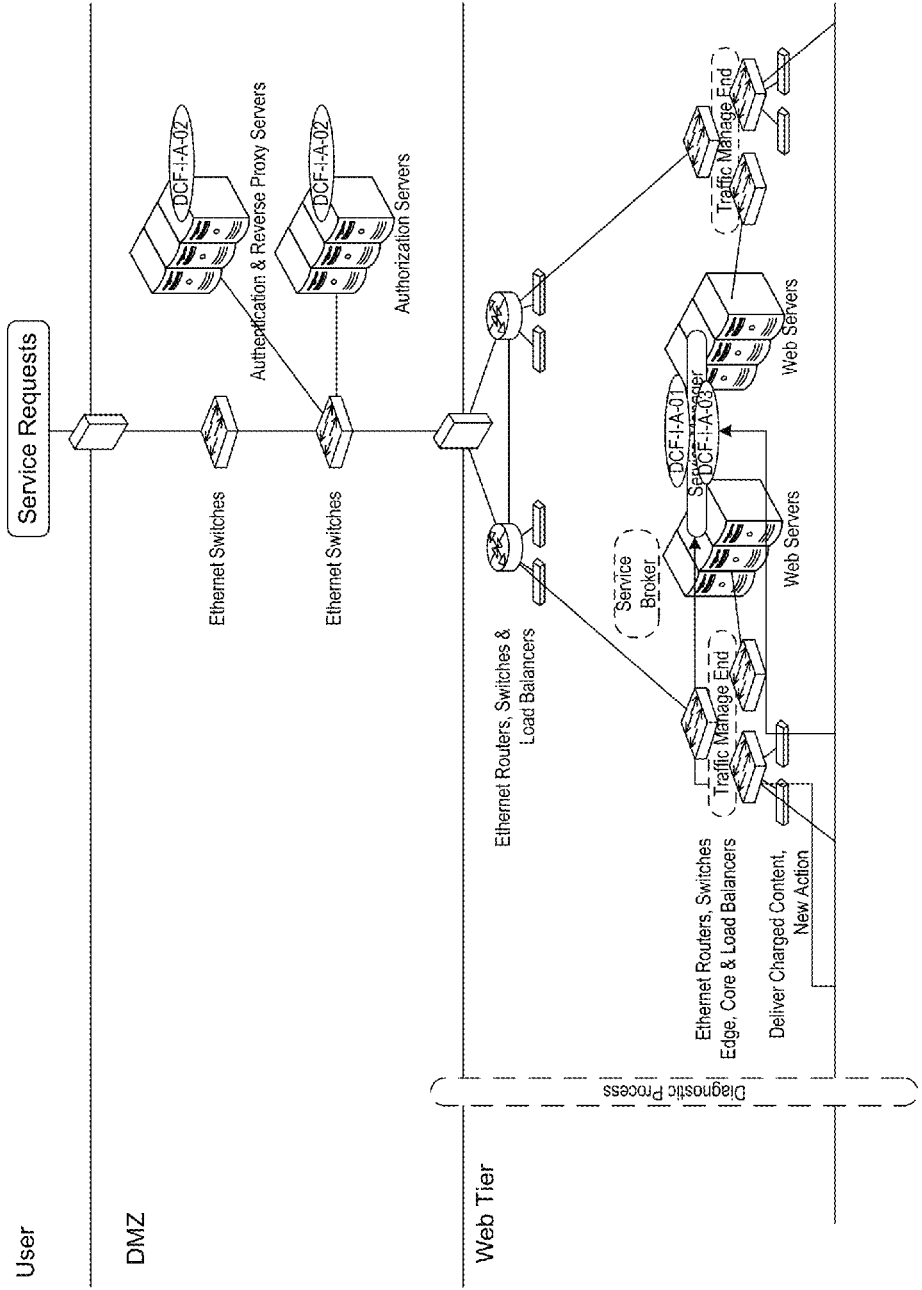
Figure 92B:
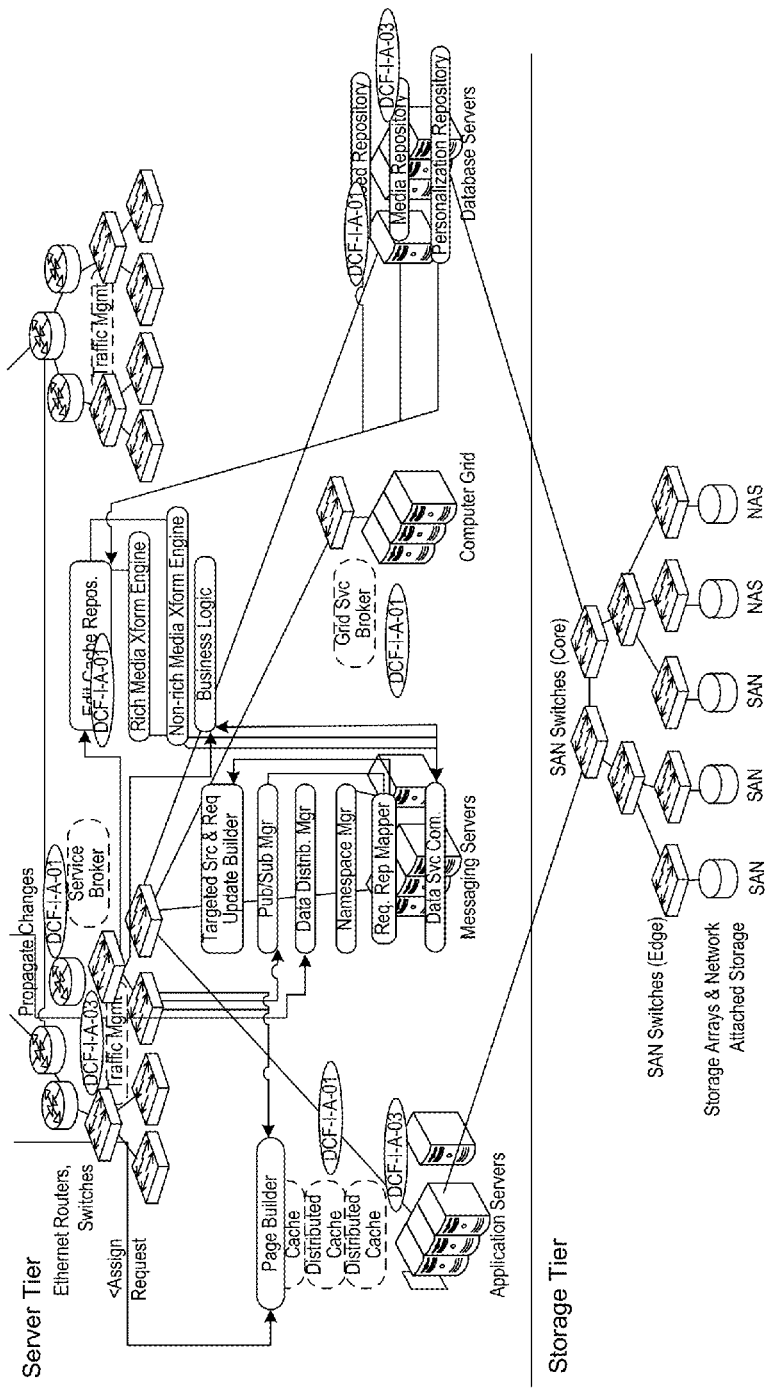

FIGS. 92A-C illustrate an exemplary service oriented architecture blueprint sheet. The blueprint shows the deployment of functional patterns on static service oriented architecture.

Turning now to the engineering view, an objective of the engineering view is to take architectural requirements and map them to an existing supply of resources. This mapping preferably considers known problems flowing from functional patterns used and existing deployments (via forensic heat maps), the current maturity of capabilities that are available, and constraints on what can be changed. This is designed to produce an optimal remediation/physical deployment given the above considerations.

From the engineering view, functionality is preferably provided to accomplish these objectives. This functionality includes the ability to remediate an existing workload without ensemble information. This can be accomplished, for example, utilizing known problems, deployment patterns, and forensic heat map context.

Figure 93A:
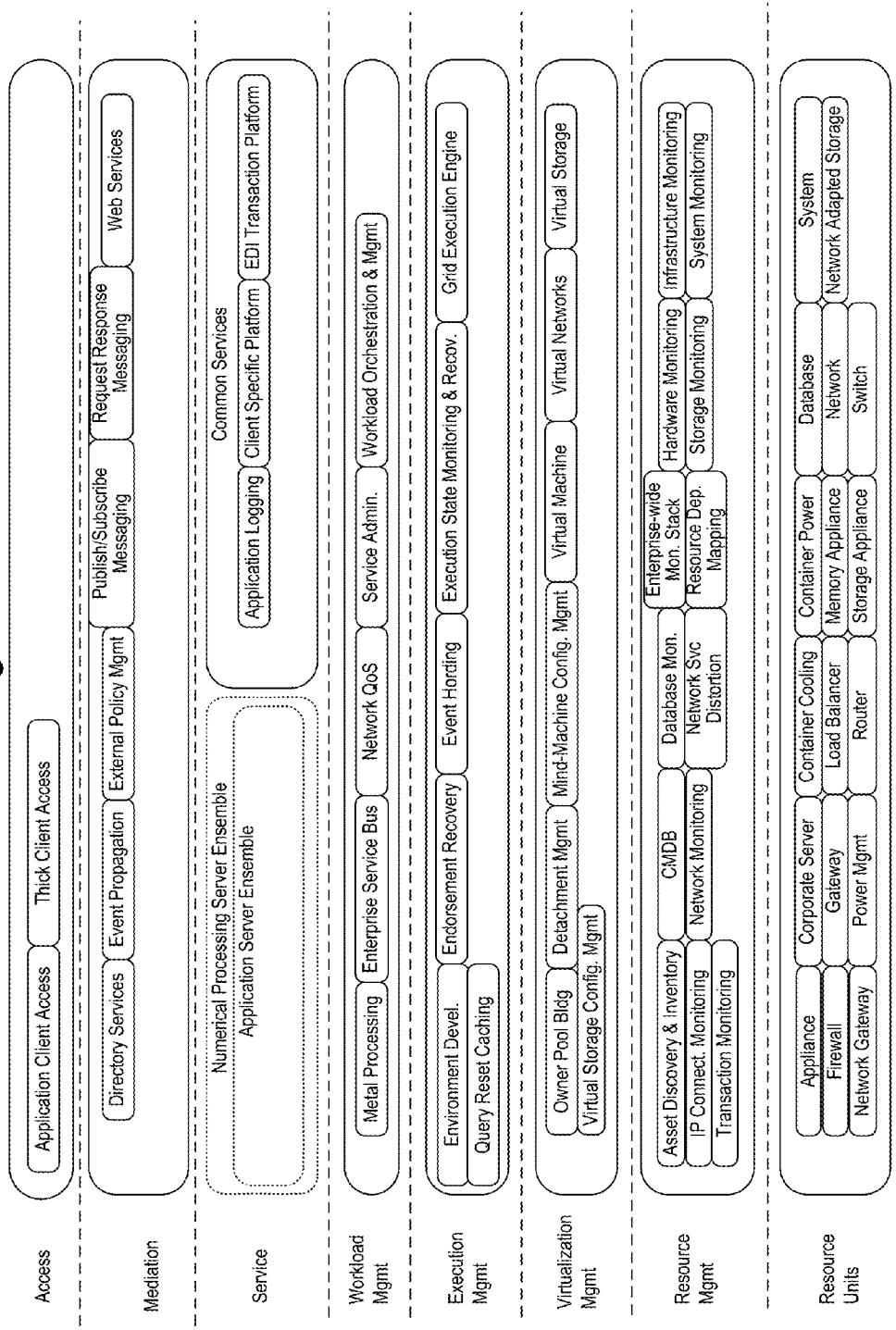
FIGS. 93A-B provide visualizations of framework services.
Figure 93B:
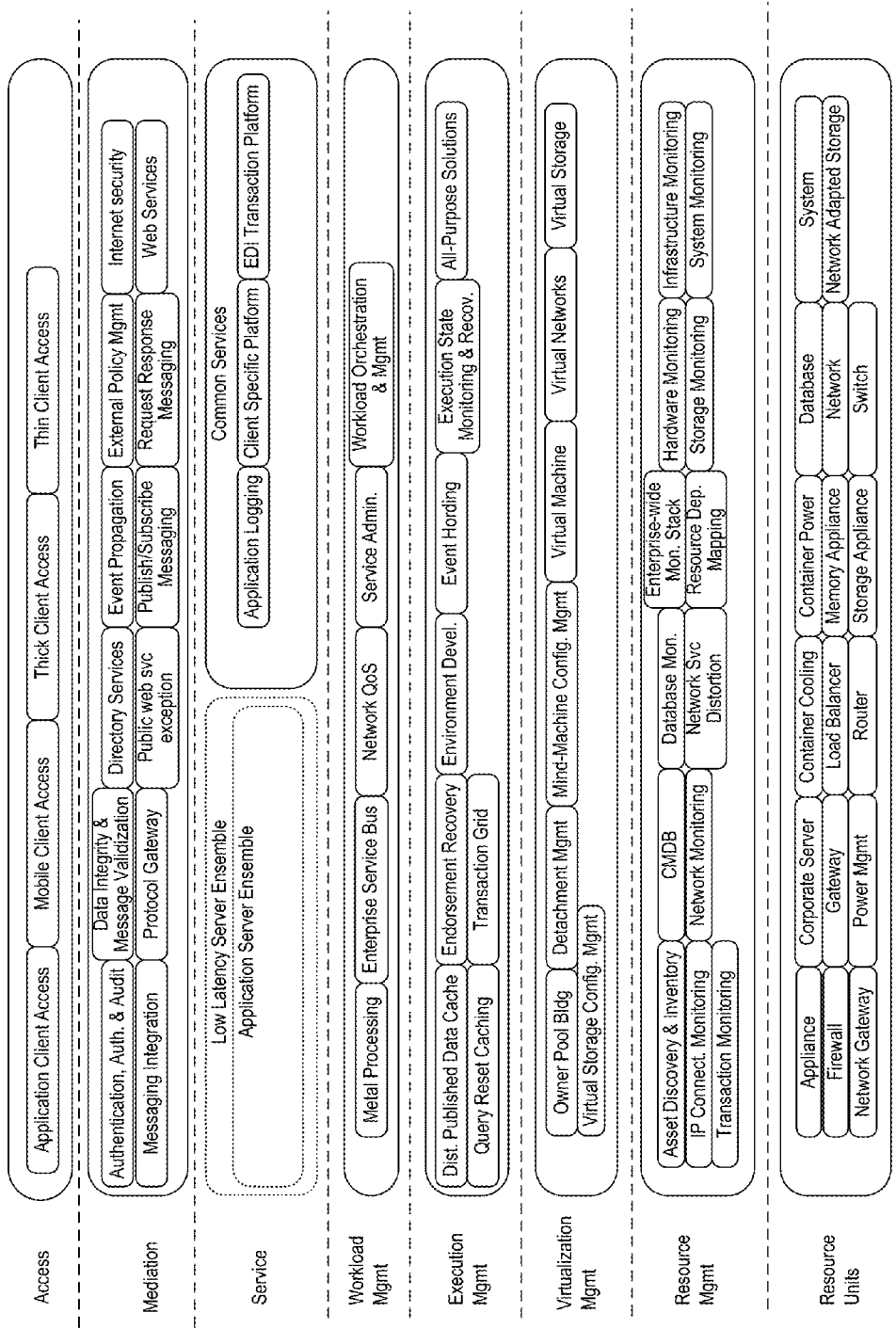

Preferably, functionality is additionally provided to design a processing execution destination based on ensemble information, for example utilizing existing technical capabilities to select framework services. FIGS. 93A-B provide visualizations of framework services. As illustrated, each ensemble has a range of technical capabilities possible in each layer. These are selected based on quality profiles, capability maturity, and heat map rules.

Processing execution destination tuning functionality is additionally provided, for example utilizing known remediation derived capabilities for known problems to select framework services.

Figure 94:
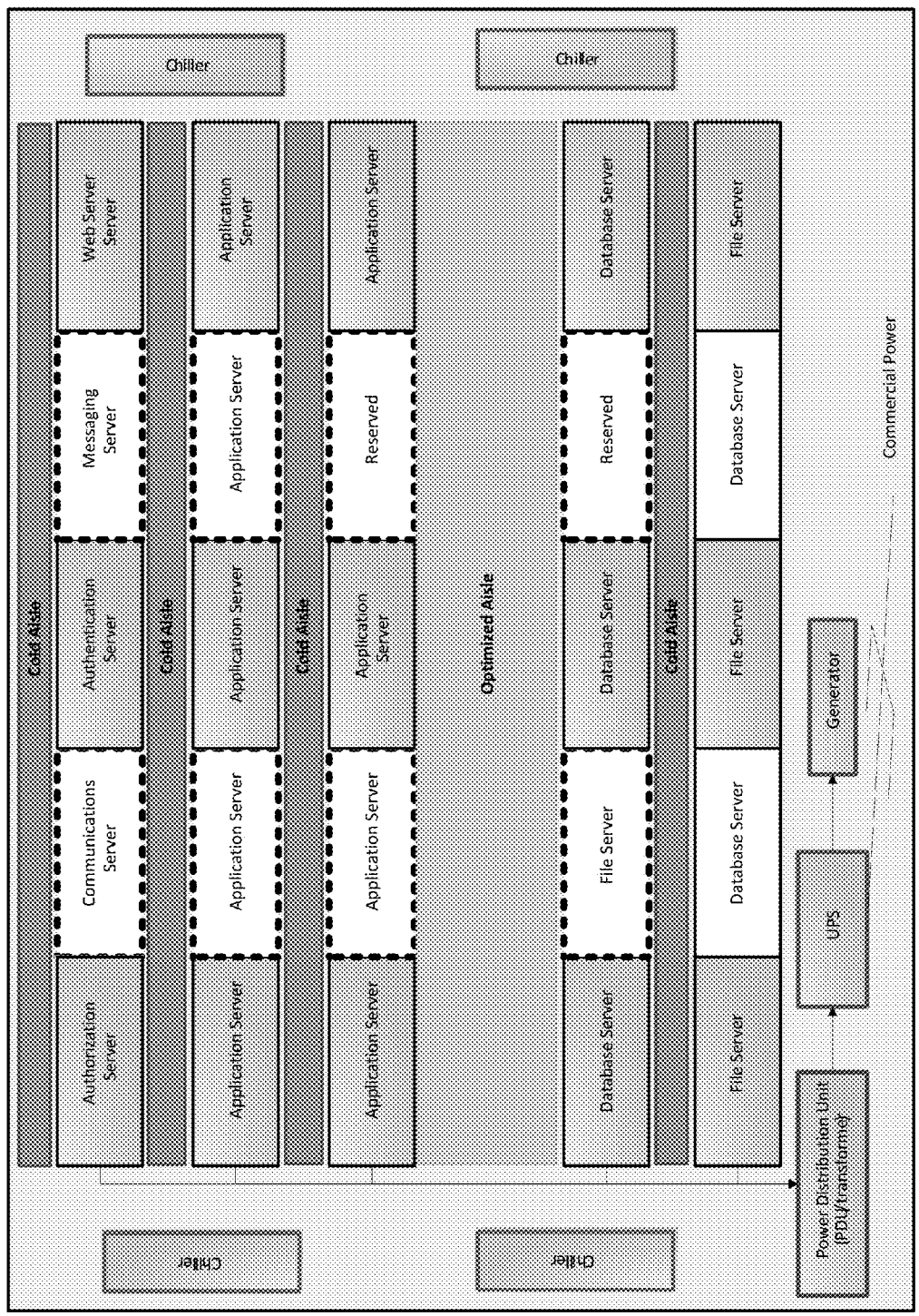
FIGS. 94-95 illustrate how facilities can be visualized utilizing, respectively, sectional and plan views.
Figure 95:
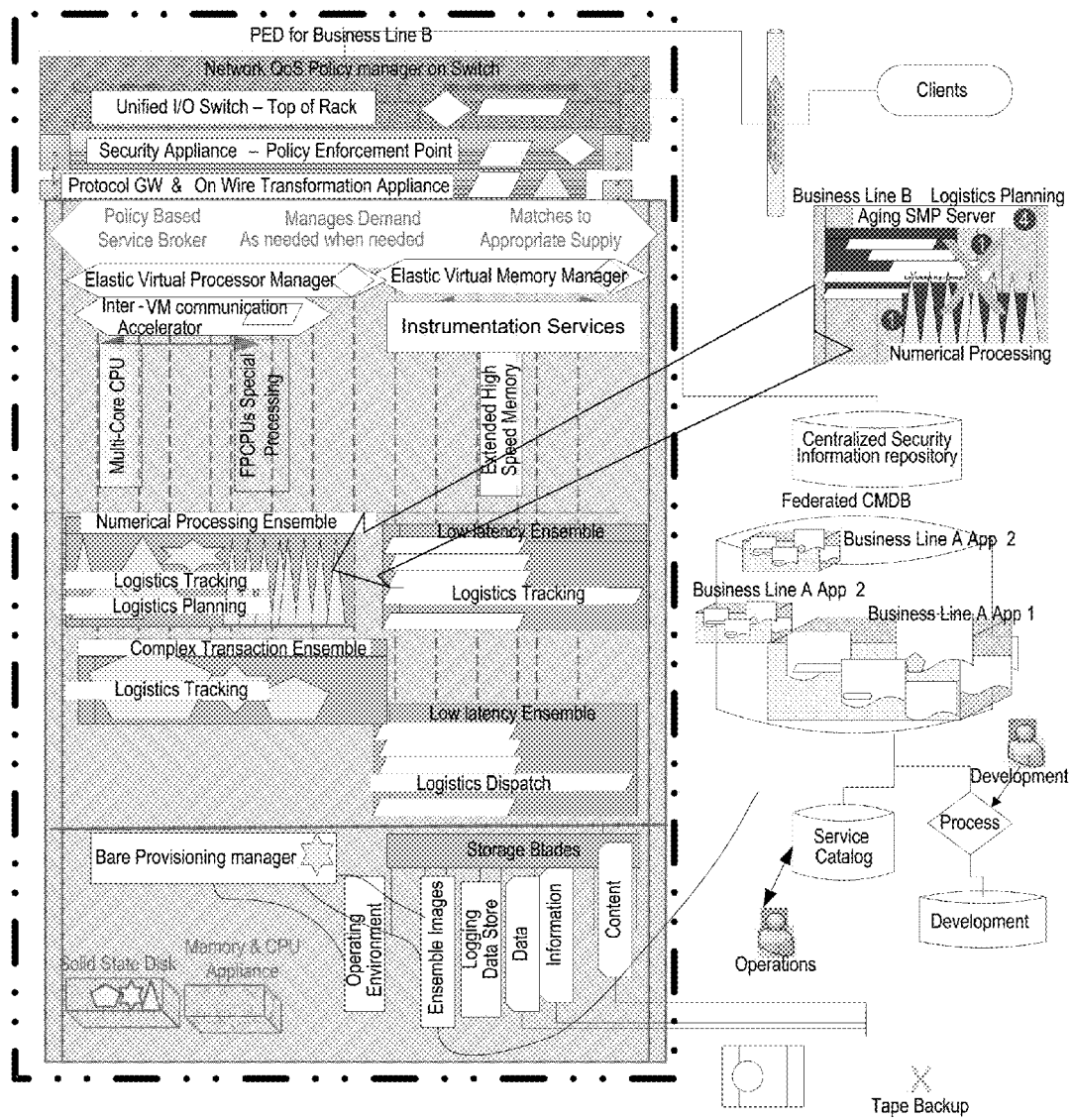

Still further, processing execution layout tuning functionality is provided, for example utilizing existing physical information and a new processing execution destination manifest. FIG. 94 and FIG. 95 illustrate how facilities can be visualized utilizing sectional (FIG. 94) and plan (FIG. 95) views. Sectional views show location and resource intensity within a rack, using as many racks as required to describe the workload in a processing execution destination, while plan views show the location of these racks and available capacity (footprint, heat, power) within a data center.

Figure 96:
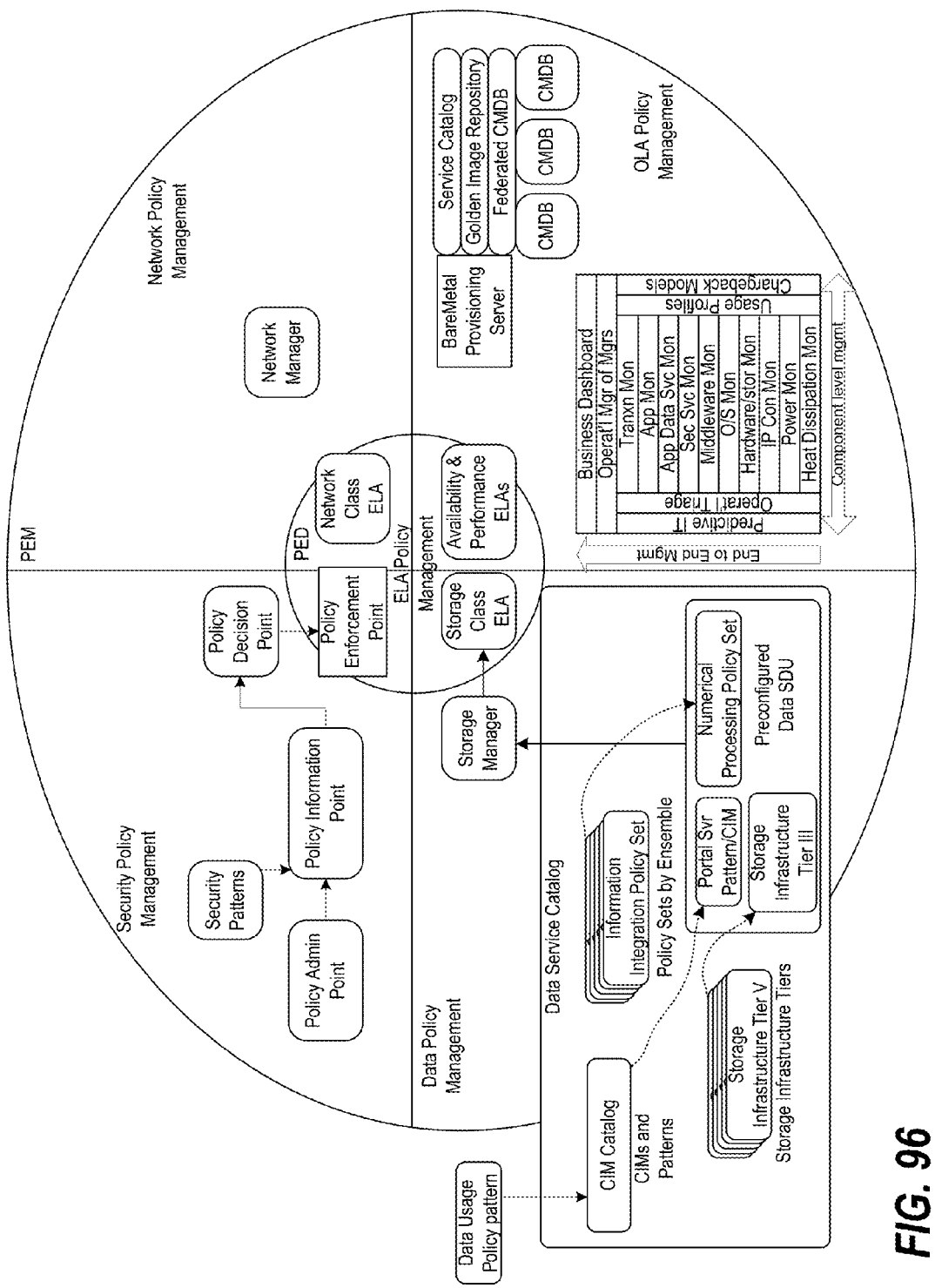
FIG. 96 illustrates how infrastructure providing technical capabilities necessary to manage a processing execution destination can be visualized.

FIG. 96 illustrates how infrastructure providing technical capabilities necessary to manage a processing execution destination (PEM) can be visualized.

Figure 97:
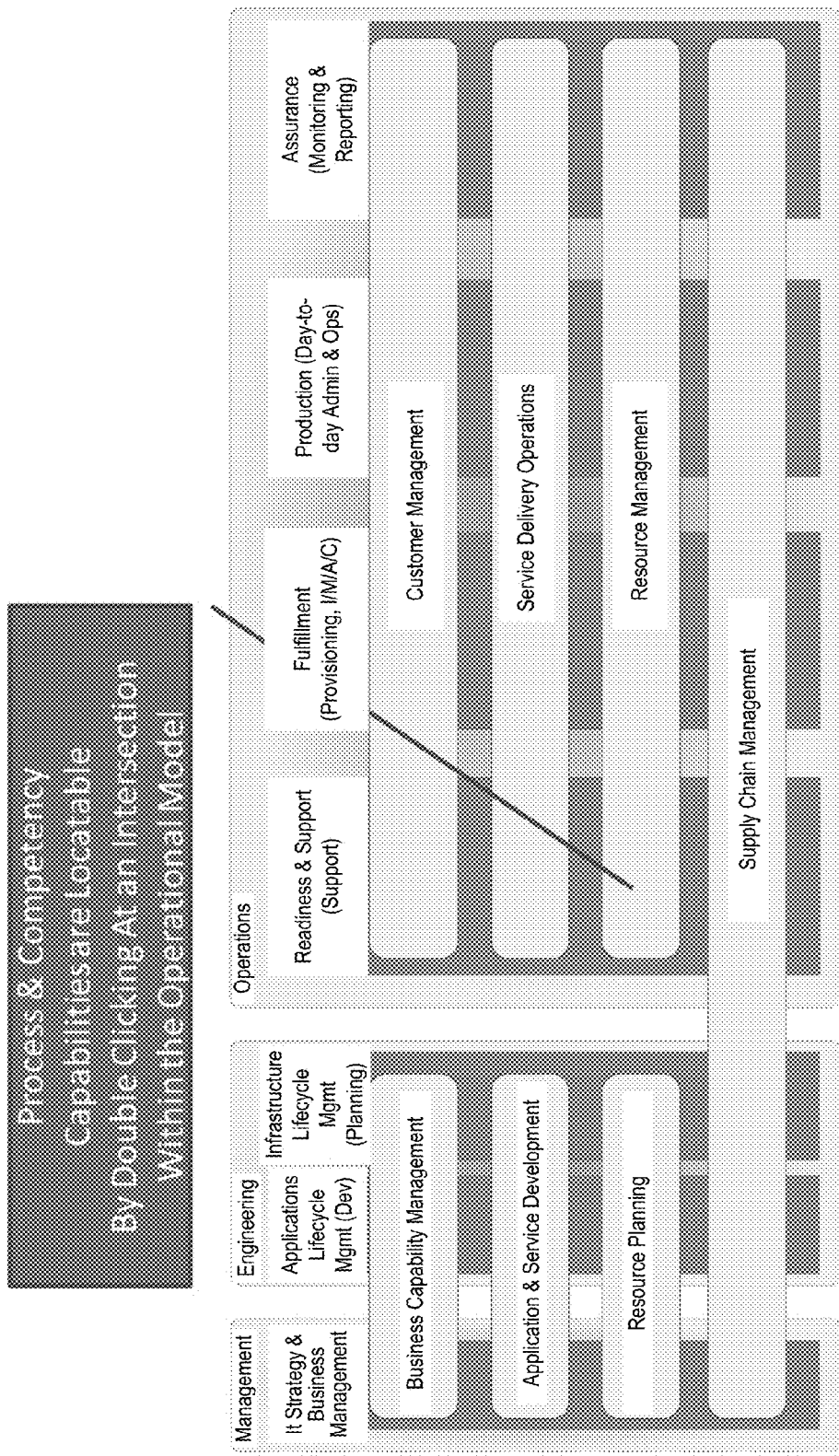
FIG. 97 illustrates a visualization of an operational model and how process and competency capabilities are locatable by double clicking at an intersection within the visualization of the operational model.
Figure 98:
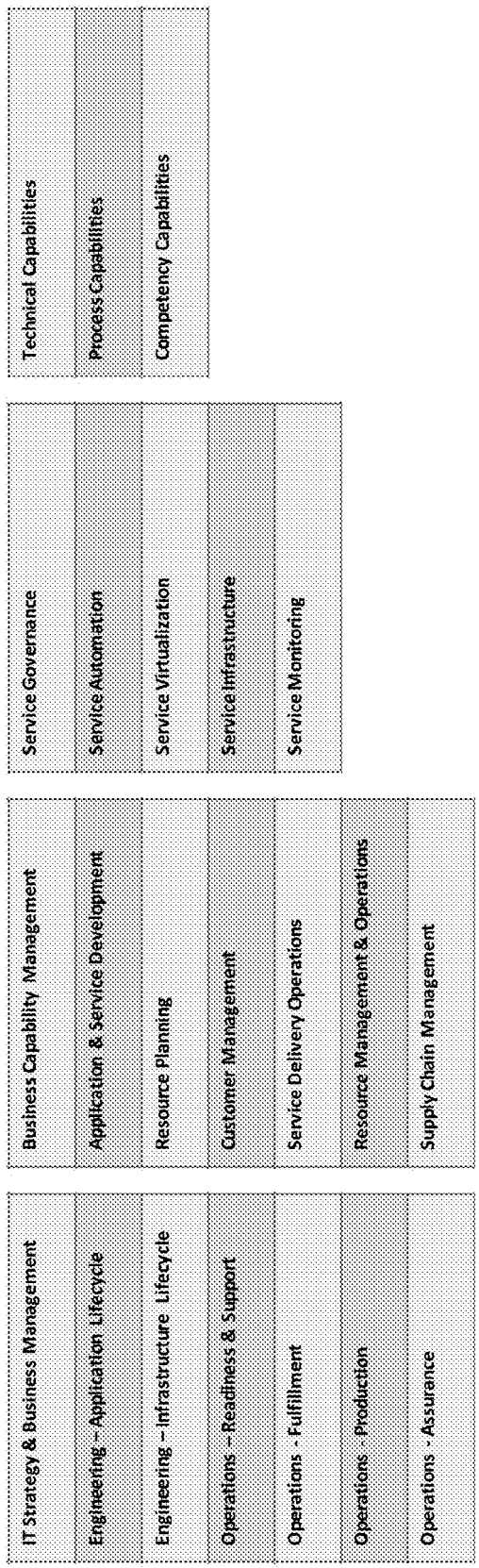
FIG. 98 illustrates an exemplary visualization showing areas of improvement that can be selected.

Turning lastly to the operational view, an objective within the operational view is to manipulate current and planned capabilities of an organization. This includes the ability to inventory, assess, and improve capabilities. Another objective of the operational view is to define operational policies and standards to be followed within operations processes. FIG. 97 illustrates a visualization of an operational model and how process and competency capabilities are locatable by double clicking at an intersection within the visualization of the operational model. FIG. 98 illustrates an exemplary visualization showing areas of improvement that can be selected.

Exemplary Use Cases

Software in accordance with one or more aspects of the present invention facilitates one or more processes described herein. FIG. 99, and FIGS. 100A-D collectively, each illustrate an exemplary logical flow detailing use of an implementation of such software.

Figure 99:
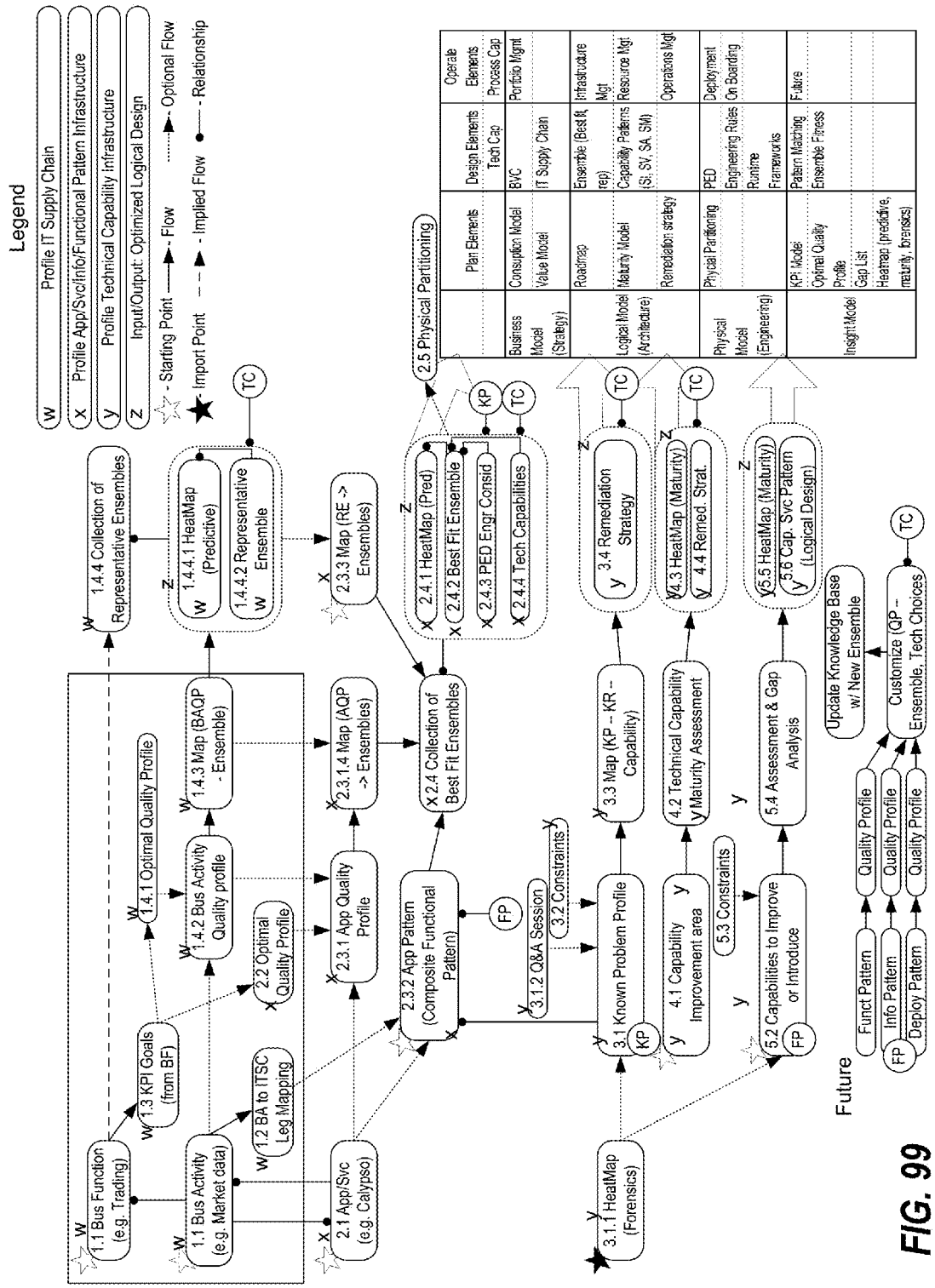
FIG. 99, and FIGS. 100A-D collectively, each illustrate an exemplary logical flow detailing use of an implementation of software in accordance with one or more aspects of the present invention.
Figure 100A:
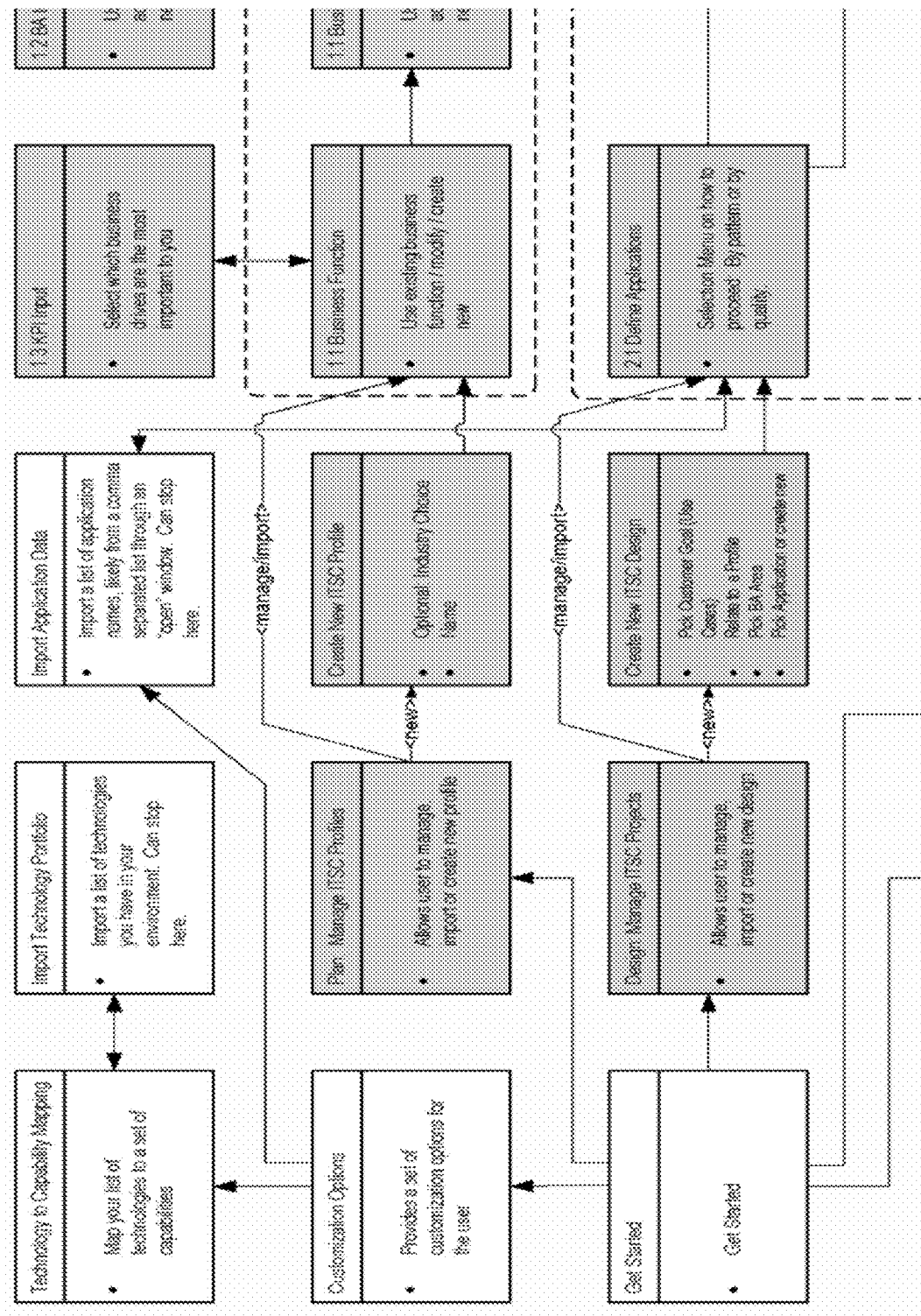
Figure 100B:
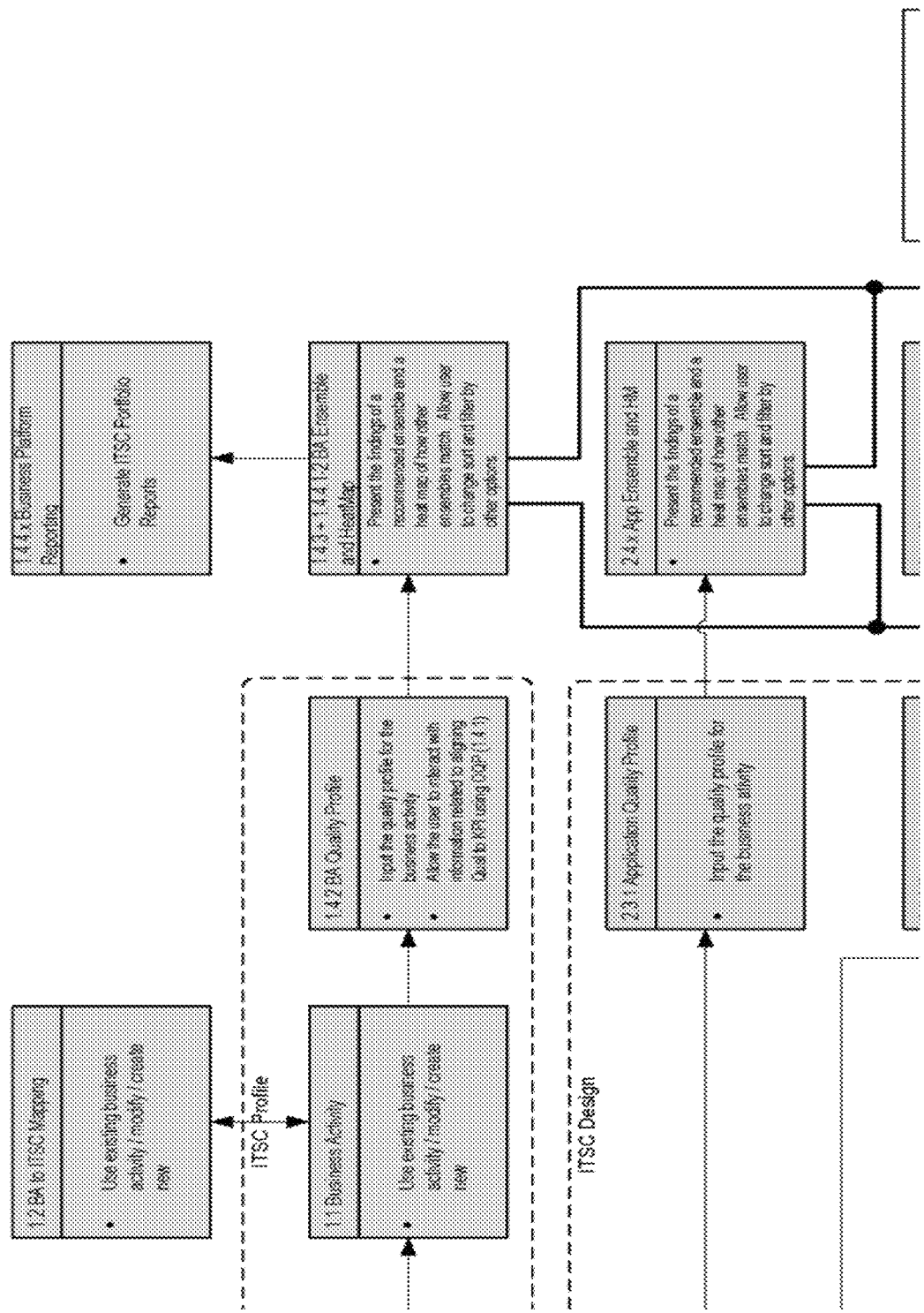
Figure 100C:
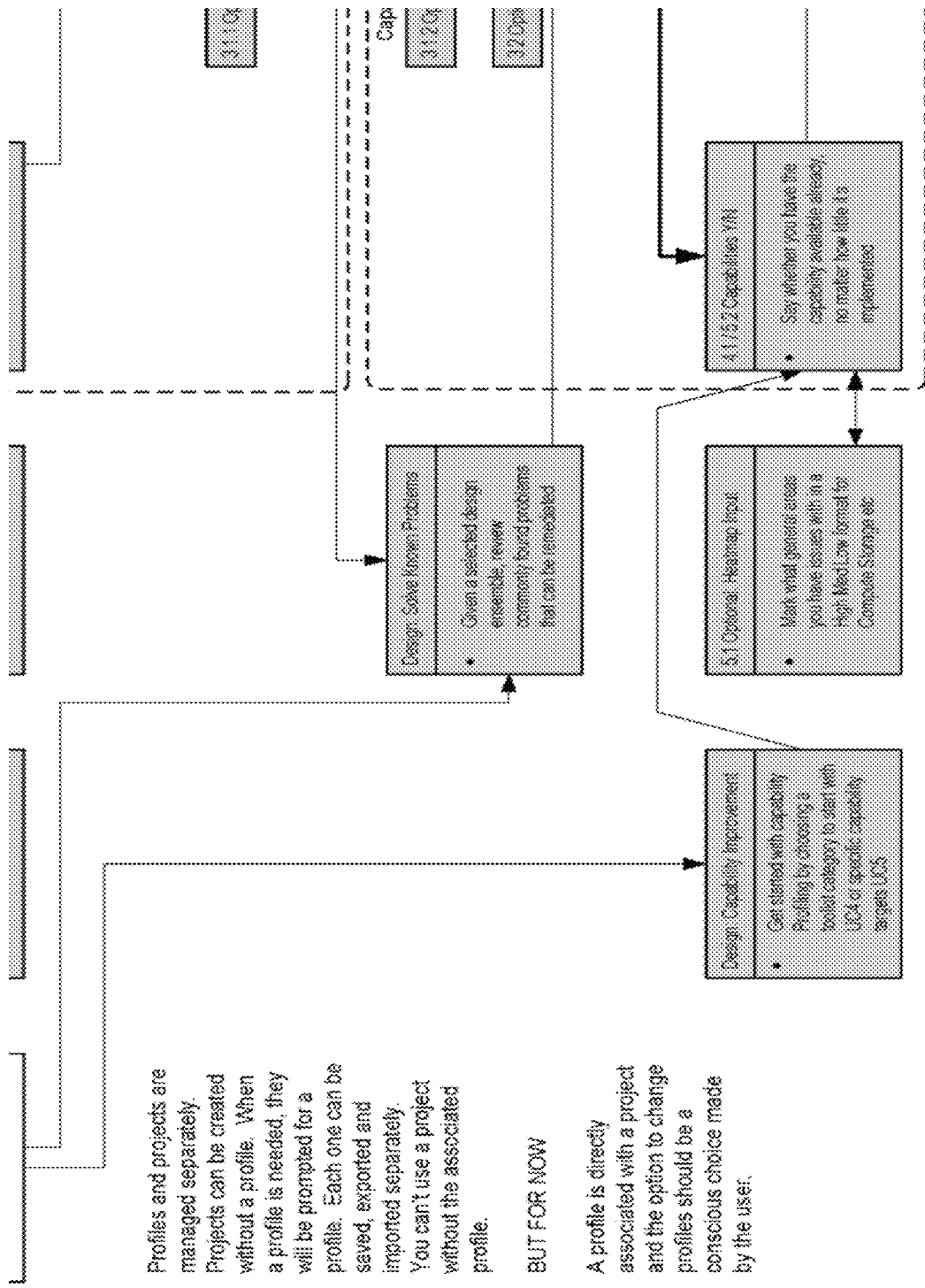
Figure 100D:
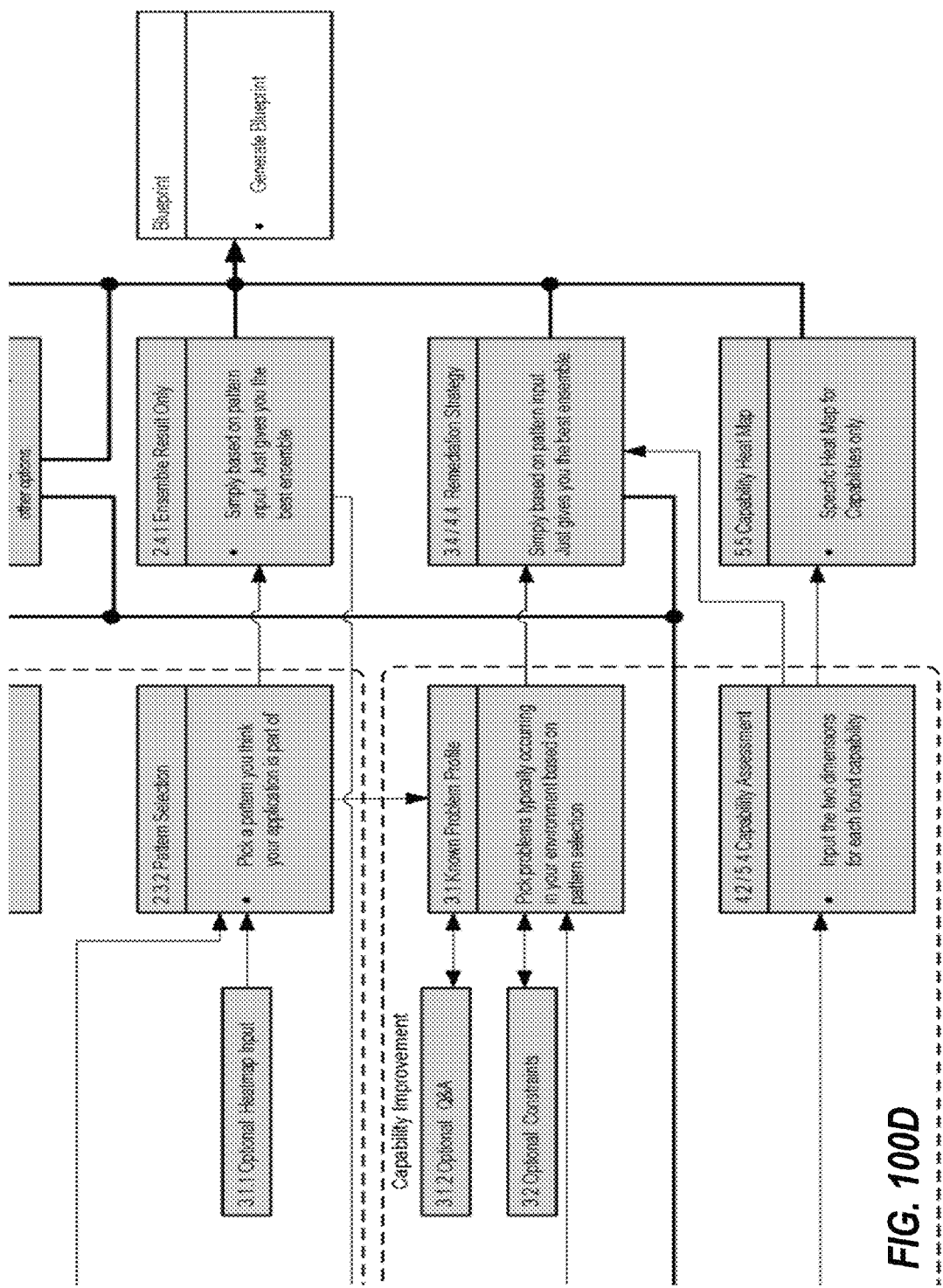

In a first use case, the design and description of an IT supply chain is facilitated. With reference to FIG. 99, at step 1.1, a user defines business functions within a business value chain and identifies business activities within each business function. Business functions and business activities can be imported from a knowledge base, or created from scratch.

Next, at step 1.2, a user maps business activities to legs of an IT supply chain corresponding to the created business value chain, for example as illustrated in FIGS. 57A-B. At step 1.3, a user characterizes key performance indicator priorities for each business function.

Optionally, a user can further characterize each business activity at step 1.4. Preferably, an optimal quality profile is automatically derived based on key performance indicator characterization as described above. At step 1.4.1, a user can interact with information related to aligning qualities to key performance indicators utilizing the optimal quality profile. For example, a user could modify the importance of key performance indicators for a business function, which would impact the optimal quality profile, or could even directly modify the optimal quality profile.

As described above, a business activity quality profile for each business activity can be derived based on such an optimal quality profile. At step 1.4.2, a user can input or modify the business activity quality profile for each business activity.

Figure 101:
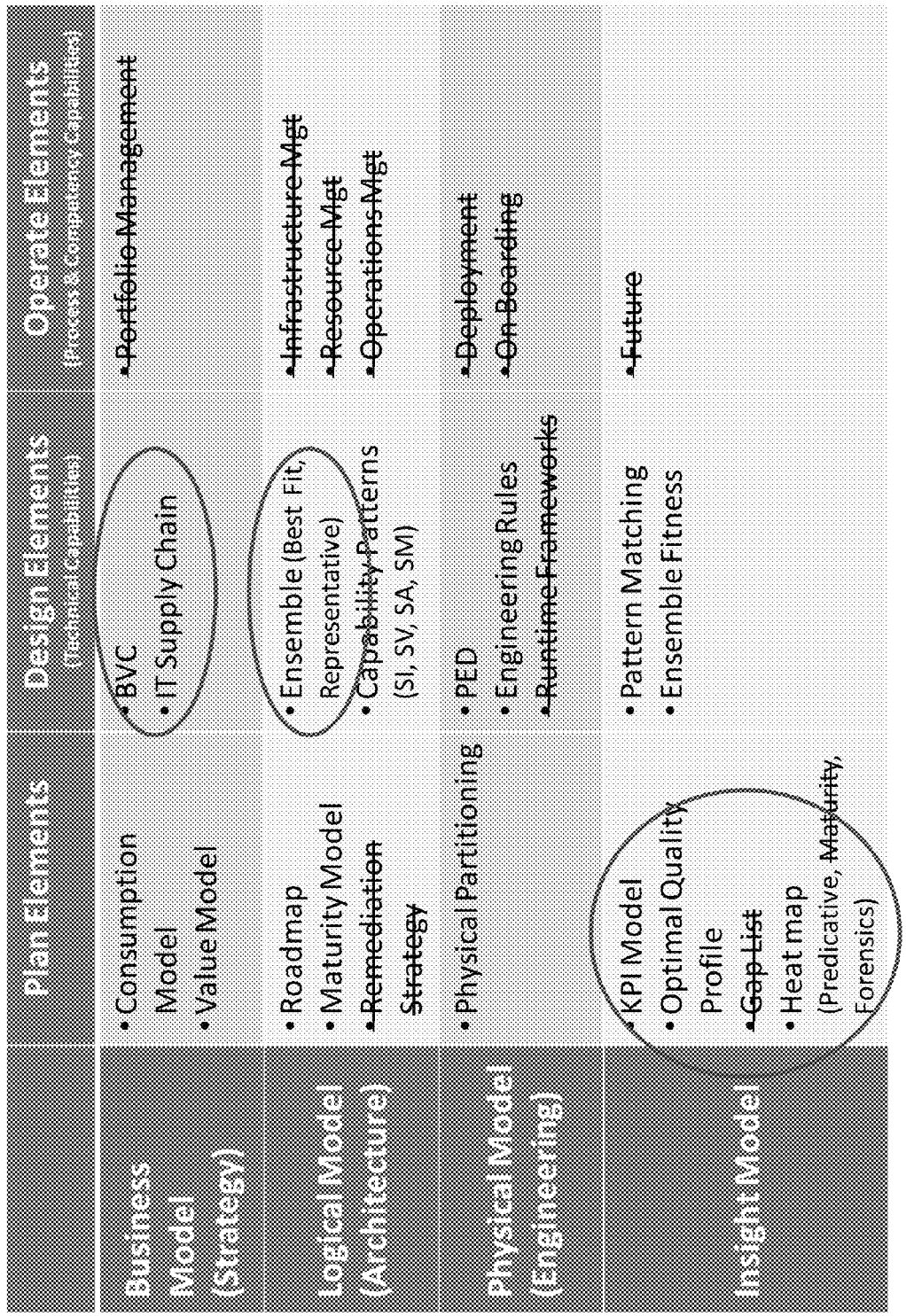
FIGS. 101-103 illustrate exemplary blueprint elements.

At step 1.4.3, a user can choose a business activity quality profile to utilize to fit to a representative ensemble. At step 1.4.4, a recommended ensemble for a business activity (e.g. recommended based on a Bayesian logic algorithm as described hereinabove) is identified with other ensembles as an ensemble collection. At step 1.4.4.1, this collection of ensembles is presented to a user, together with a heat map showing how the recommended ensemble and other ensembles match the business activity. A user can change, sort, and filter the heat map. A user selects a representative ensemble at step 1.4.4.2. This information can be provided as a part of an IT blueprint. FIG. 101 illustrates blueprint elements associated with this first use case.

In a second use case, optimized infrastructure for an application or service is identified. With reference to FIG. 99, at step 2.1, a user selects whether to define an application via a pattern or via qualities.

If the user selects to proceed via a pattern, a user can select a pattern they think an application is part of at step 2.3.2, and a best fit ensemble is selected based simply on the selected pattern.

Alternatively, if the user selects to proceed via qualities, a quality profile for a business activity can be input at step 2.3.1, and a candidate best fit ensemble list is derived at step 2.3.1.4 based on an application quality profile created utilizing an input business activity quality profile. Alternatively, an application quality profile could be input. Either way, candidate best fit ensembles are selected.

As still yet another option, a user can choose, at step 2.3.3, to derive candidate ensembles based on representative ensembles selected as a result of business activity quality profiles at step 1.4.3.

Regardless of the path taken, once one or more candidate ensembles are identified at step 2.4, a predictive heat map is derived for these ensembles comparing them to the optimal quality profile at step 2.4.1, and one or more best fit ensembles are identified at step 2.4.2 (e.g. recommended based on a Bayesian logic algorithm as described hereinabove). A user can change, sort, and filter the heat map.

Next, processing execution destination engineering considerations can be identified based on consolidation of engineering rules for each selected ensemble at step 2.4.3. Similarly, required technical capabilities can be identified based on consolidation of pre-defined lists of component technical capabilities for each selected ensemble at step 2.4.4. Optionally, physical partitioning can be specified at step 2.5.

Figure 102:
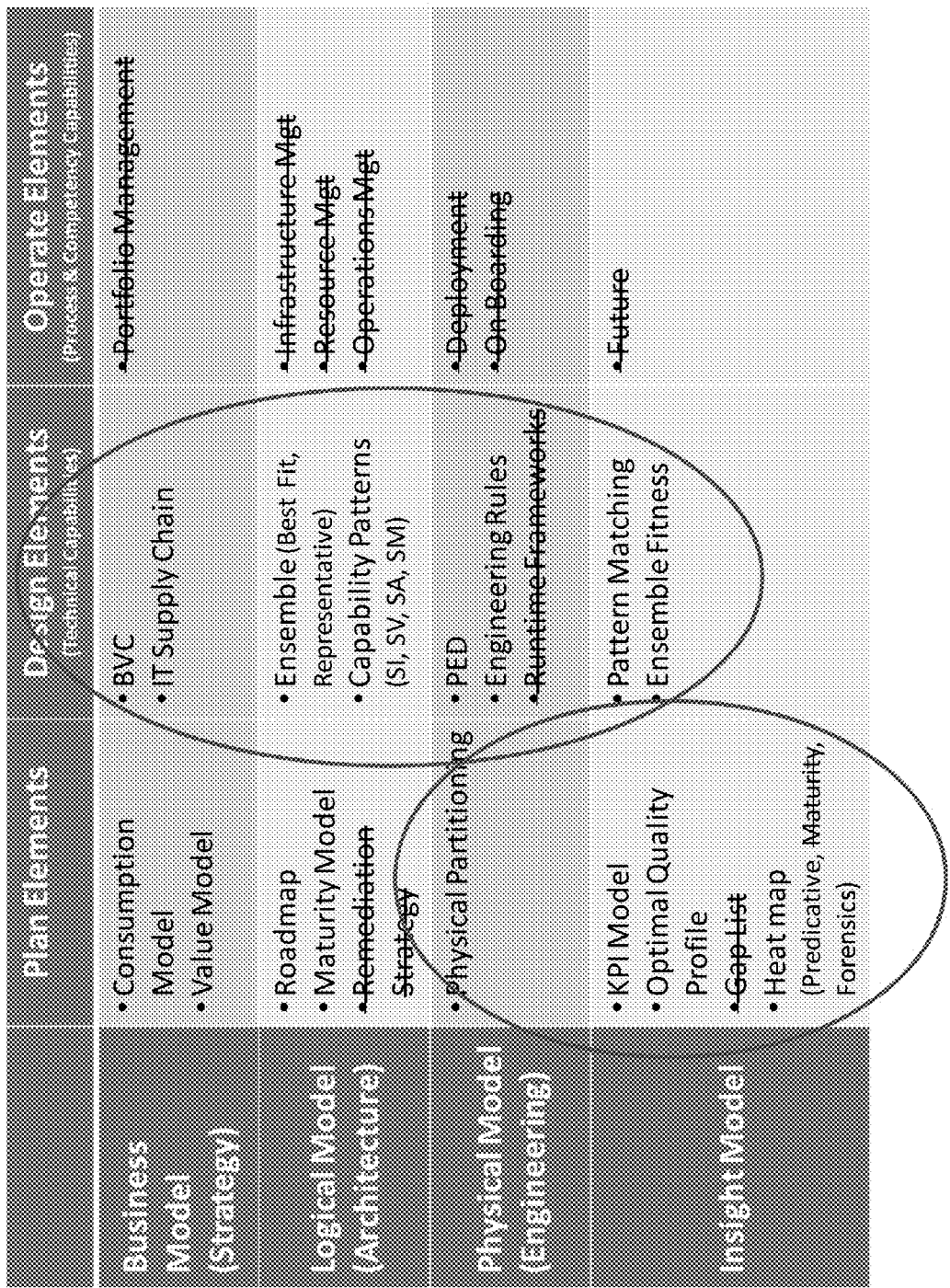

The predictive heat map, best fit ensembles, processing execution destination engineering considerations, technical capabilities and physical partitioning can be provided as a part of an IT blueprint. FIG. 102 illustrates blueprint elements associated with this second use case.

In a third use case, an infrastructure remediation strategy is generated. With reference to FIG. 99, at step 3.1, a known problem profile is derived. A known problem profile can be derived one of several different ways. A known problem profile can be derived by characterizing workload characteristics based on a forensics heat map at step 3.1.1 and mapping these workload characteristics to an application pattern, and therefore to known problems. Alternatively, a known problem profile can be derived by deriving known problems based on a question and answer session at step 3.1.2. Still yet another option is to select from known problems. These could be known problems based on one or more identified best fit ensembles from step 2.4.4 and implied functional patterns related thereto, known problems for an identified application pattern from step 2.3.2, or all known problems.

Once a known problem profile has been derived, one or more areas of scope can optionally be selected at step 3.2 to constrain possible remediations. Exemplary such areas of scope include instrumentation, resource management, holistic virtualization, and workload management.

Next, a knowledge base detailing relationships between known problems, known remediations, and capabilities is utilized to derive candidate capabilities to include in a remediation strategy (taking any constraints into account). At step 3.4, a user accepts or rejects available remediations to generate a remediation strategy. This remediation strategy can be provided as a part of an IT blueprint.

In a fourth use case, improvements to technical capabilities are planned. With reference to FIG. 99, at step 4.1, an area of scope can be selected, and the availability of capabilities within that scope identified. At step 4.2, a technical capability maturity assessment is executed to determine the maturity of various technical capabilities within the identified scope. Optionally, a maturity heat map can be generated at step 4.3. Available remediations are identified, and at step 4.4 a user accepts or rejects available remediations to generate a remediation strategy. This remediation strategy can be provided as a part of an IT blueprint.

In a fifth use case, technical capabilities are improved. With reference to FIG. 99, at step 5.1, a user optionally characterizes characteristics of candidate technical capabilities to improve or introduce based on a forensics heat map.

At step 5.2, a user selects capabilities to introduce or improve. Optionally, one or more areas of scope can be selected as constraints at step 5.3. The current state of selected technical capabilities is then assessed at step 5.4, and capabilities required for a remediation strategy to obtain the selected capabilities are identified. Similarly, any missing capabilities are identified. A maturity heat map is generated at step 5.5, and a capability service pattern (e.g. logical design) can be generated at step 5.6. This heat map and capability service pattern can be provided as a part of an IT blueprint.

Figure 103:
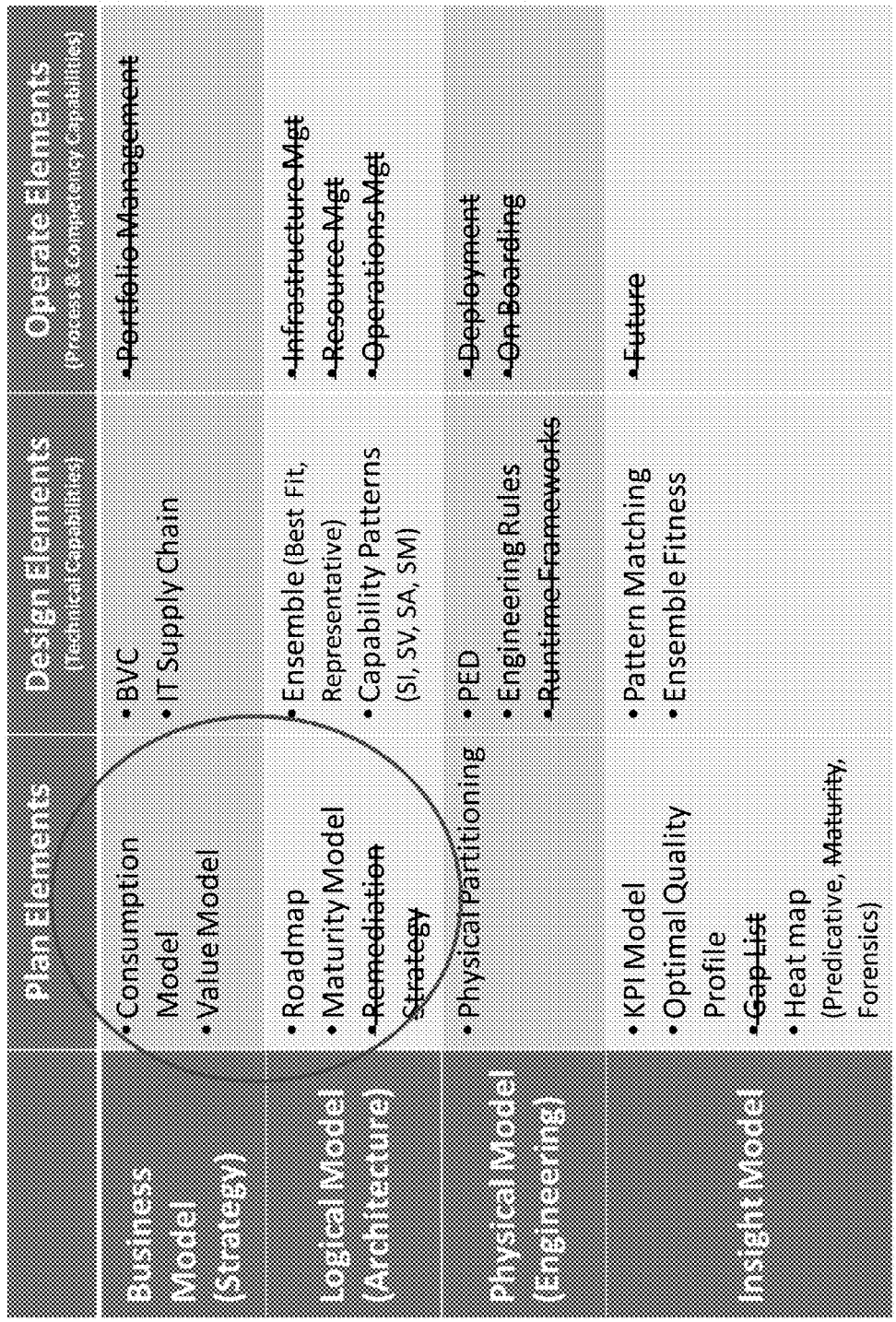

FIG. 103 illustrates blueprint elements associated with the third, fourth, and fifth use cases.

In another use case, a user is able to create a new ensemble. In this use case, a user first selects a functional pattern, information pattern, and deployment pattern. Next, quality profiles for each of these patterns is identified. Starting from these quality profiles, a user can customize a configuration profile for the ensemble, and make technology choices regarding the ensemble. This ensemble will include one or more technology capabilities. Via customization, a user can alter what technology capabilities an ensemble provides. Once ensemble customization is complete, the ensemble can be saved to a knowledge base for later use.

Exemplary System

Figure 104:
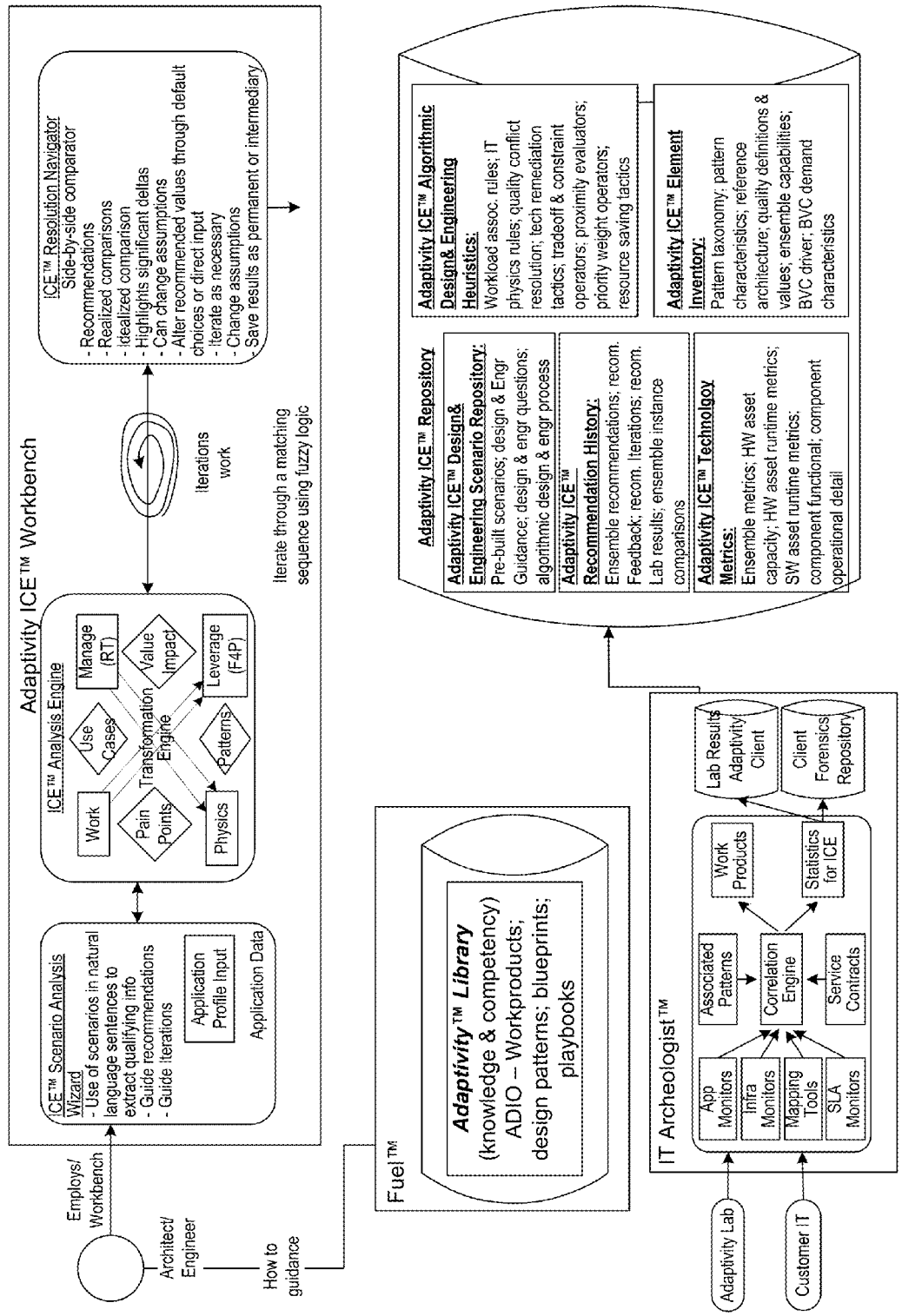
FIG. 104 illustrates an exemplary system and associated workflow in accordance with one or more preferred aspects of the present invention.

FIG. 104 illustrates an exemplary system and associated workflow in accordance with one or more preferred aspects of the present invention. The exemplary system includes exemplary software modules, at least some of which implement and utilize, inter alia, some concepts and methodologies described elsewhere herein.

As illustrated, the exemplary system includes a workbench module that can be employed by an architect or engineer. In a preferred methodology, an architect or engineer leverages a dynamic content library (such as, for example, a content library in accordance with the disclosure of U.S. patent application Ser. No. 12/899,315, titled "CUSTOMIZABLE LIBRARY FOR INFORMATION TECHNOLOGY DESIGN AND MANAGEMENT USING EXPERT KNOWLEDGE BASE", naming as inventors Anthony Bennett Bishop, Sheppard David Narkier, Alexis Salvatore Pecoraro, and Paul John Wanish, filed concurrently herewith on Oct. 6, 2010, which application and any publications thereof and patents issuing therefrom are hereby incorporated herein by reference) for how to guidance during utilization of various modules.

The exemplary system preferably facilitates the analysis work of architects, system engineers, and systems management personnel. The system preferably guides such users through key stages of infrastructure change, specifically changing how they organize infrastructure, how they architect infrastructure, and how they manage infrastructure, as well as changing what technology they leverage as they migrate toward a real time infrastructure.

A fundamental process flow can be characterized as a work flow for these users underlying this approach. This work flow includes steps of getting analysis context, getting all appropriate input data (profiles etc.), matching gaps, drivers, qualities, and capabilities, transforming infrastructure to optimize work or IT proximity optimization, showing recommendations and alternatives, and comparing recommendations against idealized patterns and historical trends.

A key recurring theme in IT is that there are inherent conflicts or trade-offs to resolve. These include conflicts to resolve in design, in IT resource management, and in operations that must be successfully resolved to control costs. For example, two key operational drivers, effectiveness and efficiency, cause inherent conflict for resources and can have significant cost implications depending on how they are resolved.

In IT, there are four basic classes of resources that are consumed. These are processing (such as CPU), memory, network, and storage. However, effectiveness meets service needs according to business requirements, and emphasizes concurrency and immediacy, while efficiency considers longer term consequences, and emphasizes sharing.

Preferably, conflict resolution is addressed, to the extent practicable, at design time. This can be accomplished by understanding the business value chain of an organization in terms of services, pain (e.g. known problems), and growth (e.g. capability expansion).

The system preferably helps users design IT that optimizes workload by first identifying different workload types within a business application. Such identification is useful because different workload types have different demands on compute, network, and storage resources.

Advanced Modeling Methods

The principles by which advanced modeling and reasoning methods can be developed will now be provided together with basic axioms governing these methods.

First, patterns exhibit services (such as a specific way to meet a common business need, an architectural feature, a design approach, etc.) which are fulfilled by elements inside the pattern. It does not make sense to characterize anything as a pattern unless there are at least 2 elements involved, but a single element might fulfill more than one service for a pattern. Preferably, this is transparent to a user of the pattern. Elements can be aggregated by more than one Pattern. Application use cases, manifested as application functions thread through patterns and elements. A pattern can appear more than once as an instantiation within an application. Elements can be directly related to business value chain functions or can provide an infrastructure service.

With respect to qualities, all patterns are associated with a set of defined qualities called a profile. These qualities are assigned categorical values which when aggregated in the context of the profile provides a unique expression of the pattern. This does not prohibit or prevent some qualities in the set from being defined categorically as not applicable (N/A)—meaning that they do not alter the meaning of the pattern and have no effect on subsequent designs or techniques that may use that pattern. Qualities are measureable requirements that can be thought of as metrics of the pattern, and, for any pattern, there must be at least one quality that is not N/A so that the pattern has a meaningful expression of requirements. While every profile will have every quality defined (even if it is N/A), this is an aggregate expression at the level of the pattern that may not necessarily be preserved when qualities are distributed to the constituent elements of the pattern. Thus this method does not prohibit or prevent such underlying elements from having a different instantiation of some qualities as long as the aggregate measure of qualities is unchanged at the level of the pattern that contains those elements.

For example, a quality of latency will not be the same for all elements in a pattern, even if the pattern has a quality of low latency. This is because some elements of the pattern may have more need for low latency than other elements in order to create the result that the pattern overall behaves with low latency. Accordingly, a stringency operator (described hereinbelow) can be described for the pattern quality of low latency, that will force at least one element to have low latency.

More precisely, since qualities have categorical values, in a preferred embodiment a system of categories such as "High/Medium/Low" can be used to meaningfully express the categorical metrics of a quality. This is a generalizable method that admits the use of more categorical values (e.g. Very High, Very Low) to assign meaning to qualities.

Thus, it would be expected that the particular element(s) that best fulfill the low latency expression of the pattern would have the highest relative priority within the pattern. Therefore, in a quality conflict between elements within this pattern, such element(s) should win with respect to this quality, although wining in this case means that such element(s) would have greater influence on the method used to configure a low latency ensemble, and then issues of collaboration with other elements would become important to the analysis, or reasoning system that implements a method of configuration.

For example, during configuration of the ensemble it would then have to be determined whether the other elements should be part of the same ensemble. If these other elements are determined by the reasoning system to be part of the same ensemble, it would be necessary that they have qualities which do not conflict with the element responsible for fulfilling the requirement of low latency. The distribution of qualities to elements under the control of a stringency operator thus provides a significant basis for creating a variety of automated methods for resolving quality conflicts that arise naturally during the configuration of ensembles and ultimately the processing destinations (computers, networks, storage) in IT.

A primary aim of the system is preferably to imitate what an expert would do when confronted with a set of problems that need to be addressed. Although starting with business drivers and proceeding in a top-down fashion is preferable in that it results in a more successful real time infrastructure (RTI) design, at least some preferred implementations might utilize iteration in a bottom-up fashion as long as some top-level goal (such as KPIs, business demand characteristics, or a quality of experience profile) can be discerned so that the bottom-up approach has a direction to work towards. A bottom-up approach is admitted by the use of reversible inference techniques such as those provided by Bayesian methods.

Early application profiling and up front business value chain exercises preferably highlight areas of concern, which include pain points. If a particular function is known to be painful, or require remediation, that is preferably captured in a variable. The system preferably utilizes many variables, some of which represent the fluid state of an iterative analysis, which is done through a number of analysis operators.

A first two of these variables are pain and remediation need. Each of these variables can be characterized as a spectrum variable having a value between zero and one, or alternatively using a categorical system of metrics such as high, medium, and low. Pain and remediation preferably express the priority of the problem to be solved and are most useful in a context where a business value chain drives IT supply chain design decisions. While pain and remediation need are preferably considered absolutes for the purpose of any analysis, the fact is that such an analysis is iterative and it could be that setting either of these two variables too high (e.g. both high) could lead to skewed results given other pain points infrastructure must solve. What is important is that the universe of problems to be solved has a partial ordering of priority such that a network graph can be drawn. In one or more preferred implementations, a reasoning system considering solutions to those problems would be built using a BBN whose causality graph is identical in topology to the network graph that describes the partial ordering of priority.

Using spectrum variables such as pain and remediation, and others that will be described hereinbelow, preferably establishes the base of an analysis meta-language.

The system can further be described as utilizing several basic axioms of work and functionality. Specifically, it is taken as axiomatic that the purpose of any application is to address required functionality based upon priorities and constraints; applications have many functions that must be realized, and they must often be accomplished simultaneously; when functionality must be satisfied, it is realized by a element that can perform that functionality that is bounded through a unit of work; elements often run simultaneously to realize functional requirements; each realization mechanism (i.e. how the work is performed through software, firmware and hardware) has resource costs to perform the work in terms of CPU, State (memory and/or storage), I/O and meta resource allocation (context switching, scheduling and resource assignment). Meta-resource allocation is also considered (e.g. the work of operating systems and various brokers, including application server and other deployment pattern elements) because for heavy I/O there is a lot work that must be done on behalf of a realization mechanism, so an operator (described hereinbelow) is needed for that (this can be characterized as a workload surrogate, or WS), which is a factor to different degrees for each pattern/element.

Generally, work can be described in terms of operators.

For example, workload resource consumption operators aggregate quality factors for resources and collectively define the expression of workload on those resources. Preferably, a sliding scale from zero to one is utilized for each of the major resource types of CPU, memory, network, and storage, although in at least some preferred implementations a system of discrete categorical measures (such as high, medium, low) is utilized.

In a preferred implementation, a resource consumption operator is implemented as a resource vector (ResVector). More specifically, implementation is preferably as a tensor having, on a first axis, time (e.g. one hour blocks over seven days, i.e. 168 intervals), and on a second axis, elements of a pattern. One of the axes of the tensor shows resource consumption per element as a resource footprint per time period for each of latency, variation, minimum level of resource quality (not to be confused with the qualities of a pattern) and occupancy of resource capacity in one dimension, with other resources described in the other dimensions of the tensor. For greater clarity this tensor can be thought of as the matrix multiplication of a time vector, a vector of elements of a pattern, a vector of resource measures consisting of occupancy, variation, latency, and a resource quality level, and a vector of resource types (such as compute, network, storage, space, and heat/thermal).

In some cases, the combinations may result in factors within the tensor that are more important than others for understanding or reasoning about performance. For example, resource latency is important with compute resources because it expresses the performance of the CPU, while resource occupancy and variation are important with memory because they express the amount of memory consumed and the degree of memory volatility that might be experienced as swapping or paging of memory (which degrades performance). Similarly, resource latency governs message frequency, while resource occupancy is associated with throughput available in the network. Lastly, with respect to storage, resource latency expresses an I/O rate, while resource occupancy is associated with an amount of storage space consumed.

Notably, the network dimension may contain vectors rather than scalars, and there is an entry for each other element that the element interacts with. This enables reasoning based on the topology of the network in some embodiments. Similarly, storage contains a vector for each storage type (representing logical files). A resource rate of change vector per element is on another axis. This shows how incremental resources are consumed based on percent changes in overall demand. A pattern matches preferably allows for the location of applications that use the same or a similar pattern based on an affinity analysis (e.g. number of elements element).

Figure 105:
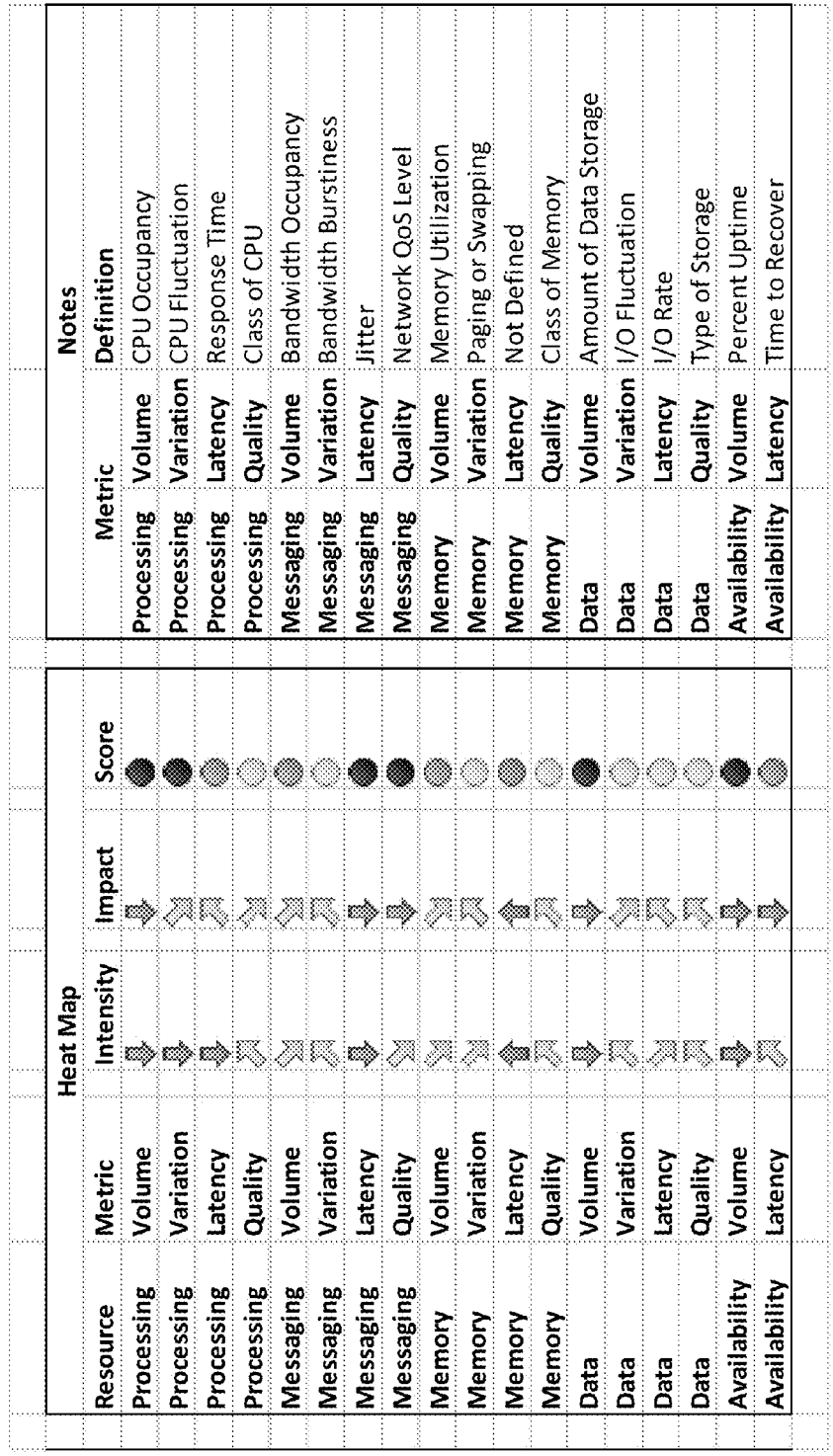
FIG. 105 illustrates how these dimensions of an exemplary resource vector could be associated.

Notably, this is just an exemplary resource vector. For example, another resource vector could, rather than showing resource consumption per element as a resource footprint per time period for latency and capacity in one dimension, processing, network, and I/O on the other dimension, show resource consumption per element as a resource footprint per time period for volume, variation, latency, and quality in one dimension, processing, messaging, memory, and data on the other. FIG. 105 illustrates how these dimensions could be associated.

Notably, the use of a resource vector allows for capacity forecasting given a growth prediction. For example, this could be performed by multiplying a growth prediction by resource vector data, which creates a demand prediction per time.

Further, the expression of resource quality allows for a variety of methods for describing the minimum or maximum service rate possible using a particular type of resource. These methods for expressing resource quality may vary by resource type, or by the combination of resource type and resource measure. For example, a 1 GHz CPU cannot exceed a service rate of 1 Billion instructions per second, whereas a SDRAM memory system has distinctly different latency characteristics as compared to a solid state memory system.

Turning to other operators, tradeoff operators may be defined that include a quality priority operator, a quality stringency operator, a conflict operator, and a unit of work designator (related to patterns).

Another operator is a concurrency operator, which relates to the degree that multiple functions must operate in conjunction, dictated by the context of the element and/or the pattern. This preferably utilizes two variables and expresses the extent to which concurrency occurs serially or in parallel. Still another operator is a collaboration operator, which details the degree to which multiple functions need to collaborate. Use of this operator allows highly collaborative flow to be distinguished between elements that may tolerate a quality of high latency and those that need instant collaboration. Preferably this operator can distinguish between collaboration types (e.g. event, information), and call them out separately so that each variable can be high. This combination of collaboration and concurrency can be used to create a proximity operator.

A proximity operator will vary in terms of need based upon collaboration need, collaboration type, stateful requirements, and concurrency. The proximity operator thus aggregates other operators.

Quality attribute designators describe the attributes of a quality and include, for example, a pattern quality, an element quality, quality values, and a quality family. Preferably, some or all operators are expressed as a value along a continuum between zero and one, so as to allow for the utilization of probabilistic or fuzzy logic modeling.

A dispersion operator will provide for workload experienced by the pattern to be allocated (according to a policy for allocation) among the elements of that pattern. The allocation policy may be even or biased and subject to constraints determined by other qualities, or via association with the qualities of other elements. For example, in a traditional deployment, a message might be sent to a server which might do the work itself or send out parts of the workload to other infrastructure (e.g. message servers, portal servers, or database servers). The dispersion operator enables this type of workload dispersion to be modeled within a pattern.

A conflict operator works to highlight when servicing the qualities of two functions will cause a conflict of resources, such as, for example, latency and throughput. When that occurs, preferably, a number of things are evaluated (e.g. concurrency, the fact that services might be of the same work type, their need to collaborate with competitors to do their job, and the need for proximity). The key to conflict can be characterized as the realization of a function in terms of competing for resources. Thus, preferably, a knowledge base is utilized that contains functions and their inherent conflicts. Preferably, these are characterized in terms of workload type (how much is CPU, versus pushing data, versus reacting to events, etc.).

In at least some implementations, remediation pain and need variables provide a means of describing the priority of problems to be addressed as described hereinabove.

In a traditional deployment, a message might be sent to a server which might do the work itself or send out parts of the workload to other infrastructure (e.g. message servers, portal servers, or db servers). This typical arrangement might present conflicts that may need remediation.

Workload at a function level might be complex due to variability and peak periods. To properly analyze work via workload operating characteristics, a work load consumption vector is preferably assigned for each function at a sliding scale. This vector may include a type of workload (expressed as a size of unit of work), sensitivity of the workload (expressed in terms of interrupt tolerance within a unit of work) and a rate of workload arrival. For interrupt tolerance/unit of work, a trend towards zero implies that long running units of work are processed for this function. For interrupt focus, a trend towards one implies a low latency workload. For CPU duration/unit of work, a trend to one implies longer dedicated CPU time is required to complete the work. For information size/unit of work, a trend to one implies a larger set of data to work with implying that cache might be needed and that the calculation effort of that workload is larger.

All of these operator subtypes can be mapped to a continuum or a system of discrete values governed by the qualities of the patterns that they operate within.

For example, a element within a pattern having a quality where latency must be low is a candidate for configuration within an optimized low latency ensemble and might exhibit some of the following properties: CPU duration/unit of work=0.1, Interrupt Tolerance/unit of work=0.0.01, Interrupt Focus=0.8, and Information Size/unit of work=0.1.

Lastly, a stringency operator can be utilized. If the stringency of a quality in a pattern is greater than the individual stringencies of the same quality at the element level, then the priority of the quality at the pattern level is set to a very high value (such as one in a system where priority is defined as a continuous value between zero and one).

It is worth noting that the focus of the conflict operator is not for real time adjustments, as workload brokers, and various monitors, mitigate conflicts as they arise based on real time resource availability. Instead, the conflict operator is intended to provide knowledge and support automated reasoning of how to design to minimize conflicts, understanding of the essence of a conflict so that users not trained in patterns, elements and RTI remediation will have an ability to characterize workload without direct references to these more complex topics. Thus the conflict operator facilitates usage of the more complex mechanisms previously described.

Two realization methods are in conflict when they must perform work concurrently and their collaboration and proximity constraints are high. In cases where a realization could have alternatives, then the realization operator could be subject to a scale of choices. If a particular realization is chosen, then the realization can be set to a high value (such as one in a system where priority is defined as a continuous value between zero and one). Thus, during what might be an iterative process of successive refinement and ensemble configuration, the realization operator reflects the certainty that a particular realization is to be implemented and this operator is updated, using a variety of techniques, as the process of configuration moves along.

Conflicts can be modeled using a variety of techniques, including matrix and state machine comparisons. Stringency is the tolerance factor for a quality in an element. In a system where conflict is defined as a continuous value between zero and one, if stringency equals one, then the requirement is incredibly tight and the quality must be met according to the definition. A value closer to zero, on the other hand, means the requirement is less stringent. A value of zero would translate to N/A for that quality. Preferably, the default value is one half, and this default value can be tuned when a quality is selected by the user. Alternatively, in a system where conflict is defined as a discrete categorical value (e.g. N/A, low, medium, high), the categorical value expresses the extent to which the quality must be met.

The system can further be described as utilizing several basic axioms of quality conflict and remediation.

According to a stringency hierarchy axiom, if stringency is set to a high value for a quality in a pattern, then there must be an element in that pattern where that matching quality has a priority that is set to a high value, and a stringency that is also set to a high value.

According to a concurrency and work unit axiom, service units enact patterns which fulfill the service unit because various elements concurrently process units of work.

According to a separation of concerns axiom, if qualities are in conflict in a pattern, the elements that are demanding conflicting qualities need to be separated.

According to an incremental tactics axiom, there is a need to characterize tactics that address service delivery requirements (e.g. performance, security, availability). Numerous tactics might be able to be subjected to a sliding scale, and each service delivery requirement, when expressed using qualities, must have a tactic. The tactics ability to meet the quality value required for the service delivery requirement may be related to the ability to provide resources when required, given constraints on supply (such as resource shortages for resources in high demand). Elements, on the other hand, have their own set of detail. Elements preferably have a number of characteristics, such as, for example, a degree of collaboration, information size, an event handling characteristic, priority, a number of functions, and a degree of concurrency for its functions.

According to a resource contention axiom, it is assumed that elements in a pattern must compete for resources (e.g. compute, network, storage, memory), in a relative way to complete the unit of work in a manner that will meet the requirements. The relative usage of resources is preferably represented by a sliding scale [0,1], represented as a percentage of initially allocated resources. A categorical system of measurement for resource contention (such as high, medium, or low contention) may also be used as an alternative. Elements have workload type characteristics, such as interrupt tolerance, as defined above. Preferably, resource competition is considered in context.

According to a containment and cascading priority axiom, elements compete within a pattern for resources, and patterns compete for resources within an application domain in traditional deployments. Elements in a pattern preferably receive priority based upon the priority of its business function as it relates to quality fulfillment at the pattern level. From a user perspective, patterns can be characterized as black boxes because they represent workload that will run on ensembles, which are to be delivered as a product. Elements within a pattern will likely have conflicting qualities that will require scarce resources to fill. In some instances, fulfillment of one quality could compromise others (e.g. strong encryption for each message could increase latency). Preferably, an unacceptability critical threshold for quality is utilized (in at least some implementations, a step function is utilized) which can be expressed in either a continuous or in a categorical metric system.

In all cases where there is a choice in implementation between a continuously valued system of metrics (such as between zero and one, or from 1 to 100), or a discrete system of metrics based on categorical values (such as low, medium, and high, or very small, small, moderate, large and very Large), the same methods, operators, and axioms can be equivalently defined and implemented. The only effect of the metric system chosen is the accuracy of the computation and the granularity of the results obtained. In many cases where pattern-matching is the primary use of the metric space, a categorical system of measurement is sufficient. In many cases where IT resource or workload simulation or performance measurement is the primary use of the metric space, a continuous system of measurement is preferred. At least some preferred implementations use both types of metric systems.

An Exemplary System, Cont'd

Returning to FIG. 104, the workbench module of the system preferably includes one or more wizard modules, such as, for example, the illustrated scenario analysis wizard module.

The average user can become easily overwhelmed by the amount of decisions that need to be made in accordance with one or more preferred methodologies. The experience would be similar to a novice builder walking into a large hardware chain store in order to find out how to build a gazebo in the backyard. The novice could wander the aisles in such a store for an entire day and be no closer to an approach.

A wizard is the equivalent of offering a set of compact "how to books" often found in large chain stores. There are books on building a gazebo that include how to plan (demand), straight through to the tools (capabilities) needed, and a cut list. One or more preferred implementations preferably include wizards that are context and rule driven to guide a user on a directed path to optimizing a certain aspect of their environment (e.g. Java platforms). This would guide them through selection of known problems, typical patterns used, how to get current state data, how to make informed design decisions, etc.

The workbench module of the system preferably further includes an analysis engine module, and a resolution navigator module. In addition to the workbench module, the system preferably utilizes a content repository (not to be confused with the content library mentioned hereinabove), which can be characterized as a knowledgebase. The repository contains the complete set of heuristics, working knowledge, and history to run the analysis engine.

In order for the system to help a user determine how to analyze workload based upon input and a knowledge base of patterns, qualities and behaviors, certain structures must be codified so that the engine can do its work. A first table considers the fact that a workload (a running instance of a function that is contained inside a element) will need certain descriptive attributes in order to be analyzed. In most cases a user will not be redesigning a new function with a new approach to refactoring it. Instead the system is structured to help a user determine how existing functions can be characterized so that they can eventually run more effectively at execution through a more effective resource management scheme or a more efficient operating platform.

Several exemplary tables detailing data schema that could be utilized for the system will now be presented. Notably, some of the scales and operators declared in these tables are summary surrogates for detailed qualities defined for each pattern, and the expected answers to be gleaned from target applications. In a system where metrics are defined as a continuous value between zero and one, [0,1] is used as a sliding relative scale, with 0 implying that the measure or quality doesn't really matter when designing the system. It does not necessarily imply a value for the actual quality (e.g. an amount of information processed per unit of work value equal to zero does not mean that the amount of information is zero, it means that the design impact factor is very low), therefore a value of zero means not applicable (N/A) as a key design consideration.

FIG. 106 illustrates an exemplary element resource analysis table.

Any business function that is allocated to an element in a pattern has a priority relative to the rest of the functions in an application and often has a perceived pain when the user experiences its ability or inability to provide service. Element—quality conflict meta table arguments represent that base set of analysis data. FIG. 107 illustrates an exemplary such table containing a small sample of remediation tactics that could be kept in a database and presented for review, often with alternatives (hence the designation as remediation tactic "A"). The presentation of alternatives is advantageous because cost will be a factor in some tactics.

A pattern should be described by all of its elements, qualities, operators, profiles, and associations to elements in other types of patterns (such as an association between functional pattern elements and deployment pattern elements). The expression of a pattern should also have a sense of how elements collaborate, at least for the purpose of ensemble configuration, although in actual execution that may not be the case, as patterns might aggregate elements that hide that information. A pattern collaboration table and conflicts analysis preparation table preferably helps layout elements that collaborate heavily, have high priority, and will need to run concurrently to meet a service level agreement. FIG. 108 illustrates an exemplary such table. Note that collaboration is rarely symmetrical, so it might be necessary to show the difference between element A having a need to collaborate with element B, and element B having a need to collaborate with element A. These do not represent the same interaction, as an element having a need to collaborate can be characterized as an initiator and expects a response from the other element, which can be characterized as a collaborator. A and B might have independent needs to initiate a collaboration. This table begins to shape decisions around proximity, concurrency and the kinds of policies that ultimately might be used by a service broker within a fully configured system.

With respect to metrics, in a preferred implementation, resource vectors are utilized to compute distance, which is interpreted as overall fit. A variety of techniques can be utilized for distance calculation. One of these is a basic sum of squares metric for use with a multi-dimensional tensor, with no bias towards any one tuple, unless there is an excessive stringency requirement that is violated. Preferably, a fractal concept (e.g. patterns and elements) is utilized to map down stringency, qualities, consumption, and allocation of consumption, with the ability to aggregate to higher levels. Density estimation between clusters of qualities and other methods for reasoning about the distance between resource vectors are preferably also utilized in at least some preferred implementations.

Figure 109:
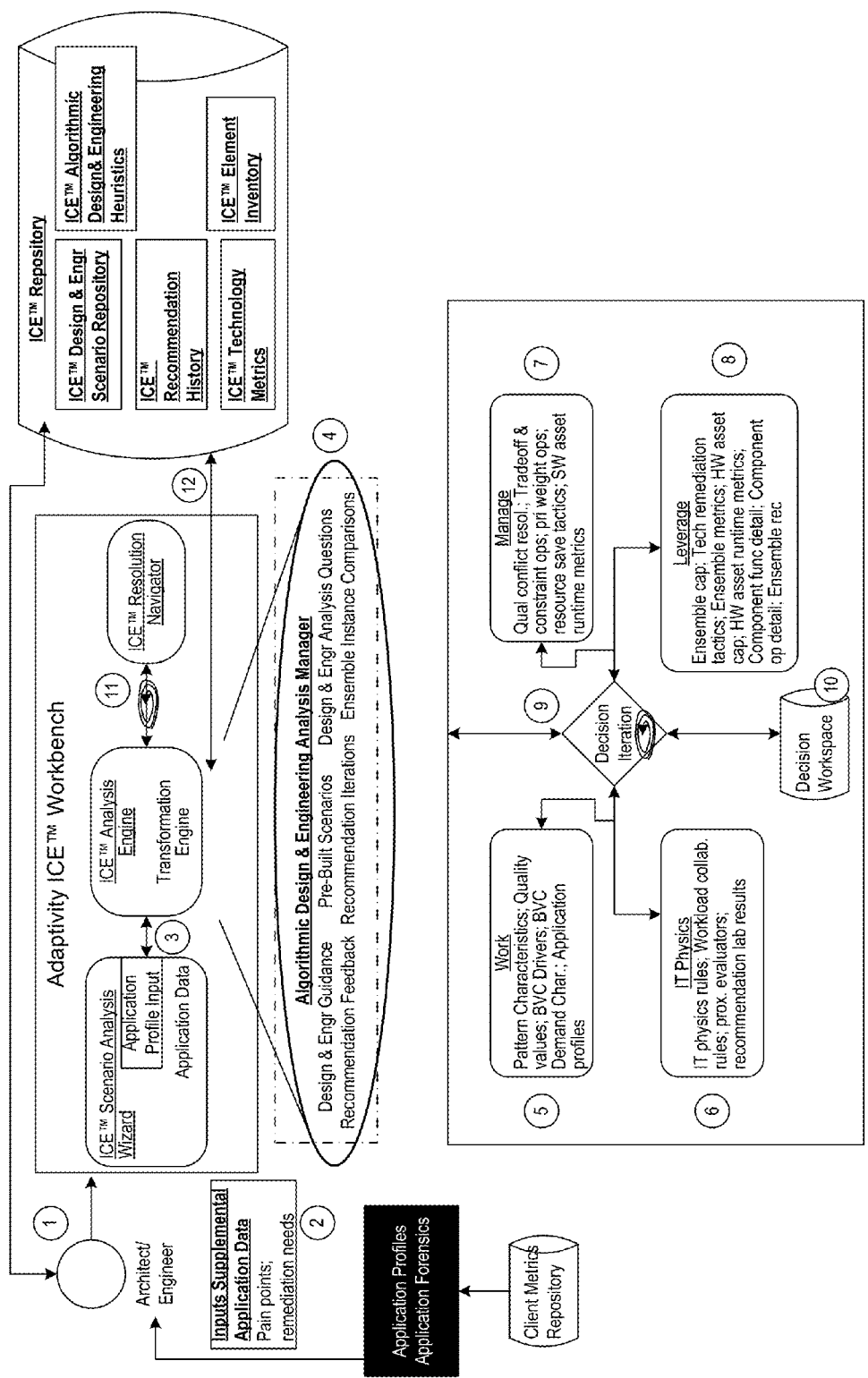
FIG. 109 is utilized for description of a preferred methodology in accordance with one or more aspects of the present invention.

A preferred methodology for the exemplary system will now be described with reference to FIG. 109.

In such preferred methodology, first, assessment scenarios are presented at step 1 to guide an architect/engineer through the scope of an application whose workload is to be optimized. Next, at step 2, an application profile and pain points/drivers are used as input for an assessment analysis. Completed profile forms can be uploaded, or, alternatively, a scenario manager can walk through questions via an interactive form Then, at step 3, an analysis engine is invoked with an assessment environment tailored to the scenario (environment variables would include business value chain element drivers, an application domain, potential patterns in that domain, etc.). The richness of the predefined data and scenario interaction will determine the richness of the analysis environment.

Thereafter, at step 4, architecture tradeoff analysis begins as part of an iterative cycle. In a preferred implementation, several analysis agents will be run concurrently, refining models in a shared decision workspace 10, e.g. a blackboard pattern.

A first of these agents is a work agent 5, where application workload is matched to patterns through iterative decomposition, utilizing a knowledge repository of defined patterns to associate the application workload. Decomposition of the workload continues and is influenced by previously defined constraints, although decomposition preferably stops at the element level. Preferably, potential resource contention and the need for concurrency are explored.

A second of these agents is an IT proximity optimization agent, where a degree of collaboration and an intensity of collaboration traffic are weighed as factors in decomposition. Preferably, resource contention is balanced (e.g. CPU, vs. network, vs. storage).

A third of these agents is a management agent 7, where workload and concurrency are evaluated to determine how best to minimize conflict and remediate resource utilization. Preferably, technology remediation tactics that offer better managed solutions are introduced and weighed for conflict.

A fourth of these agents is a leverage agent 8, where various technology remediation tactics are offered by matching technologies to functional and operational needs. As technology remediation tactics are marked as good fits, their relative combinations are compared against known ensemble configurations. Preferably, all choices are compared for possible conflicts.

The workbench further includes a decision iteration module 9, where final conflict weighting is applied and initial recommendations are offered showing benefits, tradeoffs, and constraints. Here, each decision factor can be altered by a user in order to fine tune a selection. Preferably, analysis can be saved and/or re-run.

The decision workspace 10 is an active structured workspace that can be refined simultaneously by the four agents (work, physics, management, and leverage) to refine solution sets. Preferably, proper locking and domain control is provided so that analysis can proceed rapidly.

The workbench preferably further includes a resolution navigator, which provides side-by-side comparisons of ensemble recommendations for an application organized by workload types (patterns) within the application. Preferably, idealized versions of the workload are compared with the recommendations and the historical instances of similar workload types.

Figure 110:
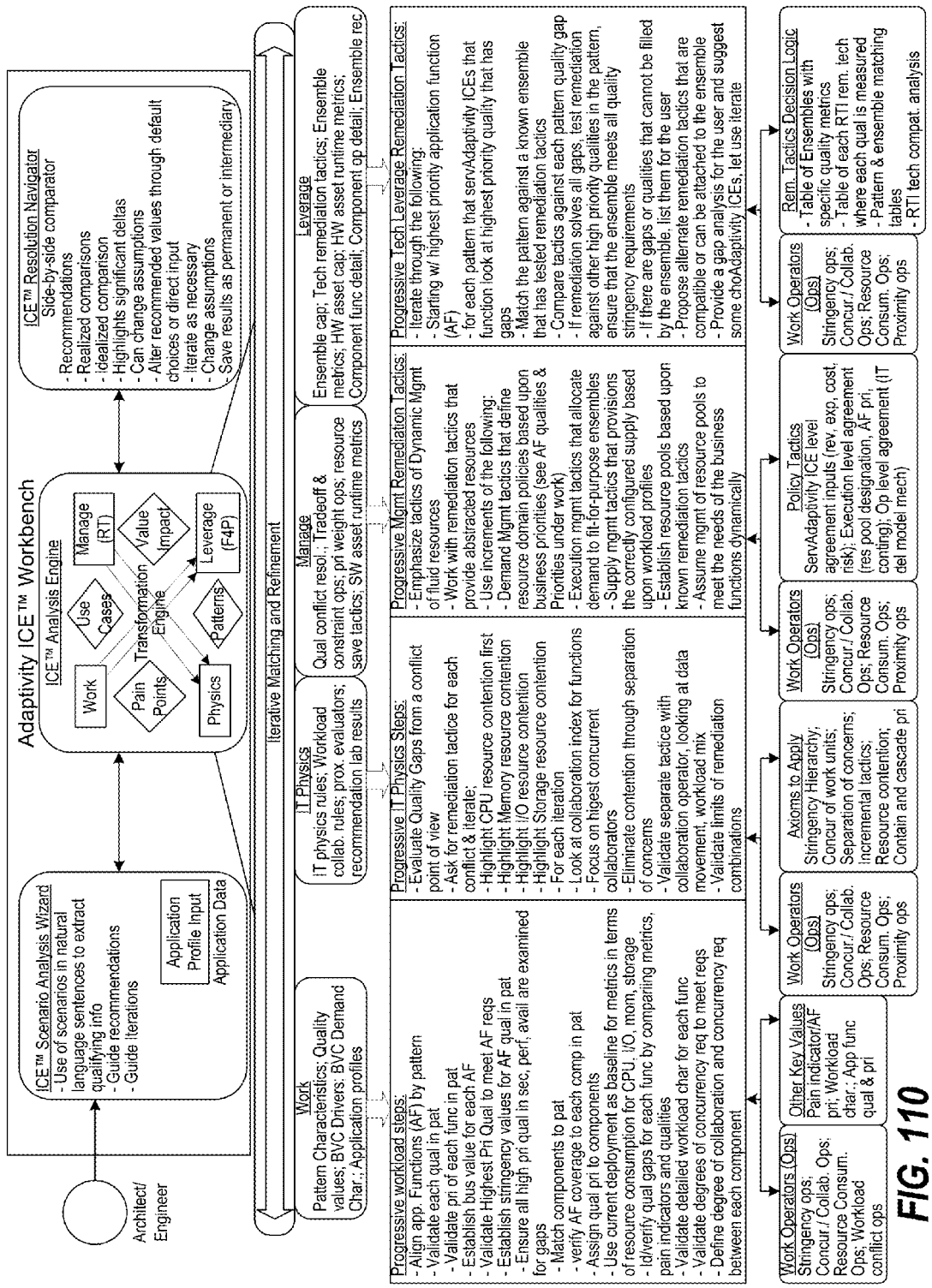
FIG. 110 illustrates agents of an exemplary software module in accordance with one or more aspects of the present invention.

As illustrated in FIG. 110, each agent takes certain inputs, and utilizes progressive steps or tactics that flow logically, and can be repeated to refine results as needed. Similarly to how an expert would work through a problem, the process is iterative, and preferably utilizes client metrics and lab results regarding new technologies (such as, for example, from an archeologist program in accordance with the disclosure of U.S. patent application Ser. No. 12/899,435, titled "INTEGRATED FORENSICS PLATFORM FOR ANALYZING IT RESOURCES CONSUMED TO DERIVE OPERATIONAL AND ARCHITECTURAL RECOMMENDATIONS", naming as inventors Anthony Bennett Bishop, Paul John Wanish, Alexis Salvatore Pecoraro, and Sheppard David Narkier, filed concurrently herewith on Oct. 6, 2010, which application and any publications thereof and patents issuing therefrom are hereby incorporated herein by reference). Preferably, logic operators are utilized to keep track of analysis states, as illustrated.

Exemplary Functionality

Some preferred systems, methods, and software described herein enable users to make better decisions about infrastructure choices by enabling the automation of reasoning systems to accomplish what would otherwise require the highly trained and experienced skills of senior IT architects. For example, some preferred systems, methods, and software described herein help users change how they organize, change how they architect, change how they manage, and change what they leverage as they migrate toward a real time infrastructure.

Some preferred systems, methods, and software described herein enable users to create fit for purpose designs dynamically managed by a demand driven real time infrastructure that meets a business platform's quality of experience requirements (i.e. balancing performance, cost, and efficiency). Still further, some preferred systems, methods, and software described herein enable practitioners to craft an operational management infrastructure based on tactics that facilitate the creation of demand, execution, and supply management policies.

Some preferred systems, methods, and software described herein help users design operating platforms that optimize workload by first identifying different workload types within a business application. Such identification is useful because different workload types have different demands on compute, network, and storage resources.

Some preferred systems, methods, and software described herein guide users through a process of engineering analysis that minimizes resource conflicts among workload types that must collaborate heavily to provide a business service, and then guides users in creating designs that combine heavily collaborative optimized workload ensembles together so that communication between collaborators is not compromised by excessive network hops.

At least some qualities (e.g. qualities of availability and security) as described herein are inter-related. Some preferred systems, methods, and software described herein help a user resolve conflicts in meeting disparate requirements. Such conflicts might arise when some qualities express extremely low tolerance for error. Meeting extreme requirements for some qualities might require a compromise on other qualities because of inherent conflict. For example, extremely low latency requirements might inherently conflict with high throughput and high availability.

Utilization of at least some preferred systems, methods, and software described herein preferably allows for alternatives to simply adding more hardware to address high execution times. Similarly, utilization of some preferred systems, methods, and software described herein preferably mitigates data center sprawl.

Use of some preferred systems, methods, and software described herein preferably additionally addresses energy concerns (e.g., heating/cooling of infrastructure), optimal use of space in a data center and other physical concerns arising from the physical placement or arrangement of systems, networks, and storage.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for allocating and configuring a network of data processing devices, the method comprising:
  displaying to a user of a computer system, via a display element, a user interface that allows a user to characterize electronic data processing demand of the network;
  receiving, from the user, via one or more input devices, input characterizing data processing demand;
  comparing, utilizing one or more processors and one or more memory elements of a computer system, qualities of electronic data processing demand to attributes of ensembles comprising implementations of reusable patterns, the qualities of electronic data processing demand being categorical metrics and being based at least in part on the received input characterizing electronic data processing demand, wherein the comparing includes correlating a fit between the qualities associated with electronic data processing demand and the attributes associated with ensembles using one or more statistical inference techniques and calculating a value corresponding to a level of fit for each ensemble based on such correlation; wherein the reusable patterns contain application patterns; wherein an application pattern includes a functional pattern that define the application; wherein the patterns represent reusable code;

determining, utilizing one or more processors and one or more memory elements of the computer system, based on said comparing step, one or more recommended ensembles, the one or more recommended ensembles being determined based on their calculated level of fit values; wherein the ensembles are estimated by mapping an application to one or more electronic data processing activities; wherein performance indicators and electronic data processing demand characteristics predict an optimal quality profile of the demand characteristics; wherein the ensemble includes an application quality profile; wherein the application quality profile is synthesized from electronic data processing activity quality profiles for all of the electronic data processing activities the application has been mapped to in an associated application pattern;

automatically generating, based on said comparing and determining steps, utilizing one or more processors and one or more memory elements of a computer system, one or more visualizations comparing the recommended one or more ensemble to electronic data processing demand;

displaying to the user, via a display element, the one or more visualizations; and generating, for each visualization, a data processing configuration blueprint, the data processing configuration blueprint comprising information for use by one or more users in implementing an ensemble of servers, storage devices, and network communications accessories; wherein the blueprint comprises a reference system architecture and design pattern which define functionality and represent data processing requirements, wherein the blueprint represents a data processing configuration transformation of the network of data processing devices; wherein the blueprint further includes a portfolio of computer applications; wherein the blueprint further profiles workload distribution utilizing functional patterns;

allowing the user to select, via a user interface displayed via a display element, the recommended ensemble or one of the other possible ensembles and receiving, from a user, input selecting a first one of the recommended ensemble or the other possible ensembles; and reconfiguring the network of data processing devices according to the selected ensemble and corresponding data processing configuration blueprint.

2. The method of claim 1, wherein said step of determining, based on said comparing step, a recommended ensemble comprises determining based at least in part on statistical inference logic, a recommended ensemble.

3. The method of claim 1, wherein said step of displaying to a user, via a display element, a user interface that allows the user to characterize electronic data processing demand of an organization comprises displaying to the user, via a display element, a user interface that allows the user to characterize key performance indicators of the organization.

4. The method of claim 1, wherein the method further includes a step of deriving a quality profile based on the received input characterizing electronic data processing demand.

5. The method of claim 1, wherein the reusable patterns comprise system of patterns whose behavior is specified by a quality profile.

6. The method of claim 5, wherein the patterns include one or more design architecture patterns.

7. The method of claim 5, wherein the patterns include one or more technology architecture patterns.

8. The method of claim 5, wherein the patterns include one or more functional architecture patterns.

9. The method of claim 5, wherein the patterns include one or more deployment architecture patterns.

10. The method of claim 5, wherein the patterns include one or more information architecture patterns.

11. The method of claim 1, wherein the attributes include qualities associated with resources.

12. The method of claim 11, wherein the qualities associated with resources include qualities associated with processing resources.

13. The method of claim 11, wherein the qualities associated with resources include qualities associated with memory resources.

14. The method of claim 11, wherein the qualities associated with resources include qualities associated with network resources.

15. The method of claim 11, wherein the qualities associated with resources include qualities associated with storage resources.

16. The method of claim 1 wherein the patterns comprise utilizing qualities, which represent categorical metrics, attributes, and/or constraints relating to the pattern.

17. A method for allocating and configuring a network of data processing devices, the method comprising:

displaying to a user of a computer system, via a display element, a user interface that allows the user to characterize electronic data processing demand of an organization;

receiving, from the user, via one or more input devices, input characterizing electronic data processing demand;

loading, in response to said step of receiving input characterizing electronic data processing demand, in one or more memory elements of the computer system, nonnumeric values for a plurality of categorical metrics associated with electronic data processing demand;

loading, from a data repository of the computer system, nonnumeric values for a plurality of categorical metrics associated with one or more architectural patterns;

automatically comparing, utilizing one or more processors and one or more memory elements of the computer system, the stored nonnumeric values for categorical metrics associated with electronic data processing demand to the loaded nonnumeric values for a plurality of categorical metrics associated with one or more architectural patterns by correlating a fit between the stored nonnumeric values for categorical metrics associated with electronic data processing demand and the loaded nonnumeric values for a plurality of categorical metrics associated with one or more architectural patterns using one or more statistical inference techniques and calculating a value corresponding to a level of fit for each of the architectural patterns based on such correlation; wherein the reusable patterns contain application patterns; wherein an application pattern includes a functional pattern that define the application; wherein the patterns represent reusable code;

automatically determining, utilizing one or more processors and one or more memory elements of a computer system, based on said comparing step, one or more recommended architectural patterns, the one or more recommended architectural patterns being determined based on their calculated level of fit values; wherein the ensembles are estimated by mapping an application to one or more electronic data processing activities; wherein performance indicators and electronic data processing demand characteristics predict an optimal quality profile of the demand characteristics; wherein the ensemble includes an application quality profile; wherein the application quality profile is synthesized from electronic data processing activity quality profiles for all of the electronic data processing activities the application has been mapped to in an associated application pattern;

displaying to the user, via a display element, an indication of the determined one or more architectural patterns; and generating, an IT blueprint, the IT blueprint comprising information for use by one or more users in implementing an ensemble; wherein the blueprint comprises a reference architecture and design pattern which define functionality and represent electronic data processing requirements, wherein the blueprint enables an information technology transformation of the information technology by providing tailored transformation information; wherein the blueprint includes a portfolio of applications; wherein the blueprint profiles workload distribution utilizing functional patterns;

allowing the user to select, via a user interface displayed via a display element, the recommended ensemble or one of the other possible ensembles and receiving, from a user, input selecting a first one of the recommended ensemble or the other possible ensembles; and reconfiguring the network of data processing devices according to the selected ensemble and corresponding data processing configuration blueprint.

18. A method for facilitating the allocation and configuration of a network of data processing devices, the method comprising:

displaying to a user of a computer system, via a display element, a user interface that allows the user to characterize key electronic data processing performance indicators for the organization;

receiving, from the user, via one or more input devices, input characterizing key electronic data processing performance indicators for the organization;

automatically deriving, based at least in part on the input characterizing key electronic data processing performance indicators for the organization, a quality profile;

displaying to the user, via a display element, a user interface, depicting the quality profile, that is configured to allow the user to effect changes to the quality profile;

automatically comparing, utilizing one or more processors and one or more memory elements of a computer system, the quality profile to attributes of ensembles comprising implementations of reusable patterns, wherein the comparing includes correlating a fit between the quality profile and the attributes of ensembles using one or more statistical inference techniques and calculating a value corresponding to a level of fit for each ensemble based on such correlation; wherein the reusable patterns contain application patterns; wherein an application pattern includes a functional pattern that define the application; wherein the patterns represent reusable code;

based on said comparing step, automatically determining, utilizing one or more processors and one or more memory elements of the computer system, one or more recommended ensembles, the one or more recommended ensembles being determined based on their calculated level of fit values; wherein the ensembles are estimated by mapping an application to one or more electronic data processing activities; wherein performance indicators and electronic data processing demand characteristics predict an optimal quality profile of the demand characteristics; wherein the ensemble includes an application quality profile; wherein the application quality profile is synthesized from electronic data processing activity quality profiles for all of the electronic data processing activities the application has been mapped to in an associated application pattern;

displaying to the user, via a display element, an indication of the recommended ensemble; and generating, an IT blueprint, the IT blueprint comprising information for use by one or more users in implementing an ensemble; wherein the blueprint comprises a reference architecture and design pattern which define functionality and represent electronic data processing requirements, wherein the blueprint enables an information technology transformation of the information technology by providing tailored transformation information; wherein the blueprint includes a portfolio of applications; wherein the blueprint profiles workload distribution utilizing functional patterns;

allowing the user to select, via a user interface displayed via a display element, the recommended ensemble or one of the other possible ensembles and receiving, from a user, input selecting a first one of the recommended ensemble or the other possible ensembles; and reconfiguring the network of data processing devices according to the selected ensemble and corresponding data processing configuration blueprint.

* * * * *